US008306665B2

(12) United States Patent
Tsangaris et al.

(10) Patent No.: US 8,306,665 B2
(45) Date of Patent: Nov. 6, 2012

(54) CONTROL SYSTEM FOR THE CONVERSION OF CARBONACEOUS FEEDSTOCK INTO GAS

(75) Inventors: Andreas Tsangaris, Ottawa (CA); Kenneth Craig Campbell, Kitchener (CA); Douglas Michael Feasby, Sherwood Park (CA); Alisdair Alan McLean, Ottawa (CA)

(73) Assignee: Plasco Energy Group Inc. (CA)

( * ) Notice: Subject to any disclaimer, the term of this patent is extended or adjusted under 35 U.S.C. 154(b) by 640 days.

(21) Appl. No.: 11/745,435

(22) Filed: May 7, 2007

(65) Prior Publication Data
US 2008/0147241 A1    Jun. 19, 2008

Related U.S. Application Data

(60) Provisional application No. 60/746,632, filed on May 5, 2006, provisional application No. 60/864,116, filed on Nov. 2, 2006, provisional application No. 60/911,179, filed on Apr. 11, 2007, provisional application No. 60/797,973, filed on May 5, 2006.

(30) Foreign Application Priority Data

Jun. 5, 2006   (WO) ................ PCT/CA2006/000881
Jun. 5, 2006   (WO) ................ PCT/CA2006/000882

(51) Int. Cl.
*G05B 15/02*    (2006.01)
(52) U.S. Cl. ........ 700/274; 700/266; 700/268; 700/271; 700/272; 700/273; 702/31; 702/32; 436/3; 436/55; 422/2; 422/62; 422/105; 422/106; 422/107; 422/108; 422/109; 422/110; 422/111; 422/112; 422/113; 422/114; 422/115; 422/172; 422/176; 422/182; 422/183; 435/3
(58) Field of Classification Search .................. 700/266, 700/268, 271–274; 702/31, 32; 436/3, 55; 422/2, 62, 105–116, 172, 176, 182, 183; 435/3
See application file for complete search history.

(56) References Cited

U.S. PATENT DOCUMENTS
2,062,762 A    12/1936  Preston
(Continued)

FOREIGN PATENT DOCUMENTS
CA          1134208        10/1982
(Continued)

OTHER PUBLICATIONS

Physical Chemistry $2^{nd}$ edition; Alberty et al. John Wiley & Sone, Inc; pp. 157-162; 1996.*

(Continued)

*Primary Examiner* — Brian R Gordon
*Assistant Examiner* — Shogo Sasaki
(74) *Attorney, Agent, or Firm* — Akerman Senterfitt

(57) ABSTRACT

The present invention provides a control system for the conversion of carbonaceous feedstock into a gas. In particular, the control system is designed to be configurable for use in controlling one or more processes implemented in, and/or by, a gasification system for the conversion of such feedstock into a gas, which may be used for one or more downstream applications. Gasification processes controllable by different embodiments of the disclosed control system may include in various combinations, a converter, a residue conditioner, a recuperator and/or heat exchanger system, one or more gas conditioners, a gas homogenization system and one or more downstream applications. The control system operatively controls various local, regional and/or global processes related to the overall gasification process, and thereby adjusts various control parameters thereof adapted to affect these processes for a selected result. Various sensing elements and response elements are therefore distributed throughout the controlled system and used to acquire various process, reactant and/or product characteristics, compare these characteristics to suitable ranges of such characteristics conducive to achieving the desired result, and respond by implementing changes to in one or more of the ongoing processes via one or more controllable process devices.

31 Claims, 77 Drawing Sheets

U.S. PATENT DOCUMENTS

| | | |
|---|---|---|
| 3,622,493 A | 11/1971 | Crusco |
| 3,692,505 A | 9/1972 | Reichl et al. |
| 3,725,020 A | 4/1973 | Slater et al. |
| 3,779,182 A | 12/1973 | Camacho |
| 3,801,469 A | 4/1974 | Essenhigh |
| 3,804,606 A | 4/1974 | Archer et al. |
| 3,941,065 A | 3/1976 | Albrecht |
| 3,991,557 A | 11/1976 | Donath |
| 4,007,786 A | 2/1977 | Schlinger |
| 4,028,068 A | 6/1977 | Kiener |
| 4,063,521 A | 12/1977 | Pech |
| 4,141,694 A | 2/1979 | Camacho |
| 4,172,425 A | 10/1979 | Sheridan |
| 4,181,504 A | 1/1980 | Camacho |
| 4,208,191 A | 6/1980 | Sze |
| 4,229,184 A | 10/1980 | Gregg |
| 4,272,255 A | 6/1981 | Coates |
| 4,291,636 A | 9/1981 | Bergsten et al. |
| 4,399,314 A | 8/1983 | Child |
| 4,400,179 A | 8/1983 | Marion et al. |
| 4,410,336 A | 10/1983 | Blaskowski |
| 4,472,172 A | 9/1984 | Sheer et al. |
| 4,479,443 A | 10/1984 | Faldt et al. |
| 4,489,562 A | 12/1984 | Snyder et al. |
| 4,495,873 A | 1/1985 | Blankenship |
| 4,534,301 A | 8/1985 | Sakash et al. |
| 4,543,940 A | 10/1985 | Krill et al. |
| 4,606,799 A | 8/1986 | Pirklbauer et al. |
| 4,644,877 A | 2/1987 | Barton et al. |
| 4,656,956 A | 4/1987 | Flickinger et al. |
| 4,666,462 A | 5/1987 | Martin |
| 4,676,805 A | 6/1987 | Richter et al. |
| 4,701,185 A | 10/1987 | Eckstein |
| 4,749,383 A | 6/1988 | Mansfield et al. |
| 4,831,944 A | 5/1989 | Durand et al. |
| 4,838,898 A | 6/1989 | Mifflin et al. |
| 4,881,947 A | 11/1989 | Parker et al. |
| 4,900,429 A | 2/1990 | Richardson |
| 4,941,415 A | 7/1990 | Pope et al. |
| 4,960,380 A | 10/1990 | Cheetham |
| 4,989,522 A | 2/1991 | Cline et al. |
| 5,010,829 A | 4/1991 | Kulkarni |
| 5,062,372 A | 11/1991 | Ritter |
| 5,065,206 A | 11/1991 | Nishizawa et al. |
| 5,081,940 A | 1/1992 | Motomura et al. |
| 5,095,825 A | 3/1992 | Arpalahti et al. |
| 5,095,828 A | 3/1992 | Holden et al. |
| 5,101,739 A | 4/1992 | Nance et al. |
| 5,136,137 A | 8/1992 | Schlienger |
| 5,279,234 A | 1/1994 | Bender et al. |
| 5,280,757 A | 1/1994 | Carter et al. |
| 5,288,969 A | 2/1994 | Wong et al. |
| 5,295,449 A | 3/1994 | Maeda et al. |
| 5,319,176 A | 6/1994 | Alvi et al. |
| 5,331,906 A | 7/1994 | Sonoda et al. |
| 5,361,709 A | 11/1994 | Eshleman |
| 5,410,121 A | 4/1995 | Schlienger |
| 5,417,170 A | 5/1995 | Eshleman |
| 5,477,790 A | 12/1995 | Foldyna et al. |
| 5,486,269 A | 1/1996 | Nilsson |
| 5,541,386 A | 7/1996 | Alvi et al. |
| 5,544,597 A | 8/1996 | Camacho |
| 5,579,705 A | 12/1996 | Suzuki et al. |
| 5,634,281 A | 6/1997 | Nugent |
| 5,666,891 A | 9/1997 | Titus et al. |
| 5,727,903 A | 3/1998 | Borray et al. |
| 5,756,957 A | 5/1998 | Titus et al. |
| 5,785,923 A | 7/1998 | Surma et al. |
| 5,798,497 A | 8/1998 | Titus et al. |
| 5,865,206 A | 2/1999 | Steigman et al. |
| 5,871,348 A | 2/1999 | Terry et al. |
| 5,877,394 A | 3/1999 | Kujawa et al. |
| 5,908,564 A | 6/1999 | Titus et al. |
| 5,937,652 A | 8/1999 | Abdelmalek |
| 5,944,034 A | 8/1999 | McRae et al. |
| 5,958,264 A | 9/1999 | Tsantrizos et al. |
| 6,066,825 A | 5/2000 | Titus et al. |
| 6,084,139 A | 7/2000 | Van Der Giessen et al. |
| 6,084,147 A | 7/2000 | Mason |
| 6,089,169 A | 7/2000 | Comiskey |
| 6,112,677 A | 9/2000 | Kuntschar et al. |
| 6,155,182 A | 12/2000 | Tsangaris et al. |
| 6,182,584 B1 | 2/2001 | Gaudio |
| 6,200,430 B1 | 3/2001 | Robert |
| 6,215,678 B1 | 4/2001 | Titus et al. |
| 6,245,309 B1 | 6/2001 | Etievant et al. |
| 6,250,236 B1 | 6/2001 | Feizollahi |
| 6,269,286 B1 | 7/2001 | Tse et al. |
| 6,279,494 B1 | 8/2001 | Jimbo et al. |
| 6,332,408 B2 | 12/2001 | Howlett et al. |
| 6,380,507 B1 | 4/2002 | Childs |
| 6,394,042 B1 | 5/2002 | West |
| 6,485,296 B1 | 11/2002 | Bender et al. |
| 6,499,412 B2 | 12/2002 | Cochran et al. |
| 6,553,924 B2 | 4/2003 | Beaumont et al. |
| 6,630,113 B1 | 10/2003 | Surma |
| 6,686,556 B2 | 2/2004 | Mitchell |
| 6,712,012 B1 | 3/2004 | van Kessel |
| 6,752,093 B2 | 6/2004 | Schirmer et al. |
| 6,810,821 B2 | 11/2004 | Chan |
| 6,817,388 B2 | 11/2004 | Tsangaris et al. |
| 6,837,910 B1 | 1/2005 | Yoshikawa et al. |
| 6,863,268 B2 | 3/2005 | Zhang |
| 6,887,284 B2 | 5/2005 | Hudson |
| 6,960,234 B2 | 11/2005 | Hassett |
| 6,971,323 B2 | 12/2005 | Capote et al. |
| 7,465,843 B2 | 12/2008 | Gnedenko et al. |
| 2001/0047614 A1 | 12/2001 | Swanepoel et al. |
| 2002/0088236 A1 | 7/2002 | Arar et al. |
| 2002/0103407 A1 | 8/2002 | Hatanaka |
| 2002/0144981 A1 | 10/2002 | Mitchell |
| 2003/0022035 A1 | 1/2003 | Galloway |
| 2003/0070808 A1 | 4/2003 | Allison |
| 2003/0192609 A1 | 10/2003 | Enerson |
| 2003/0209174 A1 | 11/2003 | Chan |
| 2003/0233788 A1 | 12/2003 | Lewis |
| 2004/0031424 A1 | 2/2004 | Pope |
| 2004/0060236 A1 | 4/2004 | Yoshikawa et al. |
| 2004/0063798 A1 | 4/2004 | Erikstrup et al. |
| 2004/0170210 A1 | 9/2004 | Do et al. |
| 2004/0244289 A1 | 12/2004 | Morozumi et al. |
| 2004/0245086 A1 | 12/2004 | Steynberg et al. |
| 2004/0247509 A1 | 12/2004 | Newby |
| 2004/0251241 A1 | 12/2004 | Blutke et al. |
| 2005/0109603 A1 | 5/2005 | Graham |
| 2005/0166810 A1 | 8/2005 | Gnedenko et al. |
| 2005/0256212 A1 | 11/2005 | Norbeck et al. |
| 2005/0256592 A1 | 11/2005 | Martens |
| 2006/0042999 A1 | 3/2006 | Iqbal et al. |
| 2006/0228294 A1 | 10/2006 | Davis et al. |
| 2007/0006528 A1 | 1/2007 | Diebold et al. |
| 2007/0012229 A1 | 1/2007 | Rehmat et al. |
| 2007/0045155 A1 | 3/2007 | Selmen et al. |
| 2007/0068405 A1 | 3/2007 | Masuch et al. |
| 2007/0258869 A1 | 11/2007 | Tsangaris et al. |
| 2007/0266632 A1 | 11/2007 | Tsangaris et al. |
| 2007/0266633 A1 | 11/2007 | Tsangaris et al. |
| 2007/0266634 A1 | 11/2007 | Tsangaris et al. |
| 2007/0272131 A1 | 11/2007 | Carabin et al. |
| 2007/0284453 A1 | 12/2007 | Tsangaris et al. |
| 2007/0289216 A1 | 12/2007 | Tsangaris et al. |
| 2008/0104887 A1 | 5/2008 | Tsangaris et al. |
| 2008/0202028 A1 | 8/2008 | Tsangaris et al. |
| 2008/0209807 A1 | 9/2008 | Tsangaris et al. |
| 2008/0210089 A1 | 9/2008 | Tsangaris et al. |
| 2008/0222956 A1 | 9/2008 | Tsangaris et al. |
| 2008/0277265 A1 | 11/2008 | Tsangaris et al. |
| 2009/0020456 A1 | 1/2009 | Tsangaris et al. |
| 2010/0154304 A1 | 6/2010 | Tsangaris et al. |
| 2010/0275781 A1 | 11/2010 | Tsangaris et al. |
| 2011/0036014 A1 | 2/2011 | Tsangaris et al. |
| 2011/0062013 A1 | 3/2011 | Tsangaris et al. |
| 2011/0078952 A1 | 4/2011 | Tsangaris et al. |

FOREIGN PATENT DOCUMENTS

| | | |
|---|---|---|
| CA | 2106746 | 3/1994 |
| CA | 2343035 | 3/2000 |

| | | |
|---|---|---|
| CA | 2349608 | 5/2000 |
| CA | 2332685 | 9/2001 |
| CA | 2457075 | 2/2003 |
| CA | 2407102 | 4/2003 |
| CA | 2396438 A1 | 7/2003 |
| CA | 2484472 | 11/2003 |
| CA | 2424805 | 10/2004 |
| CA | 2501841 | 9/2005 |
| CA | 2559875 | 10/2005 |
| CA | 2610806 | 12/2006 |
| CA | 2610808 | 12/2006 |
| CA | 2637779 A1 | 8/2007 |
| CA | 2714911 | 1/2008 |
| CA | 2716912 | 9/2008 |
| CN | 1258712 | 7/2000 |
| CN | 1382202 | 11/2002 |
| CN | 1644661 | 7/2005 |
| DE | 19652770 | 6/1998 |
| DE | 19916931 | 10/2000 |
| DE | 10047787 | 3/2002 |
| EP | 0045256 | 2/1982 |
| EP | 0153235 | 8/1985 |
| EP | 0330872 | 9/1989 |
| EP | 0412587 | 2/1991 |
| EP | 0625869 | 11/1994 |
| EP | 0675324 | 10/1995 |
| EP | 0837041 | 4/1998 |
| EP | 1004746 | 5/2000 |
| EP | 1136542 | 9/2001 |
| EP | 1227141 | 7/2002 |
| EP | 1475429 | 11/2004 |
| EP | 1696177 | 8/2006 |
| EP | 1865256 A1 | 12/2007 |
| FR | 2709980 | 3/1995 |
| GB | 191300500 | 0/1913 |
| GB | 683647 | 11/1952 |
| GB | 2422602 | 3/2006 |
| GB | 2451411 A | 1/2009 |
| JP | 49052465 | 5/1974 |
| JP | 2122109 | 5/1990 |
| JP | 05-066004 | 3/1993 |
| JP | 05-071717 | 3/1993 |
| JP | 09-033028 | 2/1997 |
| JP | 09-101399 | 4/1997 |
| JP | 10-002539 | 1/1998 |
| JP | 10-132230 | 5/1998 |
| JP | 11515086 T | 12/1999 |
| JP | 2001158887 | 6/2001 |
| JP | 2003-42429 A | 2/2003 |
| JP | 2003260454 | 9/2003 |
| JP | 2005047435 | 5/2005 |
| KR | 10-2005-0004647 A | 1/2005 |
| KR | 20050025290 | 3/2005 |
| NL | 8200417 | 9/1983 |
| RU | 2125082 | 1/1999 |
| WO | 94/04631 A1 | 3/1994 |
| WO | 9404631 | 3/1994 |
| WO | 0181828 | 11/2001 |
| WO | 02096576 | 12/2002 |
| WO | 03/018721 A1 | 3/2003 |
| WO | 03018467 | 3/2003 |
| WO | 03018721 | 3/2003 |
| WO | 2004041974 | 5/2004 |
| WO | 2004/072207 A1 | 8/2004 |
| WO | 2004072207 | 8/2004 |
| WO | 2004072210 | 8/2004 |
| WO | WO 2004/072547 | 8/2004 |
| WO | 2004087840 | 10/2004 |
| WO | 2005118750 | 12/2005 |
| WO | 2006081661 | 8/2006 |
| WO | WO 2006/081661 | 8/2006 |
| WO | 2006/114818 A1 | 11/2006 |
| WO | 2006128285 | 12/2006 |
| WO | 2006128286 | 12/2006 |
| WO | WO 2006/128285 | 12/2006 |
| WO | WO 2006/128286 | 12/2006 |
| WO | 2007/131241 A2 | 11/2007 |
| WO | 2007131239 | 11/2007 |
| WO | 2009009891 | 1/2009 |

OTHER PUBLICATIONS

Kerr et al., The Long Lake Project—The First Field Integration of SAGD and Upgrading, SPE Int'l Thermal Operations and Heavy Oil Symposium & Int'l Horizontal Well Technology Conference, Nov. 4-7, 2002, Calgary, Alberta, Canada.

Long Lake Integrated Project Diagram, Jun. 9, 2003, www.longlake.ca/project/bitumen.html.

Dighe, Westinghouse Plasma Coal Gasification & Vitrification Technology, Power Generation Conference, Oct. 16-17, 2002, Hersey, PA.

Yang et al., "Converting Moving-Grate Incineration from Combustion to Gasification—Numerical Simulation of the Burning Characteristics", Waste Management, vol. 27, No. 5, pp. 645-655, 2007.

Klien, A., "Gasification: An alternative process for energy recovery and disposal of municipal solid wastes" May 2002, pp. 1-50.

Presentation to the Hera Group, presented by Alisdair McLean of Plasco Energy Group, "Plasma Gasification of MSW" (Nov. 28, 2006), online: <http:// www.conama8.org/modulodocumentos/documentos/SDs/SD32/SD32_ppt_AlisdairMclean.pdf>.

Presentation to the Ottawa Centre of Research and Innovation (OCRI), presented by Rod Bryden of the Plasco Energy Group, "A Leap Forward" (Oct. 26, 2006).

Meeting of the Environmental Advisory Committee, City of Ottawa Committee Meeting Minutes, Doc. Minutes 27, (Ottawa: May 11, 2006), online: <http:// www.ottawa.ca/calendar/ottawa/citycouncil/a-eac/2006/05-11/minutes27.htm>.

Joint Meeting of Corporate Services and Economic Development Committee and Planning and Environment Committee, Evaluation Project—Plasma Waste Conversion, Doc. ACS2005-CMR-OCM-0012, (Ottawa: Sep. 7, 2005), online: < http://ottawa.ca/calendar/ottawa/citycouncil /occ/2005/09-28/csedc/ACS2005-CMR-OCM-0012>.

Plasco Energy Group, "Plasco Energy" (Apr. 2, 2006), online: Plasco Energy Group http://web.archive.org/web/20060412190747/www.plascoenergygroup. com/.

Ontario, Ministry of the Environment, Certificate of Approval—Air, No. 6925-6REN9E (Dec. 1, 2006).

Ontario, Ministry of the Environment, Provisional Certificate of Approval—Waste Disposal Site, No. 3166-6TYMDZ (Dec. 1, 2006).

Designation and Exemption—Plasco Trail Road Inc, O. Reg. 253/06, online: <http://www.canlii.org/on/laws/regu/2006r.253/20061120/whole.html>, 2006.

Plasco Demonstration Project, O. Reg. 254/06, online: <http://www.canlii.org/ on/laws/regu/2006r.254/20061120/whole.html>, 2006.

International Preliminary Report on Patentability issued Feb. 20, 2009 in connection with PCT Application No. PCT/US2007/068405.

European Search Report issued in connection with corresponding European Patent Application No. EP07797359.2, 2010.

* cited by examiner

Off-gas from gasifier

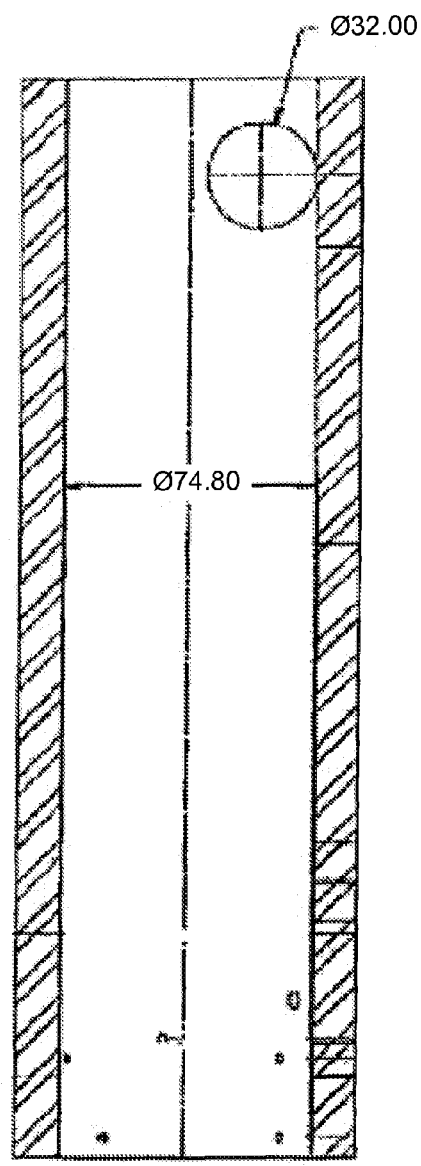
FIGURA 51A

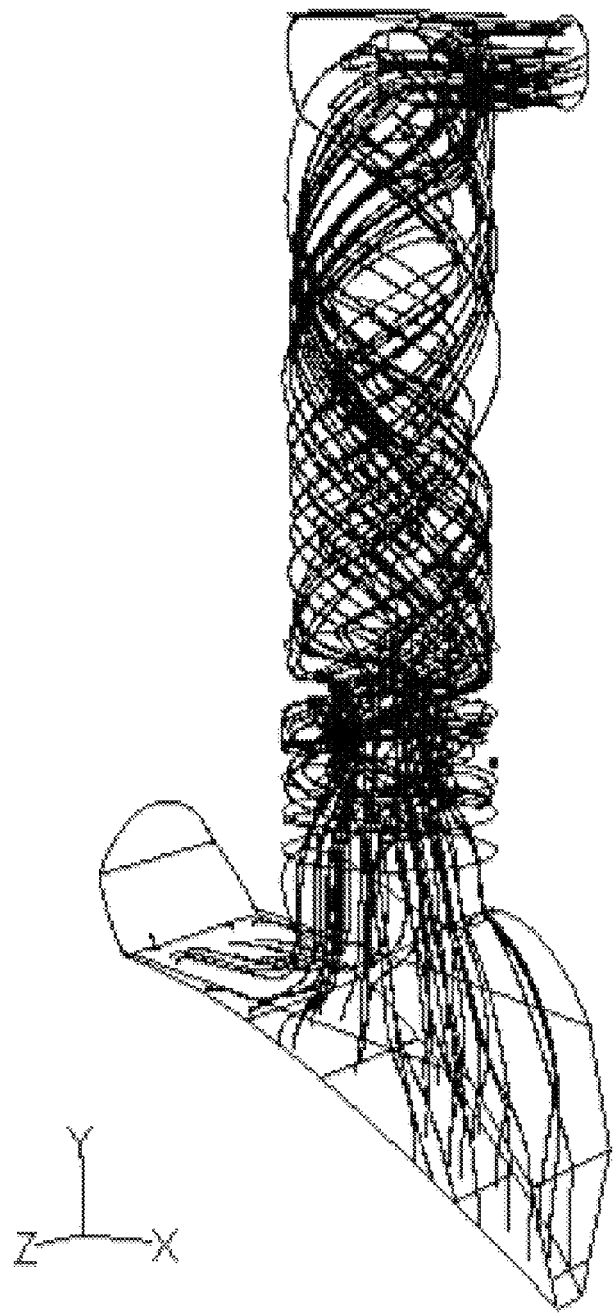
FIGURA 51B

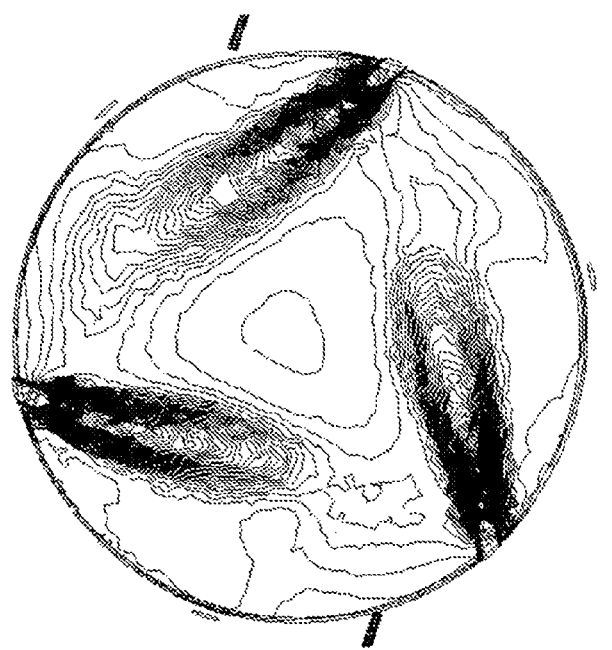
FIGURA 51C

CONTROL SYSTEM FOR THE CONVERSION OF CARBONACEOUS FEEDSTOCK INTO GAS

CROSS REFERENCE TO RELATED APPLICATIONS

This application claims benefit of priority under 35 U.S.C. §119(e) from U.S. Provisional Application Ser. No. 60/746,632, filed May 5, 2006. This application also claims benefit of priority to International Patent Application No. PCT/CA2006/000881, filed Jun. 5, 2006. This application also claims benefit of priority to International Patent Application No. PCT/CA2006/000882, filed Jun. 5, 2006. This application also claims benefit of priority under 35 U.S.C. §119(e) from U.S. Provisional Application Ser. No. 60/864,116, filed Nov. 2, 2006. This application also claims benefit of priority under 35 U.S.C. §119(e) from U.S. Provisional Application Ser. No. 60/911,179, filed Apr. 11, 2007. This application also claims benefit of priority under 35 U.S.C. §119(e) from U.S. Provisional Application Ser. No. 60/797,973, filed May 5, 2006. The contents of all of the aforementioned applications are hereby expressly incorporated by reference in their entirety and for all purposes.

FIELD OF THE INVENTION

The present invention relates to control systems and, in particular, to a control system for the conversion of carbonaceous feedstock into gas.

BACKGROUND OF THE INVENTION

Gasification is a process that enables the conversion of carbonaceous feedstock, such as municipal solid waste (MSW) or coal, into a combustible gas. The gas can be used to generate electricity, steam or as a basic raw material to produce chemicals and liquid fuels.

Possible uses for the gas include: the combustion in a boiler for the production of steam for internal processing and/or other external purposes, or for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial applications.

Generally, the gasification process consists of feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and NOx, gasification processes produce a raw gas composition comprising CO, $H_2$, $H_2S$, and $NH_3$. After cleanup, the primary gasification products of interest are $H_2$ and CO.

Useful feedstock can include any municipal waste, waste produced by industrial activity and biomedical waste, sewage, sludge, coal, heavy oils, petroleum coke, heavy refinery residuals, refinery wastes, hydrocarbon contaminated soils, biomass, and agricultural wastes, tires, and other hazardous waste. Depending on the origin of the feedstock, the volatiles may include $H_2O$, $H_2$, $N_2$, $O_2$, $CO_2$, CO, $CH_4$, $H_2S$, $NH_3$, $C_2H_6$, unsaturated hydrocarbons such as acetylenes, olefins, aromatics, tars, hydrocarbon liquids (oils) and char (carbon black and ash).

As the feedstock is heated, water is the first constituent to evolve. As the temperature of the dry feedstock increases, pyrolysis takes place. During pyrolysis the feedstock is thermally decomposed to release tars, phenols, and light volatile hydrocarbon gases while the feedstock is converted to char.

Char comprises the residual solids consisting of organic and inorganic materials. After pyrolysis, the char has a higher concentration of carbon than the dry feedstock and may serve as a source of activated carbon. In gasifiers operating at a high temperature (>1,200° C.) or in systems with a high temperature zone, inorganic mineral matter is fused or vitrified to form a molten glass-like substance called slag.

Since the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of the extreme waste of fuel in the heating process and the further waste of disposing, as a residual waste, material that can be converted into a useful syngas and solid material.

The means of accomplishing a gasification process vary in many ways, but rely on four key engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

There are a number of systems that have been proposed for capturing heat produced by the gasification process and utilizing such heat to generate electricity, generally known as combined cycle systems.

The energy in the product gas coupled with substantial amounts of recoverable sensible heat produced by the process and throughout the gasification system can generally produce sufficient electricity to drive the process, thereby alleviating the expense of local electricity consumption. The amount of electrical power that is required to gasify a ton of a carbonaceous feedstock depends directly upon the chemical composition of the feedstock.

If the gas generated in the gasification process comprises a wide variety of volatiles, such as the kind of gas that tends to be generated in a low temperature gasifier with a "low quality" carbonaceous feedstock, it is generally referred to as off-gas. If the characteristics of the feedstock and the conditions in the gasifier generate a gas in which CO and $H_2$ are the predominant chemical species, the gas is referred to as syngas. Some gasification facilities employ technologies to convert the raw off-gas or the raw syngas to a more refined gas composition prior to cooling and cleaning through a gas quality conditioning system.

Utilizing plasma heating technology to gasify a material is a technology that has been used commercially for many years. Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, oxygen, carbon dioxide). In the bulk phase, a plasma is electrically neutral.

Some gasification systems employ plasma heat to drive the gasification process at a high temperature and/or to refine the offgas/syngas by converting, reconstituting, or reforming longer chain volatiles and tars into smaller molecules with or without the addition of other inputs or reactants when gaseous molecules come into contact with the plasma heat, they will disassociate into their constituent atoms. Many of these atoms will react with other input molecules to form new molecules, while others may recombine with themselves. As the temperature of the molecules in contact with the plasma heat decreases all atoms fully recombine. As input gases can be controlled stoichiometrically, output gases can be controlled to, for example, produce substantial levels of carbon monoxide and insubstantial levels of carbon dioxide.

The very high temperatures (3000 to 7000° C.) achievable with plasma heating enable a high temperature gasification process where virtually any input feedstock including waste in as-received condition, including liquids, gases, and solids in any form or combination can be accommodated. The plasma technology can be positioned within a primary gasification chamber to make all the reactions happen simultaneously (high temperature gasification), can be positioned within the system to make them happen sequentially (low temperature gasification with high temperature refinement), or some combination thereof.

The gas produced during the gasification of carbonaceous feedstock is usually very hot but may contain small amounts of unwanted compounds and requires further treatment to convert it into a useable product. Once a carbonaceous material is converted to a gaseous state, undesirable substances such as metals, sulfur compounds and ash may be removed from the gas. For example, dry filtration systems and wet scrubbers are often used to remove particulate matter and acid gases from the gas produced during gasification. A number of gasification systems have been developed which include systems to treat the gas produced during the gasification process.

These factors have been taken into account in the design of various different systems which are described, for example, in U.S. Pat. Nos. 6,686,556, 6,630,113, 6,380,507; 6,215,678, 5,666,891, 5,798,497, 5,756,957, and U.S. Patent Application Nos. 2004/0251241, 2002/0144981. There are also a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799; 5,331,906; 5,486,269, and 6,200,430.

Prior systems and processes have not adequately addressed the problems that must be dealt with on a continuously changing basis. Some of these types of gasification systems describe means for adjusting the process of generating a useful gas from the gasification reaction. Accordingly, it would be a significant advancement in the art to provide a system that can efficiently gasify carbonaceous feedstock in a manner that maximizes the overall efficiency of the process, and/or the steps comprising the overall process.

Therefore, there is a need for a control system for the conversion of carbonaceous feedstock into a gas that overcomes some of the drawbacks of known control systems.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a control system for the conversion of carbonaceous feedstock into gas. In accordance with one aspect of the present invention, there is provided a control system for use in controlling a gasification process for converting a carbonaceous feedstock into a gas suitable for use in a selected downstream application, the system comprising: one or more sensing elements for sensing one or more characteristics of the gas; one or more computing platforms communicatively linked to said one or more sensing elements for accessing a characteristic value representative of said sensed one or more characteristics; comparing said characteristic value with a predetermined range of such values defined to characterise the gas as suitable for the selected downstream application; and computing one or more process control parameters conducive to maintaining said characteristic value within said predetermined range; and a plurality of response elements operatively linked to one or more process devices operable to affect the process and thereby adjust said one or more characteristics of the gas, and communicatively linked to said one or more computing platforms for accessing said one or more computed process control parameters and operating said one or more process devices in accordance therewith.

In accordance with another aspect of the present invention, there is provided a method for controlling the conversion of carbonaceous feedstock into a gas suitable for use in a selected downstream application, the method comprising: providing a converter for converting the feedstock into a gas, said converter comprising a feedstock input, one or more additive inputs and one or more heat sources and an output; sensing one or more characteristics of the gas downstream from said output and comparing a value representative thereof with a predetermined range of such values defined to characterise the gas as suitable for the selected downstream application; computing one or more process control parameters conducive to maintaining said characteristic value within said predetermined range; and operating one or more of said feedstock input, said one or more additive inputs and said one or more heat sources in accordance therewith.

In accordance with another aspect of the present invention, there is provided a method for controlling the conversion of carbonaceous feedstock into a gas, the method comprising providing a converter for converting the feedstock into a gas, said converter comprising a feedstock input, one or more additive inputs and one or more heat sources and an output; sensing one or more of a gas composition, a gas flow and a gas pressure and comparing values representative thereof with a respective predetermined range of such values; and when one or more of said representative values deviates from said respective predetermined range, adjusting an additive input rate via said one or more additive inputs to provide a fast response to the deviation; and adjusting a feedstock input rate via said feedstock input to provide a longer term response to the deviation.

BRIEF DESCRIPTION OF THE DRAWINGS

These and other features of the invention will become more apparent in the following detailed description in which reference is made to the appended drawings.

FIG. 51A is a cross-sectional view of the reformulating chamber of FIG. 46.

FIG. 51B is a diagram illustrating the air-flow within a gasifier comprising the gas reformulating system of the invention including the reformulating chamber of FIG. 46.

FIG. 51C illustrates the injection of air from the air inputs into the reformulating chamber of FIG. 46 and its effect on air-flow within.

DETAILED DESCRIPTION OF THE INVENTION

Figure 1:
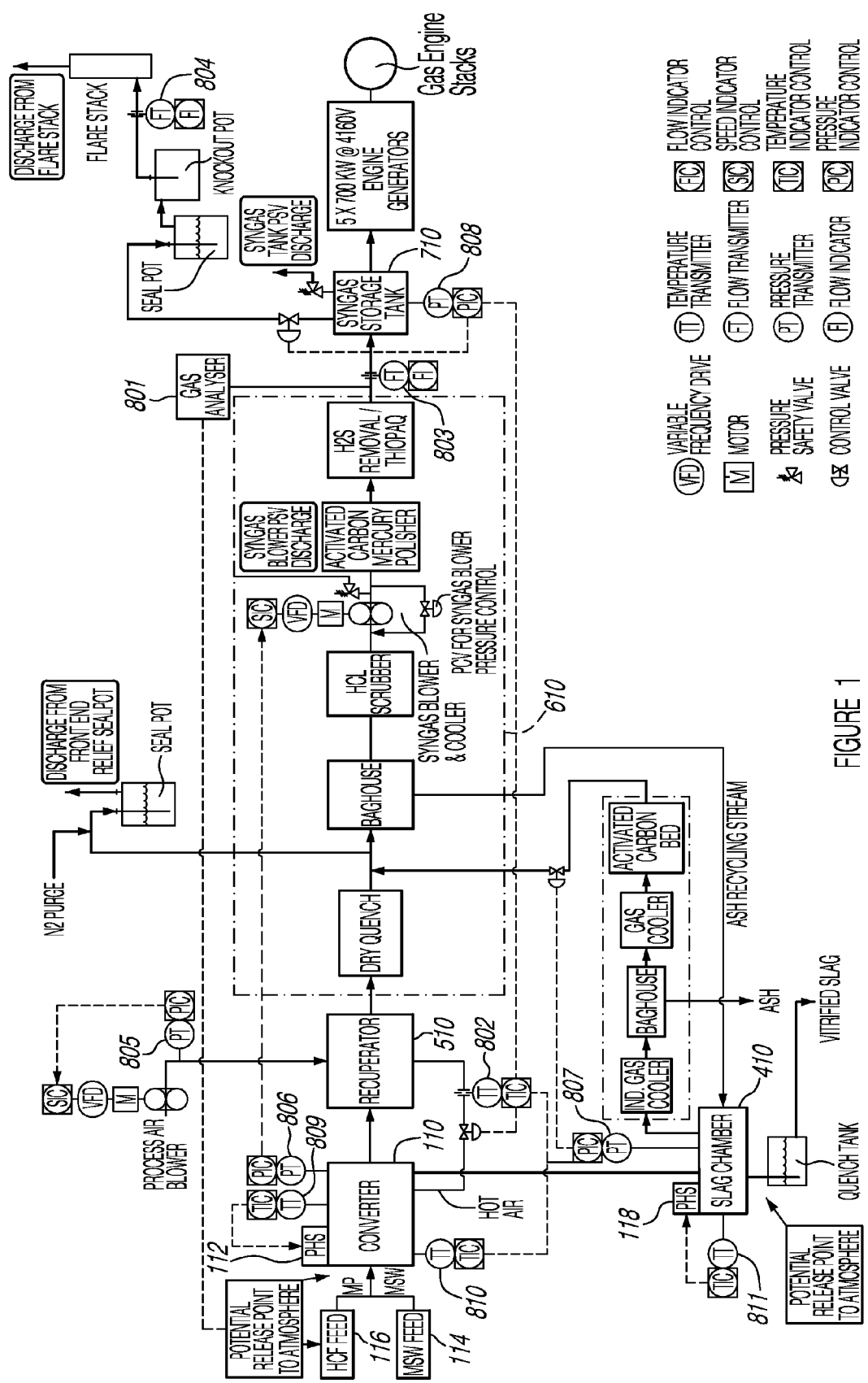
FIG. 1 is a schematic diagram depicting a control system for controlling a gasification process implemented by a system for the conversion of carbonaceous feedstocks into gas, in accordance with one embodiment of the present invention.

Unless defined otherwise, all technical and scientific terms used herein have the same meaning as commonly understood by one of ordinary skill in the art to which this invention belongs.

As used herein, the term "about" refers to a +/−10% variation from the nominal value. It is to be understood that such a variation is always included in any given value provided herein, whether or not it is specifically referred to.

As used herein, the term "carbonaceous feedstock" and "feedstock" can be any carbonaceous material appropriate for gasifying in the present gasification process, and can include, but are not limited to, any waste materials, coal (including low grade, high sulfur coal not suitable for use in coal-fired power generators), petroleum coke, heavy oils, biomass, sewage sludge, sludge from pulp and paper mills and agricultural wastes. Waste materials suitable for gasification include both hazardous and non-hazardous wastes, such as municipal waste, wastes produced by industrial activity (paint sludges, off-spec paint products, spent sorbents), automobile fluff, used tires and biomedical wastes, any carbonaceous material inappropriate for recycling, including non-recyclable plastics, sewage sludge, coal, heavy oils, petroleum coke, heavy refinery residuals, refinery wastes, hydrocarbon contaminated solid waste and biomass, agricultural wastes, tires, hazardous waste, industrial waste and biomass. Examples of biomass useful for gasification include, but are not limited to, waste or fresh wood, remains from fruit, vegetable and grain processing, paper mill residues, straw, grass, and manure.

As used herein, the term "sensing element" is defined to describe any element of the system configured to sense a characteristic of a process, a process device, a process input or process output, wherein such characteristic may be represented by a characteristic value useable in monitoring, regulating and/or controlling one or more local, regional and/or global processes of the system. Sensing elements considered within the context of a gasification system may include, but are not limited to, sensors, detectors, monitors, analyzers or any combination thereof for the sensing of process, fluid and/or material temperature, pressure, flow, composition and/or other such characteristics, as well as material position and/or disposition at any given point within the system and any operating characteristic of any process device used within the system. It will be appreciated by the person of ordinary skill in the art that the above examples of sensing elements, though each relevant within the context of a gasification system, may not be specifically relevant within the context of the present disclosure, and as such, elements identified herein as sensing elements should not be limited and/or inappropriately construed in light of these examples.

As used herein, the term "response element" is defined to describe any element of the system configured to respond to a sensed characteristic in order to operate a process device operatively associated therewith in accordance with one or more pre-determined, computed, fixed and/or adjustable control parameters, wherein the one or more control parameters are defined to provide a desired process result. Response elements considered within the context of a gasification system may include, but are not limited to static, pre-set and/or dynamically variable drivers, power sources, and any other element configurable to impart an action, which may be mechanical, electrical, magnetic, pneumatic, hydraulic or a combination thereof, to a device based on one or more control parameters. Process devices considered within the context of a gasification system, and to which one or more response elements may be operatively coupled, may include, but are not limited to, material and/or feedstock input means, heat sources such as plasma heat sources, additive input means, various gas blowers and/or other such gas circulation devices, various gas flow and/or pressure regulators, and other process devices operable to affect any local, regional and/or global process within a gasification system. It will be appreciated by the person of ordinary skill in the art that the above examples of response elements, though each relevant within the context of a gasification system, may not be specifically relevant within the context of the present disclosure, and as such, elements identified herein as response elements should not be limited and/or inappropriately construed in light of these examples.

As used herein, the term "real-time" is used to define any action that is substantially reflective of the present or current status of the system or process, or a characteristic thereof, to which the action relates. A real-time action may include, but is not limited to, a process, an iteration, a measurement, a computation, a response, a reaction, an acquisition of data, an operation of a device in response to acquired data, and other such actions implemented within the system or a given process implemented therein. It will be appreciated that a real-time action related to a relatively slow varying process or characteristic may be implemented within a time frame or period (e.g. second, minute, hour, etc.) that is much longer than another equally real-time action related to a relatively fast varying process or characteristic (e.g. 1 ms, 10 ms, 100 ms, 1 s).

As used herein the term "continuous" is used to define any action implemented on a regular basis or at a given rate or frequency. A continuous action may include, but is not limited to, a process, an iteration, a measurement, a computation, a response, a reaction, an acquisition of data via a sensing element, an operation of a device in response to acquired data, and other such actions implemented within the system or in conjunction with a given process implemented therein. It will be appreciated that a continuous action related to a relatively slow varying process or characteristic may be implemented at a rate or frequency (e.g. once/second, once/minute, once/hour, etc.) that is much slower than another equally continuous action related to a relatively fast varying process or characteristic (e.g. 1 KHz, 100 Hz, 10 Hz, 1 Hz).

As used herein, the term "reactant material" can mean feedstock or partially or fully processed feedstock.

As used herein, the term "composition of the product gas," refers to the entire composition of chemical species within a gas. In practice, however, this term will generally be used to express the species and concentrations of the chemical constituents that are most relevant to the downstream applications. For example, the gas composition desirable for a gas turbine will generally be described in terms of the amount of nitrogen, carbon monoxide, carbon dioxide, water and/or hydrogen in the synthesis gas. The chemical composition may also be identified as lacking specific chemical species, i.e. species that would be undesirable to transfer to the downstream application, such as a gas being, 'free of $H_2S$." The chemical composition of syngas can vary widely, depending on the composition of the feedstock used to generate the syngas and the manner in which the gasification process, the gas cleanup and conditioning were carried out. Depending on the context, which will be apparent to one skilled in the art, the composition of the gas will or will not contemplate trace elements.

As used herein, the term, "characteristics of the gas," refers to the chemical and/or physical qualities of the gas, which may include, but are not limited to its chemical composition, temperature, pressure, rate of flow, color, odor, etc.

As used herein, the term "off-gas" includes volatile molecules generated by the gasification of carbonaceous feedstock that can include carbon monoxide, carbon dioxide, hydrogen, light hydrocarbons and contaminating particulate matter such as soot and carbon black.

As used herein, the term "syngas" is a gaseous product of the gasification process comprising predominately carbon monoxide, carbon dioxide and hydrogen. Syngas can be derived from off-gas, or can be generated directly from the gasification process if the conditions in the converter enable the formation of this gas composition.

For the purposes of the present invention, the term syngas (or synthesis gas) refers to the product of a gasification process, and may include carbon monoxide, hydrogen, and carbon dioxide, in addition to other gaseous components such as methane and water.

The present invention provides a control system for the conversion of carbonaceous feedstock into a gas. In particular, the control system is designed to be configurable for use in controlling one or more processes implemented in, and/or by, a gasification system, or one or more components thereof, for the conversion of such feedstock into a gas, which may be used for one or more downstream applications. With reference to the exemplary embodiment of FIG. 1, which is provided as an example only and not meant to limit the general scope and nature of the following disclosure, the gasification processes controllable by different embodiments of the disclosed control system may include in various combinations, a converter 110, a residue conditioner 410, a recuperator and/or heat exchanger system 510, one or more gas conditioners 610, a gas homogenization system 710 and one or more downstream applications. Examples of these components and subsystems will be described in greater detail below with reference to FIGS. 1 to 10, which depict exemplary embodiments of gasification systems that may be controlled by the present control system.

The control system operatively controls various local, regional and/or global processes related to the overall gasification process, and thereby adjusts various control parameters thereof adapted to affect these processes for a selected result. Various sensing elements and response elements are therefore distributed throughout the controlled system, or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

In one embodiment, the control system is used for controlling a gasification process for converting a carbonaceous feedstock into a gas suitable for use in a selected downstream application. In one example, the gasification process is controlled such that the product gas thereof may be used in a continuous manner and/or in real-time for immediate use. Accordingly, the control system may comprise, for example, one or more sensors for sensing one or more characteristics of the gas to be used in the downstream application. One or more computing platforms are communicatively linked to these sensing elements for accessing a characteristic value representative of the sensed characteristic(s), and configured to compare the characteristic value(s) with a predetermined range of such values defined to characterise the gas as suitable for the selected downstream application and compute one or more process control parameters conducive to maintaining the characteristic value with this predetermined range. A plurality of response elements may thus be operatively linked to one or more process devices operable to affect the process and thereby adjust the sensed characteristic of the gas, and communicatively linked to the computing platform(s) for accessing the computed process control parameter(s) and operating the process device(s) in accordance therewith.

For example, the control system may be configured to control the conversion of a carbonaceous feedstock into a gas having one or more characteristics appropriate for downstream application(s), wherein the product gas is intended for use in the generation of electricity through combustion in a gas turbine or use in a fuel cell application. In such applications, it is desirable to obtain products which can be most effectively used as fuel in the respective energy generators. Alternatively, if the product gas is for use as a feedstock in further chemical processes, the composition will be that most useful for a particular synthetic application.

In one embodiment, the control system provides a feedback, feedforward and/or predictive control of process energetics to substantially maintain a reaction set point, thereby allowing the gasification processes to be carried out under optimum reaction conditions to produce a gas having a specified composition. For instance, the overall energetics of the conversion of feedstock to gas can be determined and achieved using an appropriately configured gasification system, wherein various process characteristics may be evaluated and controllably adjusted to influence the determination of the net overall energetics. Such characteristics may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby the net overall energetics are assessed and optimized according to design specifications.

Alternatively, or in addition thereto, the control system may be configured to monitor operation of the various components of a gasification system for assuring proper operation, and optionally, for ensuring that the process(es) implemented thereby are within regulatory standards, when such standards apply.

In accordance with one embodiment, the control system may further be used in monitoring and controlling the total energetic impact of a gasification system. For instance, a gasification system for the conversion of a feedstock may be operated such that an energetic impact thereof is reduced, or again minimized, for example, by optimising one or more of the processes implemented thereby, or again by increasing the recuperation of waste heat generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimised for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a gasification process such that limitations or performance guidelines with regards to reactant and/or product residence times in various components, or with respect to various processes of the overall gasification process are met and/or optimised for. For instance, in an embodiment where municipal waste is used as a feedstock, it may be considered important to adjust the gasification process of such waste to account for a maximum residence time of the waste in a pre-processing and/or storage phase. For example, the waste and/or other feedstock may be transported to the controlled system facility periodically or on an on-going basis, wherein processing of such feedstock must be controlled so to avoid an overstocking thereof (e.g. increased pre-processing residence time) while allowing for continuous operation (e.g. reduced or avoided down-times). In such an example, a processing rate of a given feedstock may be controlled so to substantially match a delivery rate of such feedstock, thereby allowing for a substantially constant residence time of the delivered feedstock in a storage or pre-processing stage (e.g. a number of hours, days, weeks, etc.).

Similarly, the residence time of the feedstock within the converter of a gasification system may be controlled to allow for sufficient processing, without depleting resources and thereby unduly reducing and/or limiting downstream processes and/or applications. For example, a given converter configuration may allow for a relatively stable residence time for which suitable processing of the feedstock is achieved (e.g. minutes, hours, etc.). Downstream components of the converter may equally be controlled such that a residence time appropriate therefor is also substantially respected. For example, streaming gas through a heat-exchange system, conditioning system and/or homogenisation system may be best processed by such components for a given gas flow and/or residence time. Similarly, variations in the gas flow and/or residence time may be addressed and compensated for by controlling various elements of such system components.

The control system of the present invention can be used to effectively convert a feedstock of substantially inhomogeneous characteristics and/or composition to produce a gas having substantially stable characteristics conducive for downstream application. Therefore, depending on a particular configuration of a gasification system controlled by the present control system, fluctuations in feedstock characteristics may be attenuated via continuous and/or real-time control of this system, for example reducing long term process variability by at least 4 times. In an alternative embodiment, fluctuations in feedstock characteristics may be attenuated via continuous and/or real-time control of this system to reduce long term process variability by about 4 times. In an alternative embodiment, fluctuations in feedstock characteristics may be attenuated via continuous and/or real-time control of this system to reduce long term process variability by about 3.5 times. In an alternative embodiment, fluctuations in feedstock characteristics may be attenuated via continuous and/or real-time control of this system to reduce long term process variability by about 3 times. In an alternative embodiment, fluctuations in feedstock characteristics may be attenuated via continuous and/or real-time control of this system to reduce long term process variability by about 2.5 times. In an alternative embodiment, fluctuations in feedstock characteristics may be attenuated via continuous and/or real-time control of this system to reduce long term process variability by about 2 times. In an alternative embodiment, fluctuations in feedstock characteristics may be attenuated via continuous and/or real-time control of this system to reduce long term process variability by about 1.5 times.

Also, depending on a particular configuration of a gasification system controlled by the present control system, fluctuations in feedstock characteristics may be attenuated via continuous and/or real-time control of this system for example reducing short term process variability by at least 2.5 times. In an alternative embodiment, fluctuations in feedstock characteristics may be attenuated via continuous and/or real-time control of this system to reduce short term process variability by about 2.5 times. In an alternative embodiment, fluctuations in feedstock characteristics may be attenuated via continuous and/or real-time control of this system to reduce short term process variability by about 2 times. In an alternative embodiment, fluctuations in feedstock characteristics may be attenuated via continuous and/or real-time control of this system to reduce short term process variability by about 1.5 times.

The person of skill in the art will understand that the gasification system and control system, in their various embodiments, may be used in a number of processing systems having numerous independent and/or combined downstream applications. The control system is further capable, in various embodiments, of simultaneously controlling various aspects of a process in a continuous and/or real time manner.

Control System Architecture

Figure 13:
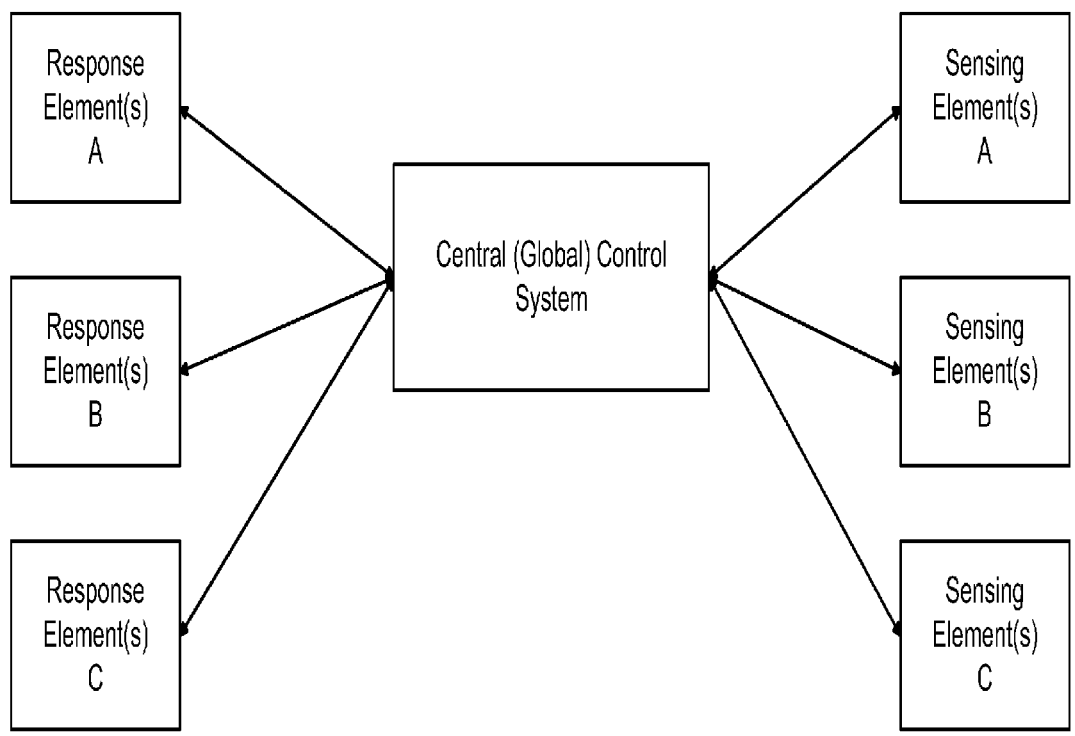
FIG. 13 is a schematic diagram of a centralized control system, in accordance with one embodiment of the present invention.
Figure 14:
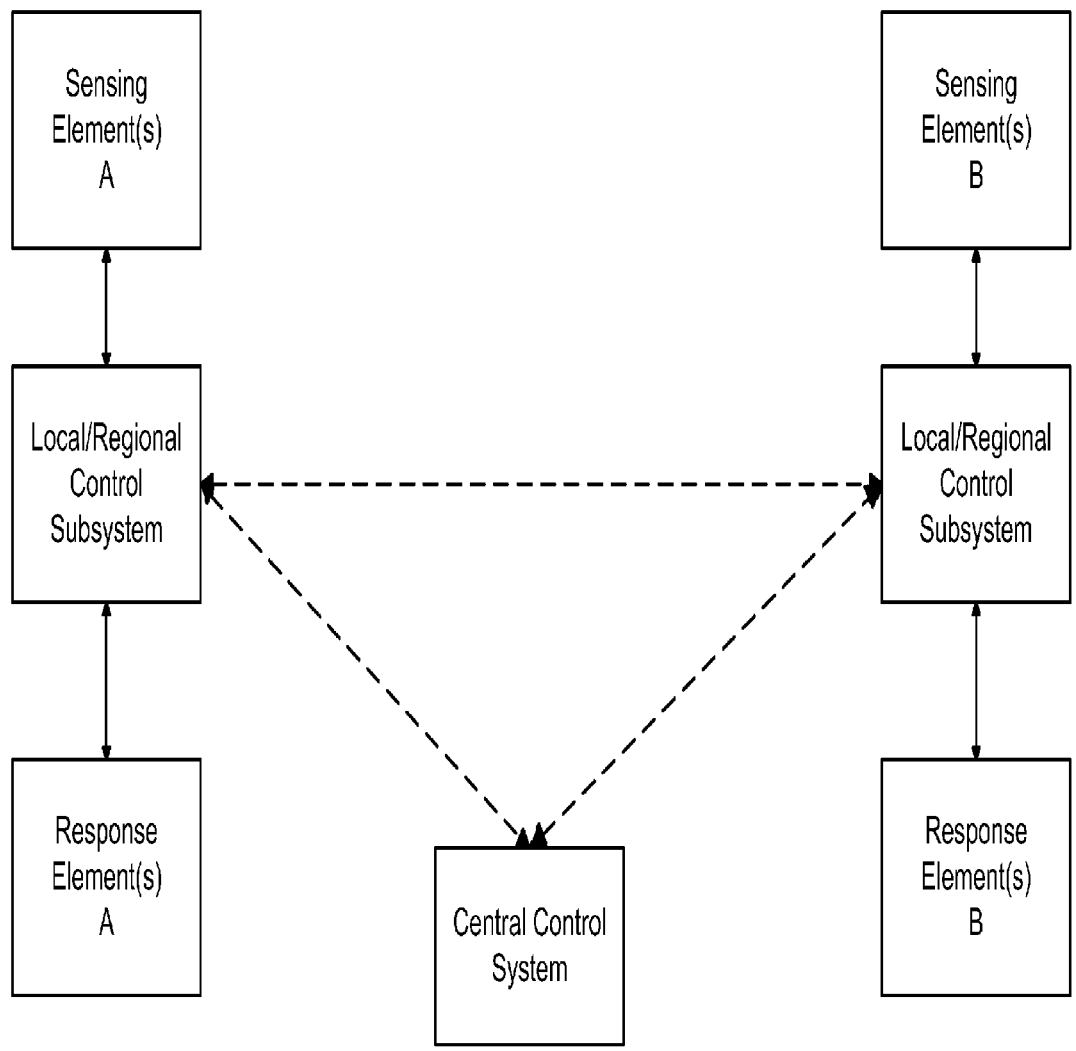
FIG. 14 is a schematic diagram of an at least partially distributed control system, in accordance with one embodiment of the present invention.

Referring to FIGS. 13 and 14, the control system may comprise any type of control system architecture suitable for the application at hand. For example, the control system may comprise a substantially centralized control system (e.g. see FIG. 13), a distributed control system (e.g. see FIG. 14), or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or sub-process. Communication may also take place between distributed controllers via various network configurations, wherein a characteristic sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the present invention may use any of the above architectures, or any other architecture commonly known in the art, which are considered to be within the general scope and nature of the present disclosure.

The control system comprises response elements for controlling the reaction conditions and to manage the chemistry and/or energetics of the conversion of the carbonaceous feedstock to the output gas. In addition, the control system can determine and maintain operating conditions to maintain ideal, optimal or not, gasification reaction conditions. The determination of ideal operating conditions depends on the overall energetics of the process, including factors such as the composition of the carbonaceous feedstock and the specified characteristics of the product gases. The composition of the feedstock may range from substantially homogeneous to completely inhomogeneous. When the composition of the feedstock varies, then certain control parameters may require continuous adjustment, via response elements, to maintain the ideal operating conditions.

The control system can comprise a number of response elements, each of which can be designed to perform a dedicated task, for example, control of the flow rate of one of the additives, control of the position or power output of one of the one or more heat sources of the gasification system, or control of the withdrawal of by-product. The control system can further comprise a processing system, (e.g. see FIG. 12). In one embodiment, the processing system can comprise a number of sub-processing systems.

Figure 12:
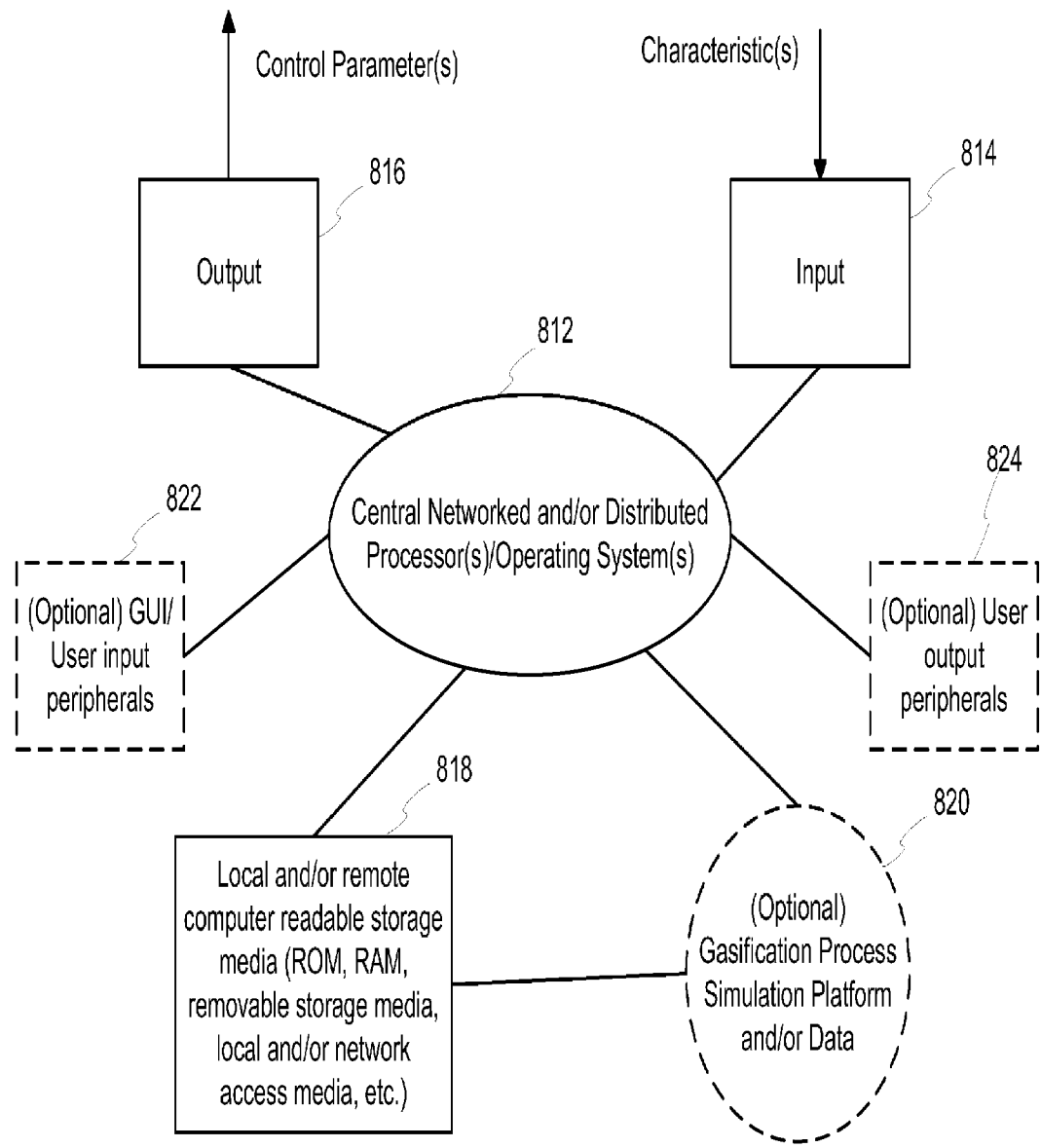
FIG. 12 is a schematic diagram of a computing platform, and exemplary components thereof, of a control system to control a gasification process for converting a carbonaceous feedstock into a gas, in accordance with one embodiment of the present invention.

With reference to FIG. 12, the control system generally comprises one or more central, networked and/or distributed processors 812, one or more inputs 814 for receiving current sensed characteristics from the various sensing elements, and one or more outputs 816 for communicating new or updated control parameters to the various response elements. The one or more computing platforms of the control system may also comprise one or more local and/or remote computer readable media 818 (e.g. ROM, RAM, removable media, local and/or network access media, etc.) for storing therein various predetermined and/or readjusted control parameters, set or preferred system and process characteristic operating ranges, system monitoring and control software, operational data, and the like. Optionally, the computing platforms may also have access, either directly or via various data storage devices, to plasma gasification process simulation data 820 and/or system parameter optimization and modeling means, an exemplary embodiment of which is described in U.S. Pat. No. 6,817,388, which a person of ordinary skill in the art will appreciate is readily applicable in the present context. Also, the computing platforms may be equipped with one or more optional graphical user interface and input peripherals 822 for providing managerial access to the control system (system upgrades, maintenance, modification, adaptation to new system modules and/or equipment, etc.), as well as various optional output peripherals (e.g. 824) for communicating data and information with external sources (e.g. modem, network connection, printer, etc.).

As illustrated in this Figure, the control system may be further enhanced by interactively performing various system and/or process calculations defined to reflect a current implementation of a given gasification system. Such calculations may be derived from various system and/or process models, wherein simulation of process and/or system characteristics and control parameters may be used in a predictive and/or corrective manner to control the system or subsystem so modeled. U.S. Pat. No. 6,817,388 provides an example of such a system model, which may be used in conjunction with the control system to define various operational parameters, and predicted results based thereon, for use as starting points in implementing the various processes of system. In one embodiment, these and other such models are used occasionally or regularly to reevaluate and/or update various system operating ranges and/or parameters of the system on an ongoing basis. In one embodiment, the NRC, PLASCO and/or PLASCO/HYSYS simulation platforms are used and can consider as inputs, waste type, any combination of input chemical composition, thermo-chemical characteristics, moisture content, feed rate, process additive(s), etc. The model may also provide various optional interactive process optimizations to consider, for example, site and feedstock type specifics, maximization of energy recovery, minimization of emissions, minimization of capital and costs, etc. Ultimately, based on the selected model options, the model may then provide, for example, various operational characteristics, achievable throughputs, system design characteristics, product gas characteristics, emission levels, recoverable energy, recoverable byproducts and optimum low cost designs. Various exemplary representations are provided in U.S. Pat. No. 6,817,388 which are readily applicable in the present context, as would be apparent to a person skilled in the art.

The processing system and any one of the sub-processing systems can comprise exclusively hardware or any combination of hardware and software. Any of the sub-processing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller.

Important aspects in the design of the combination controller can be short transient periods and little oscillation during transient times when adjusting a respective control variable or control parameter from an initial to a specified value. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value.

It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing element(s), is compared to a specified value or range. A control signal is determined based on the deviation between the two values and provided to a control element in order to reduce the deviation. For example, when the output gas exceeds a predetermined $H_2$:CO ratio, a feedback control means can determine an appropriate adjustment to one of the input variables, such as increasing the amount of additive oxygen to return the $H_2$:CO ratio to the specified value. The delay time to affect a change to a control parameter or control variable via an appropriate response elements is sometime called loop time. The loop time, for example, to adjust the power of the plasma heat source(s), the pressure in the system, the carbon-rich additive input rate, or the oxygen or steam flow rate, can amount to about 30 to about 60 seconds, for example.

In one embodiment, the product gas composition is the specified value used for comparison in the feedback control scheme described above, whereby fixed values (or ranges of values) of the amount of CO and $H_2$ in the product gas are specified. In another embodiment, the specified value is a fixed value (or range of values) for the product gas heating value (e.g. low heating value (LHV)).

Feedback control can be used for any number of control variables and control parameters which require direct monitoring or where a model prediction is satisfactory. There are a number of control variables and control parameters of the gasification system that lend themselves towards use in a feedback control scheme. Feedback schemes can be effectively implemented in aspects of the control system for system and/or process characteristics which can be directly or indirectly sensed, and/or derived from sensed values, and controlled via responsive action using adjusted control parameters for operating one or more process devices adapted to affect these characteristics.

It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

Feed forward control processes input parameters to influence, without monitoring, control variables and control parameters. The gasification system can use feed forward control for a number of control parameter such as the amount of power which is supplied to one of the one or more plasma heat sources, for example. The power output of the arcs of the plasma heat sources can be controlled in a variety of different ways, for example, by pulse modulating the electrical current which is supplied to the torch to maintain the arc, varying the distance between the electrodes, limiting the torch current, or affecting the composition, orientation or position of the plasma.

The rate of supply of additives that can be provided to the converter in a gaseous or liquid modification or in a pulverized form or which can be sprayed or otherwise injected via nozzles, for example can be controlled with certain control elements in a feed forward way. Effective control of an additive's temperature or pressure, however, may require monitoring and closed loop feedback control.

Fuzzy logic control as well as other types of control can equally be used in feed forward and feedback control schemes. These types of control can substantially deviate from classical P, I, D combination control in the ways the plasma reformulating reaction dynamics are modeled and simulated to predict how to change input variables or input parameters to affect a specified outcome. Fuzzy logic control usually only requires a vague or empirical description of the reaction dynamics (in general the system dynamics) or the operating conditions of the system. Aspects and implementation considerations of fuzzy logic and other types of control are well known to a person skilled in the art.

It will be understood that the foregoing embodiments of the invention are exemplary and can be varied in many ways. Such present or future variations are not to be regarded as a departure from the spirit and scope of the invention, and all such modifications as would be apparent to one skilled in the art are intended to be included within the scope of the following claims.

Process Control Overview

As presented above, the control system comprises sensing elements for sensing one or more process and/or system characteristics (e.g. gas composition (% CO, % $CO_2$, % $H_2$, etc.), gas temperature, gas flow rate, etc.) and generating a characteristic value from the sensed characteristics, as well as one or more computing platforms, for collecting and analyzing the value(s) produced from the sensing elements and outputting appropriate control parameters to one or more response elements configured for controlling one or more process devices in accordance with the output control parameters.

In one embodiment, the control system ensures that the gas flow and gas composition from the converter, and optionally throughout the gasification system, remains within predefined tolerances to result in the optimum production of the product gas and of system byproducts (commercial slag, gas recovery, steam generation, etc.), irrespective of the composition of different types of feedstock or any natural variability in sources of the same type of feedstock. The control system can thus recognize and make necessary adjustments to compensate for such variability. The parameters of the product gas, such as temperature, flow rate and composition, are monitored, and the relevant process device control parameters varied (e.g. via appropriate response elements) to maintain the characteristics of the product gas within predetermined tolerances as defined by the end use of the synthesis gas.

In one embodiment, the control system of the present invention provides corrective feedback by which one or more of the flow rate, temperature and composition of the product gas are monitored and corrections made to one or more of the carbonaceous feedstock input rate, the oxygen input rate, the steam input rate, the carbon-rich additive input rate and the amount of power supplied to the plasma heat sources. The adjustments are based on measured changes in the flow rate, temperature and/or composition of the product gas in order to ensure that these remain within acceptable ranges. In general, the ranges for the flow rate, temperature and/or composition of the product gas are selected to optimize the gas for a particular downstream application.

In one embodiment, the control system of the present invention simultaneously uses the controllability of plasma heat to drive the gasification process, and to ensure that the gas flow and composition from the process remains within an acceptable range even if the composition of the feedstock exhibits natural variability. In another embodiment, the control system allows for the total amount of carbon processed per unit time to be held as constant as possible, and utilizes the plasma heat to ensure that the total heat that enters and leaves the converter per unit time is kept within process limits. In other embodiments the control system can make adjustments such as adjusting air and or steam input in order to respond to, for example, flow/pressure fluctuations and/or fluctuations in product gas heating value(s). The control system may also be configured to monitor and/or regulate processes occurring via any one of the solid residue conditioner, the converter gas conditioner, the heat exchanger and/or the homogenization system, as schematically illustrated in FIG. 1, for example.

With reference to the exemplary embodiment of FIG. 1, which is provided as an example only and not meant to limit the general scope and nature of the present disclosure, in general, the gasification process controlled by the present invention generally takes place in a converter 110 comprising one or more processing zones and one or more heat sources, which may include in some embodiments one or more plasma heat sources (as in plasma heat sources 112 of FIG. 1). The converter 110 also generally comprises one or more feedstock feed mechanisms and/or devices for inputting the feedstock, which may include a single feedstock (e.g. municipal solid waste (MSW) as in MSW feed input 114, high carbon feedstock (HCF) as in HCF feed input 116, coal, plastics, liquid wastes, hazardous wastes, etc.), distinct feedstocks, and/or a mixed feedstock into the converter 110, as well as means, for adding one or more process additives, such as steam, oxidant, and/or carbon-rich material additives (the latter of which is optionally provided as a secondary feedstock). The gaseous products exit the converter 110 via one or more output gas outlets. As will be described further below, the converter 110 may comprise a single zone and/or chamber converter (e.g. see FIGS. 19 to 22), or a multi-zone and/or chamber converter, for instance comprising a gasifier and reformer wherein gasification and reformulation processes are implemented respectively (e.g. see FIG. 23). These and other converter configurations will be described in greater detail below with reference to FIGS. 19 to 23, which provide various exemplary embodiments of such converters, and FIGS. 32 to 51 of Example 1.

In one embodiment, the composition and flow of product gas from the converter 110 is controlled within predefined tolerances by controlling the reaction environment. The temperature is controlled at atmospheric pressure to ensure that the feedstock that is injected into the converter 110 encounters as stable an environment as possible. The control system can provide means to control the amounts of feedstock, steam, oxygen and/or carbon-rich material that are fed into the converter 110. Operating parameters which may be adjusted to maintain a selected reaction set point or range may include, but are not limited to, feedstock feed rate, additive feed rate, power to induction blowers to maintain a specified pressure, and power to and position of the plasma heat sources (e.g. plasma heat sources 112). These control aspects will be discussed further having regard to each parameter.

In one embodiment, the application of plasma heat (e.g. via a plasma heat source such as a plasma torch or the like), in conjunction with the input of additives, such as steam and/or oxygen and/or carbon-rich material, helps in controlling the gas characteristics, such as flow, temperature, pressure and composition. The gasification system may also utilize plasma heat to provide the high temperature heat required to gasify the feedstock, reformulate the off-gas produced thereby, and/or to melt the by-product ash and convert it to a glass-like product with commercial value.

The gasification process controlled by the present invention may further comprise means for managing and controlling processing of the solid by-product of the gasification process. In particular, a gasification system may include a solid residue conditioner 410 for the conversion of the solid by-products, or residue, resulting from feedstock-to-energy conversion processes, into a vitrified, homogenous substance having low leachability. The solid by-products of the gasification process may take the form of char, ash, slag, or some combination thereof.

Illustratively the solid residue conditioner 410 comprises a solid residue conditioning chamber or region, a plasma heating means (e.g. plasma heat source 118) or other such heating means adapted to provide sufficiently high temperatures, a slag output means, and a controlling means (which may be operatively linked to the overall control system of the gasification system), whereby plasma heat is used to cause solids to melt, blend and chemically react forming a dense silicometallic vitreous material that, when poured out of the chamber or region, cools to a dense, non-leachable, silicometallic solid slag. In particular, the control system disclosed herein may be adapted to optimize processes implemented in the SRC, namely by controlling the plasma heat rate and solid residue input rate to promote full melting and homogenization.

The gasification process controlled by the present invention may also comprise means for the recovery of heat from the hot product gas. Such heat recuperation may be implemented by various heat exchangers, such as gas-to-gas heat exchangers (e.g. recuperator 510), whereby the hot product gas is used to heat air or other oxidant, such as oxygen or oxygen enriched air, which may then optionally be used to provide heat to the gasification process. The recovered heat may also be used in industrial heating applications, for example. Optionally, one or more steam generator heat exchangers may be controlled as part of the gasification process to generate steam which can, for example, be used as an additive in the gasification and/or reformulation reaction(s), or to drive a steam turbine to generate electricity, for example.

Figure 24:
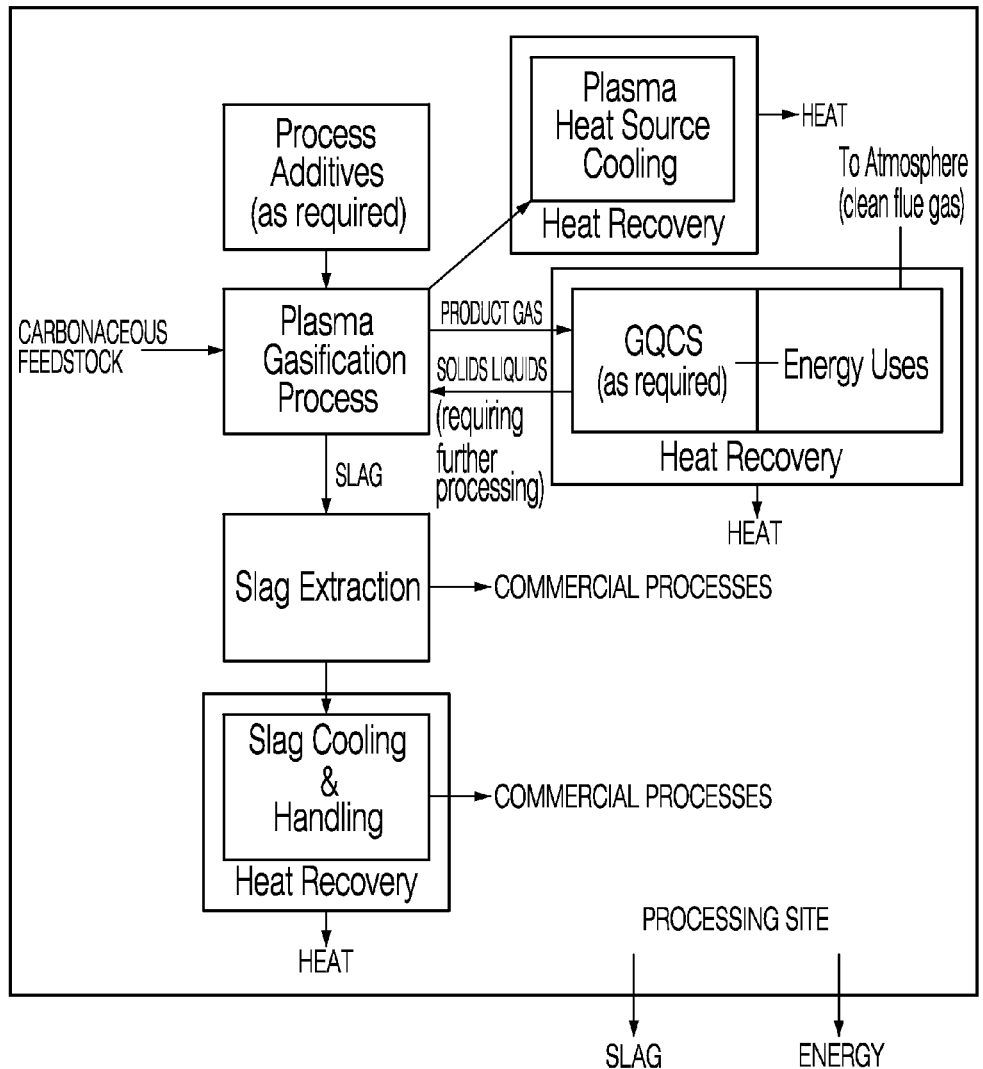
FIG. 24 is a schematic diagram depicting a heat recovery subsystem of a gasification process for converting carbonaceous feedstock into a gas, in accordance with one embodiment of the present invention.
Figure 25:
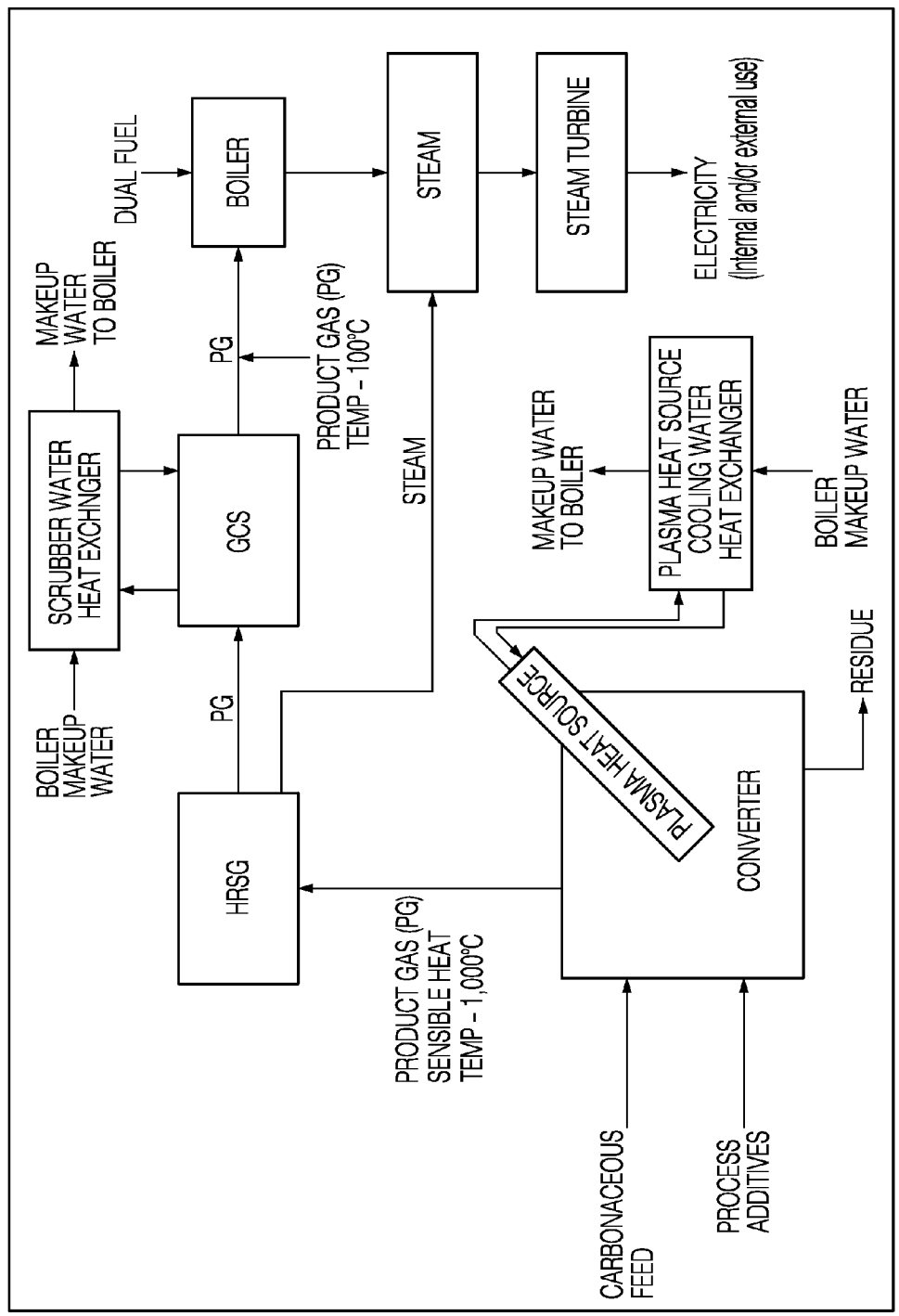
FIG. 25 is a schematic diagram depicting a heat recovery subsystem of a gasification process for converting carbonaceous feedstock into a gas, in accordance with one embodiment of the present invention.

Also, as seen in FIGS. 24 and 25, the heat exchanger may also include additional heat exchangers operatively extracting heat from various other system components and processes, such as via a plasma heat source cooling process, a slag cooling and handling process, converter gas conditioner cooling processes, and the like. The control system of the present invention may also comprise a control subsystem for controlling a heat recovery system, which may be operatively coupled to the system's overall control system, to optimize the energy transfer throughout the gasification system (e.g. see FIGS. 15 and 16).

The gasification process controlled by the present invention may further include a converter gas conditioner—GCS—(e.g. see FIGS. 1 to 10, and FIGS. 29, 59 to 66 of Example 1), or other such gas conditioning means, to condition the product gas produced by the gasification process for downstream use. For instance, the product gas may be directed to a converter gas conditioner (e.g. converter gas conditioner 610 of FIG. 1), as can gas generated from processing of the residue in the residue converter discussed above, where it is subjected to a particular sequence of processing steps to produce an output gas suitable for downstream use. In one embodiment, the converter gas conditioner comprises components that carry out processing steps that may include, for example, removal of particulate matter (e.g., via a baghouse, cyclone or the like), acid gases (HCl, $H_2S$), and/or heavy metals from the synthesis gas, or adjusting the humidity and temperature of the gas as it passes through the gasification system. The presence and sequence of processing steps is determined by the composition of the synthesis gas and the specified composition of output gas for downstream applications. The gas conditioning system may also comprise a control system, which may be operatively linked to the overall control system, to optimize the converter gas conditioner process (e.g. see FIGS. 15 and 16).

The gasification process controlled by the present invention may further comprise a gas homogenization system (e.g. homogenization system 710 of FIG. 1) for providing at least a first level homogenization of the product gas. For instance, by subjecting the product gas to a given residence time within the homogenization system, various characteristics of the gas may be at least partially homogenized to reduce fluctuations of such characteristics. For example, the chemical composition of the product gas, as well as other characteristics such as flow, pressure, and/or temperature may be at least partially stabilized by the homogenization system to meet downstream requirements. Accordingly, a homogenization system may be used to promote increased stability in gas characteristics for downstream application(s), such as a gas turbine or engine, a fuel cell application, and the like.

In one embodiment, the homogenization system of a gasification system provides a gas homogenization chamber or the like having dimensions that are designed to accommodate a gas residence time sufficient to attain a gas of a sufficiently consistent output composition, pressure, temperature and/or flow. In general, characteristics of the homogenization system will be designed in accordance with requirements of the downstream application(s), and, with respect to a capacity of the control system to attenuate fluctuations in product gas characteristics when the control system is designed with such intentions.

With reference now to FIGS. 5 to 10, the person of skill in the art will understand that the present control system may be used to control a number of gasification processes, which may be used in a number of energy generation and conversion systems having numerous independent and/or combined downstream applications. For instance, in the exemplary embodiment of FIG. 5, an Integrated Gasification Combined Cycle (IGCC) system can be controlled and used to produce output energy (e.g. electricity) by providing both a syngas for use in one or more gas turbines, and steam, generated by cooling both the syngas and exhaust gas associated with the gas turbine via one or more steam generator heat exchangers, for use in one or more steam turbines.

Figure 6:
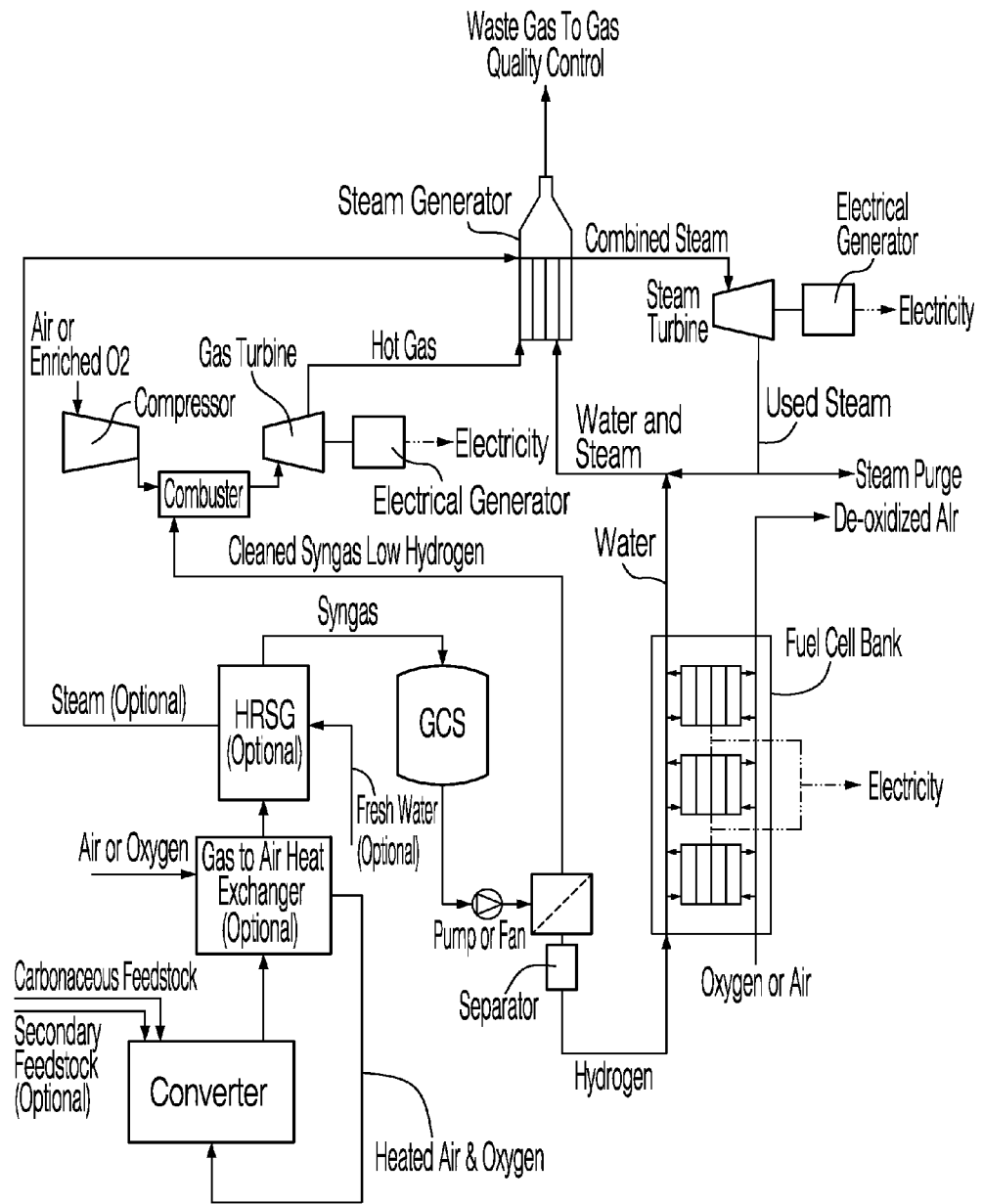
FIG. 6 is a schematic diagram depicting a system for the conversion of carbonaceous feedstocks into gas in accordance with one embodiment of the present invention.

In the exemplary embodiment of FIG. 6, the control system can be used to control a gasification system which combines an Integrated Gasification Combined Cycle (IGCC) system with a solid oxide fuel cell system, the latter of which using a hydrogen-rich byproduct of the syngas to produce energy (e.g. electricity).

Figure 7:
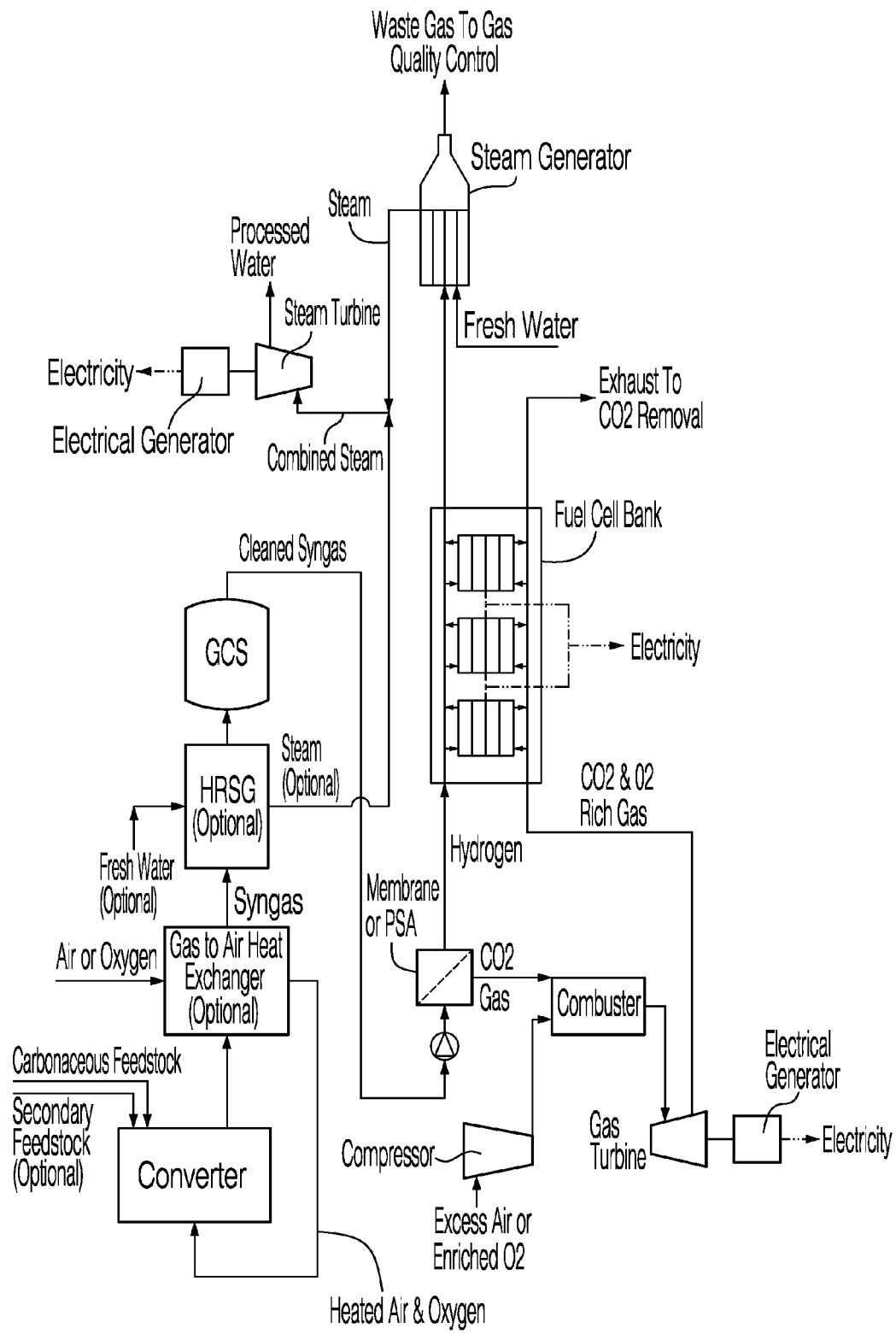
FIG. 7 is a schematic diagram depicting various downstream applications for products provided by a system for the conversion of carbonaceous feedstock into gas, in accordance with one embodiment of the present invention.

In the exemplary embodiment of FIG. 7, the control system can be used to control a gasification system which combines an Integrated Gasification Combined Cycle (IGCC) system with molten carbonate fuel cell system, the latter of which, as in FIG. 6, using a hydrogen-rich byproduct of the syngas to produce energy (e.g. electricity).

Figure 8:
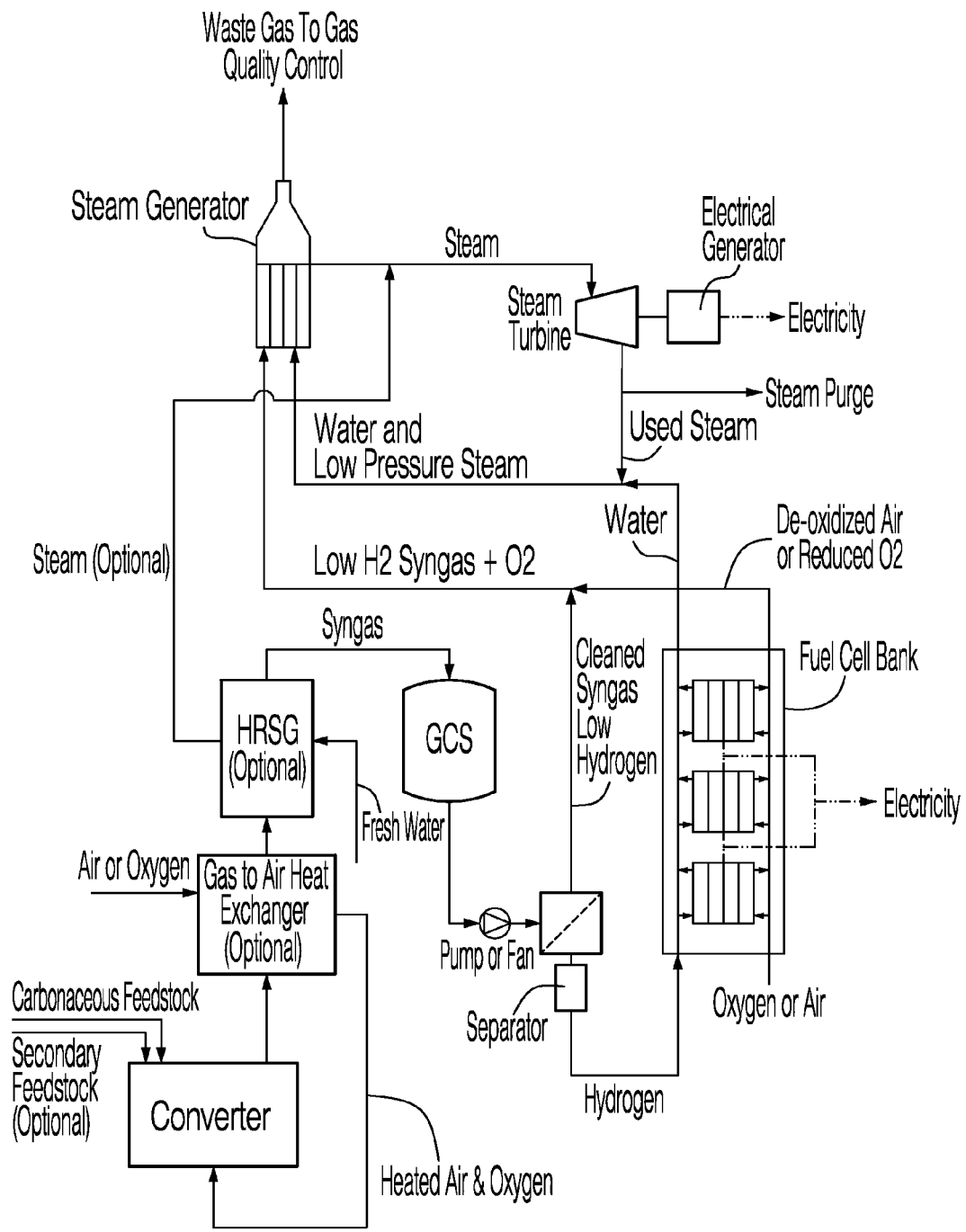
FIG. 8 is a schematic diagram depicting various downstream applications for products provided by a system for the conversion of carbonaceous feedstock into gas, in accordance with one embodiment of the present invention.

In the exemplary embodiment of FIG. 8, the control system can be used to control a gasification system which combines a solid oxide fuel cell system, as in FIG. 6, with one or more steam turbines activated by steam generated by one or more steam generator heat exchangers recuperating heat from the syngas and the fuel cell output(s).

Figure 9:
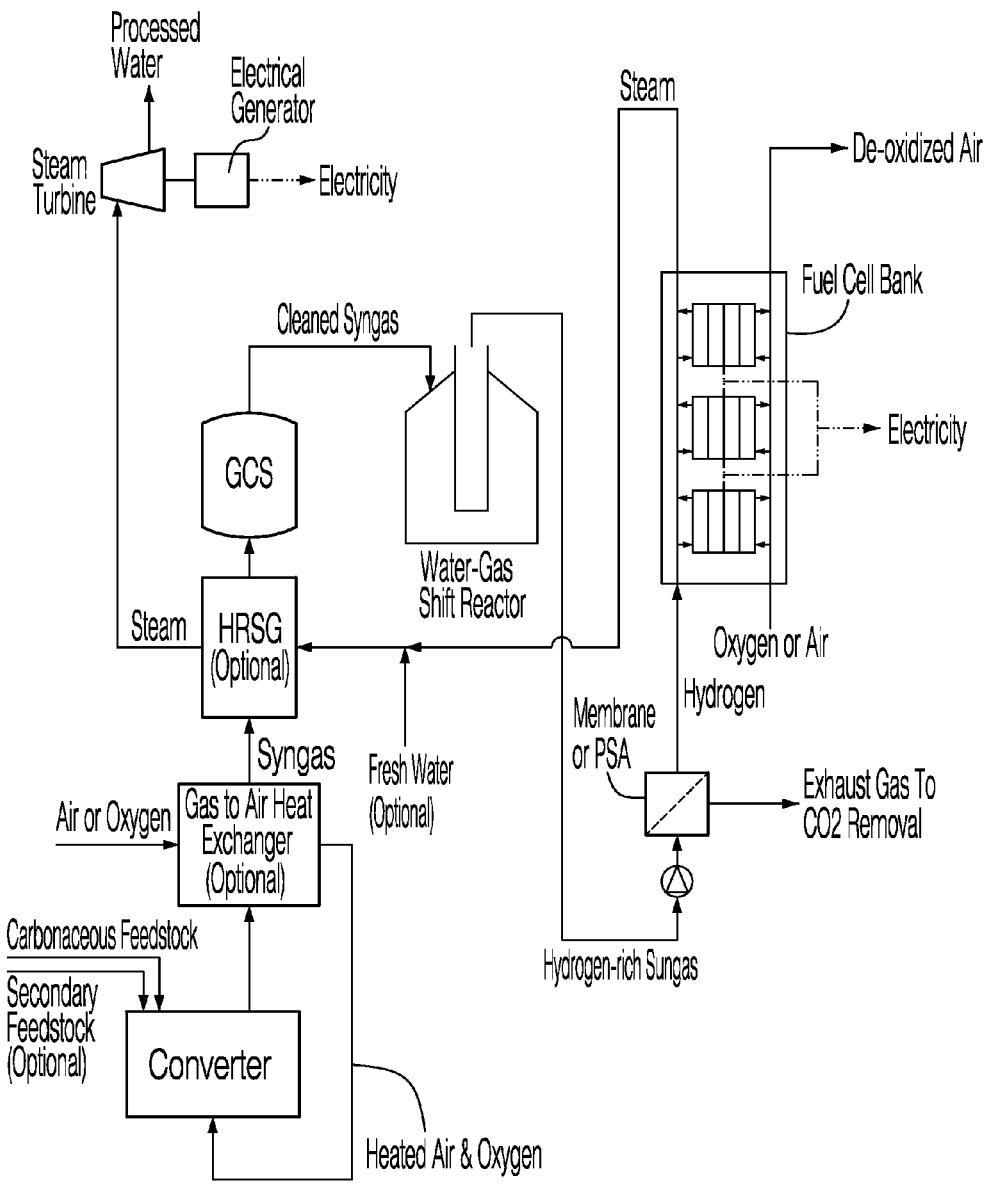
FIG. 9 is a schematic diagram depicting various downstream applications for products provided by a system for the conversion of carbonaceous feedstock into gas, in accordance with one embodiment of the present invention.

In the exemplary embodiment of FIG. 9, a water-gas shift converter is added to the embodiment of FIG. 8 to provide the hydrogen-rich syngas used in the solid oxide fuel cell system.

Figure 10:
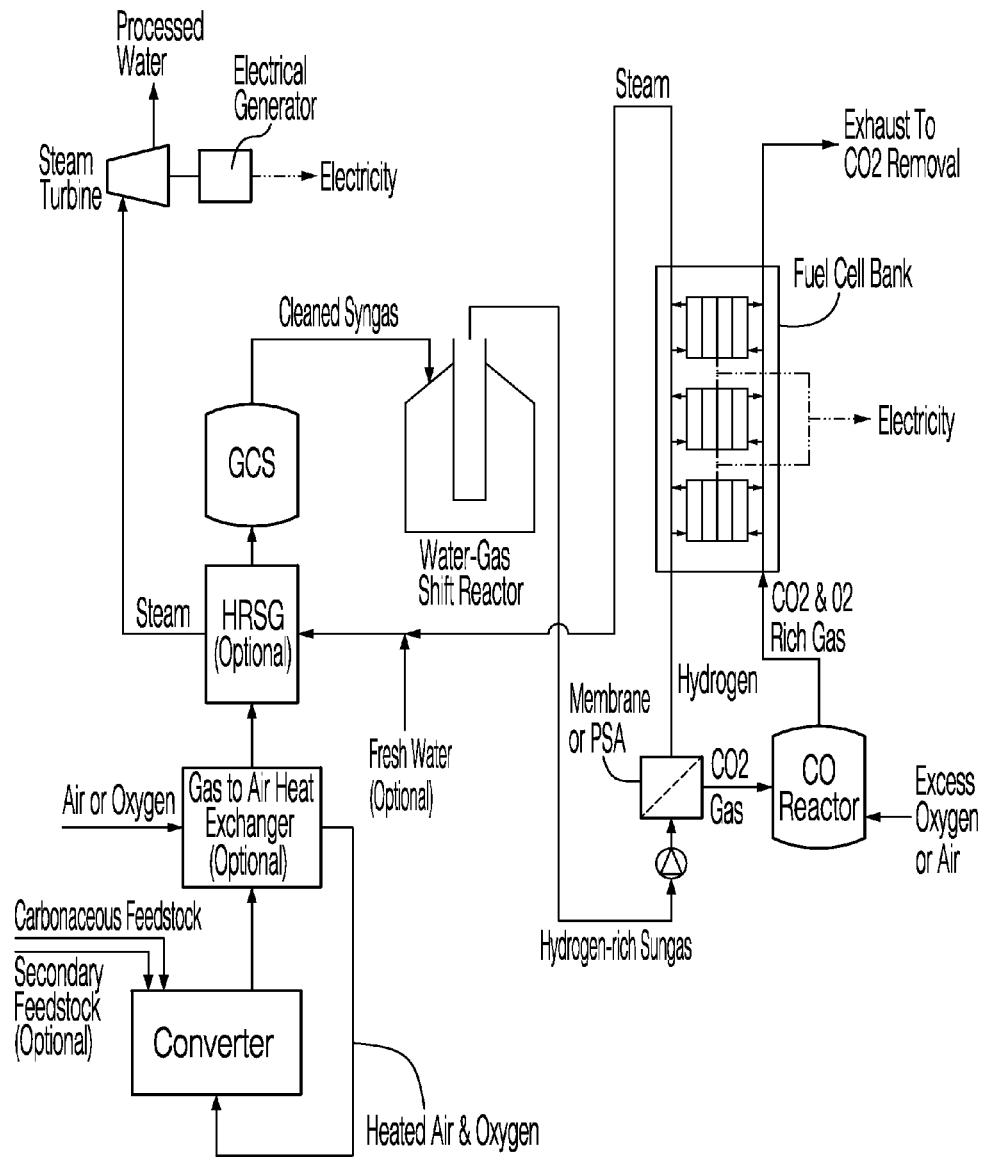
FIG. 10 is a schematic diagram depicting various downstream applications for products provided by a system for the conversion of carbonaceous feedstock into gas, in accordance with one embodiment of the present invention.
Figure 11:
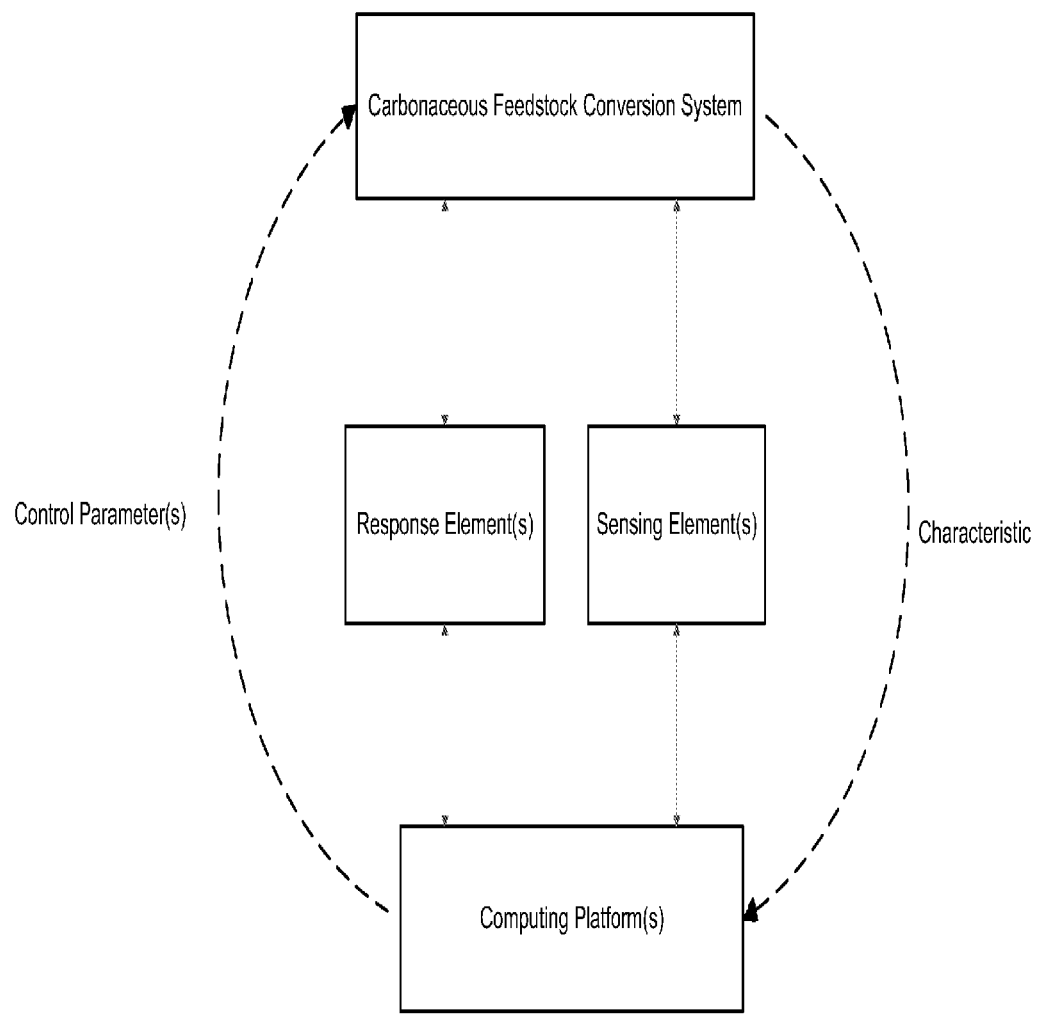
FIG. 11 is a flow diagram depicting the use of a control system to control a gasification process for converting a carbonaceous feedstock into gas, in accordance with one embodiment of the present invention.

In the exemplary embodiment of FIG. 10, the solid oxide fuel cell system of FIG. 9 is replaced by a molten carbonate fuel cell system.

As will be apparent to the person of skill in the art, the above exemplary embodiments of gasification systems controllable by various embodiments of the control system of the present invention are not meant to be limiting, as one of skill in the art will understand that other such system configurations and combinations can be provided for which the disclosed control system may be adapted, without departing from the general scope and spirit of the present disclosure.

Figure 15:
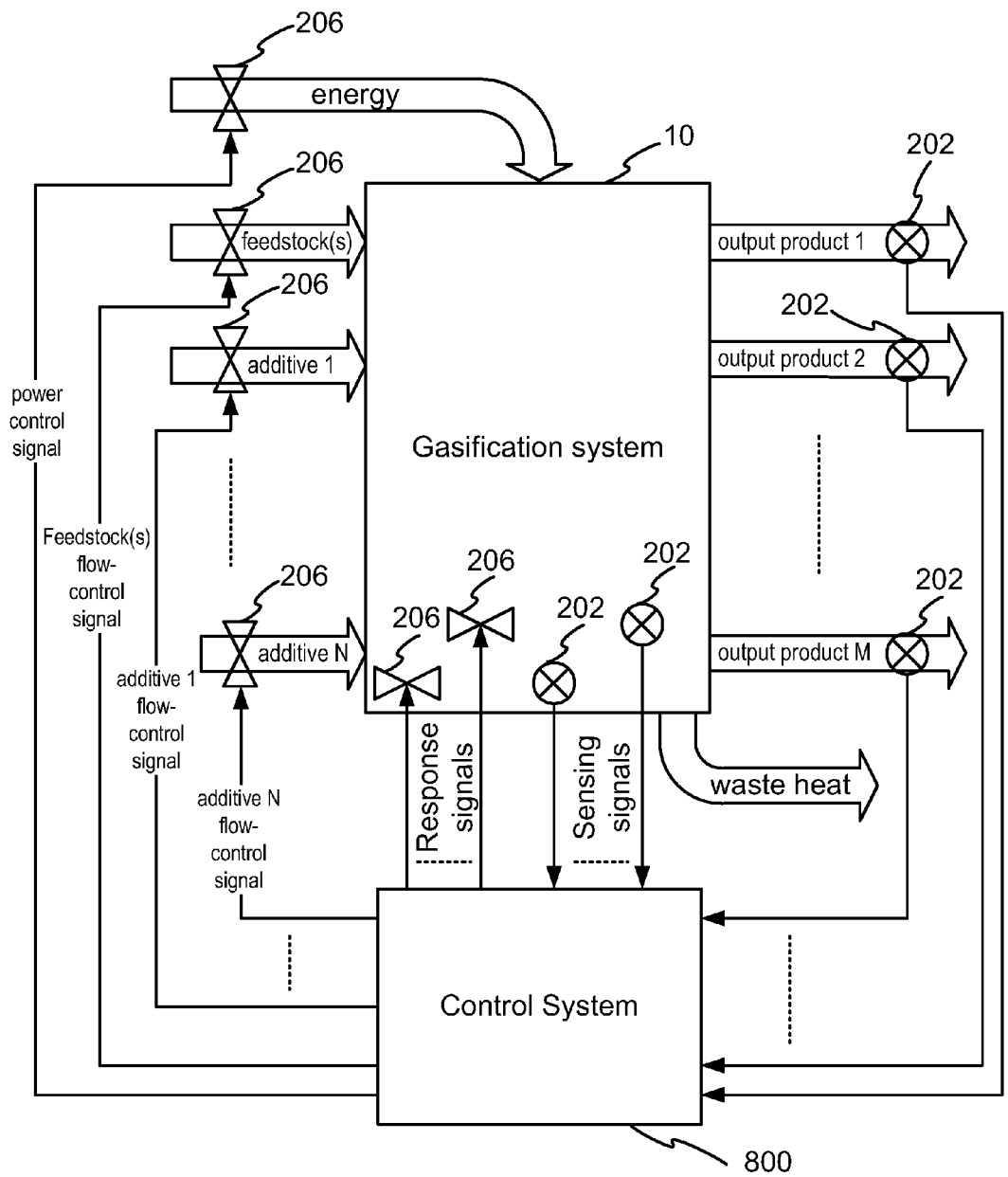
FIG. 15 is a schematic diagram depicting exemplary sensing and response signals respectively received from and transmitted to a gasification system by a control system to control one or more processes implemented therein, in accordance with one embodiment of the present invention.
Figure 16:
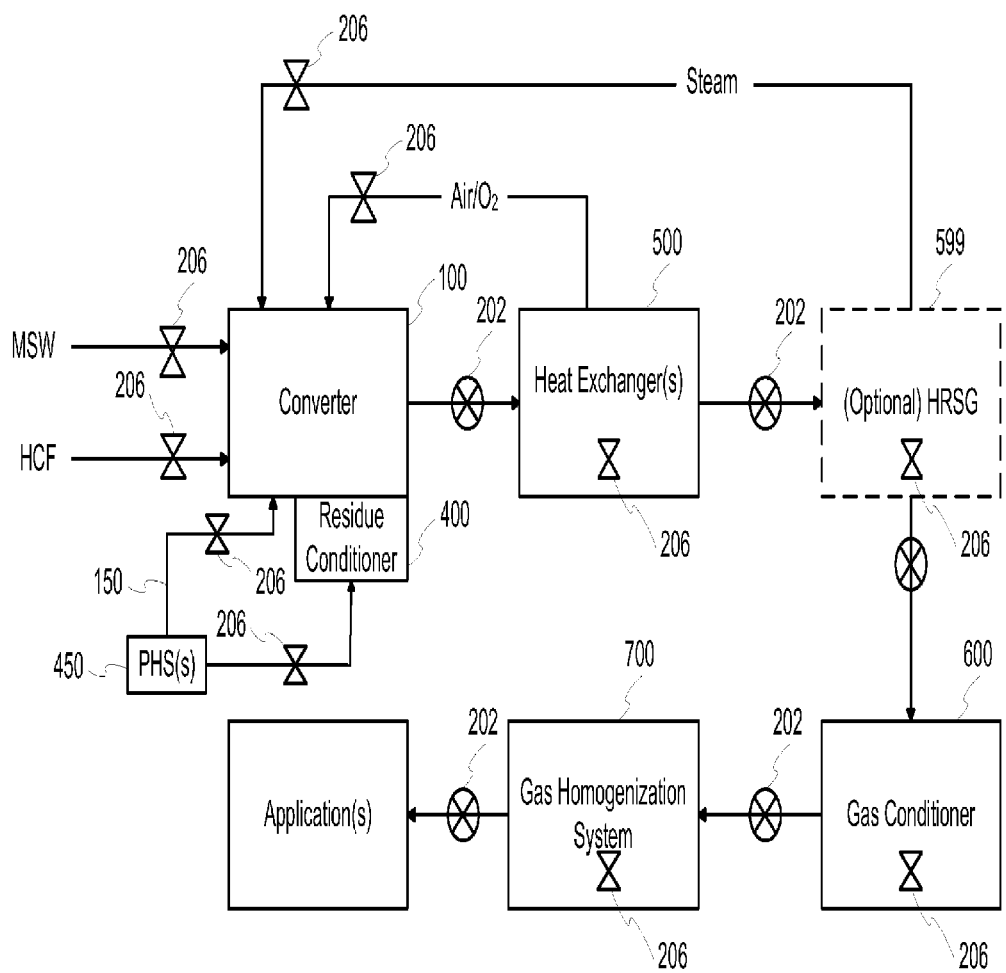
FIG. 16 is a schematic diagram depicting exemplary sensing and response access points of the integrated system control system to various devices, modules and subsystems of a system for the conversion of carbonaceous feedstocks to a gas of a specified composition, along with various possible downstream applications, in accordance with various exemplary embodiments of the present invention.

With reference to FIGS. 15 and 16, and as discussed above, the control system 800 may be integrated throughout a given gasification system 10 to monitor, via sensing elements 202, various system process or product characteristics, and implement, via response elements 206, various modifications to control parameters to manage the energetics and maintain each aspect of the process within certain tolerances. These parameters, which will be discussed in greater detail below, may be derived from processes associated with one or more of the plasma converter 100, the solid residue conditioner 400, the plasma heat source(s) 150 and slag processing heat source(s) 450, the heat exchanger (e.g. gas-to-air heat exchanger 500 and/or steam generator heat exchanger 599) and additive inputs associated therewith, the primary and/or secondary feedstock inputs (e.g. carbon-rich additives (HCF)), the converter gas conditioner 600, the homogenization system 700, and any other processing element or module of the gasification system.

Furthermore, having access to these parameters and access, via the various local and/or remote storage devices, to the control system's one or more computing platforms, to a number of predetermined and/or readjusted system parameters, system operating ranges, system monitoring and control software, operational data, and optionally plasma gasification process simulation data and/or system parameter optimization and modeling means, the control system may further interact with the gasification system in order to optimize system outputs.

The exemplary embodiment of FIG. 1 is provided as an example only and not meant to limit the general scope and nature of the present disclosure.

Composition of Product Gas

The control system of the present invention can be used to sense, compare and maintain within predetermined range(s), one or more characteristics of the product gas. As discussed previously, if the product gas is intended for use in the generation of electricity, then it is desirable to obtain products which can be used as fuel to power energy generators.

The main components of the output gas as it leaves a converter amenable for use in a gasification process controlled by the control system of the present invention are generally carbon monoxide, carbon dioxide, hydrogen, steam, and nitrogen (lesser amounts of nitrogen are present when using oxygen-enriched air, oxygen, etc.). Much smaller amounts of methane, acetylene and hydrogen sulfide may also be present. The proportion of carbon monoxide or carbon dioxide in the output gas depends on the amount of oxygen which is fed into the converter. For example, carbon monoxide is produced when the flow of oxygen is controlled so as to preclude the stoichiometric conversion of carbon to carbon dioxide, and the process is so operated to produce mainly carbon monoxide.

The composition of the product synthesis gas may be optimized for a specific application (e.g., gas turbines and/or fuel cell application for electricity generation) by adjusting the balance between, for example, applied plasma heat, oxygen and/or steam and/or carbon-rich additives. Since addition of oxidant and/or steam additives during the gasification process affects the conversion chemistry, it is desirable for the control system of the present invention to provide sensing elements, for monitoring the syngas composition. The inputs of the reactants are varied, e.g. via response elements, to maintain the characteristic values of the synthesis gas within predetermined ranges suitable for the selected downstream application(s).

With reference to the exemplary embodiment of FIG. 1, which is provided as an example only and not meant to limit the general scope and nature of the present disclosure, monitoring of the product gas can be achieved using various sensing elements, such as a gas composition sensing element (e.g. gas analyzer 801), a gas flow sensing element (e.g. flow sensing elements 802, 803 and 804), a gas pressure sensing element (e.g. pressure sensing elements 805, 806, 807 and 808), a gas temperature sensing element (e.g. temperature sensing elements 809, 810, and 811), and a gas opacity sensing element. The gas composition sensing element (e.g. gas analyzer 801) may be used to determine the hydrogen, carbon monoxide and/or carbon dioxide content of the synthesis gas, the value of which may be useable in various control steps, (e.g. see exemplary embodiments of FIGS. 18 and 71 to 75). Composition of the product gas is generally measured after the gas has been cooled and after it has undergone a conditioning step to remove particulate matter, although measurements may be taken at any point in the process.

The product gas can be sampled and analyzed using methods well known to the skilled technician. One method that can be used to determine the chemical composition of the product gas is through gas chromatography (GC) analysis. Sample points for these analyses can be located throughout the system. In one embodiment, the gas composition is measured using a Fourier Transform Infrared (FTIR) Analyser, which measures the infrared spectrum of the gas.

In one embodiment, the characteristics of the product gas, such as temperature, flow rate and composition, may be monitored via sensing elements located at the outlet of the converter. In another embodiment, sampling ports may also be installed at any location in the product gas handling system. As discussed previously, response elements are provided to vary the inputs of the reactants to maintain the characteristic values of the product gas within predetermined ranges suitable for the selected downstream application(s).

An aspect of this invention may consist in determining whether too much or too little oxygen is being added during the gasification process by determining the composition of the outlet stream and adjusting the process accordingly. In one embodiment, an analyzer, sensor or other such sensing elements in the carbon monoxide stream detects a relevant characteristic value such as the concentration of carbon dioxide or other suitable reference oxygen rich material.

It will be apparent that other techniques may be used to determine whether mostly carbon monoxide is being produced. In one alternative, the control system of the present invention may measure and analyze the ratio of carbon dioxide to carbon monoxide. In another alternative, the control system uses a sensor to determine the amount of oxygen and the amount of carbon downstream of the plasma generator, compares these characteristic values to the predetermined ranges, computes one or more process control parameters conductive to maintaining the characteristic values within the predetermined range, and operates response elements in real-time to affect the process and adjust the characteristic values. In one embodiment, the values of CO and $H_2$ are measured and compared to target values or ranges. In another embodiment, the product gas heating value (e.g. LHV) is measured and compared to target values or ranges, as described below.

The person of skill in the art will understand that these and other such product gas characteristic measurements, which may be carried throughout a given system via the above or other such sensing elements, may be used to monitor and adjust, via response elements, the ongoing process to maintain product gas characteristic values within the relevant suitable predetermined ranges, and should thus not be limited by the examples listed above and provided by the illustrative system and control system configurations depicted in the appended Figures.

Temperature at Various Locations in System

In one embodiment of the invention, there is provided means, as in sensing elements, to monitor the temperature (e.g. temperature sensing elements 809, 810, and 811) at sites located throughout the system, wherein such data are acquired on a continuous or intermittent basis. Sensing elements for monitoring the temperature in a converter amenable for use with the present control system, for example, may be located on the outside wall of the converter, or inside the refractory at the top, middle and bottom of the converter.

Sensing elements for monitoring the temperature of the product gas may be located at the product gas exit, as well as at various locations throughout the product gas conditioning system (e.g. within a converter gas conditioner). A plurality of thermocouples can be used to monitor the temperature at critical points around the converter.

If a system for recovering the sensible heat produced by the gasification process is employed (such as a heat exchanger or similar technology), a sensing element for monitoring the temperature at points in the heat recovery system (for example, at coolant fluid inlets and outlets) may also be incorporated. In one embodiment, a gas-to-air heat exchanger, a steam generator heat exchanger or both are used to recover heat from the hot gases produced by the gasification process. In embodiments employing heat exchangers, the temperature transmitters are located to measure, for example, the temperatures of the product gas at the heat exchanger inlets and outlets. Temperature transmitters may also be provided to measure the temperature of the coolant after heating in the heat exchanger.

These temperature measurements can be used by the control system to ensure that the temperature of the product gas as it enters a respective heat exchanger lies within the suitable operating temperatures or temperature ranges of that device. For example, in one embodiment, if the design temperature for a gas-to-air heat exchanger is 1050° C., a temperature transmitter on the inlet gas stream to the heat exchanger can be used to control both coolant air flow rates through the system and plasma heat power in order to maintain the optimum product gas temperature. In addition, measurement of the product gas exit temperature may be useful to ensure that the optimum amount of sensible heat has been recovered from the product gas at all heat recovery stages.

A temperature transmitter installed on the air outlet stream to measure the temperature of the heated exchange-air ensures that the process is carried out under conditions that ensure the process air is heated to a temperature appropriate for use in the gasification process. In one embodiment, the coolant air outlet temperature is, for example, about 625° C., therefore a temperature transmitter installed on the air outlet stream will provide data that is used to determine whether adjustments to one or both of the air flow rates through the system and torch power in the plasma converter should be made in order to maintain the optimum product gas input temperature, which in turn can be used to control the temperature of the coolant air. It will be apparent to someone of skill in the art that temperature adjustments in any subsystem of the process will be determined not only for optimizing that particular subsystem, but also taking into account requirements of the downstream application(s). For instance, global requirements may be accounted for when controlling a particular local and/or regional process.

According to one embodiment wherein the gasification system used with the control system of the present invention comprises a steam generator heat exchanger, the control strategy sets a fixed set point for the optimum coolant air output temperature, for example, about 600° C., as well as a fixed value for the steam generator heat exchanger gas exit temperature, for example, about 235° C. Therefore, according to this embodiment, when the product gas flow is reduced, the product gas temperature at the exit of the gas-to-air heat exchanger gets cooler, resulting in decreased steam production because the steam generator heat exchanger gas exit temperature is also set to a fixed value.

The same concept applies when the airflow through the system is reduced. According to one embodiment of the present invention, the exit coolant air temperature remains fixed therefore the exit product gas temperature for the gas-to-air heat exchanger is hotter, therefore producing more steam in the steam generator heat exchanger. However, when airflow through the system is reduced, product gas flow will consequently also reduce, so the increased inlet temperature to the steam generator heat exchanger will only be momentarily high. For example, if airflow is reduced to 50%, the maximum inlet gas temperature that the steam generator heat exchanger would momentarily see is approximately 800° C., which is within the temperature limits of the heat exchanger design.

In one embodiment of the invention, the sensing elements for monitoring the temperature is provided by thermocouples installed at locations in the system as required. Such temperature measurements can then be used, as described above, by the control system. The person skilled in the art will understand that other types of temperature measurements carried throughout a given embodiment of the system, via the above or other such sensing elements, may be used to monitor and adjust, via response elements, the ongoing process to generate a product gas suitable for use in the selected downstream application(s), and optionally maximize process outputs and efficiencies, and should thus not be limited by the examples listed above and provided by the illustrative system and control means configurations depicted in the appended Figures.

Pressure of System

In one embodiment of the invention, there is provided sensing elements to monitor the pressure within the converter, as well as throughout the entire gasification system amenable for use with the present control system, wherein such data are acquired on a continuous or intermittent basis. In a further embodiment, these pressure sensing elements (e.g. pressure sensing elements 805, 806, 807 and 808 of FIG. 1) comprise pressure sensors such as pressure transducers located, for example, on a vertical converter wall. Data relating to the pressure of the system is used by the control system to determine, on a real time basis, whether adjustments to parameters such as plasma heat source power or the rate of addition of feedstock or additives are required.

Variability in the amount of feedstock being gasified may lead to rapid gasification, resulting in significant changes in the pressure within the converter. For example, if an increased quantity of feedstock is introduced to the converter, it is likely that the pressure within the converter will increase sharply. It would be advantageous in such an instance to have sensing elements to monitor the pressure on a continuous basis, thereby providing the data required to make adjustments in real time, via response elements, to process control parameters (for example, the speed of the induction blower) to decrease the system pressure (as measured, for example, within the converter and at the input to the recuperator). Another optional pressure sensing element (e.g. pressure sensing element 807 of FIG. 1) may be used with the solid residue conditioner and operatively linked to a control valve leading solid residue conditioner gas from the solid residue conditioner to the syngas conditioner. Another optional pressure sensing element (e.g. pressure sensing element 808 of FIG. 1) may be provided with the homogenization system and operatively linked to a control valve for release of syngas via the flare stack, as well as operatively linked to a control valve to increase an additive input flow to the converter to maintain continuous operation of the gas engine, for example. Also, flow sensing elements (e.g. flow sensing elements 802, 803 and 804 of FIG. 1) may be used throughout the system (for example to detect syngas flow to the homogenization system), for example, to regulate feedstock and additive input rates into the converter.

In a further embodiment, a continuous readout of differential pressures throughout the complete system is provided, for example, via a number of pressure sensing elements. In this manner, the pressure drop across each individual component can be monitored to rapidly pinpoint developing problems during processing. The person of skill in the art will understand that the above and other such system pressure monitoring and control means can be used throughout the various embodiments of system via the above or other such sensing elements, to monitor and adjust, via response elements, the ongoing process to generate a product gas suitable for use in the selected downstream application(s), and optionally maximize process outputs and efficiencies, and should thus not be limited by the examples listed above and provided by the illustrative system and control system configurations depicted in the appended Figures.

Rate of Gas Flow

In one embodiment the control system comprises sensing elements (e.g. flow sensing elements 802, 803 and 804 of FIG. 1) to monitor the rate of product gas flow at sites located throughout the system amenable for use with the present invention, wherein such data are acquired on a continuous or intermittent basis.

The rate of gas flow through the different components of the system will affect the residence time of the gas in a particular component. If the flow rate of the gas through the reformulative region of the converter is too fast, there may not be enough time for the gaseous components to reach equilibrium, resulting in a non-optimum gasification process. Flow sensing elements may be used to detect syngas flow to the homogenization system/storage tank (e.g. flow sensing element 803 of FIG. 1), for example, to regulate feedstock and additive input rates into the converter. The above and other such gas flow monitoring and control means located throughout the various embodiments of the system may be used, to monitor and adjust, via response elements, the ongoing process to generate a product gas suitable for use in the selected downstream application(s), and optionally maximize process outputs and efficiencies.

Process Converter

In general a converter amenable for use with the control system of the present invention may comprise one or more processing zones and/or chambers which form the gasifier and reformer. The gasifier and reformer may be within the same or distinct chambers and/or zones which may be of the same or different orientation. The converter may also comprise further process devices, such as feedstock input means for feedstock comprising, for example, municipal solid waste (MSW), high carbon feedstock HCF, MSW and HCF together, or coal. Other further process devices may include means for adding one or more additives, including but not limited to steam, oxygen, air, oxygen-enriched air, oxidant, and carbon-rich additives (the latter of which may be optionally provided as a secondary feedstock), as required for maintaining one or more characteristic values of the product gas within respective ranges suitable for the selected downstream application(s). The converter may also comprise one or more plasma heat sources and/or other heat sources coupled and optionally operatively controlled by response elements of the control system. The converter may also provide means for gas output and ash removal. The converter can be equipped with various sensing means (i.e. sensors) such as thermocouples, material height detectors, pressure sensors and the like for sensing various characteristics of the process. The control system of the present invention can allow for control of various aspects of the converter processes, including but not limited to the input of feedstock, input of additives, plasma torch power, waste pile height and movement of waste through the converter.

The converter can have a wide range of length-to-diameter ratios and can be oriented either vertically or horizontally. The converter will have one or more gas outlet means, as well as means for removing solid residue (e.g., char, ash, slag or some combination thereof), which in some embodiments comprises an outlet disposed somewhere along the bottom of the chamber to enable the residue to be removed using gravity flow. In one embodiment, the converter will use physical transfer means to remove the solid residue from the bottom of the converter. For example, a hot screw may be used to convey the ash by-product into a solid residue conditioner. Means for processing and handling slag will be discussed in more detail below. Note that the slag may also be processed in the same chamber in which the gasification occurs (FIGS. 19 to 22), or in a separate chamber, as in solid residue conditioner of FIG. 23.

In one embodiment of the present invention, the one or more sources of plasma heat assist in the feedstock-to-gas conversion process. In one embodiment the use of one or more plasma heat sources, in conjunction with the input of steam and/or oxygen additives, helps in controlling the gas composition. Plasma heat may also be used to ensure the complete (or mostly complete) conversion of the offgas produced by the gasification process into the constituent elements, allowing reformulation of these constituent elements into the product gas having a specified composition (e.g. in a reformer distinct from or integrated within the gasifier). This reformulation may take place in the same zone or chamber as the gasification, or in a distinct zone or chamber within the converter, referred to herein as a reformer. The product gas may then exit the converter via one or more output gas outlets.

The gasification of carbonaceous feedstocks (i.e., the substantial conversion of the carbonaceous feedstocks to a syngas) takes place in the converter, and can proceed at high or low temperature, or at high or low pressure. A number of reactions take place in the process of converting carbonaceous feedstocks to the syngas product. As the carbonaceous feedstock is gasified in the converter, the physical, chemical, and thermal processes required for the gasification may occur sequentially or simultaneously, depending on the converter design.

In the converter, the carbonaceous feedstock is subjected to heating, whereby the feedstock is dried to remove any residual moisture. As the temperature of the dried feedstock increases, pyrolysis takes place. During pyrolysis, volatile components are volatilized and the feedstock is thermally decomposed to release, for example, tars, phenols, and light volatile hydrocarbon gases while the feedstock is converted to char. Char comprises the residual solids consisting of organic and inorganic materials.

The resulting char may be further heated to ensure complete conversion to its gaseous constituents, leaving an ash by-product that is later converted to slag. In one embodiment, the gasification of carbonaceous feedstocks takes place in the presence of a controlled amount of oxygen, optionally under the control of the control system of the present invention, to minimize the amount of combustion that can take place.

The combined products of the drying, volatilization and char-to-ash conversion steps provide an intermediate offgas product. This intermediate offgas may be subjected to further heating, typically by one or more plasma heat sources and in the presence of a controlled amount of additives such as air and steam, to further the conversion of the carbonaceous feedstocks to the syngas. This step is also referred to as a reformulation step and can take place within the same or a distinct chamber as the gasification (e.g. integrated or distinct gasifier/reformer).

The one or more plasma heat sources can be positioned to make all the reactions happen simultaneously, or can be positioned within the converter to make them happen sequentially. In either configuration, the temperature of the pyrolysis process is elevated due to inclusion of plasma heat sources in the converter.

The gasification reaction is driven by heat, which can be fueled by electrical and/or fossil fuel based (e.g. propane) heating means to heat the converter or by adding air as a reactant to drive the exothermic gasification reaction, which provides heat to the reaction. Some gasification processes also use indirect heating, avoiding combustion of the feed material in the converter and avoiding the dilution of the product gas with nitrogen and excess $CO_2$.

The design of the converter could allow for single-stage or multi-stage conversion processes. Various exemplary converter designs are provided in international application numbers WO/2006/128285 and WO/2006/128286 which are readily applicable in the present context, as would be apparent to a person skilled in the art. In one example, the design of the converters is such that the process for converting the feedstock to a syngas may take place in a one-stage process, i.e., where the gasification (feedstock to offgas) and reformulation (offgas to syngas) steps both take place generally in a single zone within the system. In another example wherein the design of other converters is such that the feedstock to syngas conversion process takes place in more than one zone, the process occurs either in more than one zone within one chamber (e.g. the embodiments of FIGS. 20 and 22 could be interpreted to represent multi-zone, single-chamber converters), in separate chambers (e.g. the embodiment of FIG. 23) or some combination thereof, wherein the zones are in fluid communication with one another.

The converter optionally comprises one or more further process devices such as additive input means, which may be provided for the addition of gases such as oxygen, air, oxygen-enriched air, steam or other gas useful for the gasification process, into the converter. The additive input means may also provide means for the addition of a carbon-rich additive into the converter, which may also be provided via a secondary feedstock input means (e.g. FIGS. 19 to 23 define a process device comprising mixed feedstock input means which illustratively combines the primary feedstock input means and optional secondary feedstock input means). Thus, the additive input means can include air (or oxygen) input ports and/or steam input ports and/or carbon-rich material input ports, the latter of which is optionally provided via a secondary (or mixed) feedstock option. These ports are positioned within the converter for the optimal distribution of additives throughout the converter. The addition of additives will be discussed in greater detail below.

The carbon-rich additive (or secondary feedstock) may be any material that is a source of carbon that can be added to the feedstock undergoing gasification to increase the amount of carbon available for the gasification process. Supplementing the feedstock being gasified with a carbon-rich material helps ensure the formation of a product gas having a specified composition. Examples of carbon-rich additives that can be used in the gasification process may include, but are not limited to, tires, plastics, high-grade coal, or a combination thereof.

Figure 23:
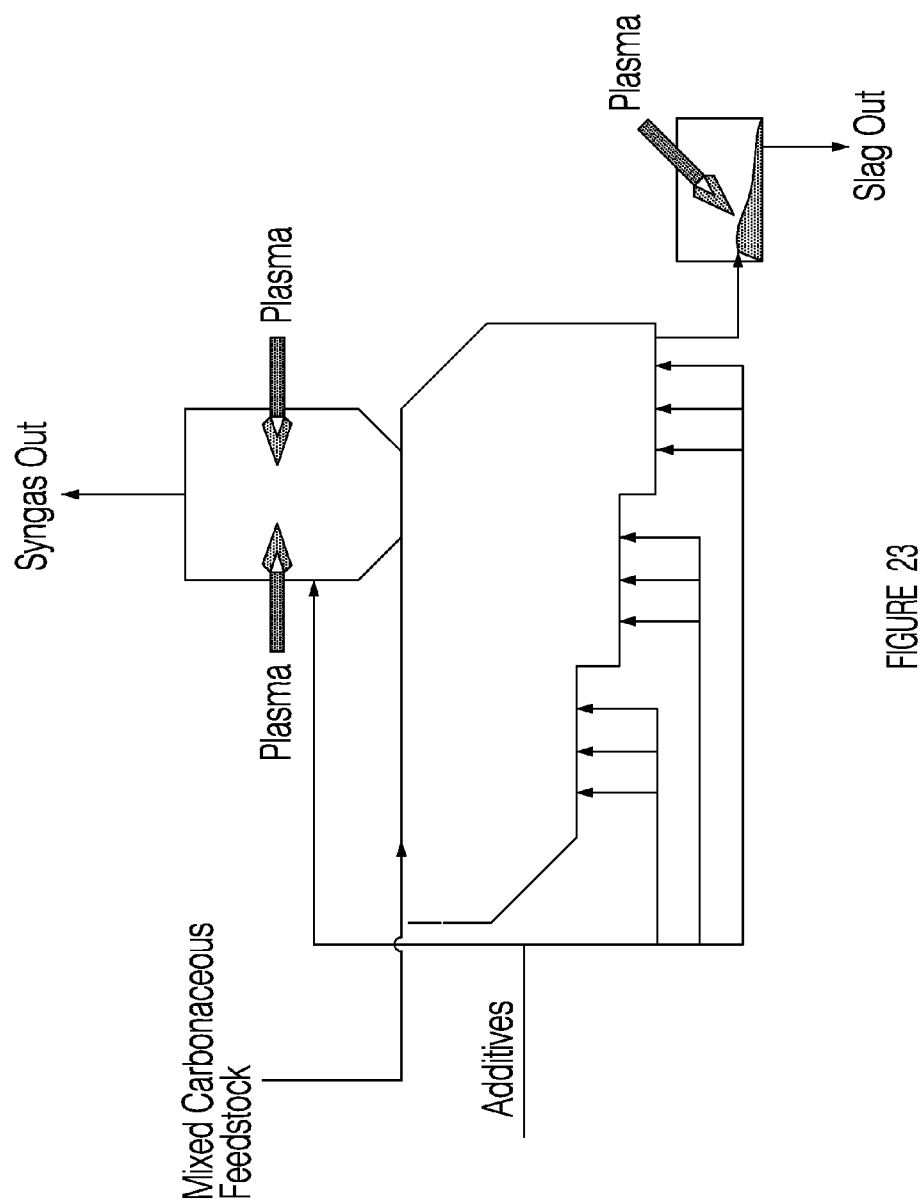
FIG. 23 is a schematic diagram of a converter for converting a carbonaceous feedstock into a gas, in accordance with one embodiment of the present invention.

With reference to the exemplary embodiment of FIG. 23, the converter depicted therein comprises a horizontally oriented converter which is subdivided into three gasification zones which provide for the optimization of the extraction of gaseous molecules from carbonaceous feedstock by sequentially promoting, each in a respective zone, drying, volatilization and char-to-ash conversion (or carbon conversion). This is accomplished by allowing drying of the feedstock to occur at a certain temperature range (e.g. 300 to 900° C.) in a first zone prior to moving the material to a second zone, where volatilization occurs at another temperature range (e.g. 400 to 950° C.), prior to moving the material to a third zone where char-to-ash conversions (or carbon conversion) occurs at another temperature range (e.g. 600 to 1000° C.). The main processes occurring at each stage are depicted generally in FIGS. 27 and 28 and described in greater detail in Example 1 below.

Figure 27:
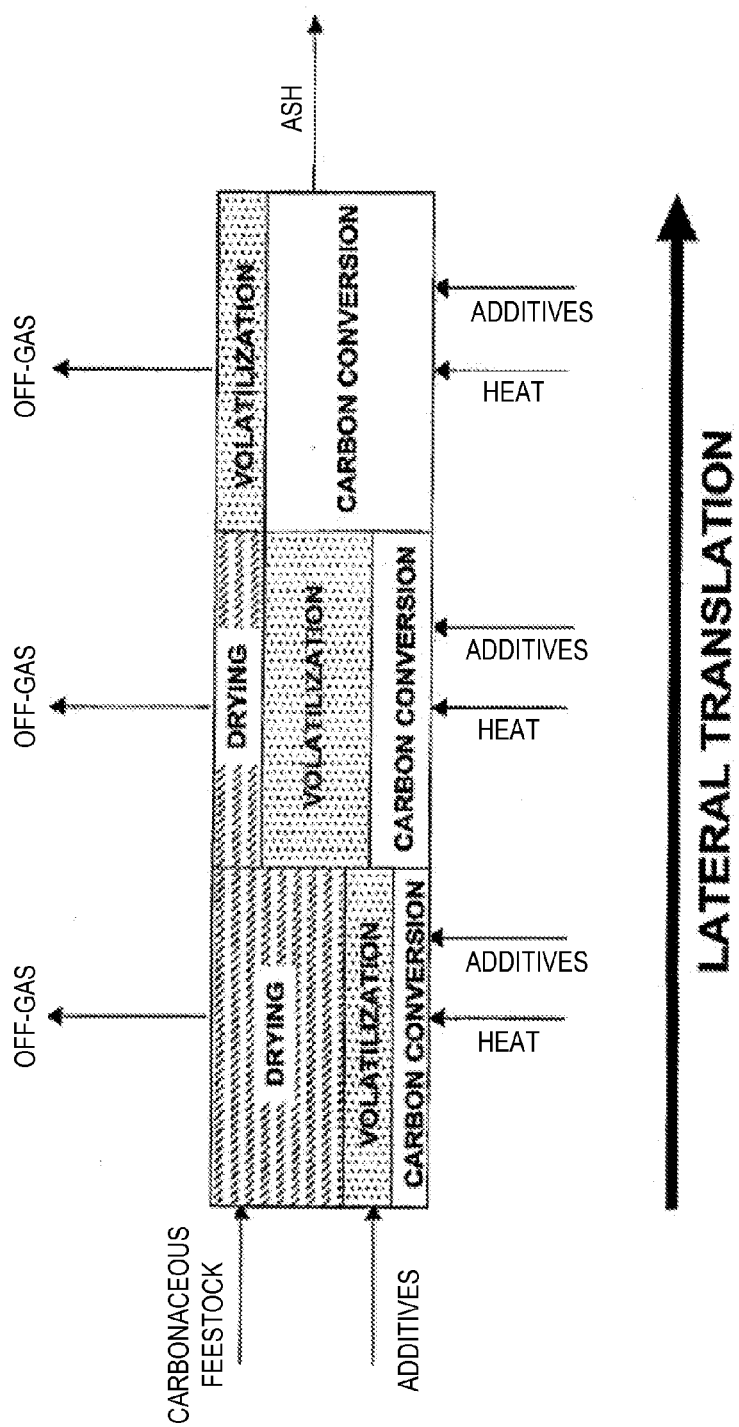
FIG. 27 is a flow diagram showing the different regions of a gasifier of an exemplary gasification system controlled by a control system, in accordance with an exemplary embodiment of the present invention.
Figure 28:
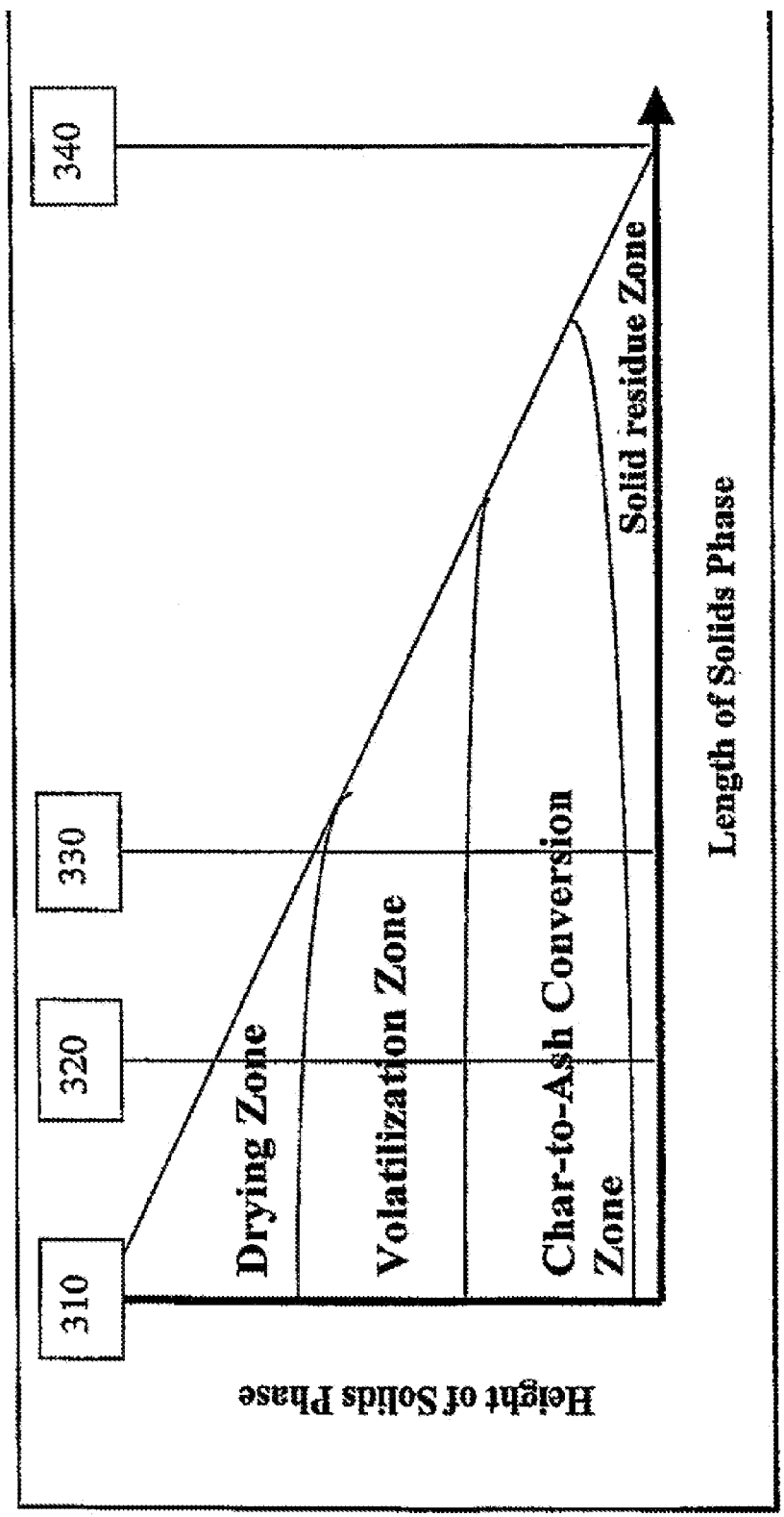
FIG. 28 is a representation of gasification processes occurring in Regions 1, 2 and 3 of the gasifier of FIG. 27.

The three zones are schematically represented in FIGS. 27 and 28, wherein exemplary reaction ratios are illustrated as progressing from a first zone where the drying process is most prominent over the volatilization and carbon conversion processes; a second zone wherein the volatilization process takes over; and a third zone where the material is practically completely dry, and the carbon conversion process takes over.

The horizontal expansion of the gasification process allows for the optimization of the gasification process by regionally promoting one or more of the stages of the gasification process in response to the characteristics of the feedstock material at that particular location in the converter of FIG. 23. It would be apparent to a worker skilled in the art that this converter could therefore be segregated into two, three, four or more steps depending on the characteristics of the feedstock used. The discussion below describes segregating the converter into three steps. The exemplary embodiment provided by the converter of FIG. 23, however, is not technically restricted to three steps.

In one embodiment, means are provided to move the material through the converter in order to facilitate specific stages of the gasification process (drying, volatilization, char-to-ash conversion). To enable control of the gasification process, means to control the material movement through the converter may also be provided. This movement of material through the converter can be achieved via the use of one or more material transfer units. This is achieved with the material transfer means by varying the movement speed, the distance each material transfer means moves and the sequence in which the plurality of material transfer means are moved in relation to each other. The one or more material transfer means can act in a coordinated manner or individual material transfer means can act independently. In order to optimize control of the material flow rate, total residence time in the chamber and pile height, the individual material transfer means can be moved individually, at varying speeds, at varying movement distances, and at varying frequency of movement. The material transfer means must be able to effectively operate in the harsh conditions of the converter and in particular must be able to operate at high temperatures. The material transfer means can include but are not limited to augers, shelves, platforms, rams, and other such means readily apparent to the person of skill in the art.

Various exemplary material transfer means are provided in international application numbers WO/2006/128285 and WO/2006/128286 and readily applicable in the present context, as would be apparent to a person skilled in the art. For example, a lateral transfer means comprising lateral transfer units, motor means and actuators wherein the individual lateral transfer units comprise a moving element and a guiding element. The response element can operate transfer means via any means readily known in the art, such as motors, hydraulics and pneumatics.

In one embodiment, a material movement system is provided to move the MSW along the converter such that the appropriate processing occurs in the appropriate stage of the converter and spent residue is moved to the solid material outlet of the converter. The height of the pile at each stage may also be controlled, as is the total residence time in the converter. These functions are controlled by a system of carrier rams at the floor of each stage. Each carrier ram is capable of movement the full or partial length of that stage, its speed is also variable. This provides the capability of controlling material pile height and residence time; also the stage can be completely cleared if required. The carrier rams may be a single carrier ram or multiple fingers. Power for moving the carrier rams can be provided by electric motors which drive the carrier ram via a gearbox and roller chain system. The motors are controlled by the control system which can command start and stop position, speed of movement and frequency of movement. Each carrier ram can be controlled independently. In one embodiment, a roller chain is used. The roller chain provides high strength and tolerates a severe duty environment. In one embodiment, precision guides can be used to keep the carrier rams angularly aligned. In another embodiment, the use of two chains per carrier ram provides a means of keeping the carrier rams angularly aligned without the need for precision guides. To avoid material on top of the carrier ram being pulled back when the carrier ram is withdrawn, the control system can be programmed for a specific carrier ram movement sequence. For example, a sequence where the lowest carrier ram is extended first; the middle carrier ram is then extended which pushes material down onto the lowest carrier ram filling the void created by that carrier ram's movement; the lowest carrier ram is then retracted; the upper carrier ram is then extended filling the void at the back of the middle carrier ram; the middle carrier ram is then retracted; new material dropping from the feed port fills any void on the top carrier ram and the top carrier ram is retracted. All of these motions can be controlled automatically by the control system in response to system instrumentation data.

In one embodiment temperature monitoring for the converter is achieved using sensors such as thermocouples. The temperature can be monitored at points along each stage and at various heights at each stage. Monitoring is achieved using thermocouples, which tend to need replacement during operation. In order to accomplish this without shutting down the process, each thermocouple can be inserted into the converter via a sealed end tube which is then sealed to the converter shell. This design allows the use of flexible wire thermocouples which are longer than the sealing tube so that the junction (the temperature sensing point) of the thermocouple is pressed against the end of the sealed tube to assure accurate and quick response to temperature change. The sealed tube can be sealed to the converter and mechanically held in place by means of a compression gland, which can also accommodate protrusion adjustment into the converter. Where temperature measurement is required into the material pile the sealed tube could cause holding back of the pile of MSW when movement is called for. To avoid this problem the end of the sealed tube can be fitted with a deflector which prevents MSW from getting blocked by the thermocouple tube.

The converter can be based on one of a number of standard converters known in the art. Examples of converters known in the art include, but are not limited to entrained flow converters, moving bed converters, fluidized bed converters, and rotary kiln converters, each of which is adapted to accept the feedstock(s) in the form of solids, particulates, slurry, liquids, gases or any combination thereof, through a feedstock input means. The feedstock(s) is introduced through one or more inlets, which are disposed to provide optimum exposure to heating for complete and efficient conversion of the feedstock(s) to the product gas.

In accordance with one embodiment of the present invention, the converter wall is lined with refractory material. The refractory material can be one, or a combination of, conventional refractory materials known in the art which are suitable for use in a converter for a high temperature (e.g., a temperature of about 1100° C. to 1400° C.) non-pressurized reaction. Various exemplary converters, along with converter compositions, configurations, etc., are described in detail in international application numbers WO/2006/128285 and WO/2006/128286 and readily applicable in the present context, as would be apparent to a worker skilled in the art.

The person of skill in the art will understand that by moving the one or more plasma heat sources, by adding other plasma heat sources, other sources of heat, and the like, the illustrated converters may be operated as single or multiple zone converters without departing from the general scope and nature of the present disclosure. Furthermore, it will be understood that the present control system may be implemented with any of the above or other such converter configurations. In fact, by monitoring one or more direct or indirect process characteristic relevant to the gasification and/or reformulation processes implemented within a given type of converter, whether these processes take place in a single zone or multiple zones within a single or multiple chambers, the control system may be used, via sensing elements, to monitor and adjust the ongoing processes to maximize, via response elements, process outputs and efficiencies. The control system may be implemented via direct control or via modular control wherein the control system comprises subsystems of control.

The person of skill in the art will further understand that, although the above description provides a number of exemplary converter types, configurations, and materials to be used therefor, other converter types, configurations and/or materials may be used without departing from the general scope and nature of the present disclosure.

Heating Means

The process for converting a carbonaceous feedstock into a product gas employs one or more plasma heating means which can be controlled by the control system of the current invention to ensure substantial conversion of the offgas to a product gas suitable for use in the selected downstream application(s). Plasma heating means may also be optionally provided to heat the carbonaceous feedstock to drive the initial gasification process.

In one embodiment, the one or more plasma heat sources will be positioned to optimize the offgas conversion to a suitable product gas. The position of the one or more plasma heat sources is selected according to the design of the gasification process, for example, according to whether the process employs a one stage or two stage gasification process, whether there are one or more converters, whether the reformer is integrated or distinct, or whether the converter is horizontally and/or vertically oriented.

A variety of commercially available plasma heat sources which can develop suitably high temperatures for sustained periods at the point of application can be utilized in the process. In general, such plasma heat sources are available in sizes from about 100 kW to over 6 MW in output power to produce temperatures, for example, in excess of about 900 to about 1100° C. as required for converting the offgas to the syngas product.

Examples may include inductively coupled plasma torches (ICP), and transferred arc and non-transferred arc torches (both AC and DC). Selection of an appropriate plasma heating means is within the ordinary skills of a worker in the art.

In one embodiment, the plasma heat sources are located adjacent to one or more air/oxygen and/or steam input ports such that the air/oxygen and/or steam additives are injected into the path of the plasma discharge of the plasma heat source.

In a further embodiment, the plasma heat sources may be movable, fixed or any combination thereof, and optionally, be operable by the control system of the present invention to adjust a position and/or orientation thereof.

In one embodiment, the gasification process uses the controllability of plasma heat to drive the conversion process and ensure that the gas flow and gas composition from the converter remain within predetermined ranges. Control of the plasma heat may also assist in the efficient production of the product gases, irrespective of the composition of different carbonaceous feedstock sources or any natural variability in sources of the same type of feedstock.

In one embodiment, the control system of the present invention comprises response elements to adjust the power of the plasma heat sources to manage the net overall energetics of the reaction. In order to manage the energetics of the reaction, the power to the plasma heat source may be adjusted to maintain a constant gasification system temperature despite any fluctuations in the composition of the feedstock and corresponding rates of feed of steam, air/oxidant and carbon-rich additives.

In one embodiment, the control system controls the power rating of the plasma heat source relative to parameters such as the rate at which the carbonaceous feedstock and additives are introduced into the converter, as well as the temperature of the system as determined by temperature sensing elements, and other such sensing elements, located at strategic locations throughout the system (e.g. temperature sensing elements 809, 810, and 811 of FIG. 1). The power rating of the plasma heat source must be sufficient to compensate, for example, for loss of heat in the converter and to process the added feedstock efficiently.

For example, when the temperature of the converter is too high, the control system may command a drop in the power rating of the plasma heat source (e.g. see FIGS. 18 and 71 to 75); conversely, when the temperature of the melt is too low, the control system may command an increase in the power rating of the plasma heat source.

In one embodiment of the invention, the control system comprises response elements to control the position of the torch to ensure the maintenance of the optimal high temperature processing zone as well as to induce advantageous gas flow patterns around the entire converter.

One or more plasma heat sources are also optionally provided to ensure complete processing of the solid residue of the gasification process, as will be discussed later. In some embodiments the converter comprises a distinct gasifier region where the gasifying takes place in the absence of plasma heat, and a distinct reformer region where plasma heat is used for gas reformulation.

Feedstock Input Means

Referring to FIGS. 1 to 4, and 19 to 24, the gasification process includes means, as in input means, for introducing the carbonaceous feedstock (which may comprise, for example, coal, municipal waste and/or high carbon mixed feedstock) to the converter, optionally under the control of the control system of the present invention. The high carbon feedstock may optionally be input via secondary feedstock input means or as an additive via additive input means described below. The input means are located to ensure that the feedstock is deposited at an appropriate location in the converter for optimum exposure to the gasifying heat source.

In one embodiment, the control system comprises response elements to adjust the rate of feedstock input via process devices for maintaining a product gas that is suitable for use in the selected downstream application(s). For example, the rate of feedstock addition to the converter can be adjusted to facilitate the efficient conversion of the feedstock into a suitable product gas. The rate of feedstock addition is selected according to the design specifications of the gasification process, in order to maintain a characteristic value representative of a sensed characteristic of the product gas within the predetermined range.

In one embodiment, the control system adjusts the feed rate via process devices such as input means to ensure that the feedstock is fed into the converter at an optimum rate for maintaining the gasification reaction as desired for the selected downstream application(s).

The selection of the input means is made according to the requirements for feed dispersion, the operating pressure and the feedstock particle size. Input means may include, for example, a screw auger, a pneumatic transport system, a plunger system, a ram system, a rotary valve system, or a top gravity feed system.

In one embodiment, municipal waste can be used as a feedstock for the gasification process. Municipal waste may be provided in solid or liquid form. For the gasification of solid wastes, the waste may be introduced to the converter through a solid waste inlet feed port. The converter may also be designed to optionally include liquid waste feed inlet ports for the processing of liquid waste.

A conditioning process for preparing the feedstock prior to introduction to the converter may also be utilized. In one embodiment, the feedstock, depending on its nature and to increase efficiencies and achieve a suitable product gas, can be pretreated, for example, to reduce its volume overall or increase its surface area to volume ratio by shredding, pulverizing, shearing, etc. In another embodiment, the feedstock may also undergo a pre-drying step to remove any residual moisture as required.

For example, in some embodiments, a gasification system amenable for use with the present control system additionally comprises a municipal solid waste (MSW) shredding system. The MSW shredding system may comprise an input conveyor, a shredder, and a pick conveyor. Stop, start and speed of the conveyor may be controlled remotely by the control system to match process demands. Sensors may be provided in the trough to alert the control system if material is not present. The shredder may be equipped to automatically stop when a jam is sensed, automatically reverse to clear the jam and then restart. In one embodiment, if a jam is still detected the shredder will shut-down and send a warning signal to the control system. Shredded waste may optionally be dropped from the shredder system into a feed hopper, which provides a buffer of material ready to feed into the converter. The hopper may be equipped with sensors such as high and low level indicators which can be used to control flow from the shredding system into the hopper. The conveyor is optionally under the control of the control system to match waste feed rate to meet process demands. In some embodiments the MSW feed conveyor may have an additional entry to accept high carbon feedstock (for example, shredded plastic) which enables quick response to process demands for higher or lower carbon input to meet the required gas quality while avoiding the need for a second input point to the converter.

In some embodiments, the gasification system amenable for use with the present control system additionally comprises a plastics handling system to prepare plastic as a high carbon feedstock and/or additive. Municipal recycling programs currently result in a large quantity of non-recyclable plastic material which has had to be sent to landfill; this material, for example, can meet the high carbon material requirement of the gasification process. Plastic and the like may optionally be shredded before input into the converter. The plastics system can be designed to provide storage for the as-received plastic, shred it, place it into a stockpile and feed it, optionally under independent control, into the converter. The system may comprise a storage facility, a shredder with input hopper, a take-away conveyor and a stockpile. Also, a feed conveyor may be used to introduce the shredded plastic into the converter. Level detectors can be located in the hopper to indicate hi and lo condition. Motion of this conveyor may be under the control of the control system. Control of the plastics handling system may be implemented via direct control or via modular control wherein the control system of the current invention comprises subsystems of control.

Additive Input Means

Referring to FIGS. 1 to 4, and 19 to 24, additives may optionally be added to the converter (e.g. via additive ports) to facilitate efficient conversion of the carbonaceous feedstock into a suitable product gas. The type and quantity of the additives may be carefully selected to optimize the carbonaceous feedstock conversion while maintaining adherence to regulatory authority emission limits and minimizing operating costs. Steam input may also be used to help promote sufficient free oxygen and hydrogen to maximize the conversion of decomposed elements of the input waste into fuel gas and/or non-hazardous compounds. Air/oxidant input may be used to assist in processing chemistry balancing to maximize carbon conversion to a fuel gas (minimize free carbon) and to maintain the optimum processing temperatures while minimizing the relatively high cost of plasma heat input. Carbon-rich additives, which may also be provided as an additional and/or complimentary feedstock, may also be added to supplement the carbon content of the feedstock undergoing gasification. The quantity of each additive is established and controlled for the selected downstream application(s). In some embodiments, the amount of oxidant injection may be carefully established to ensure a maximum trade-off for relatively high cost plasma arc input heat while ensuring the overall process does not approach any of the undesirable process characteristics associated with combustion, and while meeting and bettering the emission standards of the local area.

For those embodiments having the production of electrical energy as an objective, it is advantageous to produce gases having a high fuel value (e.g. measured by the gas high heating value (HHV) and/or low heating value (LHV)). The production of high quality fuel gases can be achieved by controlling reaction conditions, for example, by controlling the amount of additives that are added at various steps in the conversion process.

The converter, therefore, can include a plurality of additive input ports, which may be provided for the addition of gases such as oxygen, air, oxygen-enriched air, steam or other gas useful for the gasification process. The additive input means can include air input ports and steam input ports. These ports may be positioned within the converter for the optimal distribution of additives through the converter. The steam input ports can be strategically located to direct steam into the high temperature processing zone and into the product gas mass prior to its exit from the converter. The air/oxidant input ports can be strategically located in and around the converter to enhance coverage of additives into the processing zone.

The additive input ports may also include input ports for the addition of carbon-rich materials, which may also be added via additional and/or complimentary feedstock input means. Feedstocks useful for the gasification process of the present invention can conceivably be any carbonaceous materials, and as such, may be inherently highly variable in their carbon content. In one embodiment of the invention, the system provides a means, as in a dedicated carbon-rich additive port, for the addition of a carbon-rich feedstock to supplement the carbon content of the feedstock undergoing gasification. The carbon-rich material may optionally be added by premixing with the feedstock before addition to the converter (mixed feedstock input). The provision of a feedstock having a high carbon content increases the carbon balance in the product gases.

In one embodiment, the control system comprises means to control the addition of a carbon-rich feedstock via process devices such as response elements to adjust the reactants to maintain one or more characteristic values of sensed characteristics within the respective predetermined ranges defined to characterize the product gas as suitable for the selected downstream application(s). For example, additives may be added to the converter to facilitate the efficient conversion of the feedstock into a suitable product gas. The type and quantity of the additives may be carefully selected for the above mentioned goal of suitable product gas. In another embodiment of the invention, the control system comprises response elements to control the addition of additives to maintain production of a suitable product gas. In another embodiment of the control system, response elements are provided to control the addition of two or more additives to maintain production of a suitable product gas. In yet another embodiment, response elements are provided to control the addition of three or more additives to maintain production of a suitable product gas.

In those embodiments comprising a one stage process, i.e., where the gasification and reformulation steps both take place in a single chamber converter, it may be advantageous to strategically locate additive input ports in and around the converter to ensure adequate coverage of additives into the processing zone. In those embodiments wherein the process takes place in two stages, i.e., the gasification and reformulation take place in discrete regions within the system, it may be advantageous to locate certain additive ports (for example, steam inputs) proximal to the region where reformulation by the plasma heat source takes place.

In a further embodiment, the control system comprises response elements for adjusting the additive inputs based on data obtained from monitoring and analyzing the characteristics of the product gas, via various sensing elements and computing means whereby these data are used to estimate the composition of the feedstock. The product gas characteristics data may be obtained on a continuous basis, thereby allowing the adjustments to additive inputs such as air, steam and/or carbon-rich additives to be made on a real-time basis. The product gas characteristics data may also be obtained and/or analyzed on an intermittent basis.

The control system of the present invention, therefore, includes a means, as in response elements for introducing the additives into the system, based on characteristic values as monitored by various sensing elements, according to the predetermined range of characteristic values defined to characterize the product gas as suitable for the downstream application(s). For example, in the event that a gas sensor detects too much carbon dioxide, the control system may reduce the delivery of oxidant into the converter to reduce the production of carbon dioxide.

In one embodiment of the invention, the process is adjusted to produce mostly carbon monoxide, rather than carbon dioxide. In order to expedite the production of carbon monoxide in such an embodiment, the system will include a sensor, analyzer or other such sensing elements for determining the amount of oxygen in the gaseous output stream. If a certain range (dependant upon the composition and rate of other inputs such as feedstock input) of oxygen input from steam or air/oxidant inputs is used in the gasification process, the product gas will be mainly carbon monoxide. If there is too little oxygen, a considerable amount of elemental carbon or carbon black may form which may ultimately plug up equipment downstream from the converter. If there is too much oxygen in the system, too much carbon dioxide will be produced, which is undesirable if the objective of the process is to produce a fuel gas. In response to too much carbon dioxide in the system, any steam or air/oxidant being injected may be reduced or eliminated by an appropriate signal from the control system (e.g. see FIGS. 1, 18 and 71 to 75).

In one embodiment, a syngas fuel value determination module can compute the low heating value $LHV=c1*[H_2]+c2*[CO]$, where c1 and c2 are constants and where $[H_2]$ and $[CO]$ are obtained from the syngas analyzer. The module may be operatively coupled to a Fuel:Air ratio controller, for example, for cooperatively controlling the total MSW+HCF feed rate and optionally the MSW/HCF ratio controller and carrier ram sequence controller. In one embodiment, in order to determine the amount of air additive to input into the system to obtain a syngas composition within an appropriate range for the downstream application, or again within a range conducive to increasing the energetic efficiency and/or consumption of product gas, the control system may be configured to compute a control parameter based on an acquired characteristic value for the LHV (e.g. from analysis of $[H_2]$ and $[CO]$ of syngas). For instance, by setting the temperature and pressure constant, or at a desired set point, a global system parameter may be defined empirically such that the air input parameter may be estimated with sufficient accuracy using a linear computation of the form $[LHV]=a[Air]$, wherein a is an empirical constant for a particular system design and desired output characteristics.

In another embodiment, in order to determine the amount of air additive and steam additive to input into the system to obtain a syngas composition within an appropriate range for the downstream application, or within a range conducive to increasing the energetic efficiency and/or consumption of product gas, the control system may be configured to compute control parameters based on acquired characteristic values for $[H_2]$ and $[CO]$. For instance, by setting the temperature and pressure constant, or at a desired set point, global system parameters may be defined empirically such that the air and steam input parameters may be estimated with sufficient accuracy using a linear computation of the form:

$$\begin{bmatrix} H_2 \\ CO \end{bmatrix} = \begin{bmatrix} a & b \\ c & d \end{bmatrix} \begin{bmatrix} Air \\ Steam \end{bmatrix}$$

wherein a, b, c and d are empirical constants for a particular system design and desired output characteristics. The person of skill in the art will appreciate that although simplified to a linear system, this embodiment may be extended to include additional characteristic values, and thereby provide for the linear computation of additional control parameters. Higher order computations may also be considered to refine computation of control parameters as needed to further restrict process fluctuations for more stringent downstream applications.

The conversion of a carbonaceous feedstock into fuel gas within the converter is an endothermic reaction, i.e., energy needs to be provided to the reactants to enable them to reform into the suitable fuel gas product. In one embodiment of the invention, a proportion of the energy required for the gasification process is provided by the oxidation of a portion of the initial gaseous products or carbonaceous feedstock within the converter.

Introduction of an oxidant into the converter creates partial oxidation conditions within the converter. In partial oxidation, the carbon in the feedstock reacts with less than the stoichiometric amount of oxygen required to achieve complete oxidation. With the limited amount of oxygen available, solid carbon is therefore converted into carbon monoxide and small amounts of carbon dioxide, thereby providing carbon in a gaseous form.

Such oxidation also liberates thermal energy, thereby reducing the amount of energy that needs to be introduced into the converter by the plasma heat. In turn, this increased thermal energy reduces the amount of electrical power that is consumed by the plasma heat source to produce the specified reaction conditions within the converter. Thus, a greater proportion of the electricity produced by converting the fuel gas to electrical power in an electric power generating device (e.g. fuel cell application, gas turbine, etc.) can be provided to a user or exported as electrical power, because the plasma heat source requires less electricity from such an electric power generating device in a system which employs the addition of an oxidant.

The use of oxidant inputs as an additive therefore assists in maximizing the conversion of carbon to a fuel gas and helps to maintain the optimum processing temperatures as required while minimizing the relatively high cost plasma input heat. The amount of oxidant injection may be carefully established to ensure maximum removal of carbon in gaseous form (CO and $CO_2$). Simultaneously, because the gasification of carbon reactions (combination with oxygen) are exothermic, substantial quantities of heat are produced. This minimizes the need for relatively high cost plasma input heat while helping to ensure the overall process does not approach any of the undesirable process characteristics associated with combustion Although less fuel gas will be produced within the converter when partial oxidizing conditions exist (because some of the fuel gas or feedstock is oxidized to liberate thermal energy, and thus, less fuel gas is available to an electric power generating device), the reduction in electrical consumption by the plasma heat source(s) offsets a possible loss in electrical energy production. In one embodiment of the invention, the control system comprises means to adjust the addition of additives to maintain one or more characteristic values of sensed characteristics within predetermined ranges defined for a product gas suitable for the downstream application(s), while taking into account overall energy production from the process.

In one embodiment of the invention, the oxidant additive is selected from air, oxygen, oxygen-enriched air, steam or carbon dioxide. In those embodiments using carbon dioxide as an oxidizing additive, the carbon dioxide may be recovered from the product gases and recycled into the additive stream.

In some embodiments, an air feed system is provided for process air to be distributed fairly evenly over the area where the gasification process takes place. In one embodiment, the heated air is introduced through a perforated floor. To avoid blockage of air holes during processing, the air hole size can be selected such that it creates a restriction and thus a pressure drop across each hole, sufficient to prevent waste particles from entering the holes. The holes may also be tapered outwards towards the upper face to preclude particles becoming stuck in a hole. While a multi-stage horizontal design example is presented here, any number of stages, as well as vertical orientation, are also included. In multi-stage gasification configurations, the flow at each stage may be under independent control. In one embodiment of this example, there are three stages of processing with independently controllable air feed for each level. Independent air feed and distribution through a perforated floor may, in one embodiment, be achieved by a separate airbox which forms the floor at each stage.

The selection of appropriate oxidizing additive may be made according to the economic objectives of the conversion process. For example, if the economic objective is the generation of electricity, the oxidizing additive may be selected to provide the optimal output gas composition for a given energy generating technology. For those systems which employ a gas engine to generate energy from the product gases, a higher proportion of nitrogen may be acceptable in the product gas composition. In such systems, air may be an acceptable oxidant additive. For those systems, however, which employ a gas turbine to generate energy, the product gases must undergo compression before use. In such embodiments, a higher proportion of nitrogen in the product gases will lead to an increased energetic cost associated with compressing the product gas, a proportion of which does not contribute to the production of energy. Therefore, in certain embodiments, it is advantageous to use an oxidizer that contains a lower proportion of nitrogen, such as oxygen or oxygen-enriched air.

In those embodiments of the present invention which seek to maximize the production of electrical energy using the fuel gases produced by the gasification process, it may be advantageous to minimize the oxidation of the fuel gas which takes place in the converter. In order to offset any decrease in the production of fuel gas due to partial oxidation conditions, steam may also be used as the oxidizing additive. The use of steam input as an additive may help promote sufficient free oxygen and hydrogen to maximize the conversion of decomposed elements of the input feedstock into fuel gas and/or non-hazardous compounds.

For those embodiments having the production of electrical energy as an objective, it is advantageous to produce gases having a high fuel value. The gasification of carbonaceous feedstocks in the presence of steam produces a syngas composed predominantly of hydrogen and carbon monoxide. Those of ordinary skill in the chemical arts will recognize that the relative proportions of hydrogen and carbon monoxide in the fuel gas product can be manipulated by introducing different amounts of additives into the converter, namely air, oxygen, oxygen-enriched air, other oxidants, steam, etc.

Steam input ports can be strategically located to direct steam into the high temperature processing zone and/or into the product gas mass prior to its exit from the converter.

Solid Residue Conditioner

Referring to FIGS. 1 to 4, 19 to 23, and 52 to 58 of Example 1, the carbonaceous feedstock gasification system amenable for use with the present control system may also provide means for managing the solid by-product of the gasification process, such as a solid residue conditioner for the conversion of the solid by-products, or other residues in various phases, resulting from feedstock-to-energy conversion processes, into a vitrified, homogenous substance having low leachability.

The control system of the present invention may provide for the optimization of the solid residue-to-slag conversion by controlling the plasma heat rate and solid residue input rate to promote full melting and homogenization. In one embodiment, the solid residue conditioner comprises a solid residue conditioner having a solid residue inlet, a plasma heating means, a slag outlet, optionally one or more ports, and a downstream cooling means for cooling and solidifying the slag into its final form. The control system of the present invention may also provide sensing elements to monitor temperature and pressure throughout the solid residue conditioner, response elements to regulate the efficient conversion of the solid residue into slag, and via, for example, process devices, means to control such operational parameters as the power to the plasma heat source and solid residue input rate.

The solid residue conditioner is adaptable to treat solid residue coming out of any process that converts the carbonaceous feedstock into different forms of energy. This solid residue is typically in a granular state and may come from one or more sources such as the converter and optionally the converter gas conditioner. The solid residue from all sources may be heated to a temperature required to convert the solids into a vitrified, homogeneous substance that exhibits extremely low leachability when allowed to cool and solidify. The solid residue conditioner therefore ensures that the solid residue is brought up to an adequate temperature to melt and homogenize the solid residue. The solid residue conditioner also promotes the capture of polluting solids (i.e., heavy metals) in the slag, as well as the formation of a clean, homogeneous (and potentially commercially valuable) slag product.

In order to ensure essentially complete processing of the solid residue, the solid residue conditioner may be designed to provide sufficient residence time in the solid residue conditioner. In one embodiment, the system provides a residence time of at least 10 minutes. In another embodiment, the solid residue conditioner provides a residence time of up to 1 hour. In yet another embodiment, the solid residue conditioner provides a residence time of up to 2 hours.

The solid residue, which may take the form of char, ash, slag, or some combination thereof, will be removed, continuously or intermittently, from one or more upstream processes through appropriately adapted outlets and conveyance means as would be known to the skilled worker, according to the requirements of the system and the type of by-product being removed. In one embodiment, the solid residue is pushed into the solid residue conditioner through a system of hoppers and conveying screws.

The solid residue may be added in a continuous manner, for example, by using a rotating screw or auger mechanism. For example, in one embodiment, a screw conveyor is employed to convey ash to a solid residue conditioner.

Alternatively, the solid residue can be added in a discontinuous fashion. In one embodiment, the solid residue input means, attached to the solid residue conditioner, may consist of a system of conveying or carrier rams. In such an embodiment, limit switches may be employed by the control system to control the length of the carrier ram stroke so that the amount of material fed into the converter with each stroke can be controlled.

The control system of the present invention may further include a control means such that the input rate of the solid residue can be controlled to ensure optimal melting and homogenization of the solid residue material.

In one embodiment, a plasma heat source, is employed to heat and melt the ash into slag. The molten slag, at a temperature of, for example, about 1300° C. to about 1700° C., may be periodically or continuously exhausted from the solid residue conditioner and thereafter cooled to form a solid slag material. Such slag material may be intended for landfill disposal. Alternatively, the molten slag can be poured into containers to form ingots, bricks tiles or similar construction material for use in, for example road fill or concrete manufacture. The solid product may further be broken into aggregates for conventional uses.

The solid residue conditioner, therefore, includes a slag output means, optionally under the control of the control system, through which in one embodiment molten slag is exhausted from the solid residue conditioner. The output means may comprise a slag exit port, which is typically located at or near the bottom of the converter to facilitate the natural flow of the molten slag pool out of the converter. The rate at which the molten slag flows out of the solid residue conditioner may be controlled in a variety of ways. For example, in one embodiment, the temperature differential between the point closest to the plasma heating means and the exit point may be adjusted to control the re-solidification time of the molten slag, e.g., through adjustments in the volume of solid residue material allowed to pool in the converter.

The slag output means may further be adapted to minimize heating requirements by keeping the solid residue conditioner sealed. In one embodiment, the output means comprises a pour spout or S-trap.

As discussed previously, it may also be advantageous to aim the plume of one or more of the plasma heat sources towards the slag pool at, or around, the slag exit port to maintain the temperature of the molten slag and ensure that the slag exit port remains open through the complete slag extraction period. This practice will also aid in maintaining the slag as homogeneous as possible to guard against the possibility that some incompletely-processed material may inadvertently make its way out of the solid residue conditioner during slag extraction.

The molten slag can be extracted from the solid residue conditioner in a number of different ways. For example, the slag can be extracted by a batch pour at the end of a processing period, or a continuous pour throughout the full duration of processing. The slag from either pour method can be poured into a water bath, where the water acts as a seal between the external environment and the gasification system. The slag can also be dropped into carts for removal, into a bed of silica sand or into moulds.

The walls of the solid residue conditioner are lined with a refractory material that can be one, or a combination of, conventional refractory materials known in the art which are suitable for use in a converter for extremely high temperature (e.g., a temperature of about 1300° C. to 1800° C.) non-pressurized reactions. Examples of such refractory materials include, but are not limited to, chromia refractories and high alumina refractories containing alumina, titania, and/or chromia.

The physical design characteristics of the solid residue conditioner can be determined by a number of factors. These factors may include, for example, the composition, volume and operational characteristics of the input of the solid residue to be processed, efficient heat transfer, adequate temperatures, molten slag flow, the residence time required to ensure that the solid residue is brought up to an adequate temperature to melt and homogenize the solid residue, and the type of plasma heating means used, as well as the position and orientation, of the plasma heating means The control system of the present invention may regulate the efficient conversion of solid residue into slag by providing sensing elements to monitor the temperature and optionally pressure at sites located throughout the solid residue conditioner, wherein such data are acquired on a continuous or intermittent basis. Sensing elements for monitoring the temperature in the conditioner, for example, may be located on the outside wall of the conditioner, or inside the refractory at the top, middle and bottom of the conditioner. The control system of the present invention also provides response elements operatively linked to process devices to control, for example, the power to the plasma heat source and solid residue input rate.

For example, when the temperature of the melt is too high, the control system may command a drop in the power rating of the plasma heat source; conversely, when the temperature of the melt is too low, the control system may command an increase in the power rating of the plasma heat source. Control of the solid residue conditioner may be implemented via direct control of the control system or via modular control wherein the control system comprises subsystems of control.

In one embodiment, the solid residue conditioner can also comprise a means for recovering heat (e.g. plasma heat source cooling means and slag cooling means of FIGS. 24 and 25), which can reduce the amount of waste heat generated. Such heat recovery means can include, for example, heat exchangers. In such an embodiment, the control system can additionally control the operating conditions of the heat exchanger.

The heat exchanger can have, for example, a number of temperature sensors, flow control elements, and other such monitoring and response elements.

In one embodiment, the solid residue is extracted from the primary converter, fed into a high temperature melting chamber, cooled and shattered into granules in a quench tank and transferred to a stockpile ready for removal from site. In another embodiment, there is provided a solid residue feed system which extracts solid residue from the converter by means of a screw type conveyor. This can have serrated edges on the screw flights to break up any agglomerated material. The solid residue can then be taken to a slag melting chamber by means of a conveyor system. Additional sources of solid residue can also be catered for. In order for gasification to continue during solid residue conditioner downtime the solid residue may be diverted and later re-introduced into the solid residue conditioner feed system.

In one embodiment, the solid residue received from the feed system is transferred into a melting crucible and melted using a plasma torch. As molten slag rises within the crucible it reaches a weir and runs over the weir, dropping into a quench tank.

The gases produced in the solid residue conditioner may be treated similarly to the gases produced in the converter (e.g. for downstream use in a same or alternate downstream application). Any metals which have not been removed during the MSW handling system stage may be transferred to the slag crucible and will not necessarily be melted at the slag normal vitrification temperature, thus the crucible could become clogged with metal as it is of higher density than the molten slag. To deal with this, the chamber temperature may in some embodiments be periodically raised to melt any metals and the molten metals may be tapped off from the bottom of the crucible to remove them. Due to the very high temperatures needed to melt the solid residue and particularly the metals in the solid residue, the refractory will be subjected to very severe operational demands. These include corrosion and erosion, particularly at the slag waterline in addition to the high temperature. The refractory may be selected to provide an inner lining of very high resistance to heat, corrosion and erosion. The layers of refractory outside the lining may then be selected to greater insulation.

In some embodiments, the solid residue may be provided to the solid residue conditioner from both the converter and the gas conditioner, the combination of which can be conditioned to yield a solid product (e.g. vitrified slag) and a syngas to be conditioned and combined with the converter syngas for further conditioning, homogenisation and downstream use. In controlling the solid residue processing, the power of the plasma torch may be adjusted as needed to maintain temperatures adequate for the melting operation. The slag chamber may include various temperature sensing elements and pressure sensing elements. In some embodiments a control valve may be provided in the gas outlet line to restrict the flow of gas that is being removed by the downstream vacuum producer (syngas blower). The feed rate to the solid residue conditioner may be adjusted as required to ensure acceptable temperature control, within capability of melting rate of plasma torches, and to prevent high levels in the slag chamber due to un-melted material.

Heat Exchanger

Referring now to FIGS. 1 to 4 and 24 to 26, a carbonaceous feedstock gasification system amenable for use with the control system of the present invention may also provide means for the recovery of heat from the hot product gas via a heat exchanger. The heat exchanger may comprise one or more gas-to-air heat exchangers, whereby the hot product gas is used to provide heated exchange-air. The recovered heat (in the form of the heated exchange-air) may then optionally be used to provide heat to the gasification process, as specifically illustrated in FIG. 26, thereby reducing the amount of heat which must be provided by the one or more plasma heat sources required to drive the gasification process. The recovered heat may also be used in industrial or residential heating applications. In one example, the syngas temperature is reduced from about 1000° C. to about 740° C. while increasing the air temperature from ambient to about 600° C.

In another embodiment, the gas-to-air heat exchanger is employed to heat an oxidant, such as oxygen or oxygen-enriched air, which may then optionally be used to provide heat to the gasification process.

Different classes of gas-to-air heat exchangers may be used, including shell and tube heat exchangers, both of straight, single-pass design and of U-tube, multiple pass design, as well as plate-type heat exchangers. In one embodiment, the product gas flows inside the tubes and the process air flows counter-currently on the shell side of the gas-to-air heat exchanger. The design of the heat exchanger may also take into account means, such as bellows, to avoid tube rupture. The selection of appropriate heat exchangers is within the knowledge of the skilled worker.

In order to minimize the hazard potential from a tube leak, the gasification system may further comprise one or more individual temperature sensing elements associated with the product gas outlet of the gas-to-air heat exchanger. These temperature sensing elements may be positioned to detect a temperature rise resulting from combustion in the event of having exchange-air leak into the syngas conduit. Detection of such a temperature rise can be used to effect an automatic shut down of the induction air blowers which move the coolant air through the heat recovery system. A lower predetermined limit may also be used as an indication that the tubes are starting to plug, which could in some embodiments be used to indicate that the system should be shut down for maintenance.

The heat exchanger may be under the direct control of the control system of the present invention and/or under control of a modular control subsystem.

Figure 26:
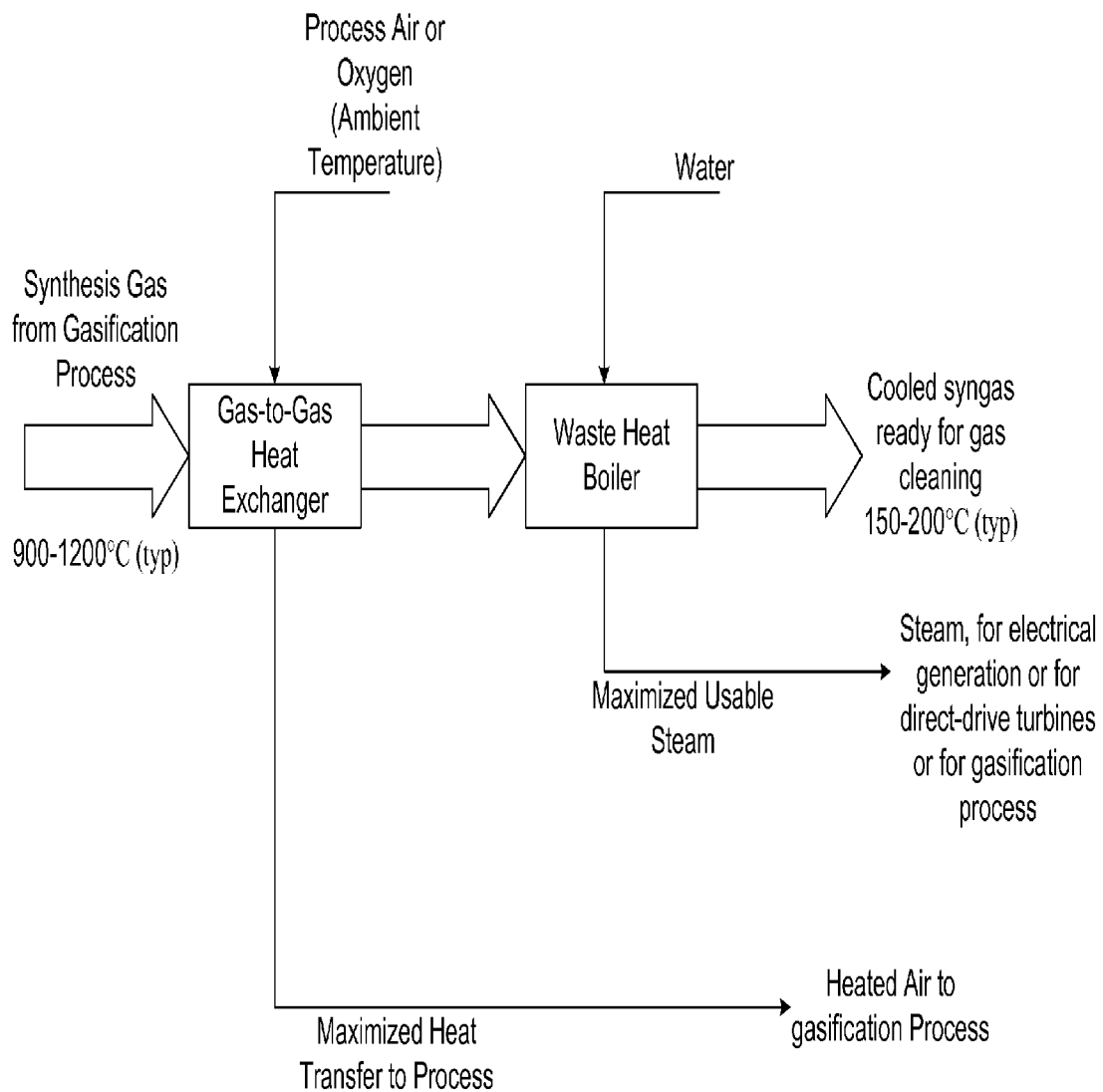
FIG. 26 is a schematic diagram depicting a heat recovery subsystem of a gasification process for converting carbonaceous feedstock into a gas, in accordance with one embodiment of the present invention.

Optionally, the heat exchanger additionally comprises one or more steam generator heat exchangers to generate steam, which can be used as an additive in the gasification reaction, as specifically illustrated in FIG. 26 to drive a steam turbine, or to drive rotating process equipment, such as induction blowers. Heat from the product gas is used to heat water to generate steam using a heat exchanging means, such as a steam generator heat exchanger (e.g. see FIGS. 2, 3 and 25), a waste heat boiler (e.g. see FIG. 26), and the like. In one embodiment, the steam produced using heat from the product gas is superheated steam.

With specific reference to FIG. 26, the relationship between a gas-to-air heat exchanger and a steam generator heat exchanger is depicted in accordance with one embodiment of the invention. The exchange-steam can also be used as a steam additive during the gasification process to help ensure sufficient free oxygen and hydrogen to maximize the conversion of the feedstock into the syngas product.

Steam that is not used within the conversion process or to drive rotating process equipment, may be used for other commercial purposes, such as the production of electricity through the use of steam turbines or in local heating applications or it can be supplied to local industrial clients for their purposes, or it can be used for improving the extraction of oil from the tar sands.

Optional Steam Generator Heat Exchanger

Figure 2:
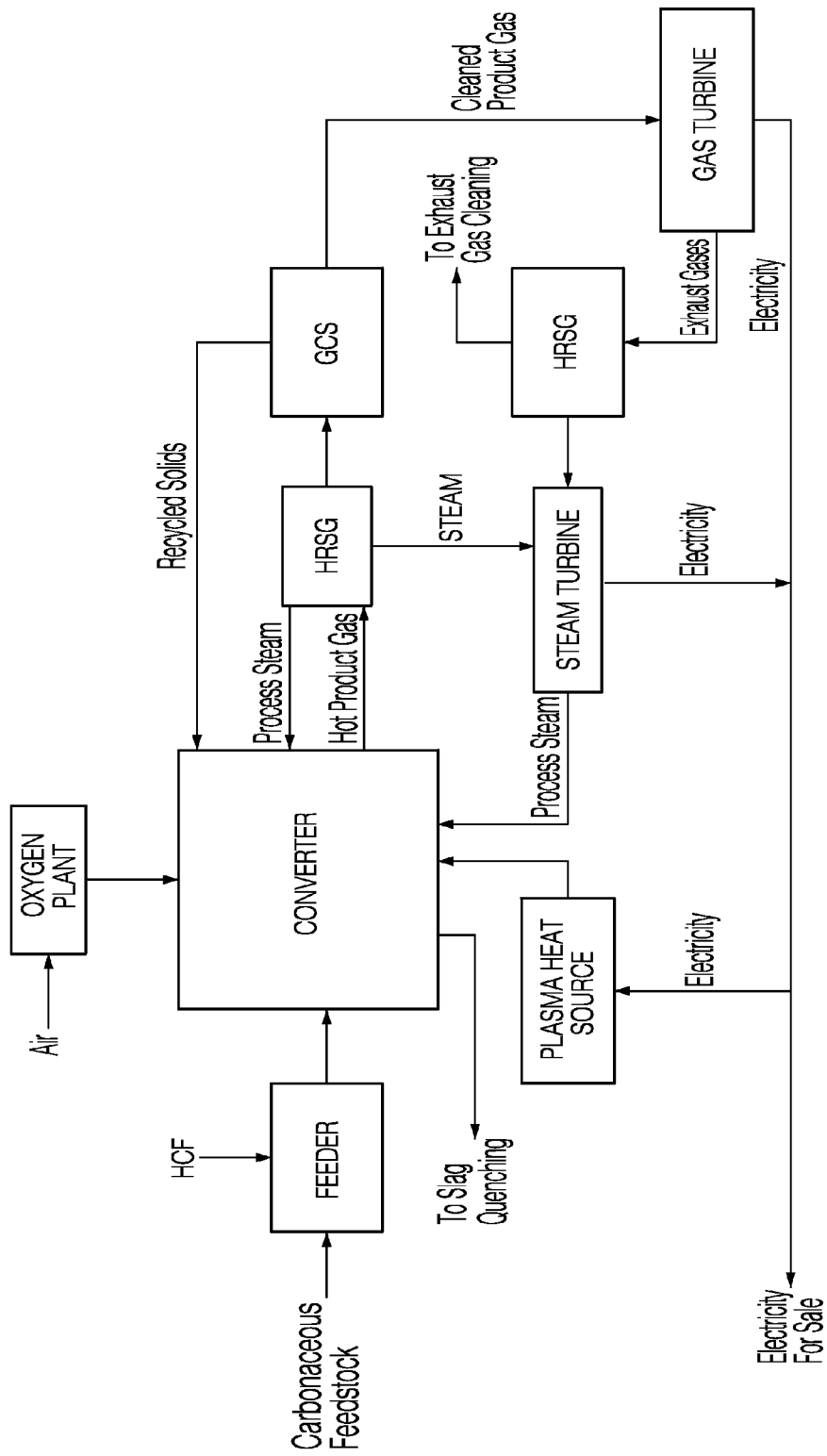
FIG. 2 is a schematic diagram depicting a system for the conversion of carbonaceous feedstocks into gas, in accordance with one embodiment of the present invention.
Figure 3:
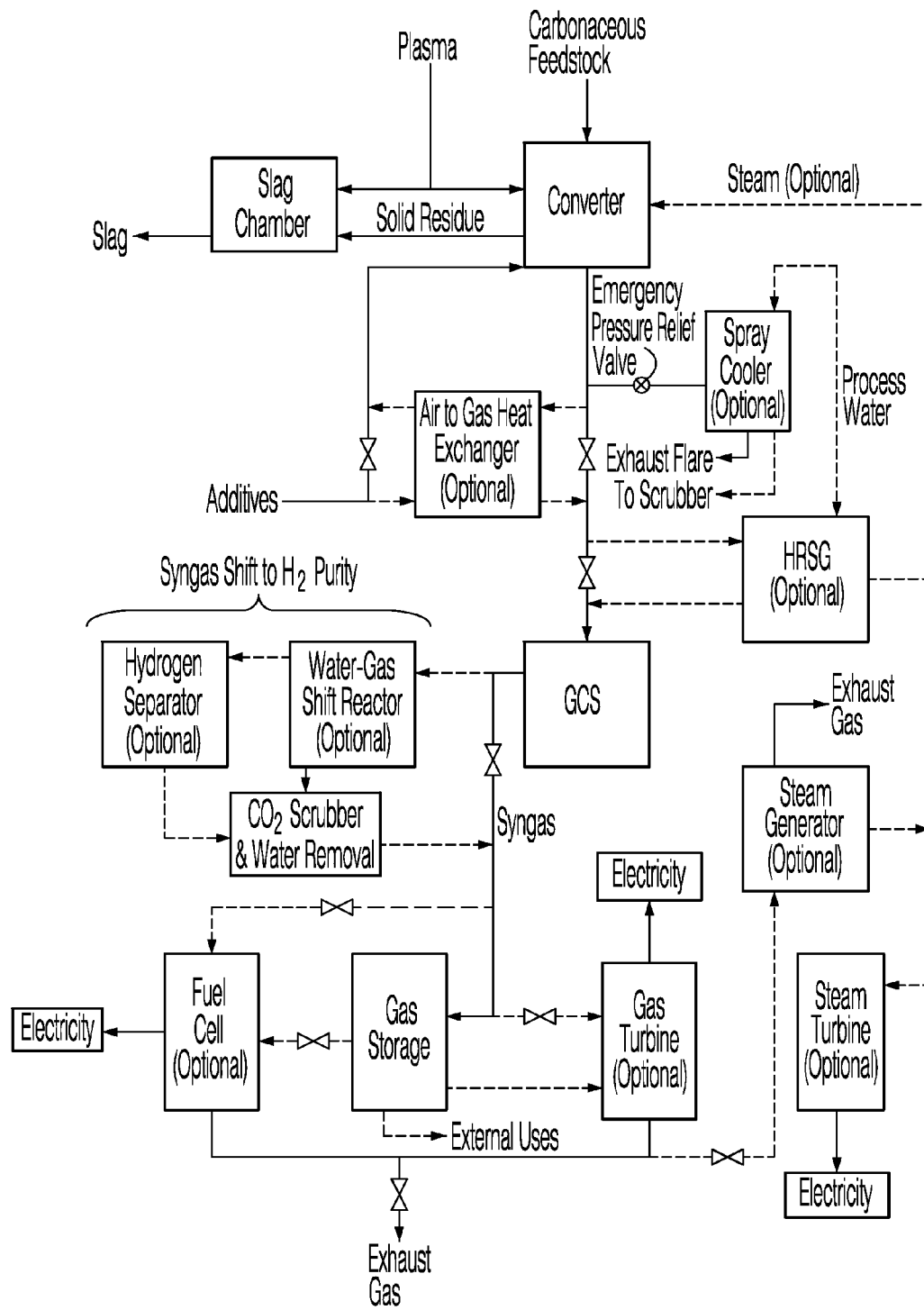
FIG. 3 is a schematic diagram depicting a system for the conversion of carbonaceous feedstocks into gas in accordance with one embodiment of the present invention.

With reference to FIG. 2, in one embodiment the steam recuperated from the outputs of the various steam turbines (e.g. a steam turbine operating from steam generated by a steam generator heat exchanger used to cool the syngas, a steam turbine operating from steam generated by a steam generator heat exchanger used to cool a gas turbine/engine and exhaust gas generated thereby, or any combination thereof), is cooled through an additional heat exchanger, which may also be controlled by the control system of the current invention, and is fed by a cooling tower pump or the like. In one embodiment, upon exit from the exchanger, the cooled steam/water is pumped through a deaerator, fed by a soft water source with appropriate chemicals, to remove air and excess oxygen therefrom, to then be processed back to the boiler feed water of the exhaust gas steam generator heat exchanger, the syngas steam generator heat exchanger, etc.

The control system of the current invention can be used, in some embodiments to optimize the transfer of energy throughout the system, thereby managing the energetics of the feedstock-to-energy conversion. The energetics of the feedstock-to-energy conversion can be optimized using the heat exchanger, since the recycling of the recovered sensible heat back to the gasification process reduces the amount of energy inputs required from external sources for the steps of drying and volatilizing the feedstock. The recovered sensible heat may also serve to minimize the amount of plasma heat required to achieve a specified quality of syngas. Thus, the present invention allows for the efficient gasification of a carbonaceous feedstock, wherein the gasification heat source is optionally supplemented by air heated using sensible heat recovered from the product gas.

In order to optimize the efficiency, the control system also optionally provides a means for controlling the conditions under which the heat exchanger process is carried out. These control means are provided to monitor one or more parameters, including, but not limited to, temperature and gas flow rates at specified locations throughout the system, and to adjust operating conditions accordingly, so as to maintain the system within defined parameters. Examples of operating conditions which may be adjusted by the control means, via response elements, include one or more of the exchange-air flow rate, the product gas flow rate, the rate of feedstock input, the rate of input of additives such as steam, and the power to the plasma heat sources.

For example, sensors such as temperature transmitters (and other such sensing elements) may be installed at specified locations throughout the gasification system amenable for use with the current invention. The temperature transmitters may be located to measure, for example, the temperatures of the product gas at the gas-to-air heat exchanger inlet and outlet, as well as the temperatures of the product gas at the steam generator heat exchanger inlet and outlet. Temperature transmitters may also be provided to measure the temperature of the process air after heating in the gas-to-air heat exchanger, as well as to measure the temperature of the steam as it exits the steam generator heat exchanger.

These temperature measurements can be used to ensure that the temperature of the syngas as it enters a respective heat exchanger does not exceed the ideal operating temperature of that device. For example, if the design temperature for the gas-to-air heat exchanger is 1050° C., a temperature transmitter on the inlet gas stream to the heat exchanger can be used to control both exchange-air flow rates through the system and plasma heat power in order to maintain the optimum syngas temperature. In addition, measurement of the product gas exit temperature may be useful to ensure that the optimum amount of sensible heat has been recovered from the product gas at both heat recovery stages.

In one embodiment a temperature sensing element such as a temperature transmitter installed on the air outlet stream to measure the temperature of the heated exchange-air helps ensure that the process is carried out under conditions that ensure the process air is heated to a temperature appropriate for use in the gasification process. In one embodiment, the exchange-air outlet temperature is, for example, about 600° C., therefore a temperature transmitter installed on the air outlet stream will be used to control one or both of air flow rates through the system and plasma heat source power in the plasma reformulating chamber in order to maintain the optimum syngas input temperature, which in turn can be used to control the temperature of the heated exchange-air.

According to one embodiment of the invention, the control strategy sets a fixed set point for the optimum heated exchange-air output temperature, for example, about 600° C., as well as a fixed value for the steam generator heat exchanger gas exit temperature, for example, about 235° C. Therefore, according to this embodiment, when the syngas flow is reduced, the exit gas temperature of the gas-to-air heat exchanger gets cooler, resulting in decreased steam production because the steam generator heat exchanger gas exit temperature is also set to a fixed value.

The same concept applies when the airflow through the system is reduced. According to one embodiment of the present invention, the exit exchange-air temperature remains fixed therefore the exit product gas temperature for the gas-to-air heat exchanger is hotter, therefore producing more steam in the steam generator heat exchanger. However, when airflow through the system is reduced, product gas flow will consequently also reduce, so the increased inlet temperature to the steam generator heat exchanger will only be momentarily high. For example, if airflow is reduced to 50%, the maximum inlet gas temperature that the steam generator heat exchanger 50 would momentarily see is approximately 800° C., which is within the temperature limits of the heat exchanger design.

In addition, in some embodiments, the present control system optionally provides response elements for controlling an automatic valve for venting process air to the atmosphere if more air than required for the gasification process is preheated. For example, in some instances it is necessary to heat more gas than required for the process due to equipment considerations (e.g. when starting a shutdown procedure). In such instances, the excess exchange-air can be vented as required.

With reference to FIGS. 24 and 25, the heat exchanger described above may also provide for the cooling of the product gas as required for subsequent particulate filtering and gas conditioning steps, namely with regards to the converter gas conditioner (e.g. converter gas conditioner cooling means), as well as provide for the cooling of the plasma heat sources (e.g. source cooling means), slag handling and processing means (e.g. slag cooling means), etc.

Converter Gas Conditioner

Figure 4:
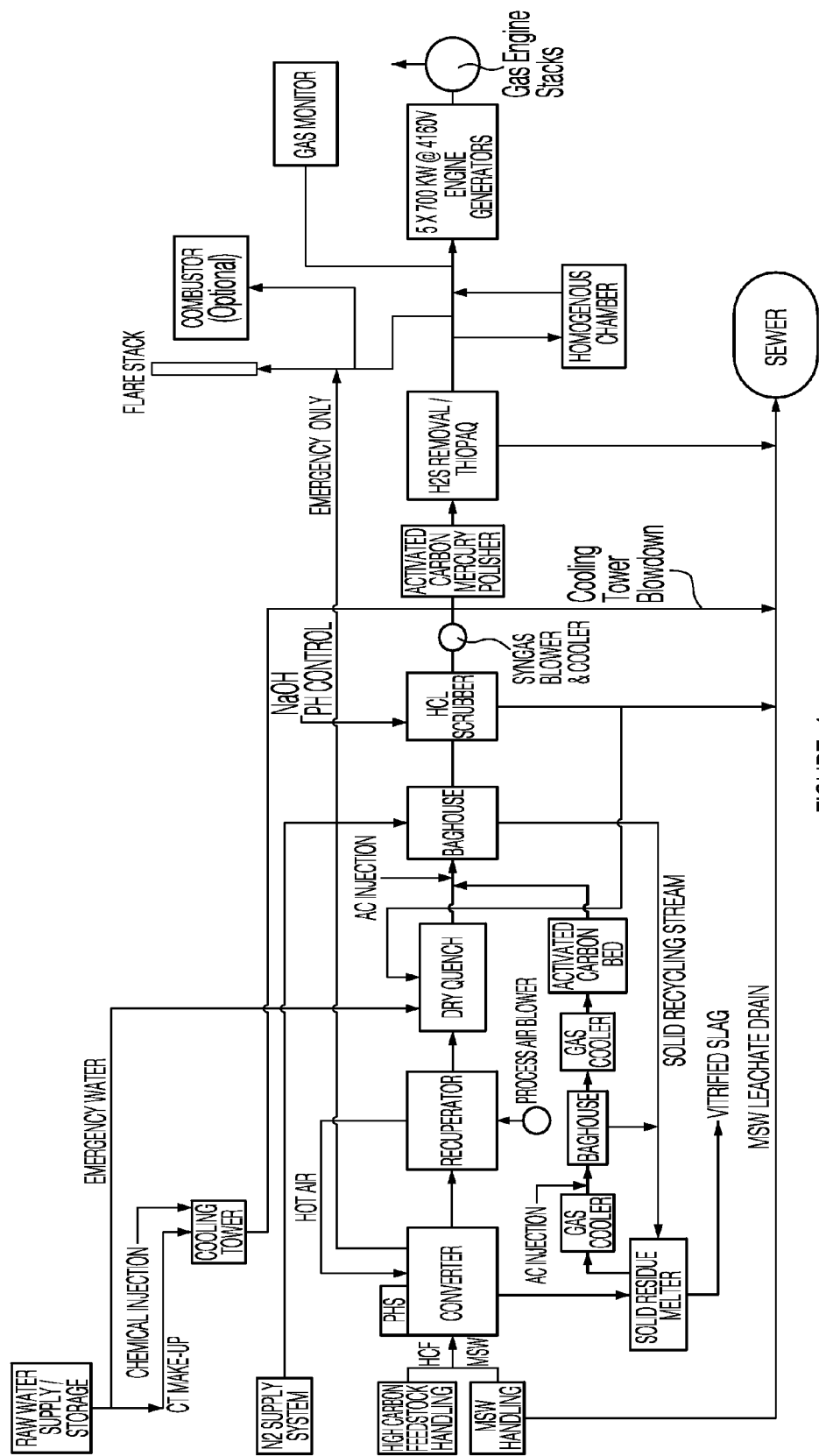
FIG. 4 is a schematic diagram depicting a system for the conversion of carbonaceous feedstocks into gas in accordance with one embodiment of the present invention.
Figure 5:
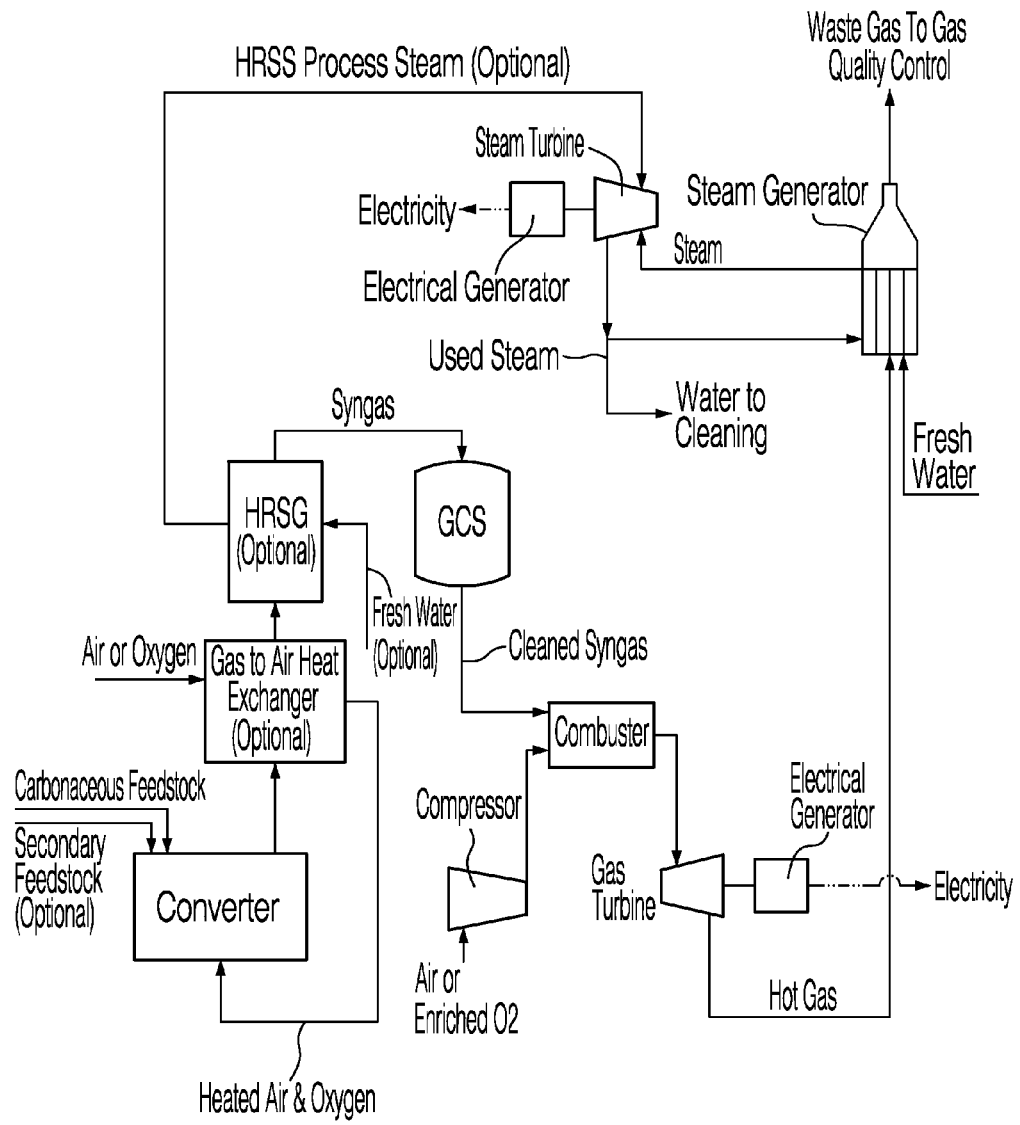
FIG. 5 is a schematic diagram depicting a system for the conversion of carbonaceous feedstocks into gas in accordance with one embodiment of the present invention.

With reference now to FIGS. 1 and 4, the control system of the present invention is amenable for use with a gasification system which optionally provides a converter gas conditioner, or other such gas conditioning means, to convert the product of the gasification process to an output gas of specified characteristics. Passage of the product gas through the converter gas conditioner helps ensure that the product gas is close to free of chemical and particulate contaminants, and therefore can be used in an energy generating system or in the manufacture of chemicals.

In one embodiment the product gas is directed to the converter gas conditioner, where it is subjected to a particular sequence of processing steps to produce the output gas having the characteristics required for downstream applications. The converter gas conditioner comprises components that carry out processing steps that may include, but are not limited to, removal of particulate matter, acid gases (HCl, $H_2S$), and/or heavy metals from the synthesis gas, or adjusting the humidity and temperature of the gas as it passes through the system. The presence and sequence of processing steps required is determined by the composition of the synthesis gas and the specified composition of output gas for downstream applications. Optimization of the converter gas conditioner process can also be achieved via use the control system of the present invention.

In one embodiment, under vacuum extraction conditions of the induction fan of a gasification system, the hot product gas is continuously withdrawn from the gasification system through an exit gas outlet(s) of the gasification system. A gas transfer means, such as a pipe or other conduit is used to transfer the gas from the converter to the converter gas conditioner.

It is also contemplated that one or more converter gas conditioners may be used, such as a primary converter gas conditioner and a secondary converter gas conditioner. In this case, the secondary converter gas conditioner may be used to process material such as particulate matter and heavy metals that are removed from the gas stream in the primary converter gas conditioner. The output gas from the converter gas conditioner can be stored in a gas storage tank (e.g. see FIG. 3), fed through further processing means such as a homogenization system (e.g. see FIGS. 1 and 4) or alternatively, fed directly to the downstream application for which it was designed (e.g. see FIG. 2).

As discussed above, it is advantageous to provide means for cooling the hot product gas prior to such a conditioning step. This cooling step may be required to prevent damage to heat-sensitive components in the system. In one embodiment, cooling step is carried out by the heat exchanger, whereby the heat recovered from the product gas may also be optionally recovered and recycled for use in the gasification process (e.g. see FIGS. 1, 4 and 26).

In another embodiment, the gas from the gasification system is first cooled down by direct water evaporation in an evaporator such as a quencher (e.g. see FIGS. 1 and 4). In yet another embodiment, evaporative cooling towers (e.g. see FIG. 4) may be used to cool the syngas that enters the converter gas conditioner from the gasification system. The evaporative cooling tower is capable of cooling the temperature of the syngas from about 740° C. to about 150 to 200° C. This process may be achieved using adiabatic saturation, which involves direct injection of water into the gas stream in a controlled manner. The evaporating cooling process is a dry quench process, and can be monitored and controlled by the control system of the present invention to ensure that the cooled gas is not wet, i.e., that the relative humidity of the cooled gas is still below 100% at the cooled temperature.

As mentioned above, the converter gas conditioner may comprise means for removing particulate matter from the optionally cooled gas, as well as gaseous contaminants not compatible with downstream uses of the product gas. A particulate removal system may be incorporated to remove particulates that may be entrained in the fuel gas exiting the converter. Particulate and dust removal systems 54 are widely available, and may include, for example, high-temperature (ceramic) filters, cyclone separators (e.g. see FIG. 7), a venturi scrubber (e.g. see FIG. 7), an electrofilter, a candle filter, a crossflow filter, a granular filter, a water scrubber, or a fabric baghouse filter (e.g. see FIG. 4), and the like, which are well known to practitioners of gas conditioning.

Alternative embodiments may make use of different orders of the various gas clean-up steps to use more efficiently the characteristics of alternative gas cleaning devices. Various exemplary embodiments are provided in international application numbers WO/2006/128285 and WO/2006/128286 which are readily applicable in the present context, as would be apparent to a person skilled in the art.

There may also be provided means for removing mercury or other heavy metals from the product gas. For example, dry injection systems utilize a calculated amount of activated carbon which is injected in the gas stream with enough residence time so that fine heavy metal particles and fumes can adsorb in the activated carbon surface. Heavy metals adsorbed on activated carbon can be captured in, for example, a baghouse filter or a wet ESP system.

In one embodiment, the converter gas conditioner optionally comprises an acid scrubbing system to remove heavy metals. For example, this system may require the gas containing heavy metals to be passed through a packed column with low pH (normally 1-2) solution circulation. Acid gas removal can be achieved by dry scrubbing or wet scrubbing. The main components of dry scrubbing may be, for example, a spray dry absorber and soda ash or lime powder injection before baghouse filtration.

In one embodiment, the mercury removal means are provided by an activated carbon mercury polisher (e.g. see FIG. 4). An activated carbon filter bed can be used as the final polishing device for heavy metals.

An acid recovery subsystem may optionally be coupled to the converter gas conditioner, to recover sulfur or sulfuric acid and hydrochloric acid (from chlorinated hydrocarbons), which may have a marketable value. The acid removal system may include scrubber systems (e.g. HCl scrubber), acid removal systems, and other conventional equipment related to sulfur and/or acid removal systems.

In yet another embodiment, a humidity control means can be provided. The humidity control means functions to ensure that the humidity of the output gas is appropriate for the downstream application required. For example, a humidity control means may include a chiller to cool the gas stream and thus condense some water out of the gas stream. This water can be removed by a gas/liquid separator.

In another embodiment, the gas processing system can include means for the recovery of carbon dioxide and/or ammonia and/or chlorine and/or elemental sulfur. Suitable means are known in the art, and various exemplary embodiments are provided in international application numbers WO/2006/128285 and WO/2006/128286.

In one embodiment, the control system may sense decrease in efficiency or alternate functional deficiency in a process of the converter gas conditioner and divert the gas stream to a backup process or backup conditioning system. In another embodiment, the control system may provide a means for fine-tuning the steps of the converter gas conditioner and providing minimal drift from optimal conditions.

The control system of this invention can include sensing elements for analyzing the chemical composition of the gas stream through the converter gas conditioner, the gas flow and thermal parameters of the process; and response elements to adjust the conditions within the converter gas conditioner to optimize the efficiency of processing and the composition of the output gas. Ongoing adjustments to the reactants (for example, activated carbon injection with sufficient residence time, pH control for the HCl scrubber) can be executed in a manner which enables this process to be conducted efficiently and optimized according to design specifications.

Homogenization System

The present gasification system also optionally provides means for regulating the product gas, for example, by at least partially homogenizing the chemical composition of the product gas and adjusting other characteristics such as flow, pressure, and temperature of the product gas to meet downstream requirements.

As is understood by those skilled in the art, the gasification process may produce gases of fluctuating composition, temperature or flow rates. In order to reduce the fluctuations in the characteristics of the product gas, there is optionally provided a homogenization system in the form of a capturing means useful for delivering a gas with reduced fluctuations to downstream equipment.

In one embodiment the present invention provides a homogenization system that collects the gaseous products of the gasification process and attenuates fluctuations in the chemistry of the gas composition in a homogenization system, or the like. Other elements of the system optionally may be used to help adjust characteristics of the gas such as flow, temperature and pressure In particular, the homogenization system provides a gas homogenization system (e.g. see FIGS. 1 and 4, and FIGS. 60, 67 and 68 of Example 1) or the like having dimensions that are designed to accommodate a residence time sufficient to assist in attaining a relatively homogeneous gas. Other elements of the homogenization system may be designed to assist in meeting the gas performance requirements of the downstream application(s). As described above, the control system may be used to actively control various characteristics of the product gas before entering the homogenization system such that the gas, upon output therefrom, is of suitable characteristic(s) for the downstream application(s).

The composition of the product gas entering the homogenization system is determined in the gasification process. Adjustments made by the control system during the gasification process permit the product gas to be optimized for the specific downstream application(s) (e.g., gas turbines or fuel cell application for electricity generation). Accordingly, the composition of the product gas can be tailored for particular energy generating technologies (for example, for specific gas engines or gas turbines) and, for best overall conversion efficiency, according to the different types of feedstocks and additives used, by adjusting the operational parameters of the gasification process.

The product gas leaving the gasification system may be within a defined range of a target composition, however, over time the product gas may fluctuate in its characteristics due to variability in the gasification process such as feedstock composition and feed rate, as well as airflow and temperature fluctuations.

Similar to the control of the composition of the product gas, the flow rate and temperature of the product gas can be monitored, for example via sensing elements, and controlled by the control system, for example via response elements, in order to maintain the parameters of the gas within predetermined ranges suitable for the end use. Adjustments made by the control system can take into account the residency time of the homogenization system to ensure that the product gas is suitable for the downstream application(s). The homogenization system helps attenuate remaining fluctuations in flow rate and temperature of the product gas. In the case of flow rate, these fluctuations may occur on a second to second basis; and with temperature on a per minute basis.

The homogenization system comprises one or more gas homogenization chambers, or the like, having a product gas inlet means, a homogenized gas outlet means, and optionally an emergency exit port.

The homogenization system receives the product gas produced from a gasification system and encourages mixing of the product gas to attenuate any remaining fluctuations in the chemical composition of the product gas in the homogenization system. Remaining fluctuations in other gas characteristics, such as pressure, temperature and flow rate, may also be reduced during mixing of the product gas.

The dimensions of the homogenization system are designed according to the performance characteristics of the upstream gasification system and the requirements of the downstream machinery, with the objective of minimizing the size of the chamber as much as possible. The homogenization system is designed to receive product gas from a gasification process and retain the gas for a certain residence time to allow for sufficient mixing of the gas to attenuate remaining fluctuations.

The residence time is the amount of time that the product gas remains in the homogenization system before being directed to the downstream equipment. The residence time may be chosen to be proportional to the response time of the related gasification system under control of the present invention to correct for remaining variances in the fluctuations in the gasification reaction in order to achieve a gas composition that falls within predetermined range(s). For example, the gas is retained in the homogenization system long enough to determine whether its characteristics fall within the predetermined ranges allowed for the particular downstream application(s) as well as for the control system to make any adjustments to the gasification process to correct for the deviance.

Additionally, residence time of the product gas in the homogenization system may be determined by the amount of remaining variance in the product gas characteristics. That is, the smaller the remaining variance in product gas characteristics, the shorter the residence time required in the homogenization system to correct for the remaining variance.

The control system of the present invention can be used to control the gasification process so that when using a homogenization system of a given residency time, the product gas will have stabilized characteristics that meet the specifications of the downstream application(s). Typically, machine manufacturers will provide the requirements and tolerances allowed by the specific machinery and would be known to the person skilled in the art.

The invention will now be described with reference to specific examples. It will be understood that the following example is intended to describe an embodiment of the invention and is not intended to limit the invention in any way.

Example 1

In this example, with reference to FIGS. 27 to 72, details of one exemplary embodiment of the invention, including various options, are provided. This example presents details for each subsystem of a gasification system amenable for use with the control system of the present invention and demonstrates how they work together to function as an integrated system for the conversion of municipal solid waste (MSW) into electricity. The subsystems discussed in this example are: a Municipal Solid Waste Handling System; a Plastics Handling System; a Horizontally Oriented Gasifier with Lateral Transfer Units System; a Gas Reformulating System; a Heat Recycling System; a Gas Conditioning System; a Residue Conditioning System and a Gas Homogenization System.

FIG. 1 shows a functional block diagram overview of the entire gasification system 120, amenable for use with the control system of the present invention, designed primarily for the conversion of MSW to syngas, with the associated use of reformulated, conditioned, and homogenized syngas in gas engines for the generation of electricity.

Municipal Solid Waste (MSW) Handling System

The initial MSW handling system 9200 is designed to take into account: (a) storage capability for supply of four days; (b) avoidance of long holding periods and excess decomposition of MSW; (c) prevention of debris being blown around; (d) control of odour; (e) access and turning space for garbage trucks to unload; (f) minimization of driving distance and amount of turning required by the loader 9218 transporting MSW from the MSW stockpile 9202 to the MSW shredding system 9220; (g) avoidance of operational interference between loader 9218 and garbage trucks; (h) possibility of additional gasification streams to allow for plant expansion; (i) minimum intrusion by trucks into the facility, especially into hazardous areas; (j) safe operation with minimum personnel; (k) indication for the loader operator of the fill levels in the conveyor input hoppers 9242; (l) shredding the as-received waste to a particle size suitable for processing; and (m) remote controllability of MSW flow rate into the processor and independent control of the plastics feed rate (described below).

Figure 30:
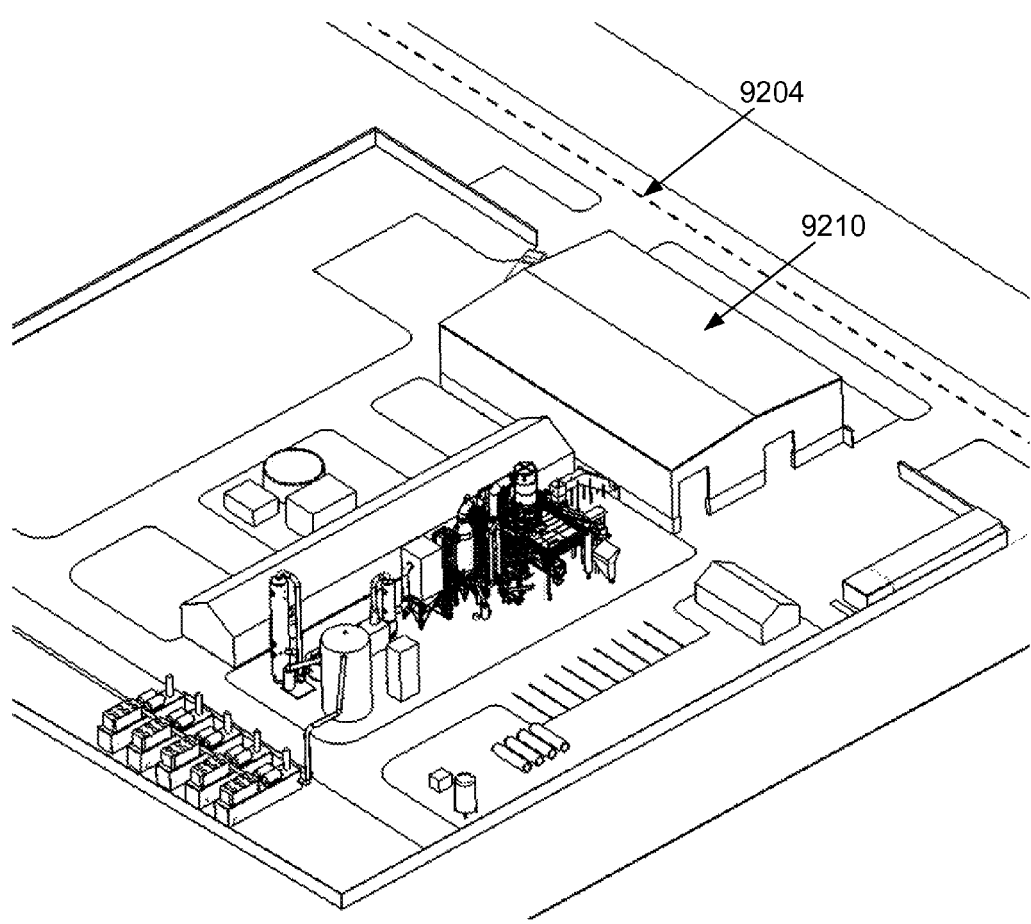
FIG. 30 is a site layout for an entire gasification system, in accordance with an exemplary embodiment of the present invention.

The MSW handling system 9200 comprises a MSW storage building 9210, a loader 9218, a MSW shredding system 9220, a magnetic separator 9230 and a feed conveyor 9240. A separate system 9250 is also designed for storing, shredding, stockpiling and feeding a high carbon material (non-recyclable plastics in this example), the feed-rate of which is used as an additive in the gasification process. FIG. 30 shows an overall layout of the entire system site. All storage and handling of MSW until it is fed into the gasification system 120 is confined in MSW storage building 9210 to contain debris and odour.

A first-in-first-out (FIFO) scheduling approach is used to minimize excessive decomposition of the MSW. FIFO is enabled by having access for trucks and loaders 9218 at both ends of the MSW storage building 9210. MSW is unloaded from the trucks at one end of the building while the material is being transferred by the loader 9218 at the other end of the MSW storage building 9210, thus also allowing the loader 9218 to operate safely and without interference by the trucks. When the loader 9218 has removed the material back to the approximate mid point of the MSW stockpile 9202 i.e. the 'old' material has all been used, the operations are then changed to the opposite ends of the MSW storage building 9210.

To minimize the size of MSW storage building 9210, space for manoeuvring the garbage trucks is outside the MSW storage building 9210. This also minimizes the size of door 9212 required as it needs only to allow a truck to reverse straight in, thus providing the best control of the escape of debris and odour. Only one door 9212 needs to be open at any time and then only when trucks are actually unloading. Receipt of MSW will normally take place during one period per day so that a door 9212 will only be open for about one hour per day.

Figure 31:
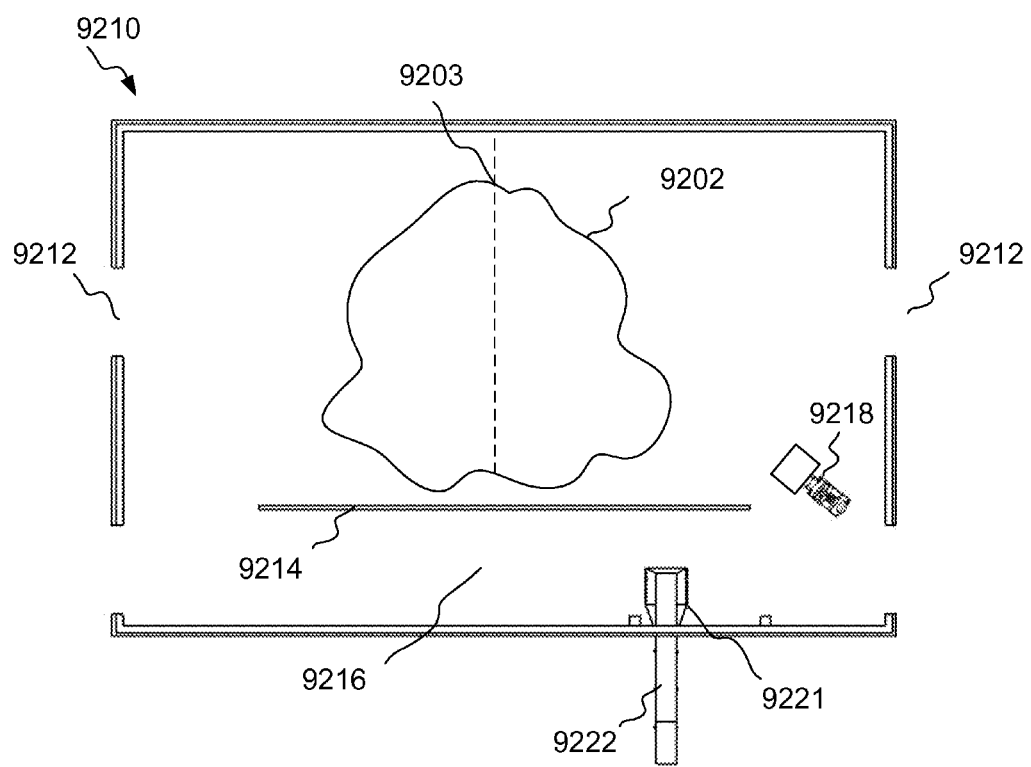
FIG. 31 is a diagrammatic representation of a layout of a storage building for municipal solid waste.
Figure 32:
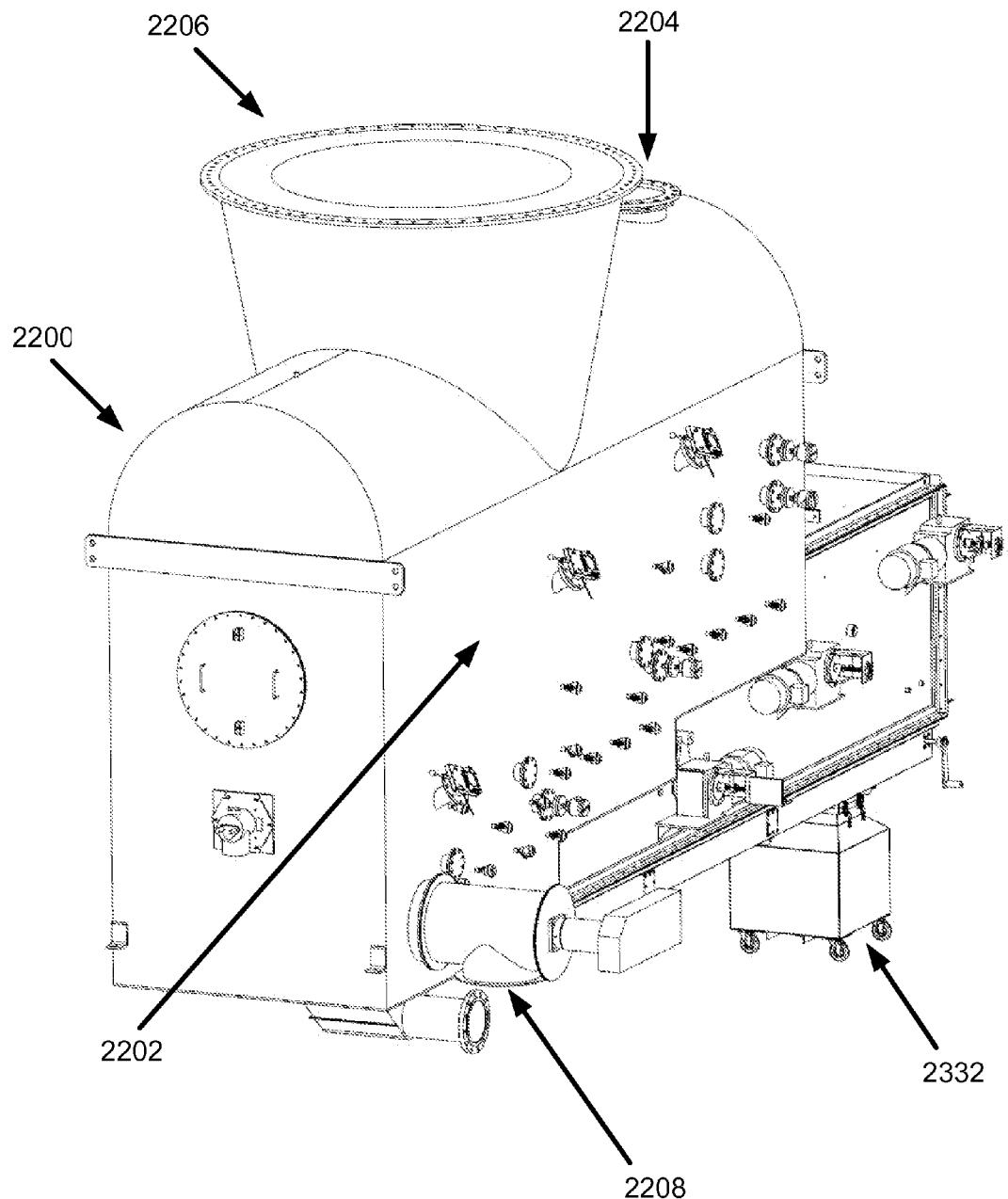
FIG. 32 is a perspective view of one embodiment of a gasifier, detailing a feedstock input, gas outlet, residue outlet, carrier-ram enclosure and access ports.

FIG. 31 shows a layout of the MSW storage building 9210. The MSW storage building 9210 has a bunker wall 9214 to separate the MSW stockpile 9202 from the aisle 9216 where the loader 9218 must drive to access the input conveyor 9222 of the MSW shredding system 9220. The bunker wall 9214 stops short of the ends of the MSW storage building 9210 to allow the loader 9218 to travel from the MSW stockpile 9202 to the input conveyor 9222 without leaving the MSW storage building 9210. Thus, the doors 9212 at one end of the MSW storage building 9210 can be kept closed at all times while the other end is open only when trucks are unloading or when a loader (described below) for transferring material from the stockpile to the shredding system needs to exit to move plastic.

By having the MSW storage building 9210 located adjacent and parallel to the road 9204 and allowing for truck manoeuvring at both ends of the MSW storage building 9210, as shown in FIG. 28, both space requirements and truck movements within the facility is reduced. The space layout design allows a truck to drive into the facility, reverse into the MSW storage building 9210, dump its load and drive directly back onto the road 9204. At no times do they get near any of the process equipment or personnel. The two road entrance concept also avoids the need for an additional roadway within the facility to enable the trucks to access both ends of the MSW storage building 9210.

A mechanized, bucket-based loader 9218 is used to transfer material from the stockpile to the shredding system. A skid steer loader design is used due to its compact size, manoeuvrability, ease of operation etc. A standard commercially available skid steer has adequate capacity to feed the MSW, clean up the stockpile floor after the trucks have unloaded and also handle the waste plastics system shredder and process feed.

The MSW shredding system consists of an input conveyor 9222, a shredder, a pick conveyor and a magnetic pick-up conveyor. The input conveyor 9222 transports the MSW from inside the MSW storage building 9210 upwards and drops it into a shredder. The feed hopper for this conveyor is located entirely inside the MSW storage building 9210 to prevent debris being blown around outdoors. The conveyor has a deep trough which, combined with the capacity of the feed hopper holds sufficient material for one hour of operation. The portion of the trough outside the MSW storage building 9210 is covered to control escape of debris and odour. The conveyor is controlled remotely by the process controller to match process demands. Mirrors are provided to allow the loader operator to see the level of MSW in the hopper from either side. Detectors provided in the trough alert the process controller that material is absent.

The shredder ensures that the as-received MSW is suitable for processing, by breaking any bags and cutting the larger pieces of waste into a size able to be processed. As the received MSW may include materials too large and hard for the shredder to handle, thus causing the shredder to jam, the shredder is equipped to automatically stop when a jam is sensed, automatically reverse to clear the jam and then restart. If a jam is still detected the shredder will shut-down and send a warning signal to the controller.

The shredded waste is dropped onto a belt conveyor to be transported under a magnetic pick-up system and then to be dropped into the feed hopper of a screw conveyor which will feed the waste into the gasifier 2200.

To avoid inadvertent feeding of excessive amounts of ferrous metals through the gasifier 2200, a magnetic pick-up is located above the pick conveyor, which attracts ferrous metals that may be present in the shredded waste. A non-magnetic belt runs across the direction of the pick conveyor, between the magnet and the waste so that ferrous metals attracted to the magnet get moved laterally away from the waste stream. The ferrous metal is later removed from the magnet and dropped onto a pile for disposal.

The MSW feed system consists of a hopper and screw conveyor to transport shredded waste from the shredder system to the gasification chamber 2202. Shredded waste is dropped from the shredder system into the feed hopper, which provides a buffer of material ready to feed into the processor. The hopper has high and low level indicators which are used to control flow from the shredding system into the hopper. The conveyor is under the control of the process controller to match waste feed rate to meet process demands. The use of a screw conveyor with integral feed hopper also provides gas sealing for the processor. The input hopper is connected to the shredder system with covers to control debris and odour. The MSW feed conveyor has an additional entry to accept shredded plastic.

Plastics Handling System

The gasification system 120 provides for the addition of plastics as a process additive. The plastics are handled separately from the MSW, before being fed to the gasifier 2200. The system for handling plastics is designed to provide storage for as-received bales of plastic, shred it, place it into a stockpile and feed it under independent control into the processor. The system comprises a storage facility, a shredder with input hopper, a take-away conveyor and a stockpile, all located in a common building to control debris. A feed conveyor moves the shredded plastic into the processor.

The plastics storage building has the capacity to store two truck loads of plastic bales. It is closed on three sides and opens on one side, thus providing containment of the material with access for stacking and removing bales. The building also provides protection for the shredding system and debris control and protection for the shredded material.

The shredder facilitates the plastic material meeting the process requirements. As-received plastic is loaded into the feed hopper of the shredder with a loader. The shredded material drops onto a belt conveyor that transports it up and drops it into a stockpile.

The shredded plastic is picked up by a loader and dropped into the input hopper of the feed conveyor. As the conveyor is outdoors, the hopper incorporates an integral roof and upwardly extended walls to minimize escape of plastic during filling of the hopper. The conveyor trough is sealed to the trough of the MSW conveyor such that the plastic is introduced into the gasifier 2200 via the MSW conveyor to reduce openings into the gasifier 2200. The conveyor is a screw conveyor with the hopper sealed to it to provide gas sealing when it contains material. Detectors are located in the hopper to indicate high and low levels and a mirror is provided for the skid steer operator to monitor fill level. Motion of this conveyor is under the control of the process controller.

Converter

The converter 1200 comprises a gasifier 2200 and a Gas Reformulating System (GRS) 3200. The MSW and plastics are fed into the gasifier 2200 and the resulting gas is sent to the GRS 3200 where it is reformulated. Any resulting residue from the gasifier 2200 is sent to the residue conditioning system 4200.

The gasifier 2200 is designed to take into account the requirements to: (a) provide a sealed, insulated space for primary processing of the waste; (b) introduce hot air and steam in a controlled and distributed manner throughout the gasifier 2200; (c) enable control of the height and movement of the waste pile through the gasifier 2200; (d) provide instrumentation for controlling the gasification process; (e) transfer the gas to the GRS 3200; (f) remove residue for further processing; and (g) provide access to the interior for inspection and maintenance.

Referring to FIGS. 32 to 35, the gasifier 2200 comprises a horizontally oriented refractory-lined gasification chamber 2202 having a feedstock input 2204, inputs for hot air used for heating the gasification chamber, input for steam which serves as a process additive, a centrally-located gas outlet 2206 to which the GRS is directly coupled, a residue outlet 2208 and various service 2220 and access 2222 ports. The gasification chamber 2202 is built as a steel weldment having a stepped floor with a plurality of floor steps 2212, 2214, 2216. A system comprising carrier rams 2228, 2230, 2232 is used to facilitate the lateral movement of the material through the gasifier 2200. Provision is also made for installation of instrumentation, such as thermocouples, material height detectors, pressure sensors and viewports.

Figure 36:
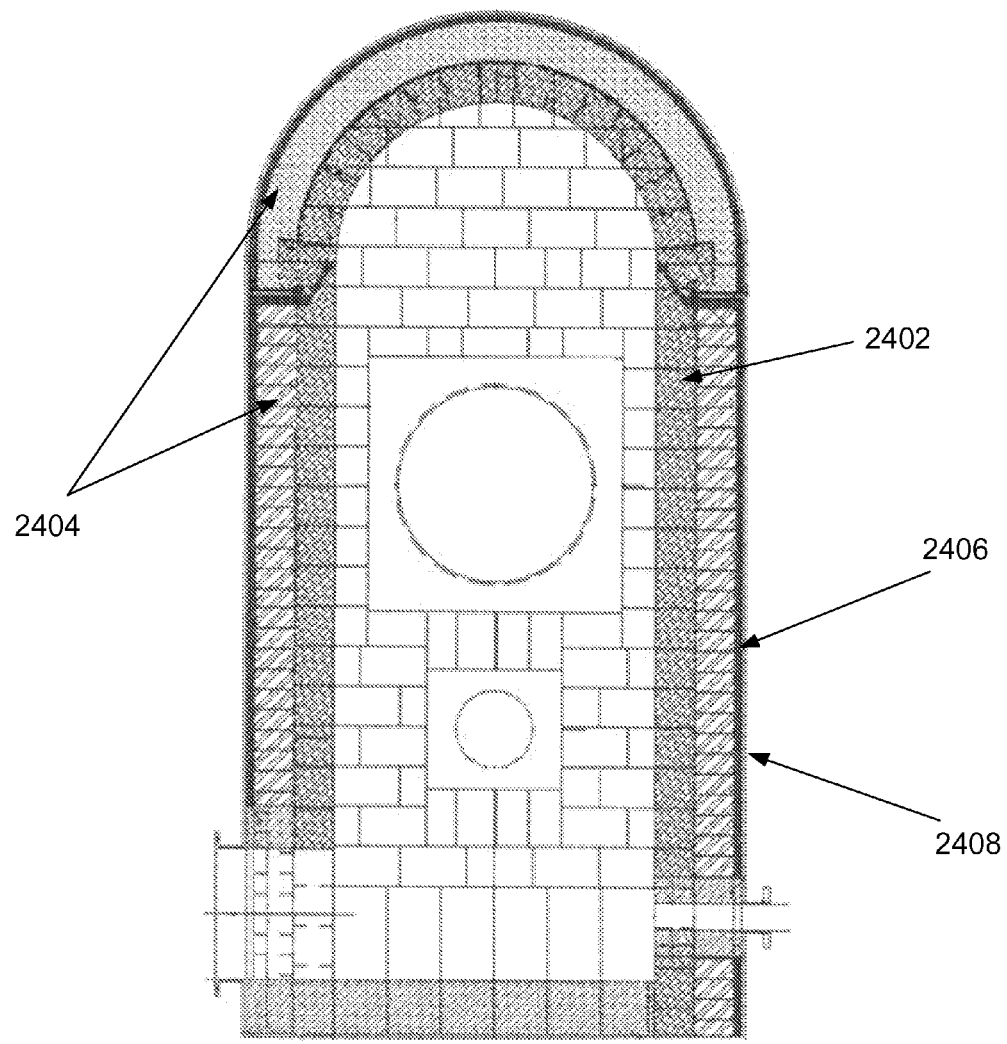
FIG. 36 is a sectional view of the gasifier of FIGS. 32 and 33 detailing the refractory.

The refractory lining of the gasification chamber 2202 protects it from high temperatures, corrosive gases and also minimizes the unnecessary loss of heat from the process. Referring to FIG. 36, the refractory is a multilayer design with a high density chromia layer 2402 on the inside, a middle high density alumina layer 2404 and an outer very low density insulboard material 2406. The refractory lines the metal shell 2408 of the gasification chamber. The gasification chamber 2402 is further lined with a membrane to further protect it from the corrosive gases.

Each step 2212, 2214, and 2216 of the stepped floor of gasification chamber 2402 has a perforated floor 2270 through which heated air is introduced. The air hole size is selected such that it creates a restriction and thus a pressure drop across each hole sufficient to prevent waste materials from entering the holes. The holes are tapered outwards towards the upper face to preclude particles becoming stuck in a hole.

Referring to FIGS. 27 & 28, the conditions at the three individual steps are designed for different degrees of drying, volatilization and carbon conversion. The feedstock is introduced into the gasification chamber 2202, onto the first stage via the feedstock input 2204. The targeted temperature range for this stage (as measured at the bottom of the material pile) lies between 300 and 900° C. Stage II is designed to have a bottom temperature range between 400 and 950° C. Stage III is designed to have a temperature range between 600 and 1000° C.

Figure 33:
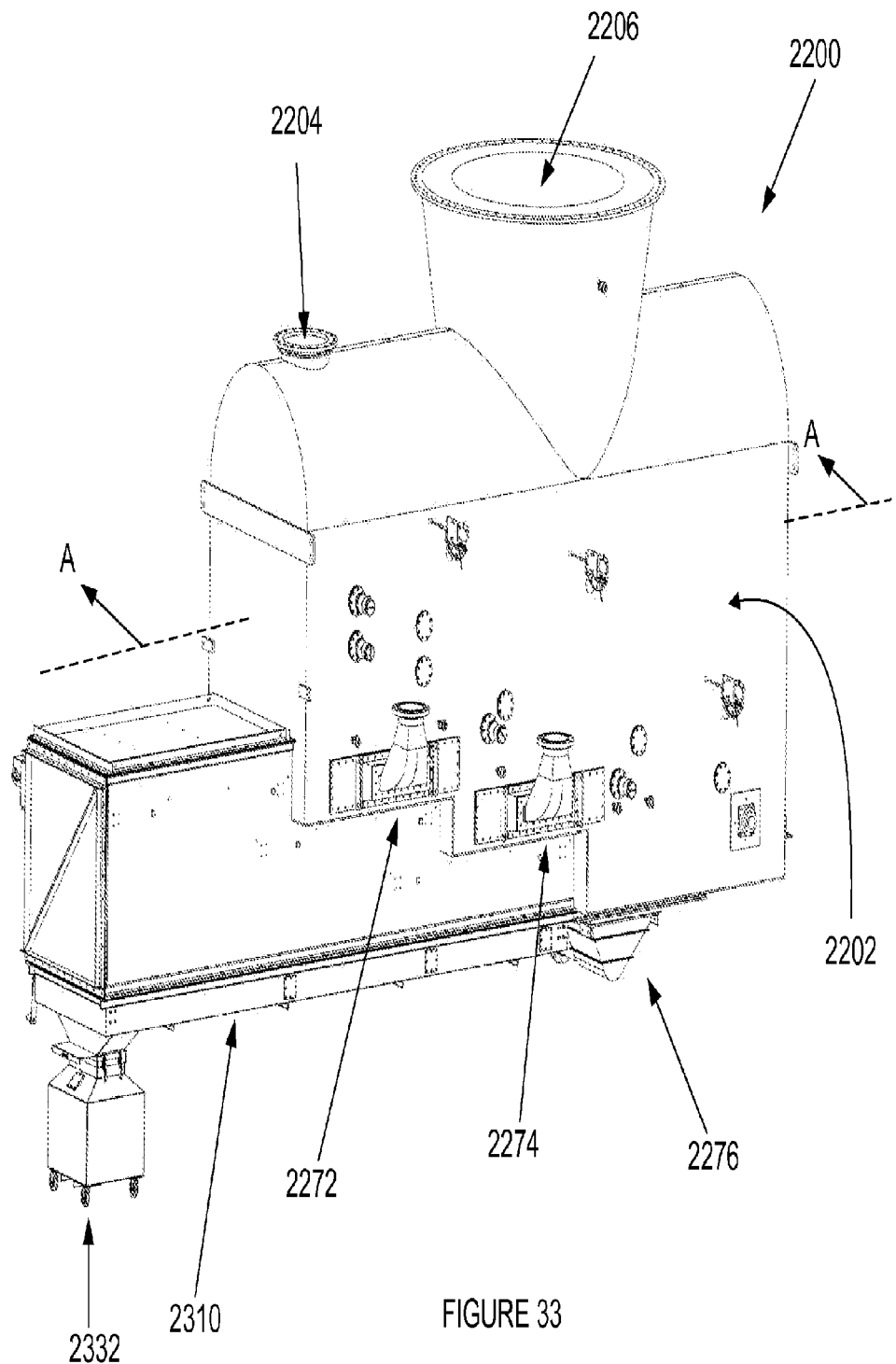
FIG. 33 is a side perspective view of the gasifier illustrated in FIG. 32 detailing air boxes, residue can and dust collector.
Figure 34:
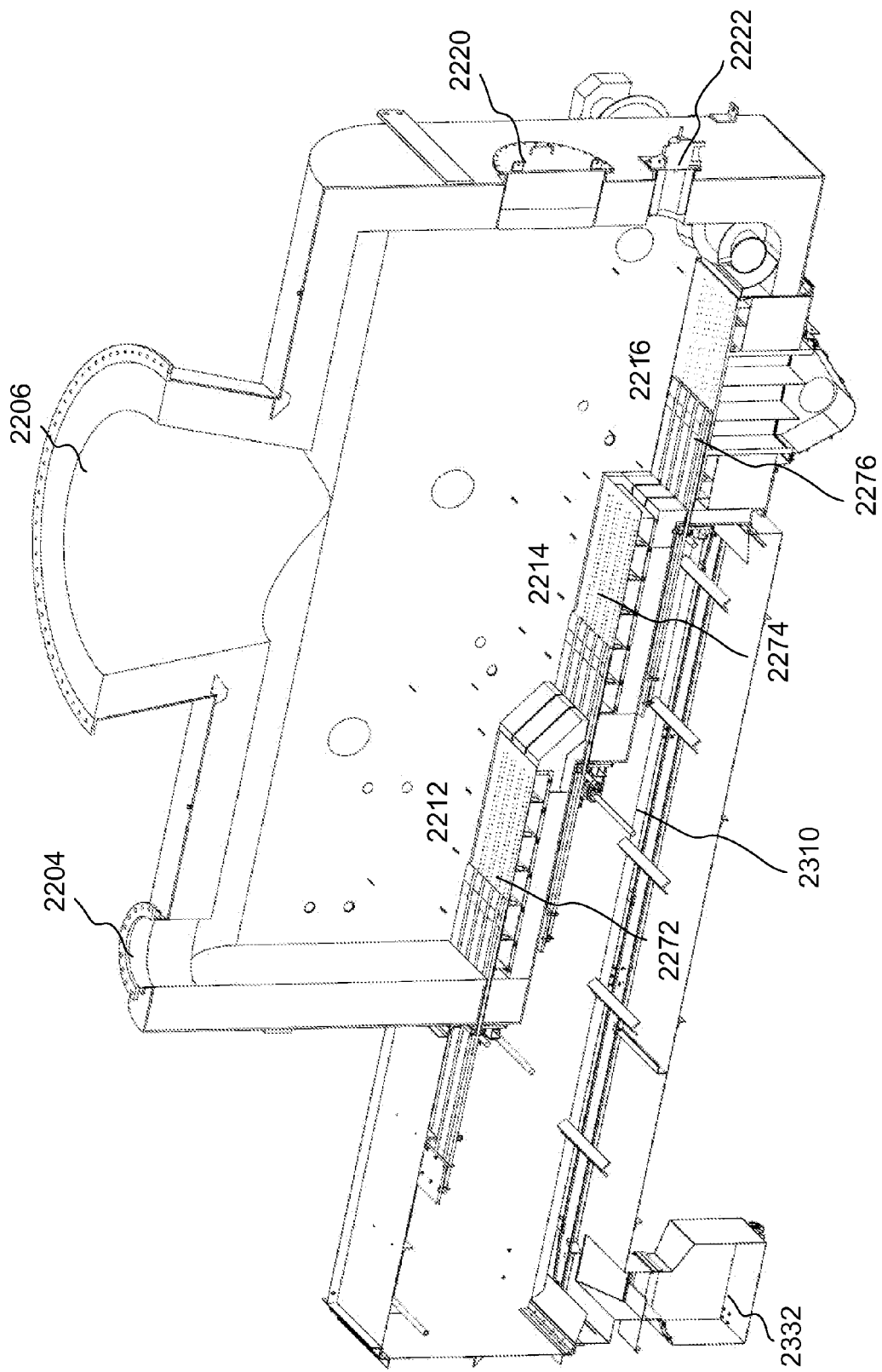
FIG. 34 is a central longitudinal cross-sectional view through the gasifier illustrated in FIGS. 32 and 33, detailing the feedstock input, gas outlet, residue outlet, lateral transfer means, thermocouples and access ports.
Figure 35:
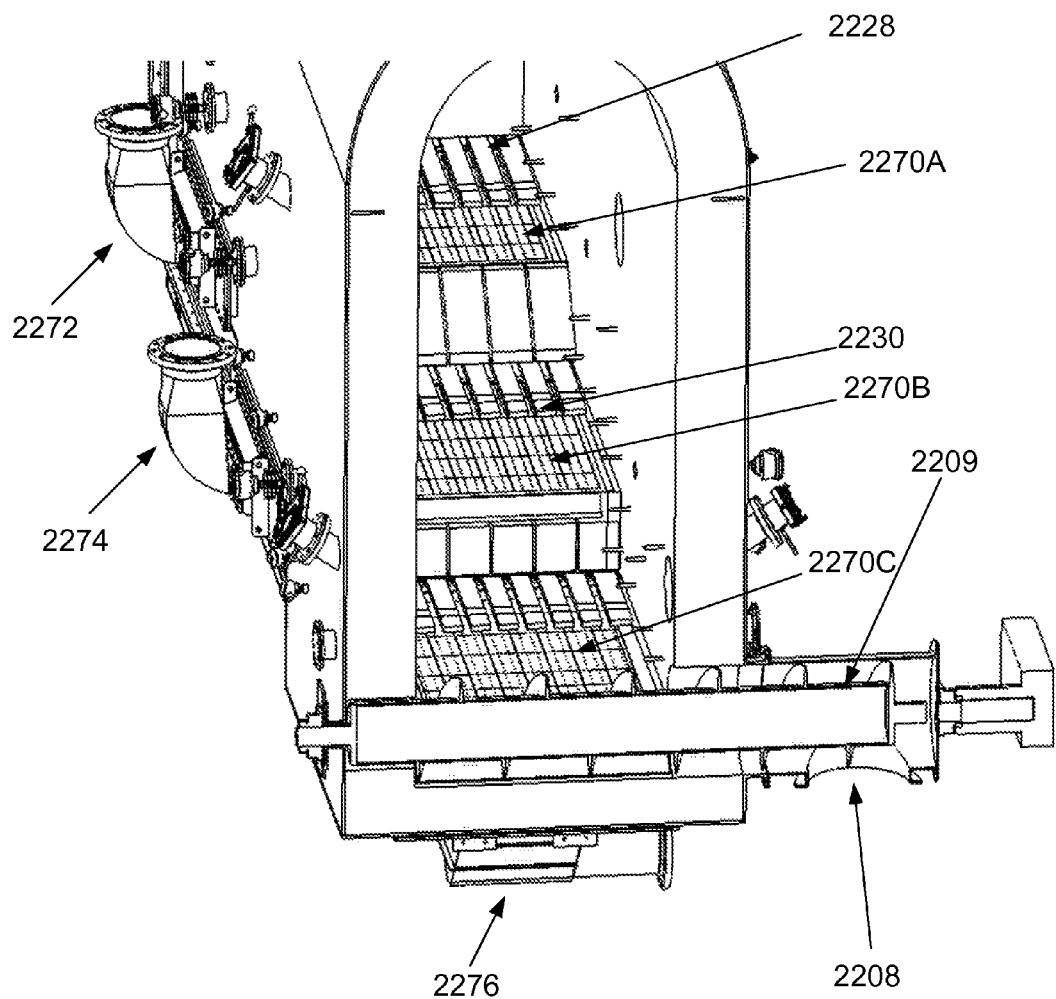
FIG. 35 illustrates a blown up cross sectional view detailing the air boxes, carrier-ram fingers, residue extractor screw and edge of step C.

The three steps 2212, 2214 & 2216 of the stepped-floor, that separate the gasification chamber 2202 into three stages of processing have their own independently controllable air feed mechanism. The independence is achieved by using separate airboxes 2272, 2274, and 2276 which form the perforated floor 2270 at each stage. The system of carrier rams 2228, 2230 & 2232 used for movement of material in the gasification chamber 2202 prevents access from below steps 1 & 2, 2212 & 2214. Thus for these stages, the airboxes 2272 & 2274 are inserted from the side. The third stage airbox 2276 is however inserted from below, as shown in FIGS. 33 & 34.

Figure 37:
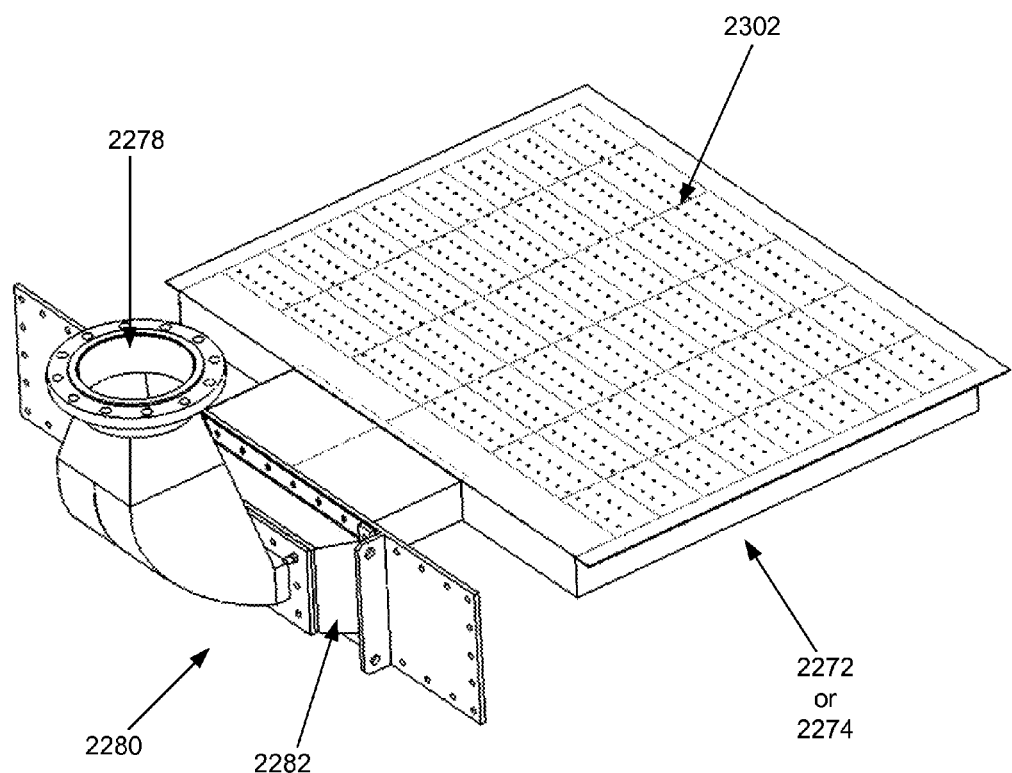
FIG. 37 details the air box assembly of Step A and B of the gasifier illustrated in FIGS. 32 to 36.
Figure 38:
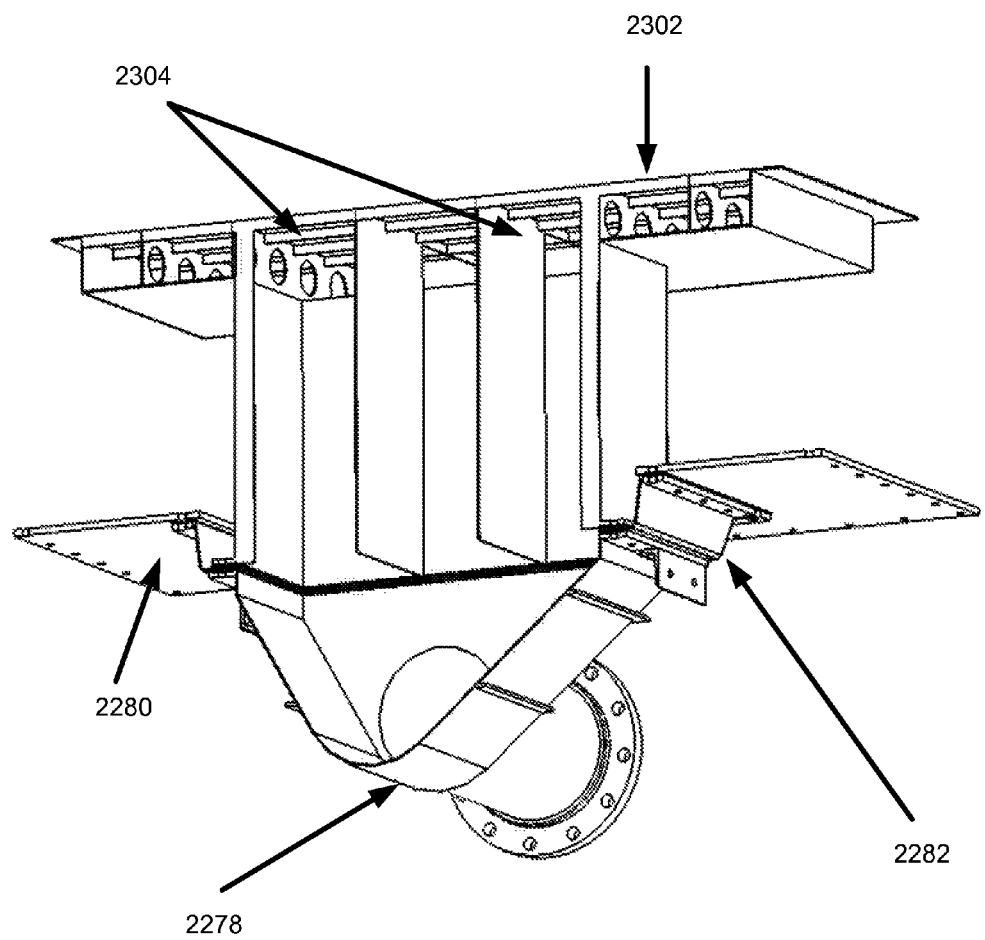
FIG. 38 illustrates a cross sectional view of the Step C air box of the gasifier illustrated in FIGS. 32 to 36.

The perforated top plate 2302 of the airboxes 2272, 2274, 2276, in this design and referring to FIGS. 37 & 38, is a relatively thin sheet, with stiffening ribs or structural support members 2304 to prevent bending or buckling. To minimize stress on the flat front and bottom sheets of the boxes, perforated webs are attached between both sheets. To allow for thermal expansion in the boxes they are attached only at one edge and are free to expand at the other three edges.

Figure 39:
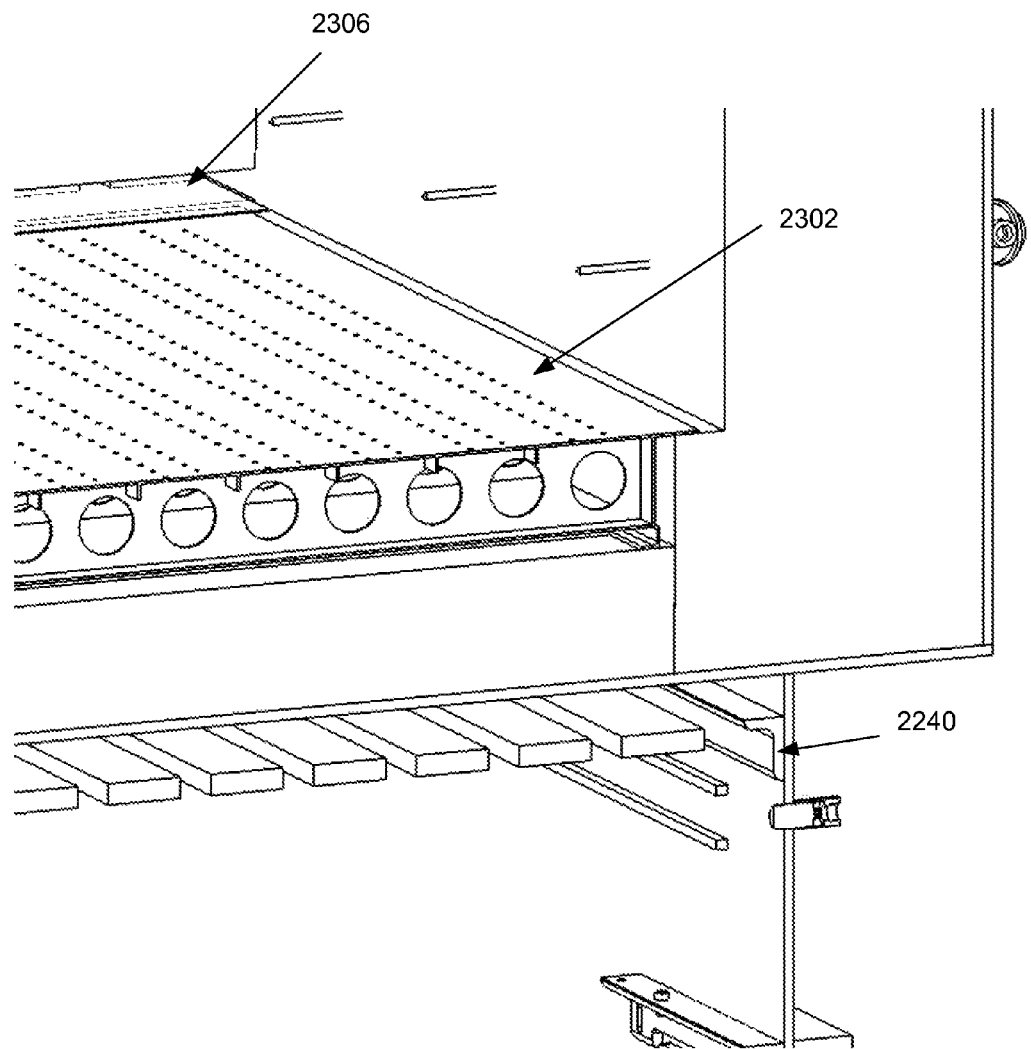
FIG. 39 illustrates a cross sectional view of the gasifier of FIGS. 32 to 36 detailing an air box.

As shown in FIG. 37, the fixed edge of the Step 1 & 2 airboxes 2272 and 2274 is also the connection point of the input air piping 2278. Thus, the connection flange 2280 will be at high temperature and must be sealed to the cool wall of the gasifier 2200. A shroud is used, as shown in FIG. 37, to achieve this without creating stress and without using a complex expansion joint. The hot air box 2272 and pipe 2278 are attached to one end of the shroud 2282 and the other end of the shroud 2282 is connected to the cool gasifier 2200. As a temperature gradient will occur across the length of the shroud 2282, there is little or no stress at either connection. The other advantage of this arrangement is that it positions the airbox rigidly in the required position without causing stress. The space between the shroud 2282 and the internal duct of the air box 2272 is filled with insulation to retain heat and to ensure the temperature gradient occurs across the shroud. When the airbox is in its operating location in the gasification chamber 2202, the top plate opposite to the air connection is extended beyond the airbox to rest on a shelf of refractory. This provides support to the airbox during operation and also acts as a seal to prevent material from falling below the airbox. It also allows free movement to allow for expansion of the airbox, as shown in FIG. 39.

The downstream edge of the airbox is also dealt with in the same way. The upstream edge of the airbox is sealed with a resilient sheet sealing 2306 between the carrier ram and the top plate of the airbox 2302.

The airbox is connected to the hot air supply piping using a horizontal flange. Therefore, only the flange has to be disconnected to remove an airbox.

The third stage airbox 2276 is inserted from below and also uses the shroud concept for sealing and locating the box to the gasifier 2200.

Sealing against dust falling around the edges of the third stage airbox 2276 is achieved by having it set underneath a refractory ledge at the edge of the second stage 2214. The sides can be sealed by flexible seals protruding from below recesses in the sides of the refractory. These seals sit on the top face of the box, sealing between the walls and the box. The downstream edge of the air box is dust sealed to the side of an extractor trough using a flexible seal. The box is reinforced with stiffeners and perforated webs between the flat faces of the air boxes to permit the use of thin sheet metal for the boxes.

The hot air pipe connection is vertical to permit removal of the third stage airbox 2276 after disconnecting the pipe connection.

Figure 42:
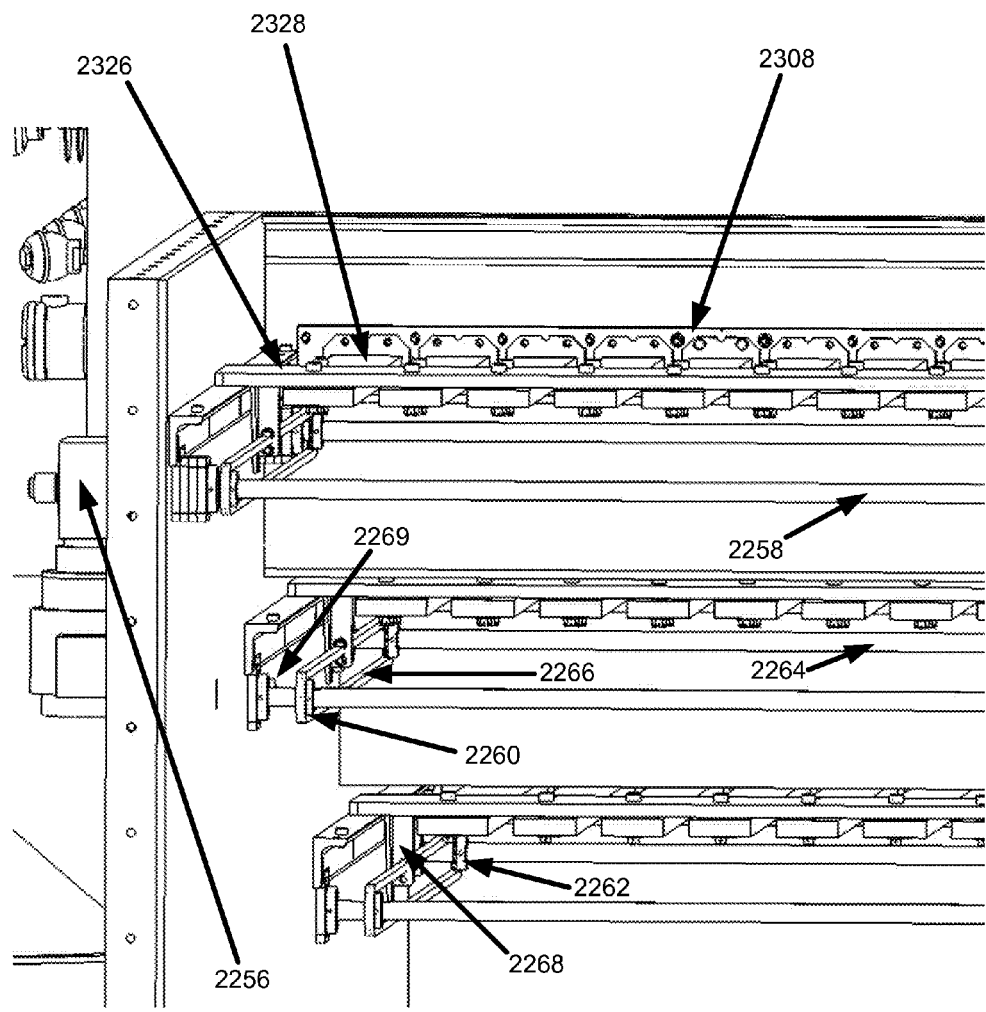
FIG. 42 details the carrier-ram enclosure of the gasifier illustrated in FIGS. 32 to 36 detailing the carrier-ram structure.

Referring to FIG. 42, a series of a system of carrier rams 2228, 2230, 2232 is used to ensure that the MSW is moved laterally along the gasifier 2200 for appropriate processing in each of the three steps 2212, 2214 & 2216, and that the spent residue is moved to the residue outlet 2208. Each of the three stage floors is serviced by its own carrier ram. The carrier rams control both the height of the pile at each stage as well as the total residence time in the gasification chamber. Each carrier ram is capable of movement over the full or partial length of that step, at variable speeds. Thus, the stage can also be completely cleared if required.

Each carrier ram comprises an externally mounted guide portion, a carrier ram having optional guide portion engagement members, externally mounted drive system and an externally mounted control system. The carrier ram design comprises multiple fingers that allow the air-box air-hole pattern to be arranged such that operation of the carrier rams does not interfere with the air passing through the air-holes.

In the multiple finger carrier ram design, the carrier ram is a structure in which fingers are attached to the body of the carrier ram, with individual fingers being of different widths depending on location. The gap between the fingers in the multiple finger carrier ram design is selected to avoid particles of reactant material from bridging. The individual fingers are about 2 to about 3 inches wide, about 0.5 to about 1 inch thick with a gap between about 0.5 to about 2 inches wide.

The air box air hole pattern is arranged such that operation of the carrier rams do not interfere with the air passing through the air holes. For example, the pattern of the air holes can be such that when heated they are between the fingers (in the gaps) and are in arrow pattern with an offset to each other. Alternatively, the air hole pattern can also be hybrid where some holes are not covered and others are covered, such that even distribution of air is maximized (i.e. areas of floor with no air input at all are minimized). In choosing the pattern of the air holes, factors to consider include avoiding high velocity which would fluidize the bed, avoiding holes too close to gasifier walls and ends so that channeling of air along refractory wall is avoided, and ensuring spacing between holes was no more than approximately the nominal feed particle size (2") to ensure acceptable kinetics.

A multi-finger carrier ram can have independent flexibility built-in so that the tip of each finger can more closely comply with any undulations in the air-box top face. This compliance has been provided by attaching the fingers to the carrier ram main carriage using shoulder bolts, which do not tighten on the finger. This concept also permits easy replacement of a finger.

The end of the carrier ram finger is bent down to ensure that the tip contacts the top of the air in the event that the relative locations of the carrier ram and airbox changes (for example, due to expansions). This features also lessens any detrimental effect on the process due to air holes being covered by the carrier ram, the air will continue to flow through the gap between the carrier ram and the airbox.

Referring to FIG. 39, the guide portion comprises a pair of generally horizontal, generally parallel elongated tracks 2240 (a), 2240(b) mounted on a frame. Each of the tracks has a substantially L-shaped cross-section. The moving element comprises a carrier ram body 2326 and one or more elongated, substantially rectangular carrier ram fingers 2328 sized to slide through corresponding sealable opening in the gasification chamber wall.

The carrier ram fingers are constructed of material suitable for use at high temperature. Such materials are well-known to those skilled in the art and can include stainless steel, mild steel, or mild steel partially protected or fully protected with refractory. Optionally, specific individual carrier ram fingers or all carrier ram fingers can be partially or fully covered with refractory. Optionally, cooling can be provided within the carrier ram fingers by fluid (air or water) circulated inside the carrier ram fingers from outside the gasification chamber 2202.

Figure 40:
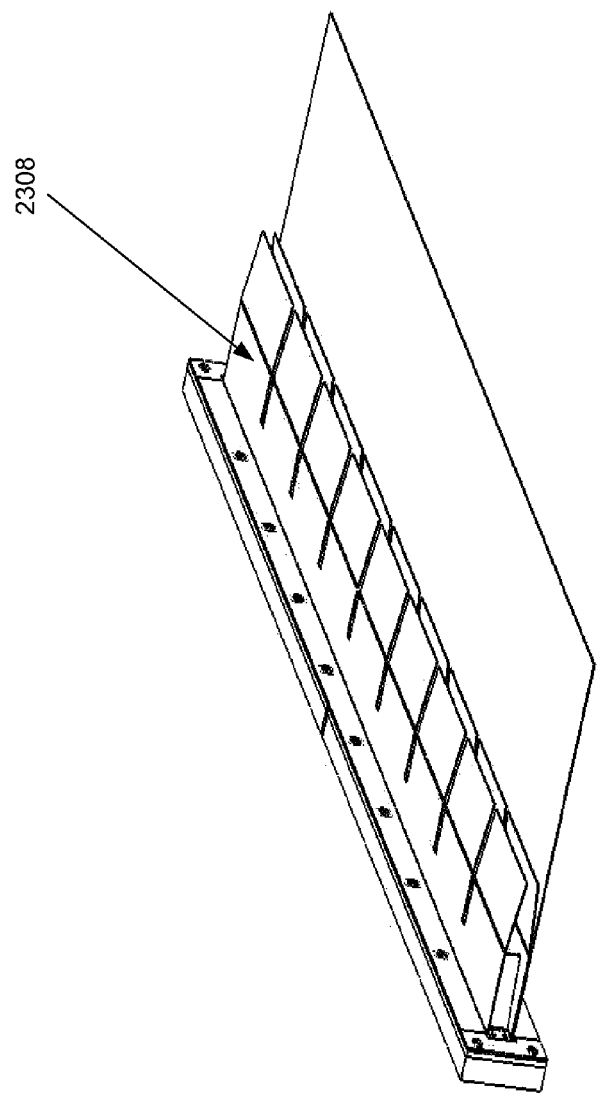
FIG. 40 details the dust seal of the multi-finger carrier-ram of the gasifier illustrated in FIGS. 32 to 36.

The carrier ram fingers are adapted to sealingly engage the gasification chamber wall to avoid uncontrolled air from entering the gasifier 2200, which would interfere with the process or could create an explosive atmosphere. It is also necessary to avoid escape of hazardous toxic and flammable gas from the gasification chamber 2202, and excessive escape of debris. Gas escape to atmosphere is prevented by containing the carrier ram mechanisms in a sealed box. This box has a nitrogen purge facility to prevent formation of an explosive gas mixture within the box. Debris sealing and limited gas sealing is provided for each finger of the carrier ram, using a flexible strip 2308 pressing against each surface of each finger of the carrier rams, as shown in FIG. 40. Alternatively, the seal can be a packing gland seal providing gas and debris sealing for each finger.

Figure 41:
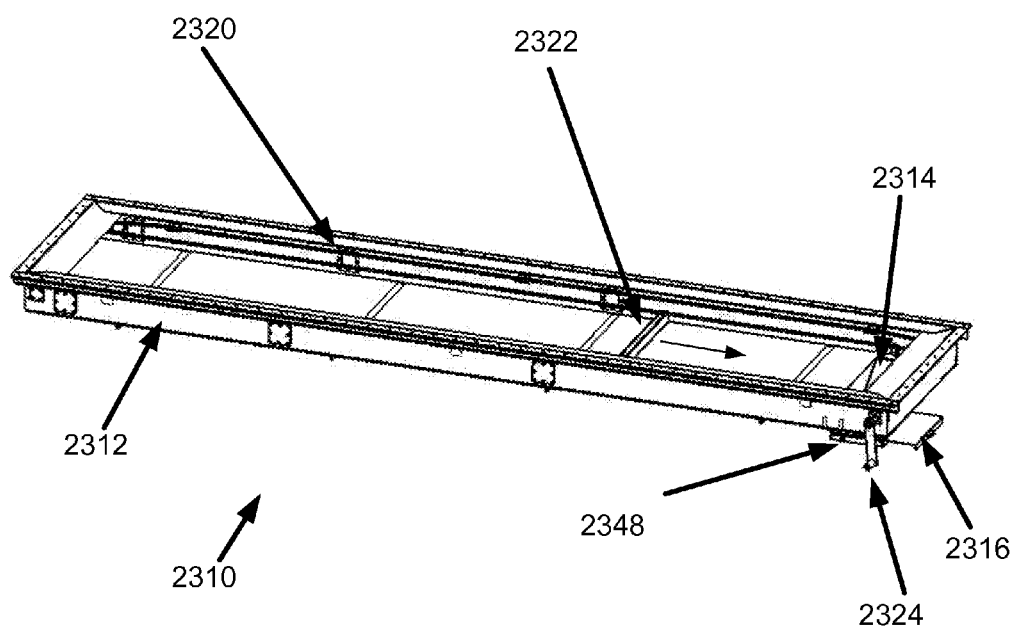
FIG. 41 showing the dust removal system of one embodiment of the gasifier illustrated in FIGS. 32 to 36 detailing the dust pusher, dust can attachment, shutter, operator handle and chain mechanism.

The design of this sealing provides a good gas and debris seal for each carrier ram finger while tolerating vertical and lateral movements of the carrier ram. The seals at the sides of the fingers were the greatest challenge as they must be compliant to the vertical and lateral motions of the carrier ram while remaining in close contact with the carrier ram and the seals of the upper and lower surfaces of the carrier ram. Leakage of debris can be monitored by means of windows in the sealed box and a dust removal facility is provided if the debris build-up becomes excessive. This removal can be accomplished without breaking the seal integrity of the carrier ram box, as shown in FIG. 41.

The dust removal facility 2310 comprises a metal tray 2312 having a dust outlet 2314 equipped with a shutter 2316 and attachment site 2318 for a dust can 2332, and a manual-operated, chain 2320 driven dust pusher 2322. Dust is pushed to the dust outlet 2314 by the pusher 2322 when the operator handle 2324 is used.

Power for moving the carrier rams 2228, 2230 & 2232 is provided by electric motors which drive the carrier ram via a gearbox and roller chain system. Briefly, the power to propel the carrier rams along the tracks is supplied by an externally mounted electric variable speed motor 2256 which drives a motor output shaft 2258 selectably in the forward or reverse direction allowing for extension and retraction of the carrier ram at a controlled rate. Position sensor (sensors) 2269 transmit the carrier ram position information to the control system. Optionally, the motor may further comprise a gear box. Two driver sprocket gears 2260 are mounted on the motor output shaft. The driver sprockets 2260 and corresponding driven sprockets 2262 mounted on an axle 2264 operatively mesh with chain members 2266 which are secured by brackets 2268 to the elongated rectangular block 2244.

The motors are controlled by the overall system control means which can command start and stop position, speed of movement and frequency of movement. Each carrier ram can be controlled independently. Roller chain is used for this implementation as it provides high strength and tolerates a severe duty environment. The use of two chains per carrier ram provides a means of keeping the carrier rams angularly aligned without the need for precision guides. There is a tendency for the material on top of the carrier ram to be pulled back when the carrier ram is withdrawn. This can be dealt with by sequencing the carrier rams where the lowest carrier ram 2232 is extended first; the middle carrier ram 2230 is then extended which pushes material down onto the lowest carrier ram 2232 filling the void created by that carrier rams movement; the lowest carrier ram 2232 is then retracted; the upper carrier ram 2228 is then extended filling the void at the back of the middle carrier ram 2230; the middle carrier ram 2230 is then retracted; new material dropping from the feed port fills any void on the top carrier ram 2228 and the top carrier ram 2228 is retracted. All these motions are controlled automatically and independently by the system control means in response to system instrumentation data.

Figure 43:
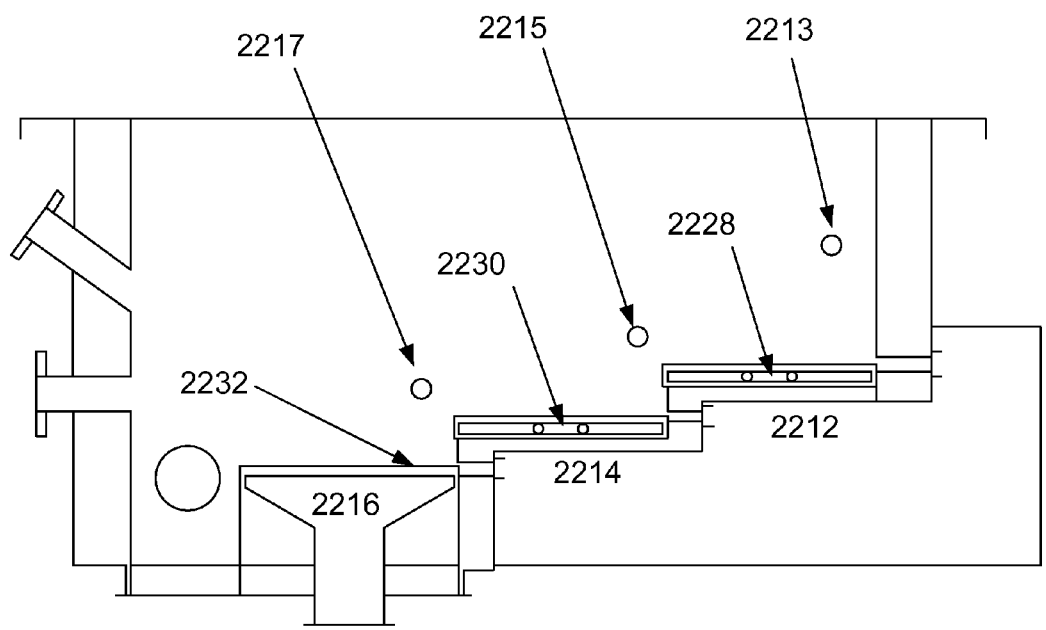
FIG. 43 is an illustration detailing the level switch locations in one embodiment of the invention.
Figure 44:
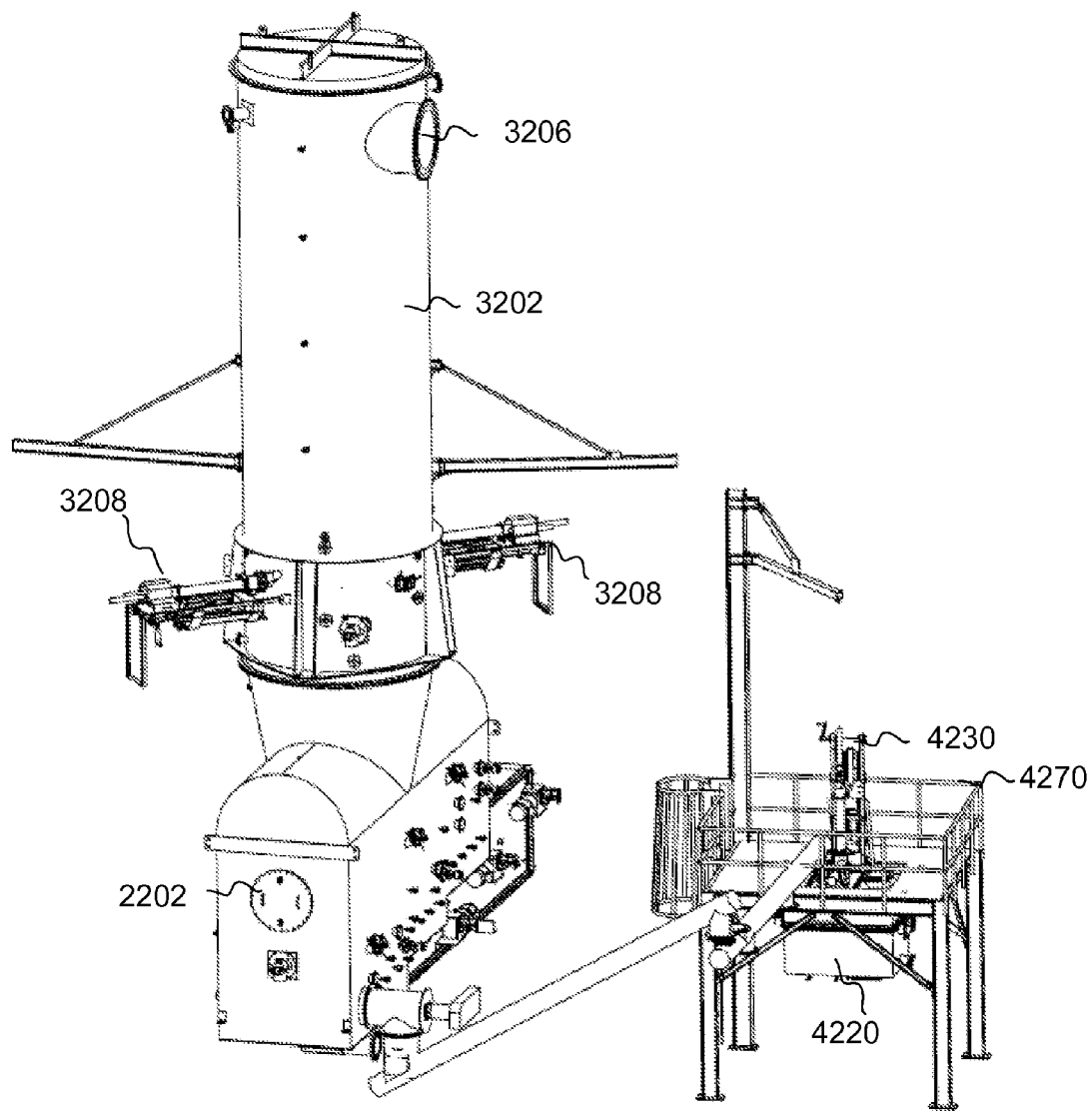
FIG. 44 shows the setup of the gasifier, gas reformulating chamber and the residue conditioning chamber.
Figure 45:
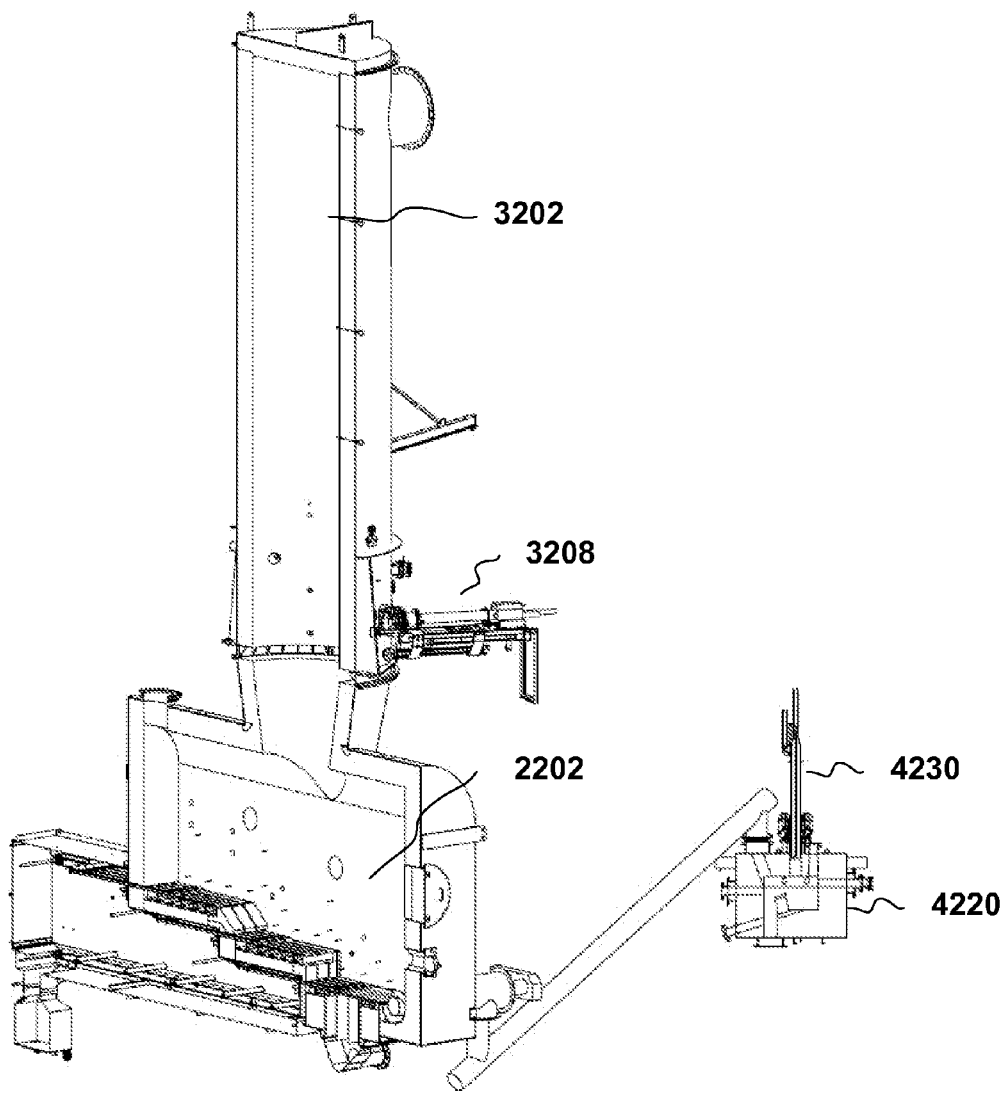
FIG. 45 is a cross-sectional view of the setup of the gasifier, gas reformulating chamber and the residue conditioning chamber.

Referring to FIG. 43, a staggered carrier ram sequence control strategy was implemented to facilitate movement of the carrier rams, as summarized below:

carrier ram C 2232 move fixed distance (with adjustable setpoint), creating a pocket at the start of step C 2216;

carrier ram B 2230 follows as soon as carrier ram C 2232 passes a trigger distance (trigger distance has adjustable setpoint) carrier ram B pushes/carries material to immediately fill the pocket at the start of step C 2216. Feedback control is to stroke as far as necessary to block level switch C 2217, or minimum setpoint distance if already blocked, or maximum setpoint distance if blocking does not occur. At the same time as carrier ram B 2230 is filling the pocket at the start of Step C 2216, it is creating a pocket at the start of Step B 2230;

carrier ram A 2228 follows as soon as carrier ram B 2230 passes a trigger distance. carrier ram A 2228 pushes/carries material to immediately fill the pocket at the start of Step B 2214. Feedback control is to stroke as far necessary to block level switch B 2215, or minimum setpoint distance if already blocked, or maximum setpoint distance if blocking does not occur. At the same time as carrier ram A 2228 is filling the pocket at the start of Step B 2214, it is also creating a pocket at the start of Step A 2212. This typically triggers the feeder to run and fill the gasifier 2200 until level switch A 2213 is blocked again;

all carrier rams reverse to home position simultaneously.

Access is provided to the gasifier 2200 using a manhole at one end. During operation, this is closed using a sealable refractory lined cover. Further access is also possible by removing the third stage air-box 2276.

The residue (e.g. char or ash) remaining after gasification must be removed from the gasifier 2200 and passed to the residue conditioning system (RCS) 4220. As the material is processed and moved in the gasifier 2200, the heat generated within the pile can cause melting, which will result in agglomeration of the residue. Agglomerated residue has been shown to cause jamming in drop port type exits. In order to ensure that any agglomerations do not create jamming at the exit from the gasification chamber 2202, a screw conveyor 2209 is used to extract the residue from the gasification chamber 2202. The carrier ram motion pushes the residue into the extractor screw 2209 which pushes the residue out of the gasification chamber 2202 and feed it into a residue conveyor system. Rotation of the extractor screw 2209 breaks up agglomerations before the residue is fed into the conveyor system. This breaking up action is enhanced by having serrations on the edge of the extractor screw flights.

For implementing process control, various parameters have to be monitored within the gasification chamber 2202. For example, the temperature needs to be monitored at different points along each stage and at various heights at each stage. This is achieved using thermocouples, which tend to need replacement during operation. In order to accomplish this without shutting down the process, each thermocouple is inserted into the gasification chamber 2202 via a sealed end tube which is then sealed to the vessel shell. This design allows the use of flexible wire thermocouples which are procured to be longer than the sealing tube so that the junction (the temperature sensing point) of the thermocouple is pressed against the end of the sealed tube to assure accurate and quick response to temperature change. The sealed tube is sealed to the gasification chamber 2202 and mechanically held in place by means of a compression gland, which can also accommodate protrusion adjustment into the gasification chamber 2202. For temperature measurements within the MSW pile, the sealed tube can result in the pile being held back when its movement is needed. To avoid this problem the end of the sealed tube is fitted with a deflector which prevents the MSW pile from getting blocked by the thermocouple tube.

The off-gas produced in the gasifier 2200 then moves into the Gas Reconstituting System (GRS) 3200. The GRS 3200 is designed to satisfy a wide range of requirements: (a) provide necessary volume for the required gas refining residence time; (b) provide insulation for heat conservation and protection of the outer steel vessel; (c) provide inlets for addition of air and steam; (d) enable mixing of the gases; (e) process the gases at high temperature using plasma torches 3208; (f)

provide instrumentation for monitoring the gas composition for process control and for enhanced performance of the plasma torch 3208; and (g) output the processed gas to a downstream heat exchanger 5200.

Figure 46:
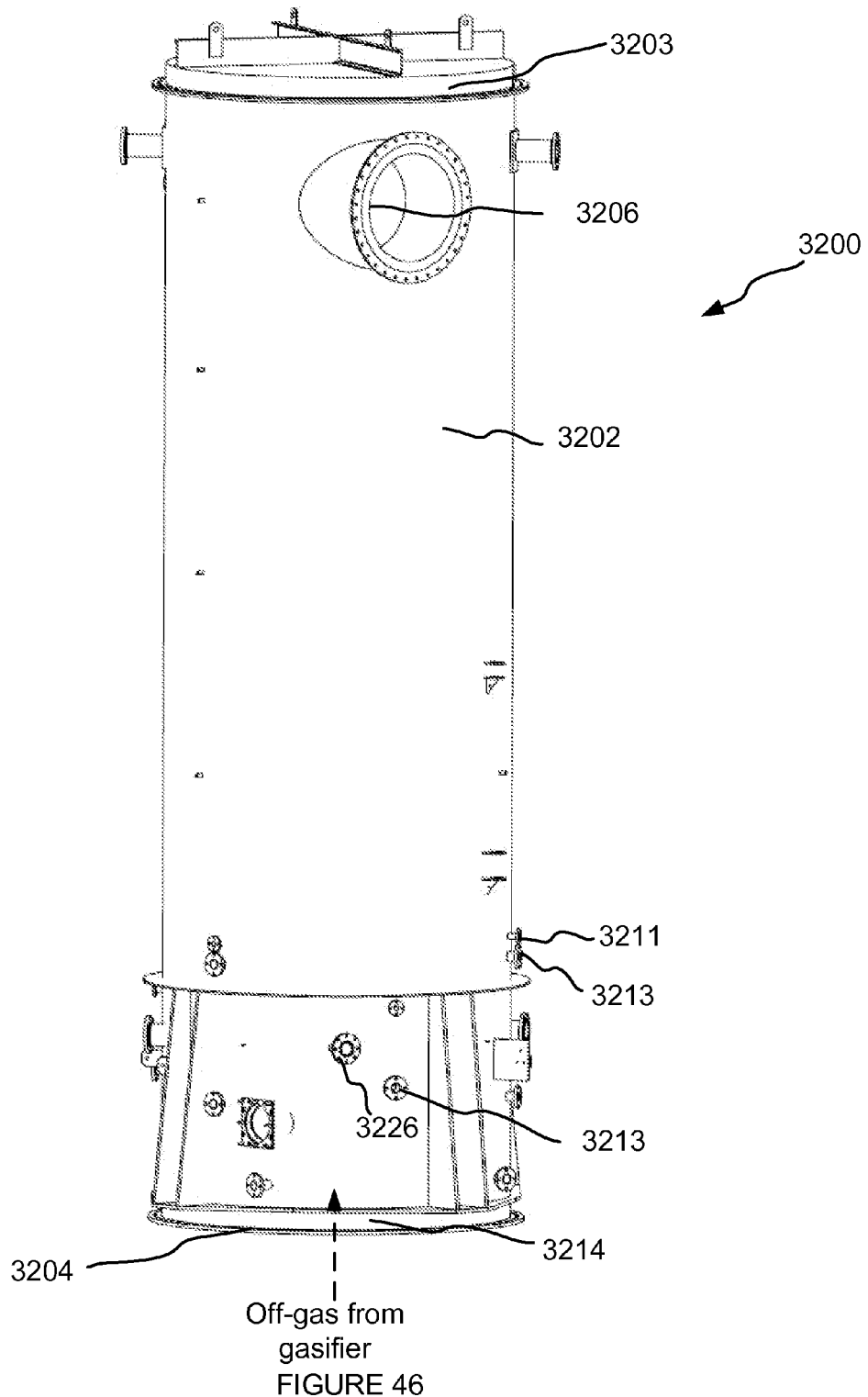
FIG. 46 is a schematic of the gas reformulating chamber.

The gas reformulating system (GRS) 3200 provides a sealed environment with mounting and connection features for process air, steam, plasma torches 3208 and torch handling mechanisms, instrumentation and exhaust of the output syngas. As shown in FIG. 46, the GRS 3200 comprises a substantially vertically mounted refractory-lined cylindrical or pipe-like reformulating chamber 3202 having a single conically shaped off-gas inlet 3204 to which the gasifier 2200 is connected to via a mounting flange 3214. The GRS 3200 has a length-to-diameter ratio of about 3:1. The residence time within the GRS 3200 is 1.2 seconds. The GRS 3200 further comprises three levels of tangentially positioned air nozzles, two tangentially located plasma torches 3208, six thermocouple ports, two burner ports, two pressure transmitter ports and several spare ports. The high temperatures created in the GRS 3200 by the plasma torches 3208 ensure that the molecules within the off-gas disassociate into their constituent elements, and then combines together to form syngas. The hot crude syngas exits the GRS 3200 via the syngas outlet 3206.

Figure 47:
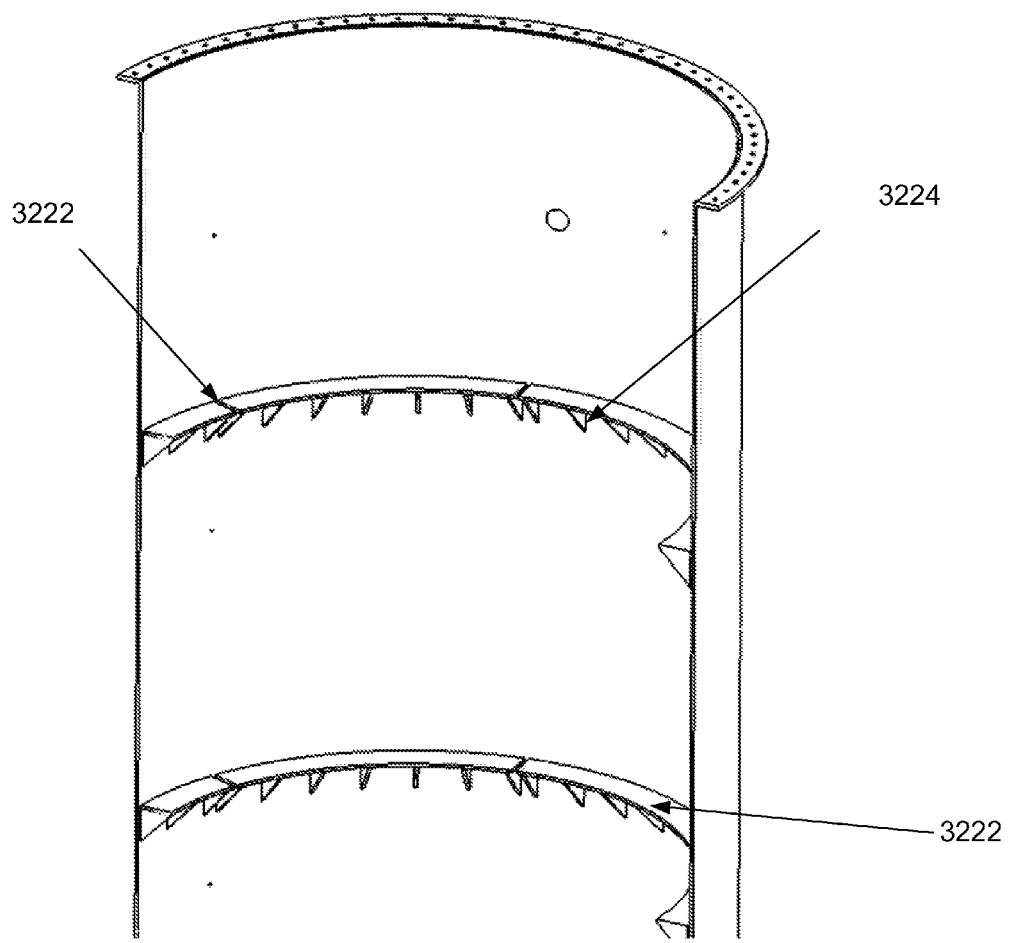
FIG. 47 is a view of the inner wall of the reformulating chamber.

As mentioned earlier, the GRS 3200 incorporates supports for refractory lining. The major support feature for the refractory is a series of shelves 3222 around the interior of the GRS 3200. During operation, these shelves 3222 will be at considerably higher temperature than the shell of the reformulating chamber 3202. Therefore, it is necessary to avoid any waste of heat by conduction to the GRS 3200, while providing allowance for differential expansion. Also, the shelves 3222 must be capable of supporting the considerable weight of the refractory. These requirements were met by making the shelves 3222 segmented with expansion gaps between segments to allow for the expansion. Also, there is a gap between the shelf 3222 and the wall to avoid heat transfer. To take the weight of the refractory, each shelf segment is supported by a number of gussets welded to the wall, as shown in FIG. 47. Expansion along the shelf 3222 along its length would create stress and possibly failure in the gussets if they were welded to the gussets. However, by resting the shelf 3222 on the gussets without welding, the shelf 3222 is allowed to expand freely. To hold the segment into its correct location, it is welded to the center gussets only where the expansion is small and even then only the outer portion is welded. This minimizes any stress on the gussets and potential buckling of the shelf 3222.

The top of the reformulating chamber 3202 is capped with a refractory-lined lid 3203 thereby creating a sealed enclosure. The whole GRS 3200 is coated with a high temperature resistant membrane internally to prevent corrosion by the unrefined off-gas. It is painted on the exterior surfaces with a thermo-chromic paint to reveal hot spots due to refractory failure or other causes.

The refractory used is a multilayer design with a high density layer on the inside to resist the high temperature, erosion and corrosion that is present in the GRS 3200. Outside the high density material is a lower density material with lower resistance properties but higher insulation factor. Outside this layer, a very low density foam board material with very high insulation factor is used because it will not be exposed to abrasion of erosion. The outside layer, between the foam board and the vessel steel shell is a ceramic blanket material to provide a compliant layer to allow for differential expansion between the solid refractory and the vessel shell. Vertical expansion of the refractory is provided for by means of a compressible refractory layer separating sections of the non-compressible refractory. The compressible layer is protected from erosion by overlapping but extendible high density refractory.

Figure 48:
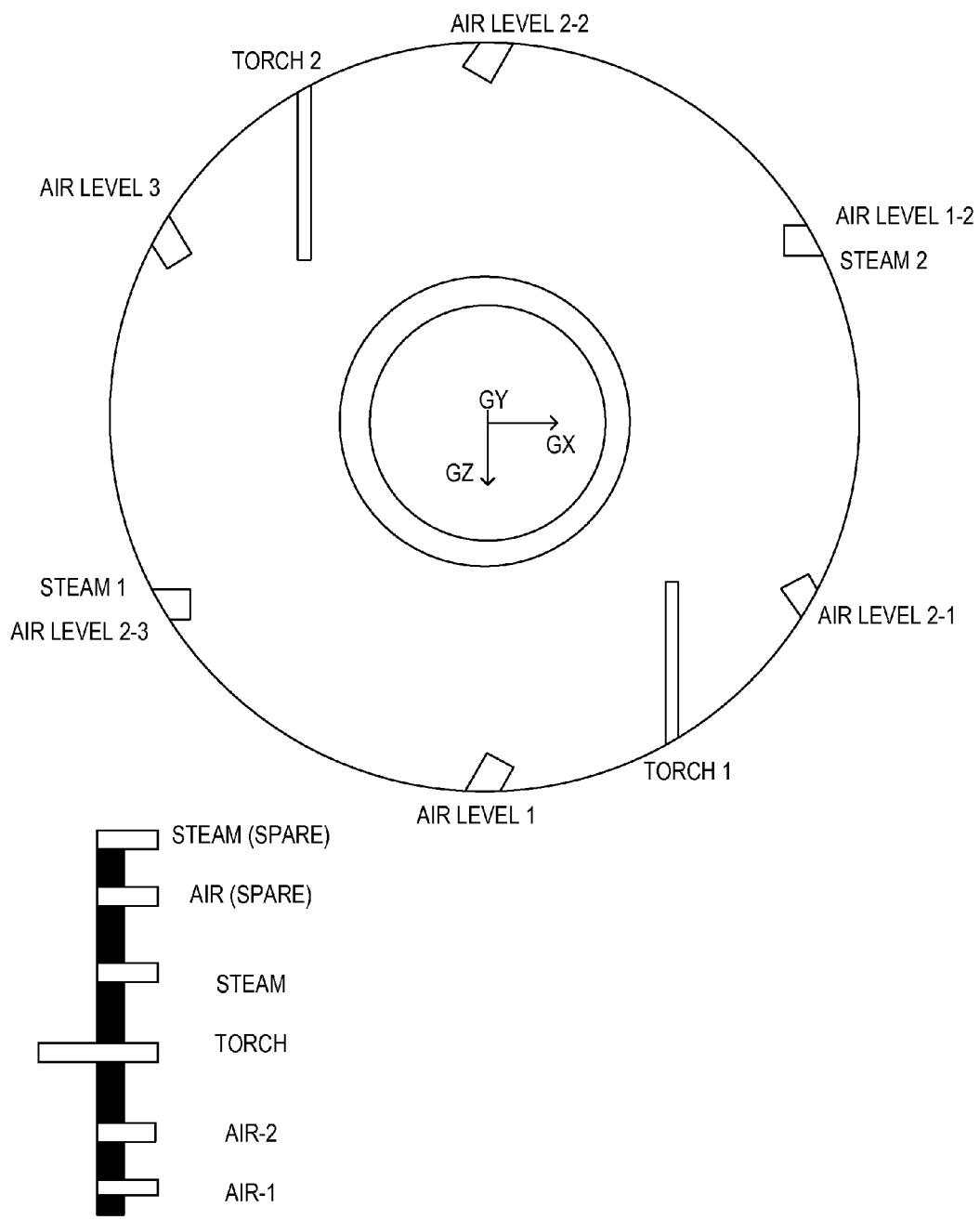
FIG. 48 is a top-down view of the reformulating chamber showing the position of the torches, and the air and steam nozzles.
Figure 49:
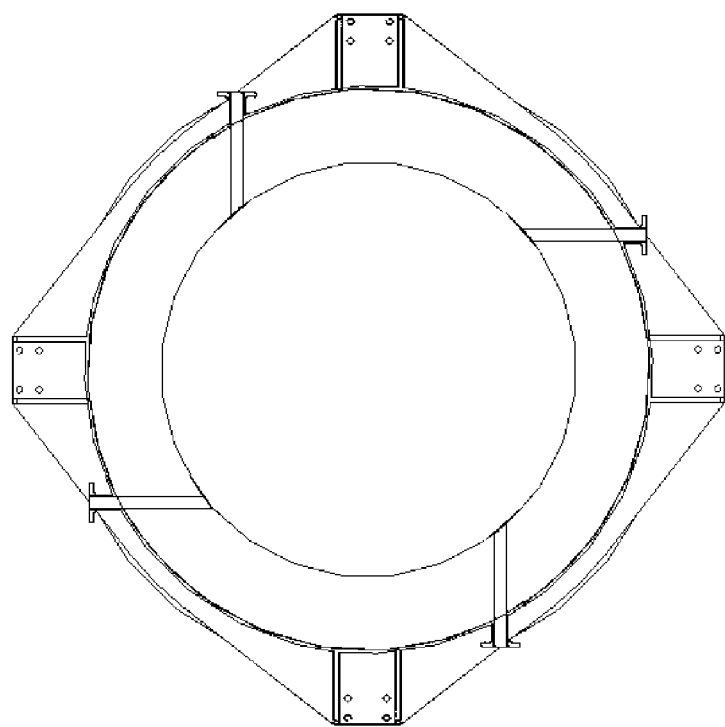
FIG. 49 shows the arrangement of the swirl inlets around the reformulating chamber.
Figure 50:
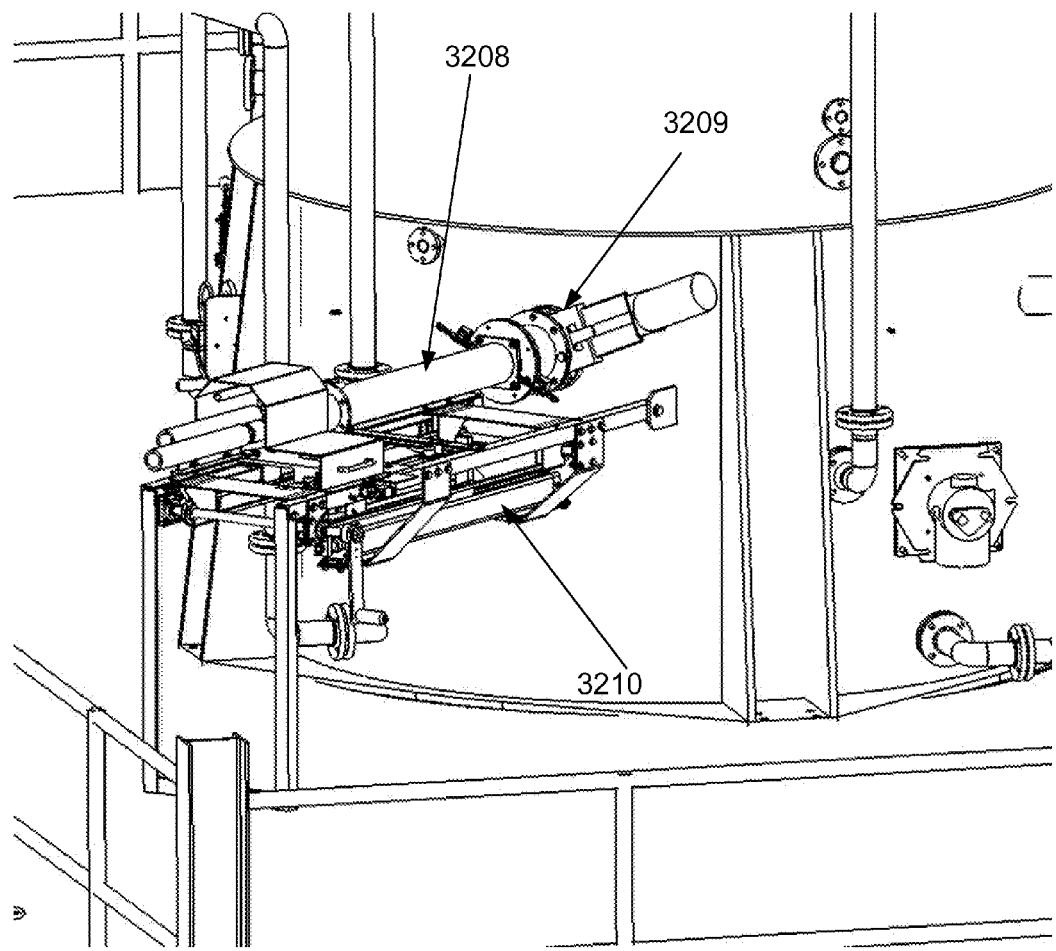
FIG. 50 shows the attachment of the plasma torches on the reformulating chamber.

As shown in FIGS. 48 & 49, air is injected into the off-gas stream by three levels of air nozzles that include four jets at the lower level, and another six jets at upper level, in which three jets are slightly higher than other three to create cross-jet mixing effects to achieve better mixing. Angular blowing of the air into the GRS 3200, achieved using deflector at the tip of the input nozzle, also results in better mixing while allowing the inlet pipes and flanges to be square with the reformulating chamber 3202. The improved mixing of the gases in the GRS 3200 allows for optimal refining of the syngas. This is achieved by inducing a swirling action at the base of the reformulating chamber 3202 by making use of the process air velocity. Air is injected into the off-gas stream through swirl ports 3212 to create a swirling motion or turbulence in the off-gas stream thereby mixing the off-gas and creating a re-circulating vortex pattern within the GRS 3200.

As mentioned earlier, the GRS 3200 also includes two tangentially mounted 300 kW, water cooled, copper electrode, NTAT, DC plasma torches 3208 mounted on a sliding mechanism. The DC plasma torches 3208 are powered from a DC power supply. Thermocouples are positioned at various locations within the GRS 3200 to ensure that the temperature of the syngas is maintained at about 1000° C.

The plasma torches 3208 require periodic maintenance and it is most desirable that they are replaceable with the process still running. As mentioned earlier, this implementation uses two torches 3208 in the GRS 3200 when strictly only one is needed for operation. Removal and replacement of the plasma torches 3208 have to be done in the presence of high temperature toxic and flammable gas in the GRS 3200. In addition, the torch 3208 will also need to be removed in the event of failure of the torch cooling system to protect it from the heat in the GRS 3200.

These challenges are met by mounting the torch 3208 on a sliding mechanism that can move the torch 3208 into and out of the reformulating chamber. The torch 3208 is sealed to the reformulating chamber 3202 by means of a sealing gland. This gland is sealed against a gate valve, which is, in turn, mounted on and sealed to the vessel. To remove a torch 3208, it is pulled out of the reformulating chamber 3202 by the slide mechanism. Initial movement of the slide disables the high voltage torch power supply for safety purposes. The gate valve shuts automatically when the torch 3208 has retracted past the valve and the coolant circulation is stopped. The hoses and cable are disconnected from the torch 3208, the gland is released from the gate valve and the torch 3208 is lifted away by a hoist.

Replacement of a torch 3208 is done using the reverse of the above procedure; the slide mechanism can be adjusted to permit variation of the insertion depth of the torch 3208. For the sake of simplicity and safety, all the above operations except for the closing of the gate valve are carried out manually. The gate valve is operated mechanically so that operation is automatic. A pneumatic actuator is used to automatically withdraw the torch in the event of cooling system failure. Compressed air for operating the actuator is supplied from a dedicated air reservoir so that power is always available even in the event of electrical power failure. The same air reservoir provides the air for the gate valve. An electrically interlocked cover is used a further safety feature by preventing access to the high voltage torch connections.

Residue Conditioning System

The residue remaining after the gasification must be rendered inert and usable before disposal. This is done by extracting it from the gasifier 2200 into a plasma-based residue conditioning chamber (RCC) 4220, melting it and rendering it into an inert vitreous slag 4203, cooling and shattering the slag 4203 into granules using a quench tank 4240 before transfer to a slag stockpile 4204 ready for removal from the site. The final by-product is suitable for use as road fill or concrete manufacture.

As mentioned earlier, the movement of residue from the gasifier 2200 is complicated by the potential for agglomeration caused due to the heat generated within the pile. This problem is solved by using a screw type conveyor 2209 at the outlet end of the gasifier 2200. The conveyor has serrated edges on the screw flights to break up any agglomerated material.

Figure 52:
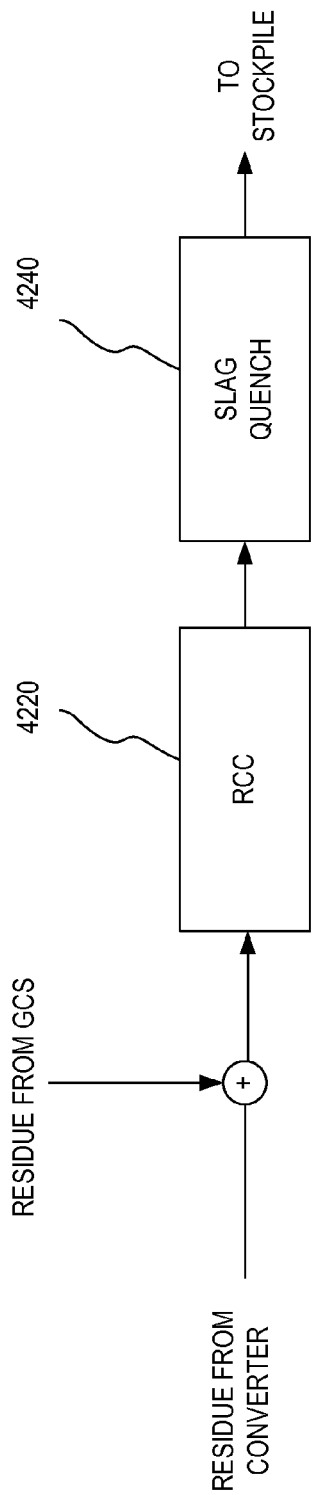
FIG. 52 is a functional block diagram of the residue conditioning system.
Figure 53:
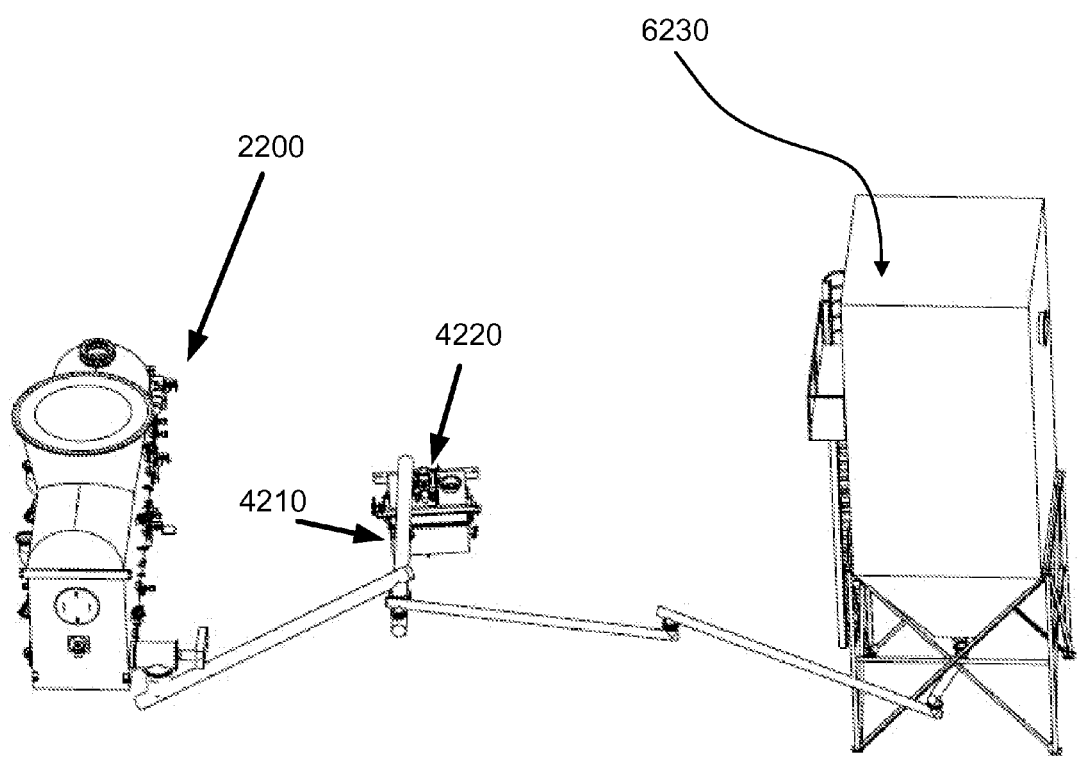
FIG. 53 shows a view of the actual implementation of the residue conditioning system and its connections to the gasifier and the baghouse filter.

The residue is then taken to the RCC 4220 by means of a main conveyor 4210 system comprising a series of screw conveyors. This conveyor system 4210 also takes the residue from the GCS baghouse filter 6230 downstream and passes it onto the RCC 4220. To minimize the number of entry ports to the RCC 4220, the residue from all sources is combined before introduction to the RCC 4220. This avoids enlarging the RCC 4220 to cater to multiple feed sources. An additional source of residue may also have to be catered for. In order for gasification to continue during RCC 4220 downtime the residue may be diverted. In which case it must be re-introduced into the RCC feed system. The overall schematic of the residue conditioning system is shown in FIG. 52.

Figure 54:
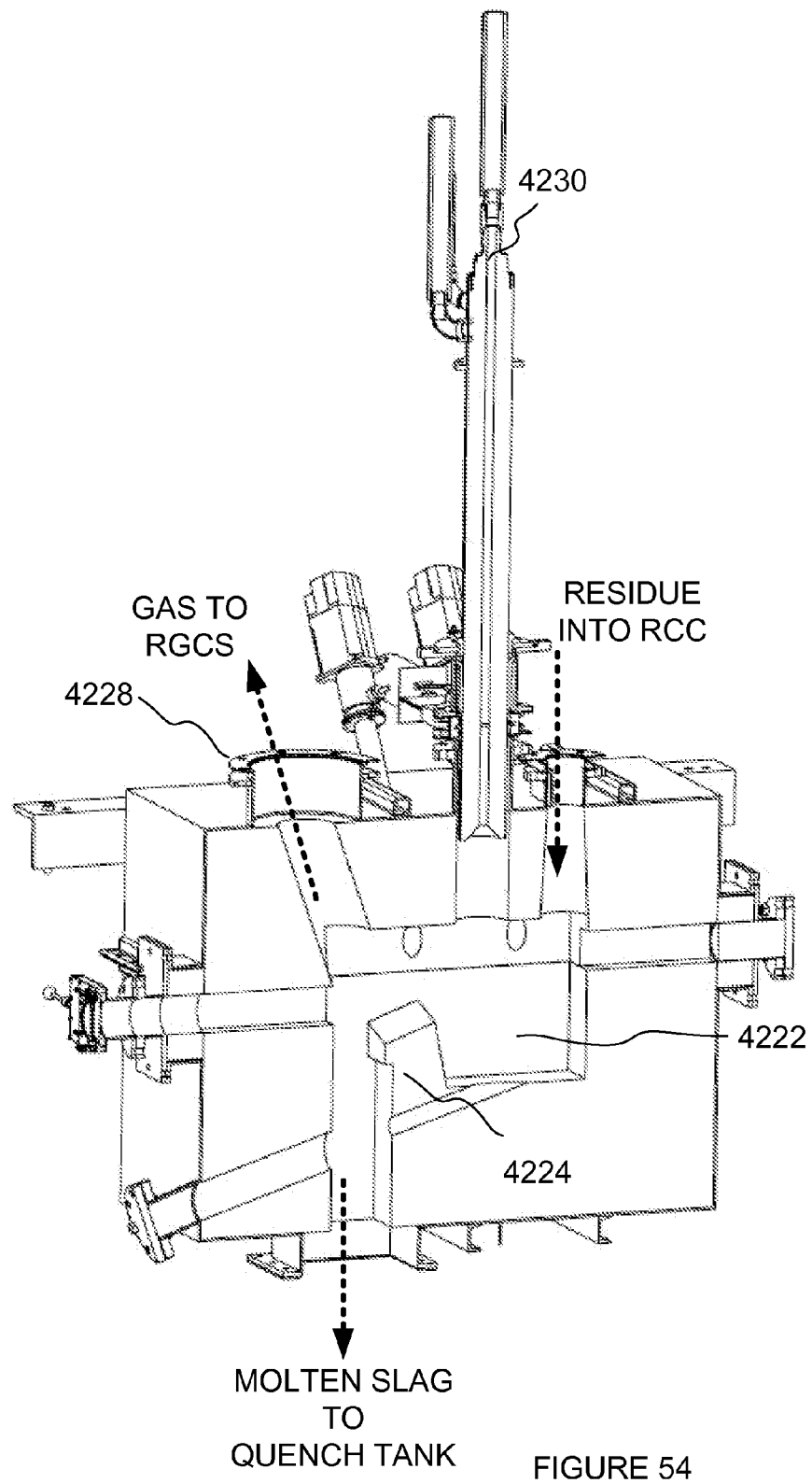
FIG. 54 shows a cross-sectional view of the residue conditioning chamber.
Figure 55:
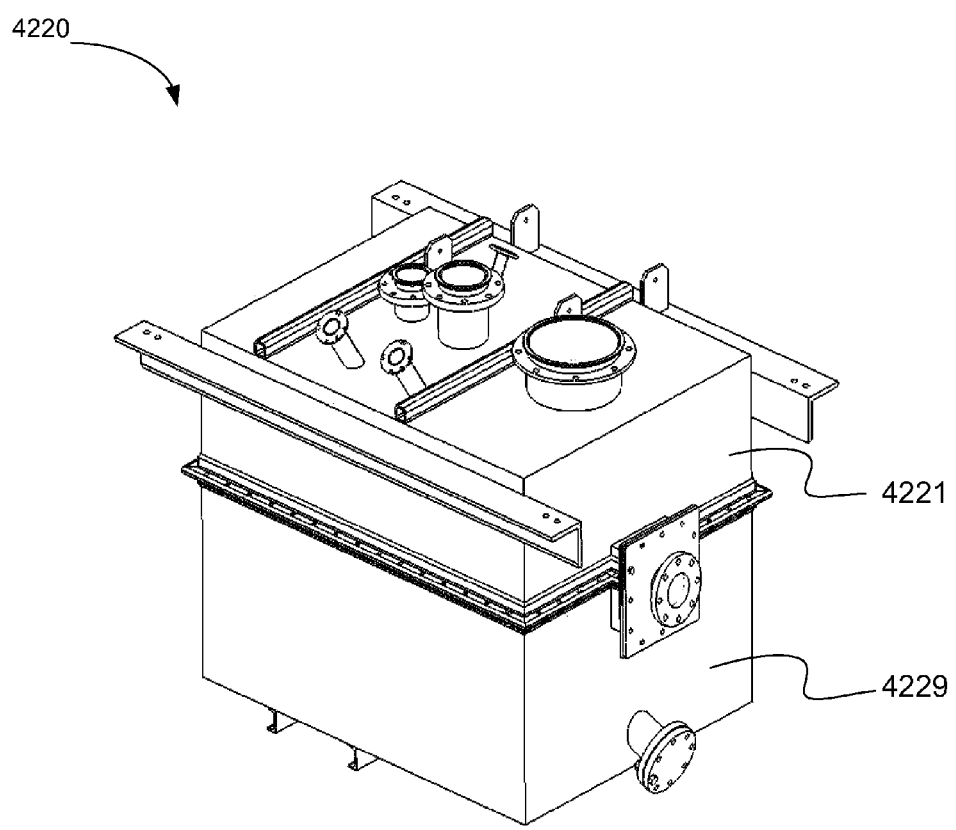
FIG. 55 shows another view of the residue conditioning chamber.

As shown in FIG. 54, the residue is dropped into the RCC 4220, where it accumulates in a reservoir 4222 whose depth is determined by the height of a weir 4224, and undergoes heating by a plasma torch 4230. As the level of the molten slag rises within the reservoir 4222 it runs over the weir 4224, dropping into a quench tank 4240. The water tank 4240 ensures that the RCC 4220 is sealed to the atmosphere. Any metals which have not been removed during the MSW handling system stage is transferred to the RCC 4220 and will not necessarily be melt at the slag's normal vitrification temperature. Thus, the crucible could become clogged with metal as it is of higher density than the molten slag. To avoid this, the RCC temperature is periodically raised to melt any metals and the molten metals are tapped off from the bottom of the crucible.

Due to the very high temperatures needed to melt the residue and particularly the constituent metals in it, the refractory is subjected to very severe operational demands. These include corrosion and erosion, particularly at the slag waterline, in addition to the high temperature. Also the refractory must provide good insulation to conserve heat and the RCC 4220 must be as small as possible. The refractory is selected to provide an inner lining of very high resistance to heat, corrosion and erosion. The layers of refractory outside the lining are then selected to greater insulation.

Figure 57:
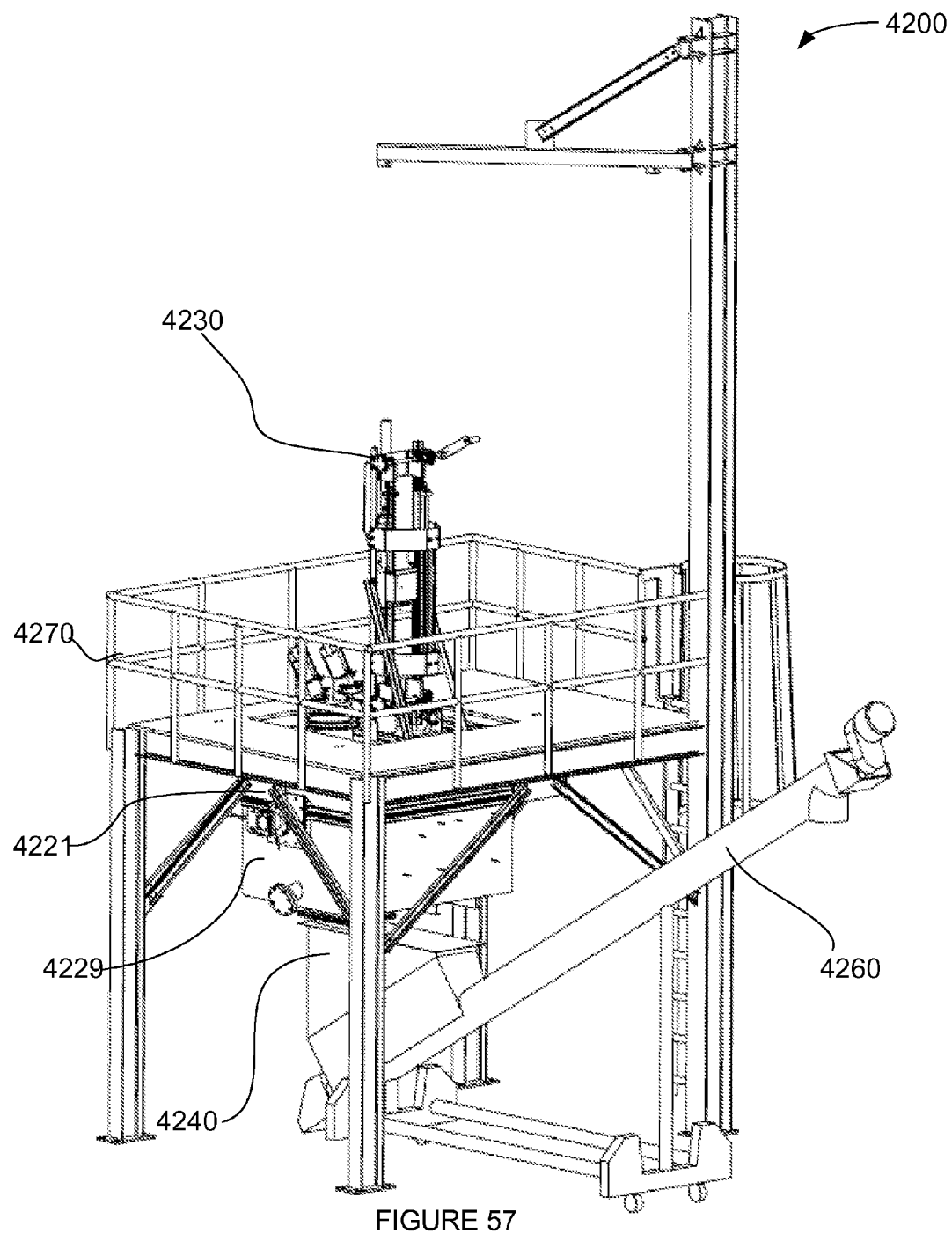
FIG. 57 shows the entire residue conditioning system from another angle and also shows the support structure used for the residue conditioning chamber.
Figure 58:
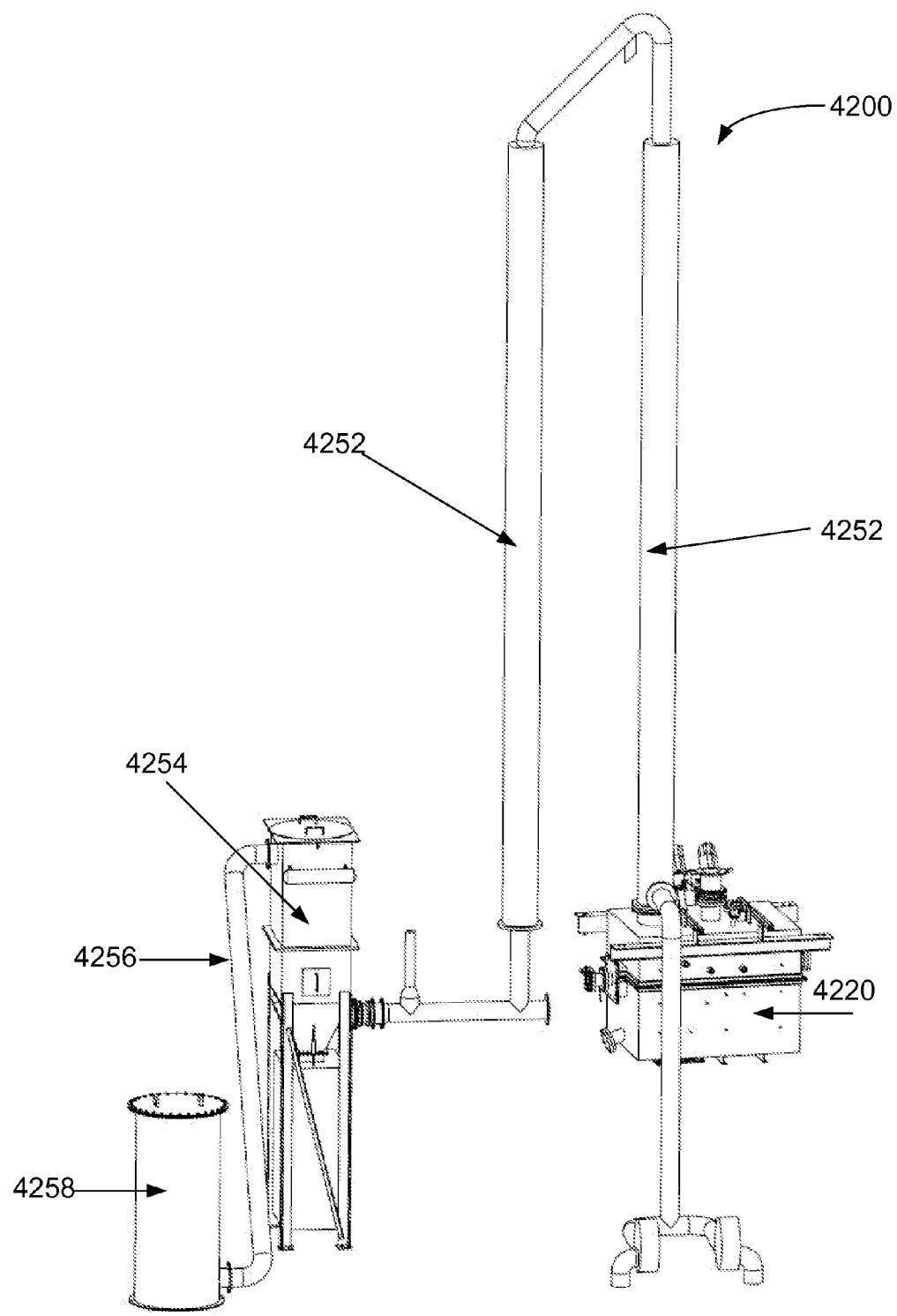
FIG. 58 shows the arrangement of the residue gas conditioning system with the residue conditioning chamber.

It is anticipated that the crucible refractory in particular will require periodic maintenance. To allow for this, the bottom of the RCC with the crucible can be removed without disturbing any connections to the RCC. This is accomplished by suspending the RCC from its support structure 4270 rather than setting it onto a structure, as shown in FIG. 57. Thus the lower portion of the RCC with the crucible can be dropped away from the top without having to disconnect any connections. Also the entire RCC can be removed by disconnecting the connections and lowering it. This avoids the need to lift the conveyor 4260 and piping out of the way.

Figure 56:
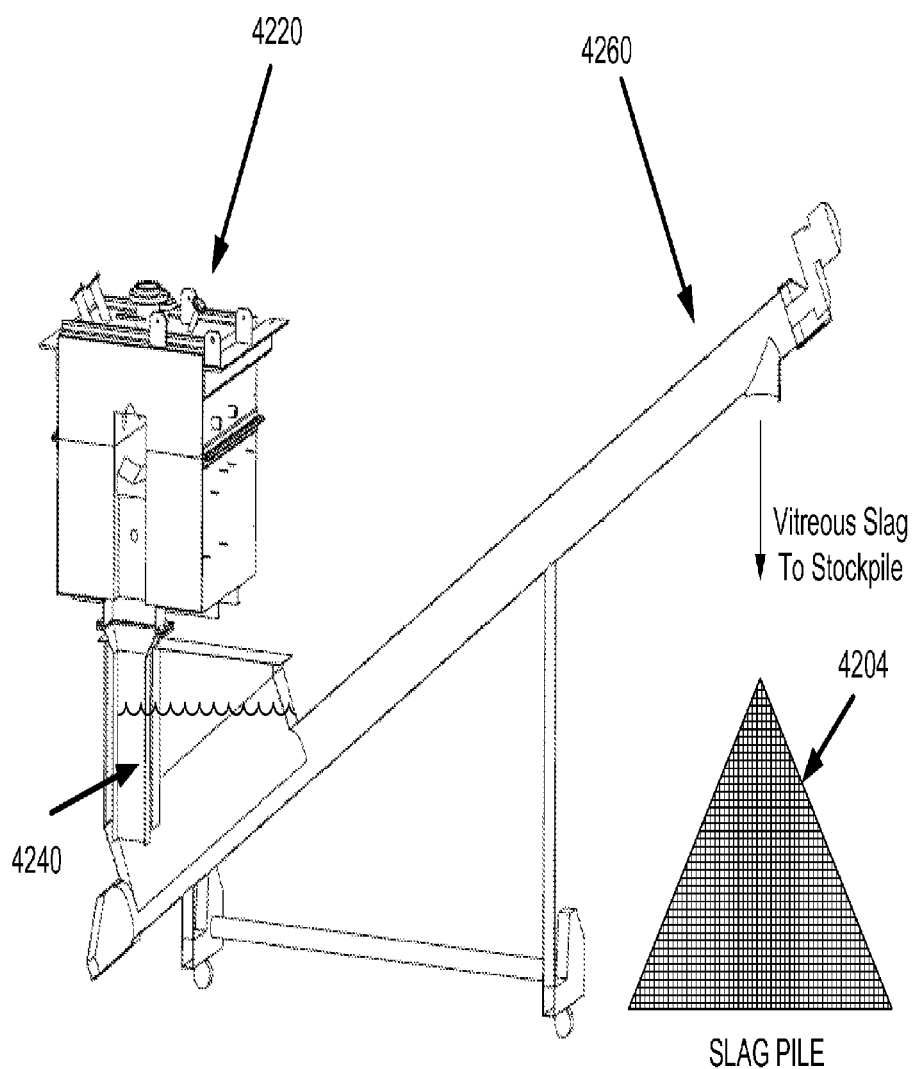
FIG. 56 shows a view of the residue conditioning chamber and the quench tank with the conveyor used for the transfer of vitrified slag to the slag stockpile.

When the molten slag drops into the quench tank 4240 it is cooled and shattered into granular form. A slag conveyor 4260 then removes the granular slag 4203 from the quench 4240 and places it into a stockpile 4204 for disposal or further use, as shown in FIG. 56. The slag drop port is sealed to the environment by means of a water trap consisting of a shroud sealed to the RCC 4220 at the top and with its lower edge submerged in the quench medium. The same quench medium seals the slag conveyor 4260 from the RCC 4220.

The gases produced in the RCC 4220 are treated similarly to the gases produced in the converter 1200. The residue gas exits the RCC 4220 via the gas outlet 4228 and is directed to a residue gas conditioner (RGCS) 4250. It undergoes a pre-cooling step in an indirect air-to-gas heat exchanger 4252 prior to being passed through a baghouse filter 4254 that removes particulates and heavy metal contaminants. The residue gas is then cooled using a second heat exchanger 4256 before it is passed through an activated carbon bed 4258 for the further removal of heavy metals and particulate matter. The cleaned and conditioned residue gas is diverted back to the downstream GCS 6200 to feed back with the syngas stream from the converter 1200.

The raw syngas exits the converter 1200 and passes through a Syngas-to-air Heat Exchanger (HX) 5200 where the heat is transferred from the syngas stream to a stream of air. Thus, the syngas is cooled while the resulting hot stream of air is fed back to the converter 1200 as process air. The cooled syngas then flows into a Gas Conditioning System (GCS) 6200, where the syngas is further cooled and cleaned of particulates, metals and acid gases sequentially. The cleaned and conditioned syngas (with desired humidity) is stored in the syngas HC 7230 before being fed to gas engines 9260 where electricity is generated. The functions of the major components (equipment) in the system after the converter 1200 and RCS 4200 are outlined in Table I, in the sequence in which the syngas is processed.

TABLE 1

Steps after Converter 1200 and RCS 4200

| Subsystem or equipment | Main Function |
| --- | --- |
| Heat Exchanger 5200 | Cool down syngas and recover sensible heat |
| Evaporative Cooler 6210 | Further cooling down of syngas prior to baghouse |
| Dry Injection System 6220 | Heavy metal adsorption |
| Baghouse 6230 | Particle or dust collection |
| HCL Scrubber 6240 | HCl removal and syngas cooling/conditioning |
| Carbon Filter Bed 6260 | Further mercury removal |
| H₂S Removal System 6270 | $H_2S$ removal and elemental sulfur recovery |
| RGCS 4250 | RCC off-gas cleaning and cooling |
| Syngas Storage 7230 | Syngas storage and homogenization |
| Chiller 7210; Gas/Liquid Separator 7220 | Humidity control |
| Gas Engines 9260 | Primary driver for electricity generation |
| Flare Stack 9299 | Burning syngas during start-up |

Syngas-to-Air Heat Exchanger (Recuperator)

The output syngas leaving the GRS 3200 is at a temperature of about 900° C. to 1100° C. In order to recover the heat energy in the syngas, the raw syngas exiting from GRS 3200 is sent to a shell-tube type syngas-to-air heat exchanger (HX) 5200. Air enters the HX 5200 at ambient temperature, i.e., from about −30 to about 40° C. The air is circulated using air blowers 5210, and enters the HX 5200 at a rate between 1000 $Nm^3/hr$ to 5150 $Nm^3/hr$, typically at a rate of about 4300 $Nm^3/hr$.

The syngas flows vertically through the tube side 5202 and the air flows in a counter-clockwise fashion through the shell side 5206. The syngas temperature is reduced from 1000° C. to between 500° C. and 800° C., (preferably about 740° C.) while the air temperature is increased from ambient temperature to between 500° C. and 625° C. (preferably about 600° C.). The heated exchange-air is recirculated back into the converter 1200 for gasification.

The HX 5200 is designed specifically for high level of particulates in the syngas. The flow directions of the syngas and the air are designed to minimize the areas where build up or erosion from particulate matter could occur. Also, the gas velocities are designed to be high enough for self cleaning while still minimizing erosion.

Due to the significant temperature difference between the air and syngas, each tube 5220 in the HX 5200 has its individual expansion bellows 5222. This is essential to avoid tube rupture, which can be extremely hazardous since the air will enter the syngas mixture. Possibility for tube rupture is high when a single tube becomes plugged and therefore no longer expands/contracts with the rest of the tube bundle.

Multiple temperature transmitters are placed on the gas outlet box of the gas-to-air heat-exchanger 5200. These are used to detect any possible temperature raise that occurs due to combustion in the event of an air leak into the syngas. The air blower 5210 is automatically shut down in such a case.

The material for the gas tubes in the HX 5210 has to be carefully selected to ensure that corrosion is not an issue, due to concerns about sulphur content in the syngas and its reaction at high temperatures. In our implementation, Alloy 625 was selected.

Gas Conditioning System (GCS)

In general, a gas conditioning system (GCS) 6200 refers to a series of steps which converts the crude syngas obtained after the heat exchanger 5200 into a form suitable for downstream end applications. In our implementation, the GCS 6200 can be broken down into two main stages. Stage 1 comprises of: (a) an evaporative cooler (dry quench) 6210; (b) a dry injection system 6220; and (c) a baghouse filter (used for particular matter/heavy metal removal) 6230. Stage 2 comprises of (d) a HCl scrubber 6240; (e) a syngas (process gas) blower 6250; (f) a carbon filter bed (mercury polisher) 6260; (g) a H$_2$S (sulphur) removal system 6270; and (h) humidity control using a chiller 7210 and gas/liquid separator 7220.

The heat exchanger 5200 before the GCS 6200 is sometimes considered as part of Stage 1 of the GCS 6200. The syngas (process gas) blower 6250 typically includes a gas cooler 6252 which is sometimes mentioned separately in Stage 2 of the GCS 6200. Also, humidity control mentioned here as part of Stage 2 of the GCS 6200 is often considered part of the syngas regulation system 7200 further downstream to the GCS 6200.

Figure 59:
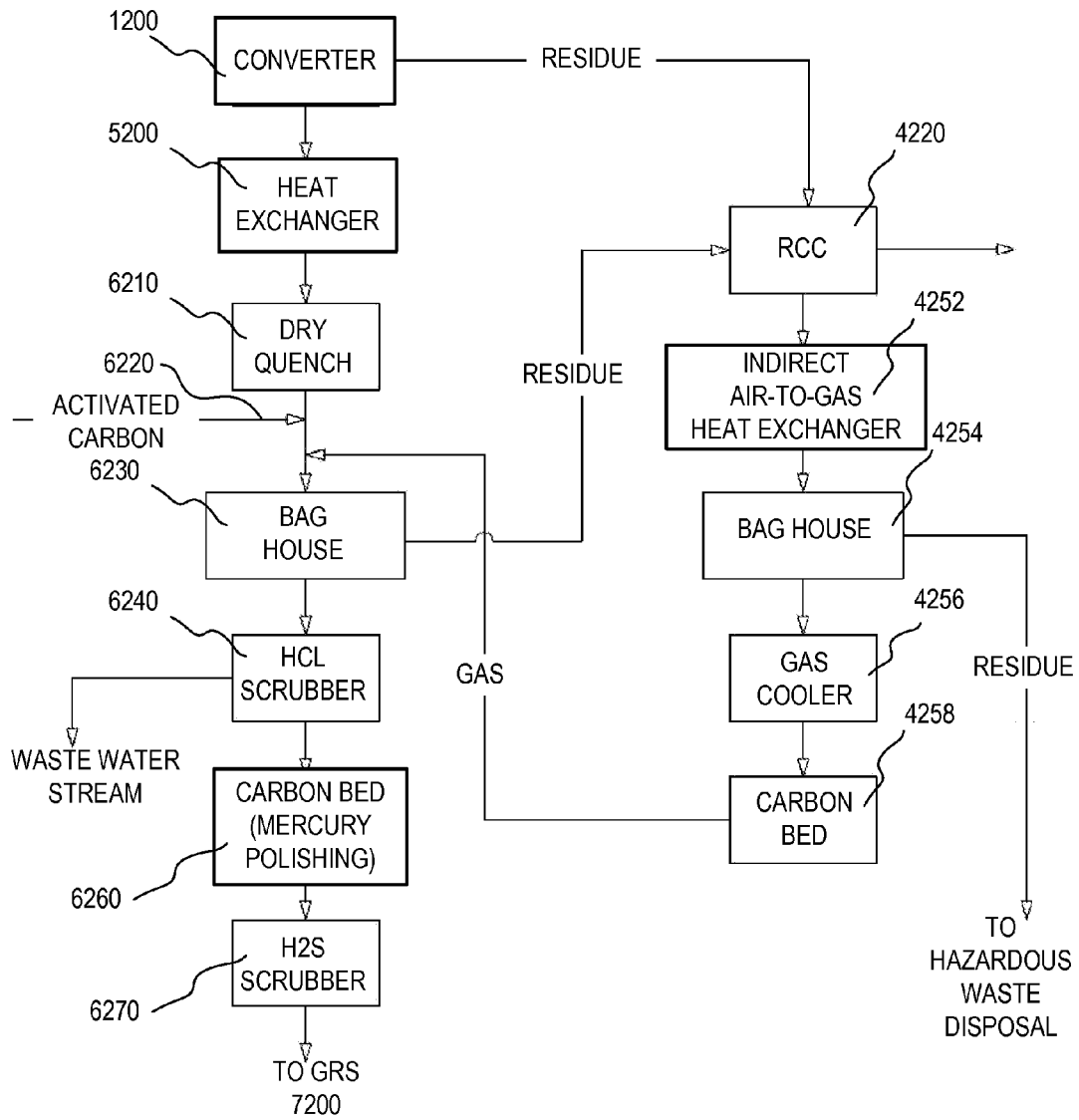
FIG. 59 depicts a process flow diagram of the entire system, and in particular the gas conditioning system (GCS).
Figure 60:
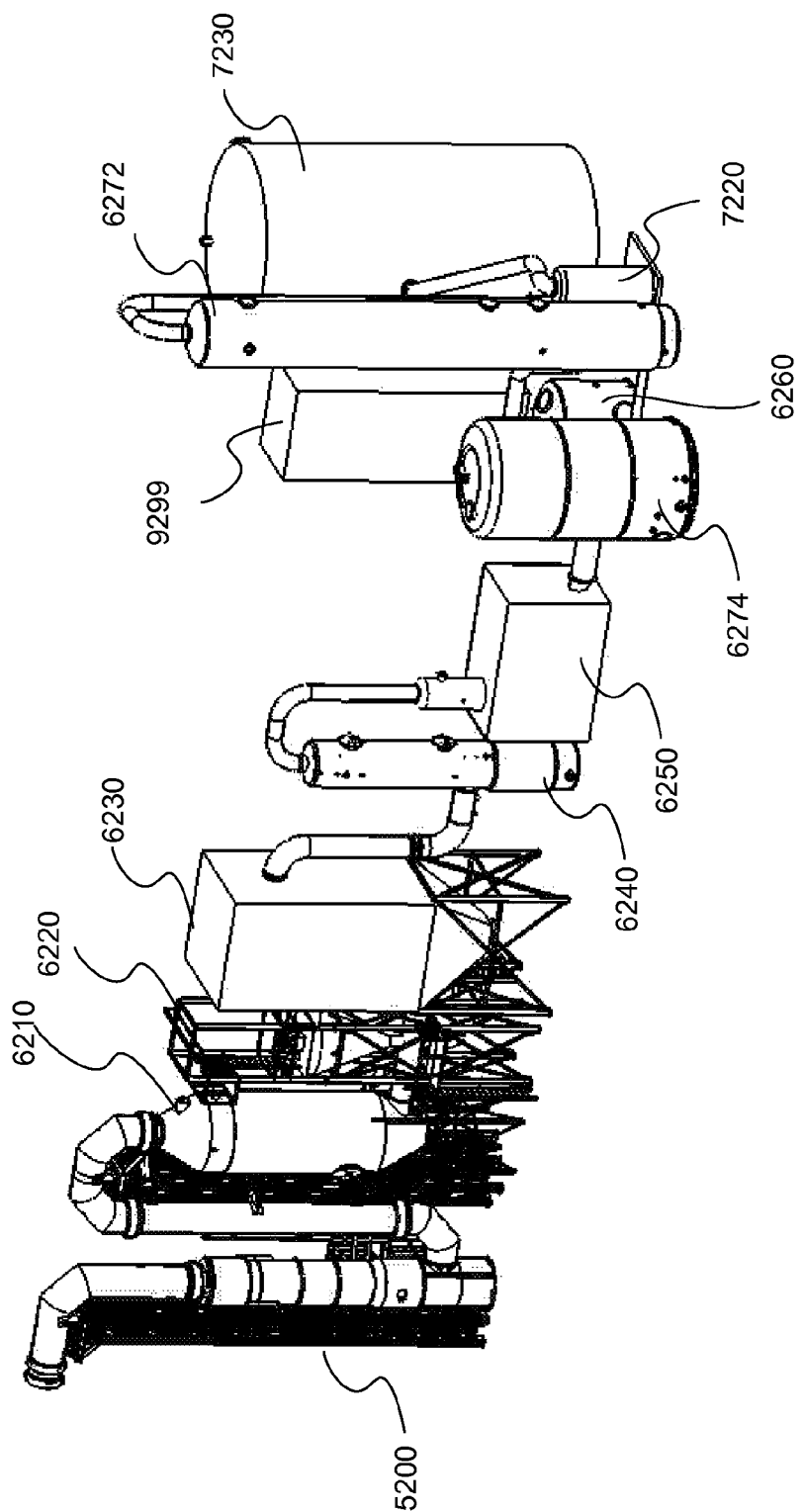
FIG. 60 depicts the setup of the gas conditioning system integrated with a syngas regulation system according to one embodiment of the present invention.
Figure 61:
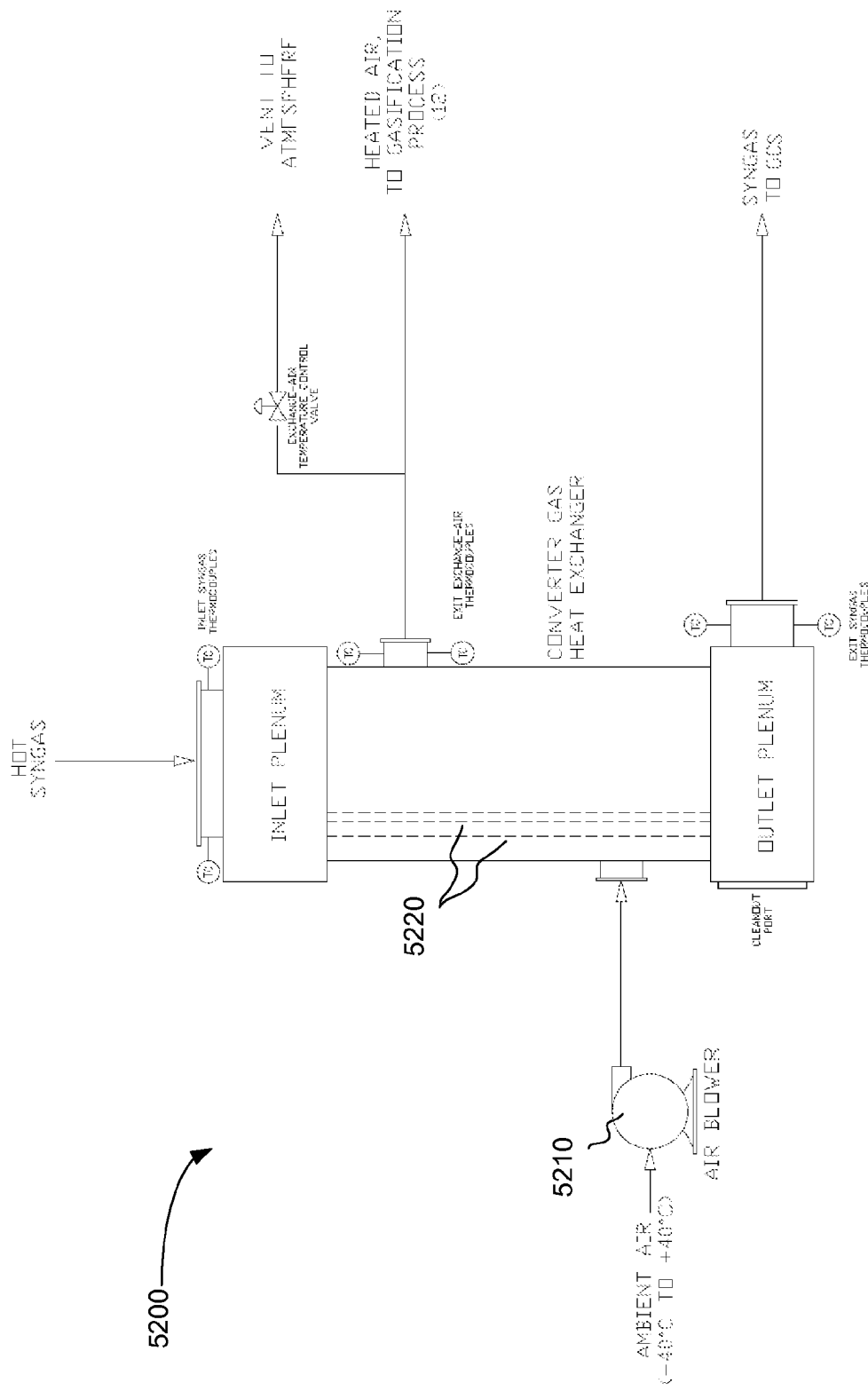
FIG. 61 is a more detailed drawing of the heat exchanger and shows the process air blower used for the control of the air input to the heat exchanger.

FIG. 59 shows a block diagram of the GCS 6200 implemented in our system. This is also an example of a converging process in which the GCS 6200 is integrated with the RGCS 4250. FIG. 60 shows a view of the layout of the GCS.

After initial cooling in the heat exchanger 5200, the input syngas is further cooled by dry quenching, which lowers the syngas temperature and also prevents condensation. This is achieved using an evaporative cooling tower (a.k.a 'dry quench') 6210 by direct injection of water into the gas stream in a controlled manner (adiabatic saturation). The water is atomized before it is sprayed co-currently into the syngas stream. As no liquid is present in the cooling, the process is also called dry quench. When the water is evaporated, it absorbs the sensible heat from syngas thus reducing its temperature from 740° C. to between 150° C. and 300° C. (typically about 250° C.). Controls are added to ensure that water is not present in the exiting gas. The relative humidity at the exiting gas temperature is therefore still below 100%.

Once the gas stream exits the evaporative cooling tower 6210, activated carbon, stored in a hopper, is pneumatically injected into the gas stream. Activated carbon has a very high porosity, a characteristic that is conducive to the surface adsorption of large molecular species such as mercury and dioxin. Therefore, most of the heavy metals (cadmium, lead, mercury etc.) and other contaminants in the gas stream are adsorbed on the activated carbon surface. The spent carbon granules are collected by the baghouse 6230 and recycled back to the RCS 4200 for further energy recovery as described in the next step. For obtaining efficient adsorption, it is necessary to ensure that the syngas has sufficient residence time in this stage. Other materials such as feldspar, lime, and other absorbents can also be used instead of, or in addition to, activated carbon in this dry injection stage 6220 to capture heavy metals and tars in the syngas stream without blocking it.

Particulate matter and activated carbon with heavy metal on its surface is then removed from the syngas stream in the baghouse 6230, with extremely high efficiency. The operating parameters are adjusted to avoid any water vapour condensation. All particulate matter removed from the syngas stream forms a filter cake which further enhances the efficiency of the baghouse 6230. So while new non-coated bags have a removal efficiency of 99.5%, the baghouse 6230 is typically designed for 99.9% particulate matter removal efficiency. The baghouse 6230 employs lined fiber glass bags, unlined fibre glass bags or P84 basalt bags and is operated at a temperature between 200° C. and 260° C.

Figure 62:
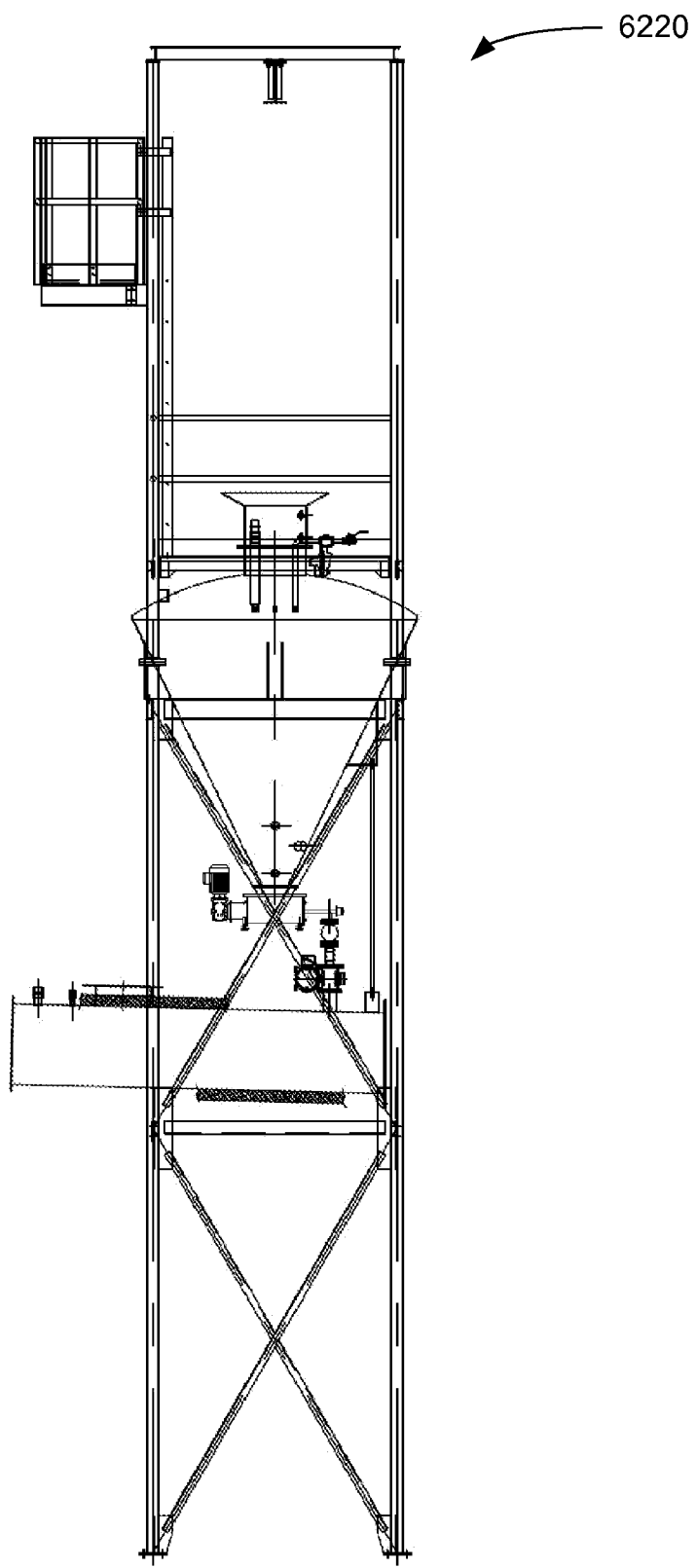
FIG. 62 depicts a dry injection system whereby carbon is held in a storage hopper and is fed into the syngas stream by rotating screw; the syngas stream pipe is angled so that carbon not entrained in the gas stream rolls into the baghouse.
Figure 63:
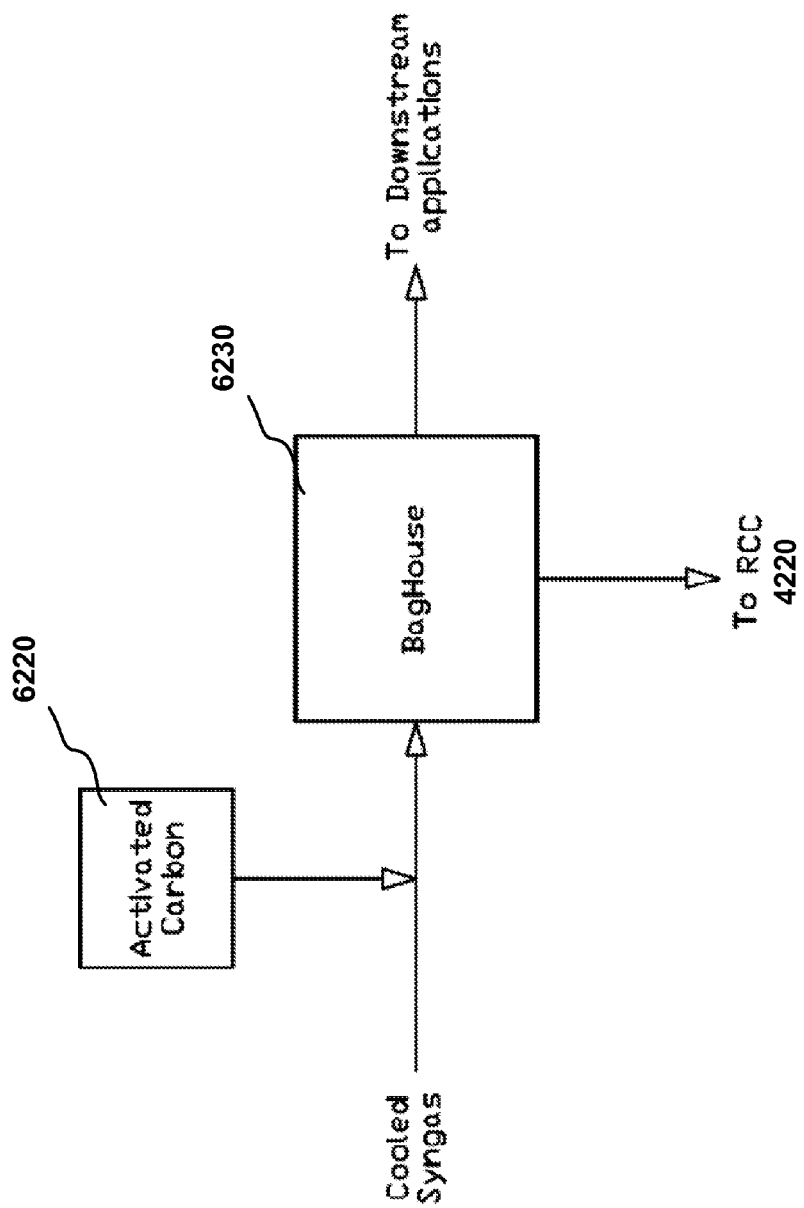
FIG. 63 presents an exemplary schematic diagram of the dry injection system in combination with the baghouse.

When the pressure drop across the baghouse 6230 increases to a certain set limit, nitrogen pulse-jets are used to clean the bags. Nitrogen is preferred to air for safety reasons. The residue falling from the outside surface of the bags are collected in the bottom hopper and are sent to the residue conditioner 4200 for further conversion or disposal. Special reagents can be used to absorb the high molecular weight hydrocarbon compounds (tars) in order to protect the baghouse 6230. FIGS. 63 & 62 shows the schematic and design of the baghouse respectively.

The baghouse uses cylindrical filters which do not require support. A typical operational specification of the baghouse 6230 (assuming the input is fly-ash with heavy metals) is as follows:

| | |
|---|---|
| Design Gas flow rate | 9500 Nm3/hr |
| Dust loading | 7.4 g/Nm3 |
| Cadmium | 2.9 mg/Nm3 |
| Lead | 106.0 mg/Nm3 |
| Mercury | 1.3 mg/Nm3 |

Guaranteed filtration system outlet:

| | |
|---|---|
| Particulate matter | 11 mg/Nm3 (about 99.9% removal) |
| Cadmium | 15 µg/Nm3 (about 99.65% removal) |
| Lead | 159 µg/Nm3 (about 99.9% removal) |
| Mercury | 190 µg/Nm3 (about 90% removal) |

The quantity of residue contaminated with heavy metals exiting the baghouse 6230 is large. Therefore, as shown in FIG. 59, this residue is sent to the plasma-based RCC 4220 for conversion into vitreous slag 4203. The secondary gas stream created in the RCC 4220 is then treated in a separate residue gas conditioner (RGCS) 4250 with the following Stage 1 processes: cooling in an indirect air-to-gas heat exchanger 4252 and removal of particulate matter and heavy metals in a smaller baghouse 4254. The smaller baghouse 4254 is dedicated to treating the secondary gas stream generated in the RCC 4220. As shown in FIG. 59, additional steps carried out by the RGCS 4250 include cooling the gas further using a gas cooler 4256, and removing heavy metals and particulate matter in a carbon bed 4258. The processed secondary syngas stream is then diverted back to the GCS 6200 to feed back into the primary input syngas stream prior to the baghouse filter 6230.

The quantity of residue removed from the bag-house 4254 of the RGCS 4250 is significantly less compared to the baghouse 6230 in the GCS 6200. The small baghouse 4254 acts as a purge for the heavy metals. The amount of heavy metals purged out of the RGCS 4250 will vary depending on MSW feed composition. A periodic purge is required to move this material to hazardous waste disposal, when the heavy metals build-up to a specified limit.

Below is a typical design specification for the smaller RGCS baghouse 4254, once again assuming that the input is fly-ash with heavy metals:

| | |
|---|---|
| Design Gas flow rate | 150 Nm3/hr |
| Dust loading | 50 g/Nm3 |
| Cadmium | 440 mg/Nm3 |
| Lead | 16.6 mg/Nm3 |
| Mercury | 175 mg/Nm3 |

Guaranteed filtration system outlet:

| | |
|---|---|
| Particulate matter | 10 mg/Nm3 (about 99.99% removal) |
| Cadmium | 13 µg/Nm3 (about 99.997% removal) |
| Lead | 166 µg/Nm3 (about 99.999% removal) |
| Mercury | 175 µg/Nm3 (about 99.9% removal) |

The GCS 6200 may comprise direct and indirect feedback or monitoring systems. In our implementation, both the GCS and RGCS baghouse filters have a dust sensor on the exit (direct monitoring) to notify of a bag rupture. If a bag rupture occurs, the system is shutdown for maintenance. Optionally, the water stream in the HCl scrubber 6240 can be analyzed at start-up to confirm particulate matter removal efficiency.

The particulate-free syngas stream exiting from the baghouse 6230 is scrubbed in a packed tower using a re-circulating alkaline solution to remove any HCl present. This HCl scrubber 6240 also provides enough contact area to cool down the gas to about 35° C. A carbon bed filter 6260 is used to separate the liquid solution from potential soluble water contaminants, such as metals, HCN, ammonia etc. The HCl scrubber 6240 is designed to keep the output HCl concentration at about 5 ppm. A waste water bleed stream is sent to a waste water storage tank 6244 for disposal.

Figure 64:
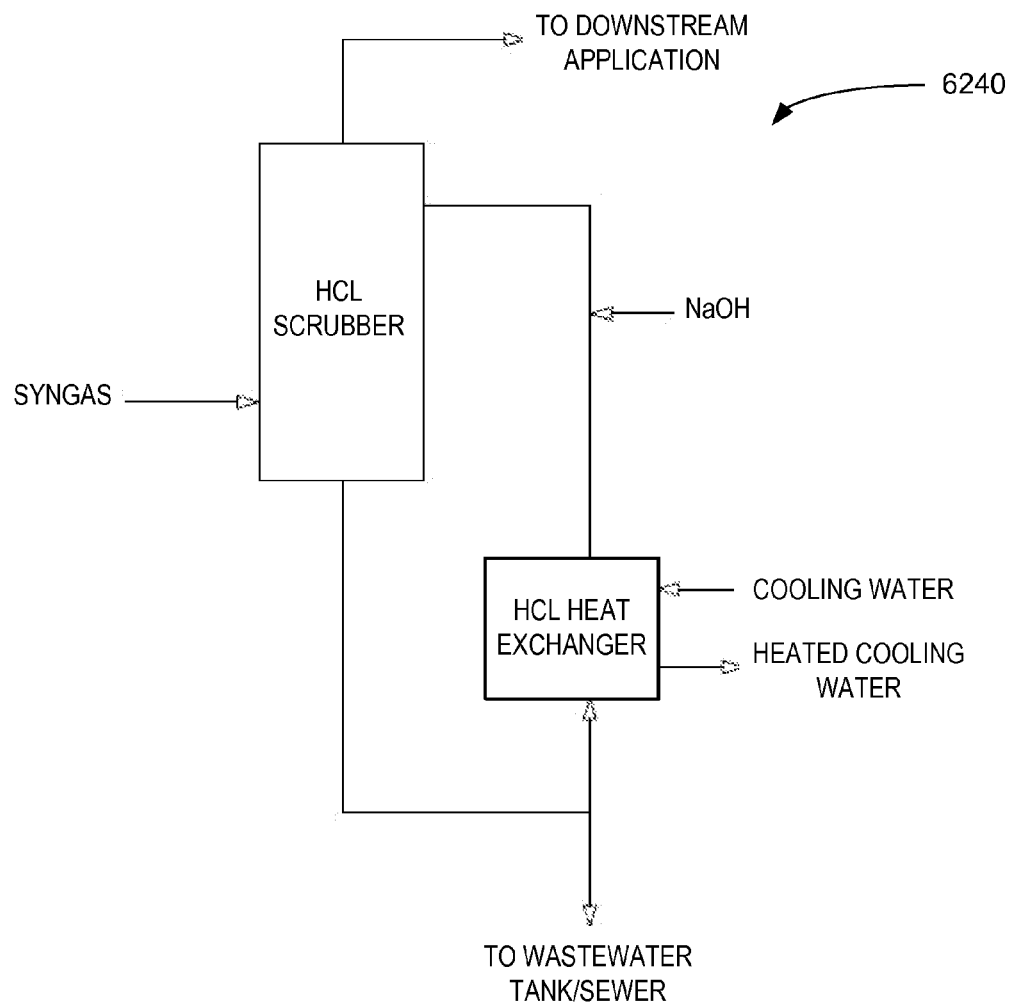
FIG. 64 presents an exemplary schematic diagram of the HCl scrubber and associated components.
Figure 65:
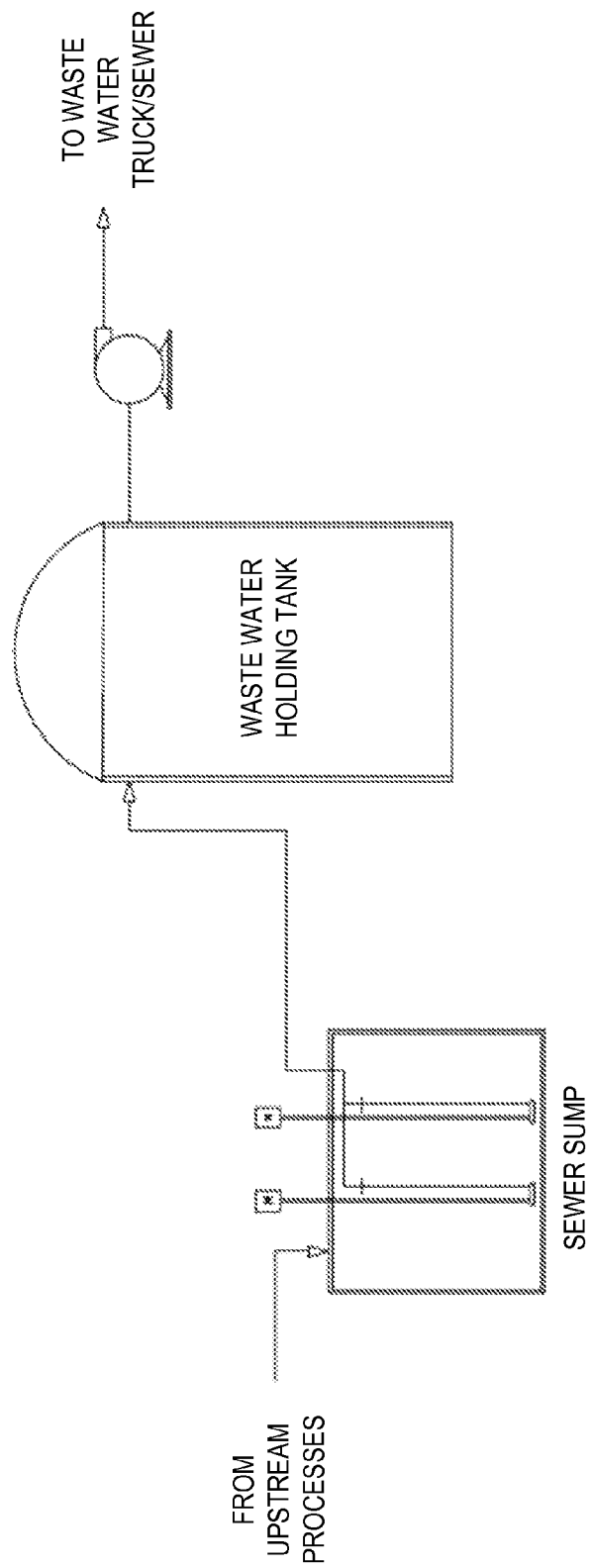
FIG. 65 shows a system for collecting and storing waste water from the gas conditioning system.

For metallurgical considerations, the HCl scrubber 6240 is located upstream of the gas blower 6250. An exemplary schematic diagram of an HCl scrubber 6240 including associated components such as heat exchangers 6242 is shown in FIG. 64. FIG. 65 shows an exemplary system for collecting and storing waste water from the GCS 6200. A carbon bed 6245 is added to the water blowdown to remove tars and heavy metals from the wastewater. Typical specification for the HCl scrubber 6240 is as follows:

| | |
|---|---|
| Design Gas flow rate | 9500 Nm3/hr |
| Normal Inlet/Max HCl loading to scrubber | 0.16%/0.29% |
| HCl outlet concentration | 5 ppm |

Figure 29:
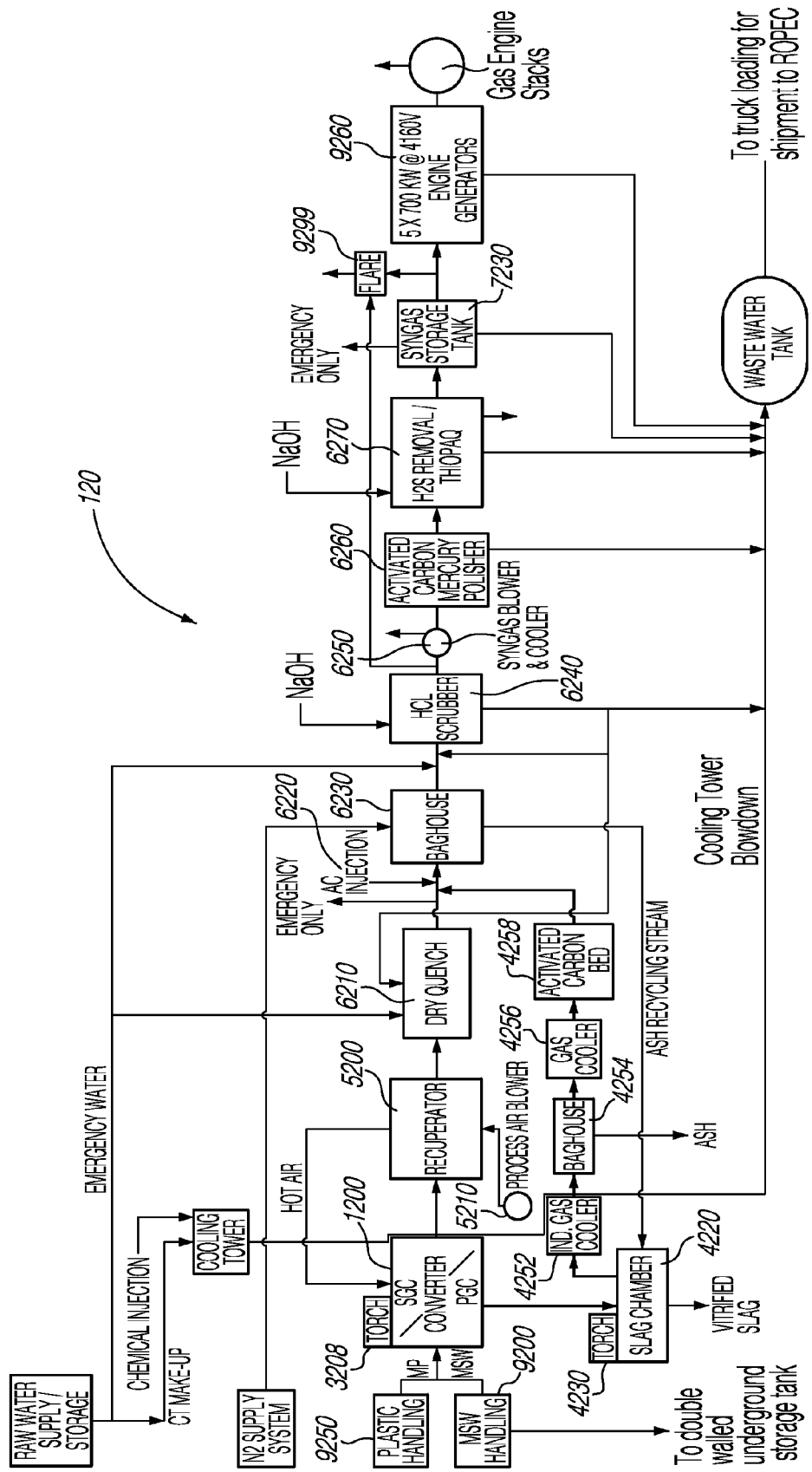
FIG. 29 is an overview process flow diagram of a low-temperature gasification facility incorporating an exemplary gas conditioning system according to one embodiment of the invention, integrated with downstream gas engines.

After HCl removal, a gas blower 6250 is employed which provides the driving force for the gas through the entire system 120 from the converter 1200 to the gas engines 9260 downstream. The blower 6250 is located upstream of the mercury polisher 6260 as the latter has a better mercury removal efficiency under pressure. This also reduces the size of the mercury polisher 6260. FIG. 29 shows a schematic of the entire system 120 and the position of the process gas blower 6250.

The blower 6250 is designed using all upstream vessel design pressure drops. It is also designed to provide the required pressure for downstream equipment pressure losses to have a final pressure of ~2.1 to 3.0 psig (typically 2.5 psig) in the HC 7230. As the gas is pressurized when passing through the blower 6250, its temperature rises to about 77° C. A built-in gas cooler 6252 is used to reduce the temperature back to 35° C., as maximum operating temperature of the $H_2S$ removal system 6270 is about 40° C.

A carbon bed filter 6260 is used as a final polishing device for any heavy metal remaining in the syngas stream. Its efficiency is improved when the system is under pressure instead of vacuum, is at lower temperature, gas is saturated, and when the HCl is removed so that is does not deteriorate the carbon. This process is also capable of absorbing other organic contaminants, such as dioxins from the syngas stream if present. The carbon bed filter 6260 is designed for over 99% mercury removal efficiency. The performance of this system is measured by periodically analyzing the gas for mercury. Corrections are made by modifying the carbon feed rate and monitoring the pressure drop across the polisher 6260, and by analyzing the carbon bed efficiency via sampling.

Typical specification for the carbon bed filter 6260 is as follows:

| | |
|---|---|
| Design Gas flow rate | 9500 Nm3/hr |
| Normal/Max Mercury loading | 190 µg/Nm3/1.3 mg/Nm3 |
| Carbon bed life | 3-5 years |
| Guaranteed mercury carbon bed outlet | 19 µg/Nm3 (99%) |

Figure 66:
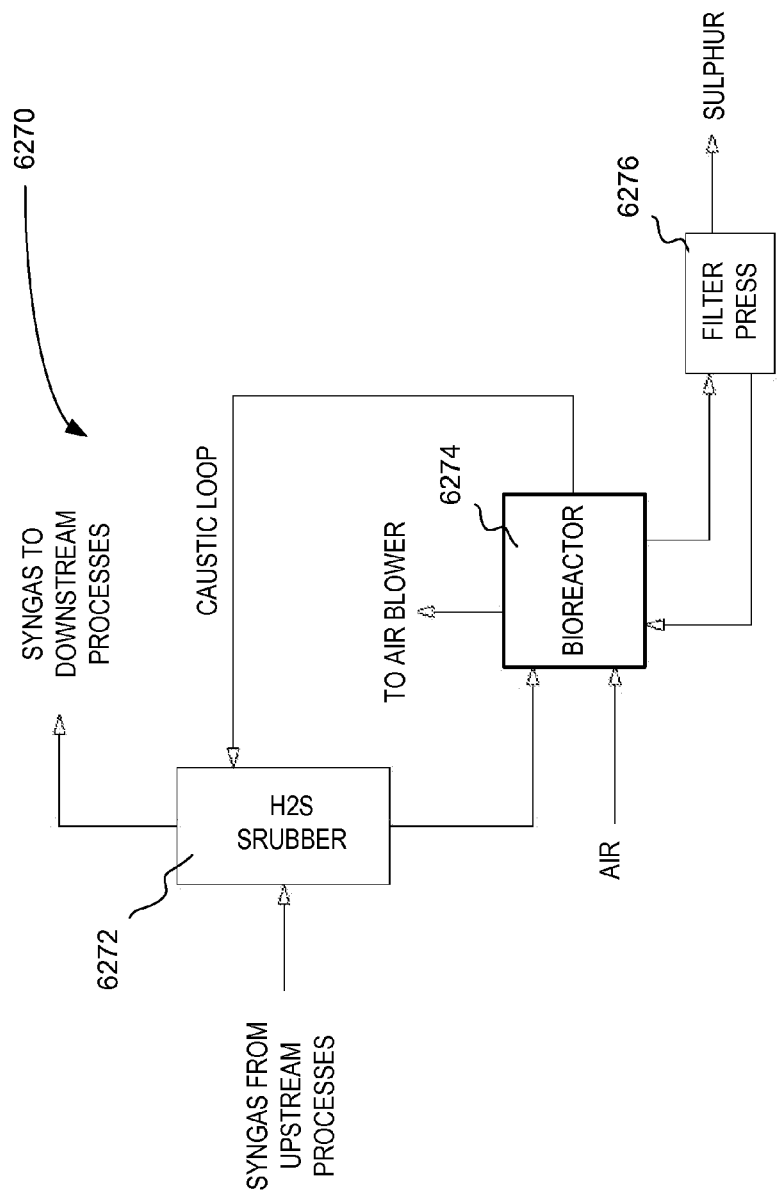
FIG. 66 depicts a process flow diagram of an $H_2S$ removal process using a Thiopaq-based bioreactor, in accordance with one embodiment of the invention.
Figure 67:
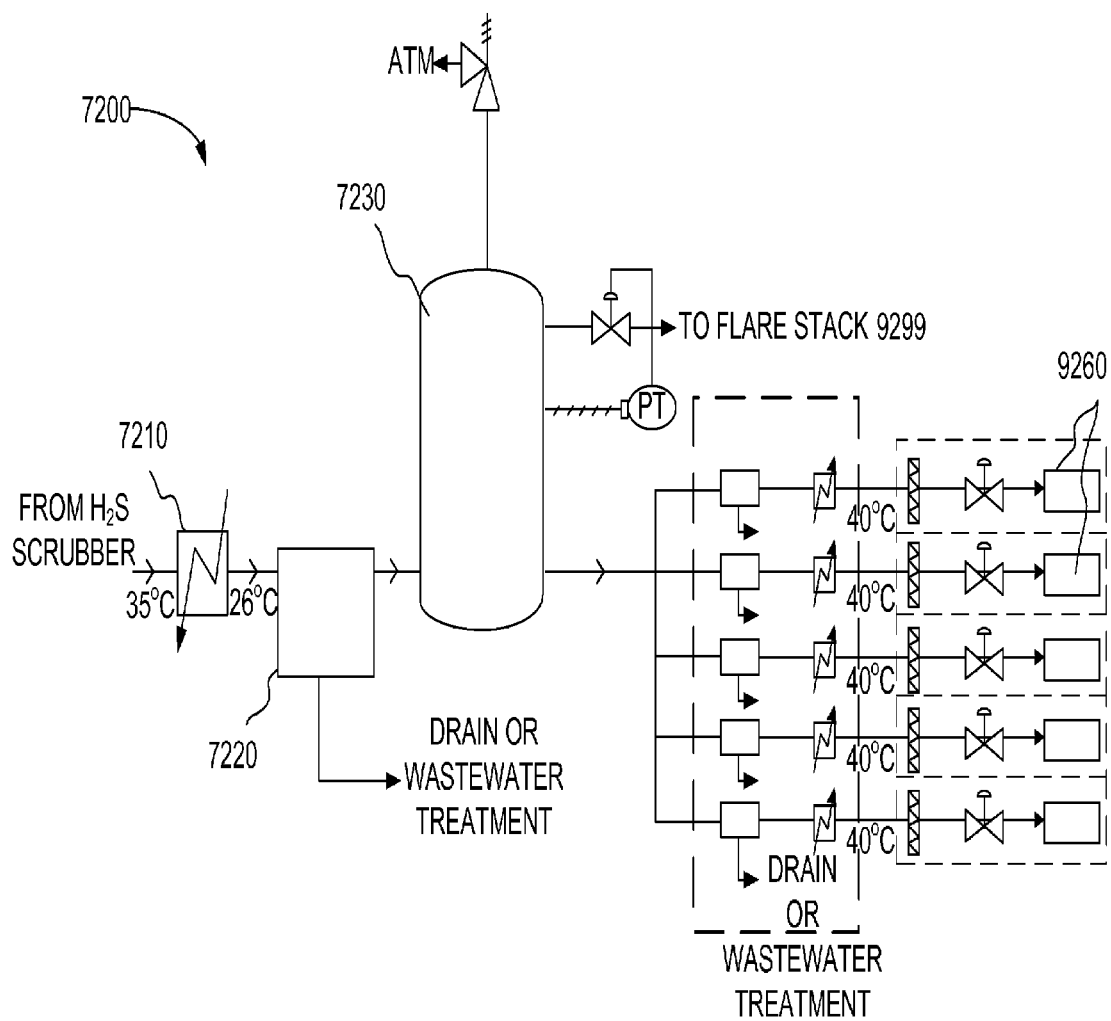
FIG. 67 is an illustration of a gas homogenization system, in accordance with one embodiment of the invention, where gas is delivered from a single source to a single homogenization chamber and then delivered to multiple engines, each engine having its own gas/liquid separator and heater.

The $H_2S$ removal system 6270 was based on $SO_2$ emission limitation outlined in A7 guide lines of the Ministry of Environment, Ontario, Canada, which states that syngas being combusted in the gas engines will produce $SO_2$ emission below 15 ppm. The $H_2S$ removal system 6270 was designed for an output $H_2S$ concentration of about 20 ppm. FIG. 66 shows the details of the $H_2S$ removal system 6270.

The Shell Paques Biological technology was selected for $H_2S$ removal 6270. This technique consists of two steps: First, syngas from the carbon bed filter 6260 passes through a scrubber 6272 where $H_2S$ is removed from syngas by re-circulating an alkaline solution. Next, the sulphur containing solution is sent to a bioreactor 6274 for regeneration of alkalinity, oxidation of sulfide into elemental sulphur, filtration of sulphur, sterilization of sulphur and bleed stream to meet regulatory requirements. The $H_2S$ removal system 6270 is designed for 20 ppm $H_2S$ outlet concentration.

Thiobacillus bacteria are used in the bioreactor 6274 to converts sulfides into elemental sulphur by oxidation with air. A control system 8200 controls the air flow rate into the bio-reactor to maintain sulphur inventory in the system. A slip stream of the bio reactor 6274 is filtered using a filter press 6276. Filtrate from filter-press 6276 is sent back to the process, a small stream from this filtrate is sent as a liquid bleed stream. There are two sources of discharge; one solid discharge—sulphur with some biomass and one liquid discharge—water with sulphate, carbonate and some biomass. Both streams are sterilized before final disposal.

Typical specification for the $H_2S$ removal system 6270 is as follows:

| | |
|---|---|
| Design Gas flow rate | 8500 Nm3/hr |
| Normal/Max $H_2S$ loading | 353 ppm/666 ppm |
| Guaranteed $H_2S$ outlet for system | 20 ppm |

After the $H_2S$ removal, a chiller 7210 is used to condense the water out of the syngas and reheat it to a temperature suitable for use in the gas engines 9260. The chiller 7210 sub-cools the gas from 35° C. to 26° C. The water condensed out from the input gas stream is removed by a gas/liquid separator 7220. This ensures that the gas has a relative humidity of 80% once reheated to 40° C. (engine requirement) after the gas storage prior to being sent to the gas engines 9260.

The following table gives the major specifications of the entire GCS 6200:

| | |
|---|---|
| Quench Tower 6210 | quench gas from 740° C. to 200° C. in 2 sec residence time |
| Dry Injection 6220 | 90% mercury removal efficiency |
| Baghouse Filter 6230 | 99.9% Particulate removal efficiency |
| | 99.65% Cadmium removal efficiency |
| | 99.9% Lead removal efficiency |
| HCl Scrubber 6240 | 99.8% HCl removal efficiency |
| Gas Blower 6250 | Zero leak seal rotary blower |
| Gas Cooler 6252 | 0.5 MBtu/hr cooling load |
| Carbon Bed Filter 6260 | 99% mercury removal efficiency |
| $H_2S$ Scrubber 6270 | $H_2S$ at scrubber outlet - 20 ppm |
| Bioreactor 6274 | Maximum regeneration efficiency with minimum blow-down |
| Filter Press 6276 | 2 days sulphur removal capacity |
| Homogenization Chamber 7230 | 2 min gas storage capacity |

As noted above, the GCS 6200 converts an input gas to an output gas of desired characteristics. FIG. 59 depicts an overview process flow diagram of this GCS system 6200 which is integrated with a plasma gasification system and downstream application. Here, the secondary gas stream generated in the RCS 4200 is fed into the GCS 6200.

The Residue Gas Conditioner (RGCS)

As mentioned earlier, the residue from the GCS baghouse 6230 which may contain activated carbon and metals is purged periodically by nitrogen and conveyed to the RCC 4220, where it is vitrified. The gas coming out of the RCC 4220 is directed through a residue gas conditioner (RGCS) 4250 baghouse 4254 to remove particulates and is cooled by a heat exchanger 4256 before entering an activated carbon bed 4258. The baghouse 4254 is also periodically purged based on pressure drop across the system. The residue collected in the RGCS baghouse 4254 is disposed by appropriate means. The combustible gas exiting from the RGCS 4250 as a secondary gas stream is sent back to the main GCS system 6200 to fully utilize the recovered energy.

Syngas Regulation System

The cleaned and cooled syngas from the GCS 6200 enters a syngas regulation system 7200 designed (SRS) to ensure that the syngas flowing to the downstream gas engines 9260 is of consistent gas quality. The SRS 7200 serves to smooth out short-term variations in gas composition (primarily its low heating value—LHV) and its pressure. While the downstream gas engines 9260 will continue to run and produce electricity even with short-term variations in the LHV or pressure of the syngas, it may deviate from its threshold emission limits due to poor combustion or poor fuel to air ratio.

The SRS 7200 comprises a chiller 7210, a gas/liquid separator 7220 and a homogenization chamber (HC) 7230. The gas is heated on the exit of the gas storage prior to the gas engines 9260 to meet engine temperature requirements.

Two types of homogenization chambers (HC) are available: a fixed volume HC and a variable volume HC. The latter is typically more useful to reduce flow and pressure fluctuation while the former is more useful to reduce LHV fluctuations. LHV fluctuations are more prominent in our application due to the nature of the MSW feedstock. A fixed volume HC is also typically more reliable than variable volume in terms of its construction and maintenance.

Figure 68:
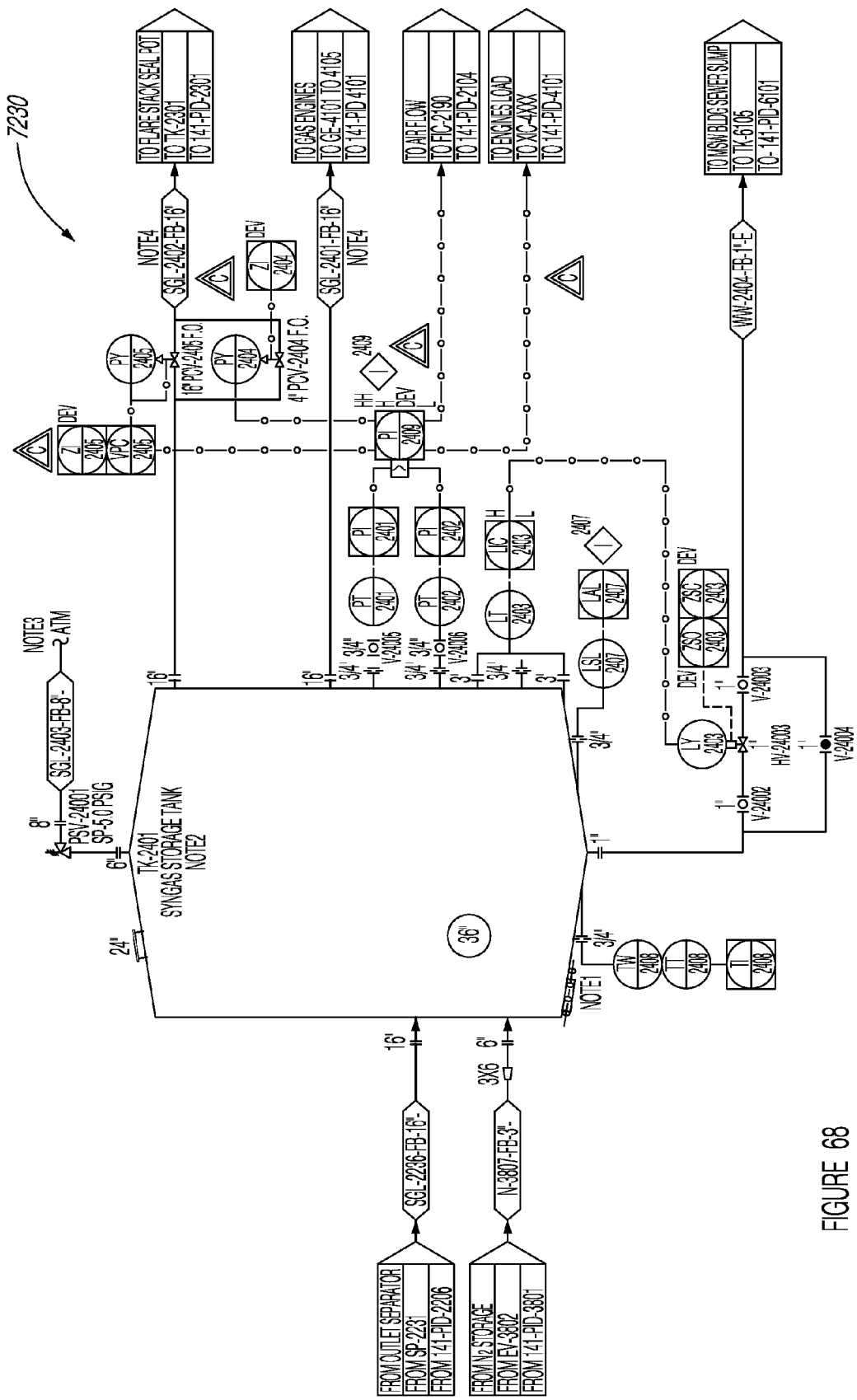
FIG. 68 is an illustration of a fixed-volume homogenization chamber, in accordance with an embodiment of the invention.

FIG. 68 show the schematic of the homogenization chamber (HC) 7230 used in this implementation. It is designed to hold about 2 minutes of syngas flow. This hold up time meets the gas engine guaranteed norms on LHV fluctuation specifications of about 1% LHV fluctuation/30 sec. The residence time up to the gas analyzer 8130 is typically about 30 sec (including analysis and feedback). The maximum LHV fluctuation is typically about 10%. Thus, to average this out and get 3% LHV fluctuation, >1.5 min storage is needed. The 2 min storage allows for some margin.

The HC 7230 is operated at a range of 2.2 to 3.0 psig to meet the fuel specifications of the downstream gas engines 9260. The exiting gas pressure is kept constant using a pressure control valve. The HC 7230 is designed for a maximum pressure of 5 psig and a relief valve is installed to handle unusual overpressure scenarios.

The 2 min hold up time of the HC 7230 also provides enough storage to reduce pressure fluctuations. For our design, the allowable pressure fluctuation for the gas engine 9260 is 0.145 PSI/sec. In the case of a downstream failure of the gas engine 9260, a buffer may be required (depending on control system response time and 30-35 sec gas resident times) to provide time to slow down the process or to flare the excess gas.

Typical syngas flow rate into the HC 7230 is at ~8400 Nm3/hr. Therefore, for a hold up time of 2 min, the HC's volume has to be about 280 m3.

The HC 7230 is free-standing and is located outside where it will be exposed to snow, rain and wind. Therefore, the dimensions of the HC 7230 are designed to meet mechanical engineering requirements. Its support structure 7232 interfaces with a concrete foundation.

As some water will condense out of the syngas, a bottom drain nozzle is included in the design of the HC 7230. To assist in the drainage of the HC 7230, its bottom is intentionally designed to not be flat, but as a conical bottom with a skirt. Traced/insulated drain piping is used to form the drain flange. As the water within the HC 7230 has to gravity drain to the floor drain, the HC 7230 is kept slightly elevated. The HC 7230 is designed to meet the following design requirements.

| | |
|---|---|
| Normal/Maximum Inlet Temperature | 35° C./40° C. |
| Normal/Maximum Operating Pressure | 1.2 psig/3.0 psig |

-continued

| | |
|---|---|
| Normal/Maximum Gas Inlet Flow Rate | 7000 Nm³/hr/8400 Nm³/hr |
| Normal/Maximum Gas Outlet Flow Rate | 7000 Nm³/hr/8400 Nm³/hr |
| Relative Humidity | 60%-100% |
| Storage Volume | 290 m³ |
| Mechanical Design Temperature | −40° C. to 50° C. |
| Mechanical Design Pressure | 5.0 psig |

The material used for the HC 7230 has to take into account both the mechanical design requirements above and the typical gas composition given below. Corrosion is particularly a concern due to the presence of water, HCl, and $H_2S$.

| | |
|---|---|
| $N_2$ | 47.09% |
| $CO_2$ | 7.44% |
| $H_2S$ | 20 ppm |
| $H_2O$ | 3.43% |
| CO | 18.88% |
| $H_2$ | 21.13% |
| $CH_4$ | 0.03% |
| HCl | 5 ppm |

The following openings are provided in the HC 7230:
One 36" manhole near the bottom for accessibility;
One 6" flange at the top for relief;
One 16" flange on the shell for gas inlet;
One 16" flange on the shell for gas outlet;
Six 1" flanges on the shell (2 for pressure, 1 for temperature and 3 as spares);
One 2" flange at the bottom of HC (drain); and
One 1" flange on the bottom cone for level switches.

In addition to satisfying the design requirements, the HC 7230 also provides:
Openings, manhole covers, and blind flanges for all spare nozzles.
A ladder allowing safe access, (e.g. with railing) to the roof and relief valve.
Required lifting hooks and anchor bolts.
A concrete ring wall.
Interior and exterior coatings of the HC 7230, if required.
Insulation and heat tracing of the bottom of the HC 7230.
A concrete slab for support.

The gas engine 9260 design requires that the inlet gas be of a specific composition range at a specified relative humidity. Therefore, the cleaned gas that exits the $H_2S$ scrubber 6270 is sub-cooled from 35° C. to 26° C. using a chiller 7210. Any water that is formed due to the condensation of the gas stream is removed by the gas/liquid separator 7220. This ensures that the syngas has a relative humidity of 80% once reheated to 40° C., a typical requirement for gas engines 9260.

A gas blower 6250 is used to withdraw syngas from the system by providing adequate suction through all the equipment and piping as per specifications below. The blower design took heed to good engineering practice and all applicable provincial and national codes, standards and OSHA guidelines. Operation of the blower 6250 was at about 600 Volts, 3 phase, and 60 Hz.

The gas blower 6250 was designed to meet following functional requirements.

| | |
|---|---|
| Normal gas inlet temperature | 35 C. |
| Normal gas suction pressure | −1.0 psig |
| Normal gas flow rate | 7200 Nm3/hr |
| Maximum gas flow rate | 9300 Nm3/hr |

-continued

| | |
|---|---|
| Maximum gas suction temperature | 40 C. |
| Normal discharge pressure | 3.0 psig |
| Normal discharge temperature (after gas cooler) | <35 C. |
| Mechanical design pressure | 5.0 psig |
| Relative Humidity of gas at blower inlet | 100% |
| Gas Molecular Weight | 23.3 |
| Cooling water supply temperature (product gas cooler) | 29.5 C. |
| Maximum acceptable gas discharge temperature (after product gas cooler) | 40 C. |
| Turn down ratio | 10% |

The typical gas composition (wet basis) drawn is as follows:

| | |
|---|---|
| $CH_4$ | 0.03% |
| CO | 18.4% |
| $CO_2$ | 7.38% |
| $H_2$ | 20.59% |
| Normal/Max $H_2S$ | 354/666 ppm |
| $H_2O$ | 5.74% |
| Normal/Max HCl | 5 ppm/100 ppm |
| $N_2$ | 47.85% |

As the syngas is flammable and creates an explosive mixture with air, the blower 6250 is configured such that there is minimal to no air intake from the atmosphere, and minimal to no gas leak to the atmosphere. All service fluids, i.e., seal purges are done with nitrogen and a leak-free shaft seal is used. Advanced leak detection systems are employed to monitor leaks in either direction.

In addition to the design criteria above, the blower 6250 also provides:
An explosion proof motor with leak-free blower shaft seal.
A gas cooler 6252.
A silencer with acoustic box to meet noise regulation of 80 dBA at 1 m.
A common base plate for the blower and motor.
An auxiliary oil pump with motor, and all required instrumentations for blower auxiliary system.
All instruments and controls (i.e. low and high oil pressure switch, high discharge pressure and temperature switch, differential temperature and pressure switch). All switches are CSA approved discharge pressure gauge, discharge temperature gauge, oil pressure and temperature gauge. All instruments are wired at a common explosion proof junction box and the VFD is controlled by a pressure transmitter installed upstream of the blower.
A zero leaks discharge check valve.
Equipment safety system to prevent blower from excessive pressure/vacuum/shut off discharge (e.g. systems like PRV and recycle line).

As the gas blower 6250 is located outside the building, exposed to rain, snow and wind. The gas blower 6250 is configured to withstand the following environmental conditions.

| | |
|---|---|
| Elevation above mean sea level | 80 m |
| Latitude | 45° 24' N |
| Longitude | 75° 40' W |
| Average atmospheric pressure | 14.5 psia |
| Maximum summer dry bulb temperature | 38° C. |
| Design summer dry bulb temperature | 35° C. |
| Design summer wet bulb temperature | 29.4° C. |

| | |
|---|---|
| Minimum winter dry bulb temperature | 36.11° C. |
| Mean wind velocity | 12.8 ft/sec |
| Maximum wind velocity | 123 ft/sec |
| Design wind velocity | 100 mph/160 kph |
| Prevailing wind direction | Mainly from south and west |
| Seismic Information | Zone 3 |

Since the blower 6250 works in an environment where explosive gases may be present, all instruments and electrical devices installed on syngas pipes or within about 2 meter distance are designed for the classification of Class 1, zone 2.

For ensuring reliability, proper access for inspection and maintenance is provided, as is access to isolate and correct faults quickly. While the blower 6250 can be operated continuously (24/7), frequent start/stop operation is more common during process stabilization are contemplated.

The material of construction was chosen based on design conditions and gas composition. For example, electrical circuit boards, connectors and external components were coated or otherwise protected to minimize potential problems from dirt, moisture and chemicals. Control panels and switches are of robust construction, designed to be operated by personnel with work gloves.

Generally, variable speed drive (VSD) with a flow range of 10% to 100% is employed for motor control. Over-voltage and overload protection are included. The motor status, on/off operation and change of speed are monitored and controlled remotely through the distributed control system (DCS).

Once the regulated gas exits the HC 7230, it is heated to the engine requirement and directed to the gas engines 9260.

Gas Engines

Five reciprocating GE Jenbacher gas engines 9260 with 1 MW capacity each are used to produce electricity. So, the full capacity of electricity generation is 5 MW. Optionally, any of the gas engines 9260 can be turned off depending on the overall requirements. The gas engine 9260 is capable of combusting low or medium heating value syngas with high efficiency and low emissions. However, due to the relatively low gas heating value (as compared to fuels such as natural gas) the gas engines 9260 have been de-rated to operate around 700 kW at their most efficient operating point.

Flare Stack

An enclosed flare stack 9299 will be used to burn syngas during start-up, shut-down and process stabilization phases. Once the process has been stabilized the flare stack 9299 will be used for emergency purposes only. The flare stack 9299 is designed to achieve a destruction efficiency of about 99.99%.

Control System

In this implementation, the gasification system 120 of the present example comprises an integrated control system for controlling the gasification process implemented therein, which may include various independent and interactive local, regional and global processes. The control system may be configured to enhance, and possibly optimise the various processes for a desired front end and/or back end result.

A front-to-back control scheme could include facilitating the constant throughput of feedstock, for example in a system configured for the gasification of MSW, while meeting regulatory standards for this type of system. Such front-to-back control scheme could be optimised to achieve a given result for which the system is specifically designed and/or implemented, or designed as part of a subset or simplified version of a greater control system, for instance upon start-up or shut-down of the process or to mitigate various unusual or emergency situations.

A back-to-front control scheme could include the optimisation of a product gas quality or characteristic for a selected downstream application, namely the generation of electricity via downstream gas engines 9260. While the control system could be configured to optimise such back-end result, monitoring and regulation of front-end characteristics could be provided in order to ensure proper and continuous function of the system in accordance with regulatory standards, when such standards apply.

The control system may also be configured to provide complimentary results which may be best defined as a combination of front-end and back-end results, or again as a result flowing from any point within the system 120.

In this implementation, the control system is designed to operate as a front-to-back control system upon start-up of the gasification process, and then progress to a back-to-front control system when initial start-up perturbations have been sufficiently attenuated. In this particular example, the control system is used to control the gasification system 120 in order to convert feedstock into a gas suitable for a selected downstream application, namely as a gas suitable for consumption by a gas engine 9260 in order to generate electricity. In general, the control system generally comprises one or more sensing elements for sensing various characteristics of the system 120, one or more computing platforms for computing one or more process control parameters conducive to maintaining a characteristic value representative of the sensed characteristic within a predetermined range of such values suitable for the downstream application, and one or more response elements for operating process devices of the gasification system 120 in accordance with these parameters.

For example, one or more sensing elements could be distributed throughout the gasification system 120 for sensing characteristics of the syngas at various points in the process. One or more computing platforms communicatively linked to these sensing elements could be configured to access characteristic values representative of the sensed characteristics, compare the characteristic values with predetermined ranges of such values defined to characterise the product gas as suitable for the selected downstream application, and compute the one or more process control parameters conducive to maintaining these characteristic values within these predetermined ranges. The plurality of response elements, operatively linked to one or more process devices and/or modules of the gasification system operable to affect the process and thereby adjust the one or more characteristics of the product gas, can be communicatively linked to the one or more computing platforms for accessing the one or more computed process control parameters, and configured to operate the one or more processing devices in accordance therewith.

The control system may also be configured to provide for an enhanced front-end result, for example, for an enhanced or constant consumption and conversion rate of the input feedstock, or again as part of start-up, shut-down and/or emergency procedure, or again, configured to implement the process of the gasification system 120 so to achieve a predetermined balance between front-end benefits and back-end benefits, for instance enabling the conversion of the feedstock to produce a product gas suitable for a selected downstream application, while maximising throughput of feedstock through the converter. Alternative or further system enhancements could include, but are not limited to, optimising the system energy consumption, for instance to minimise an energetic impact of the system and thereby maximise energy production via the selected downstream application, or for favouring the production of additional or alternative downstream products such as consumable product gas(es), chemical compounds, residues and the like.

Figure 69:
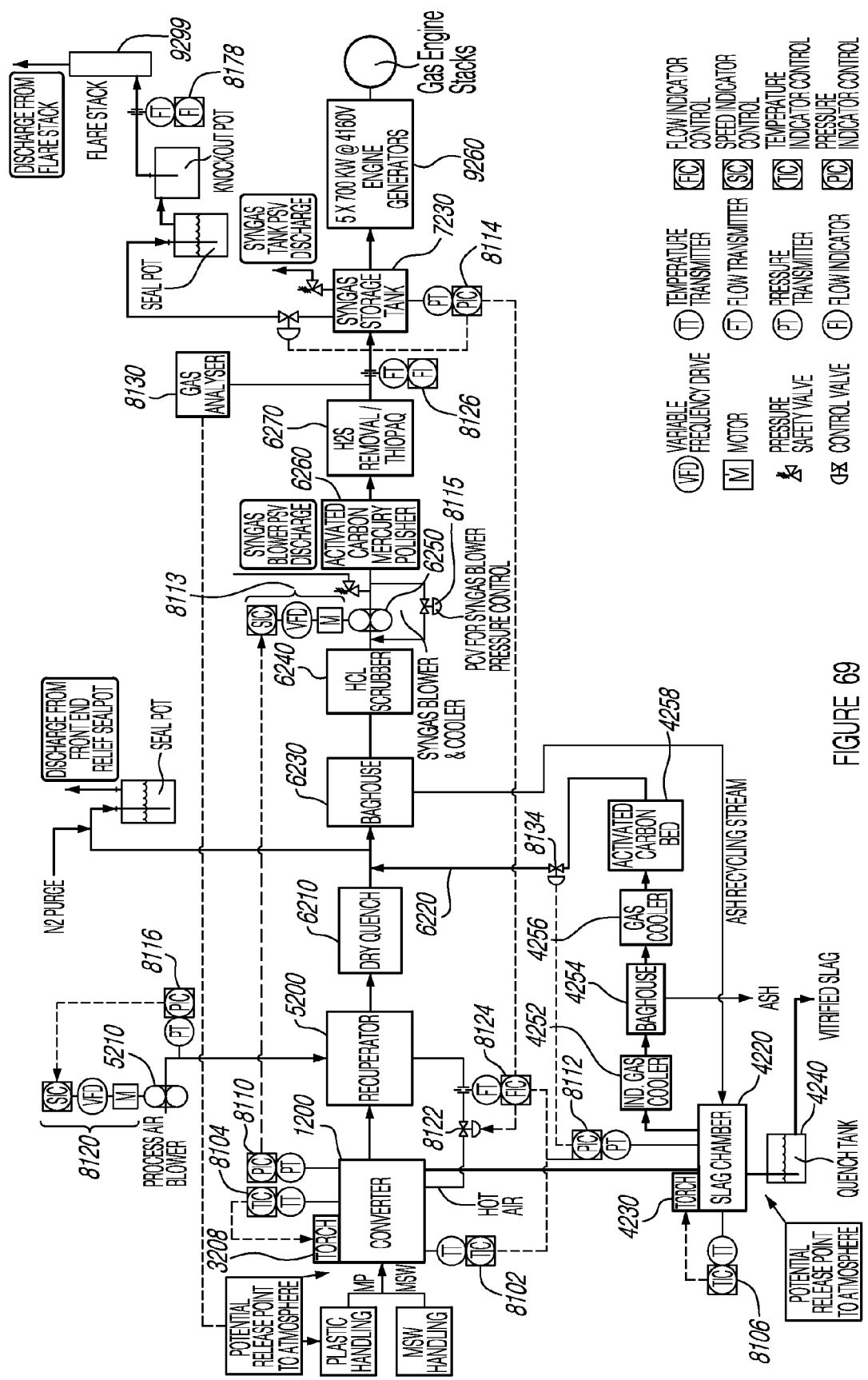
FIG. 69 is a high-level schematic diagram of a gasification system and control system therefore.
Figure 70:
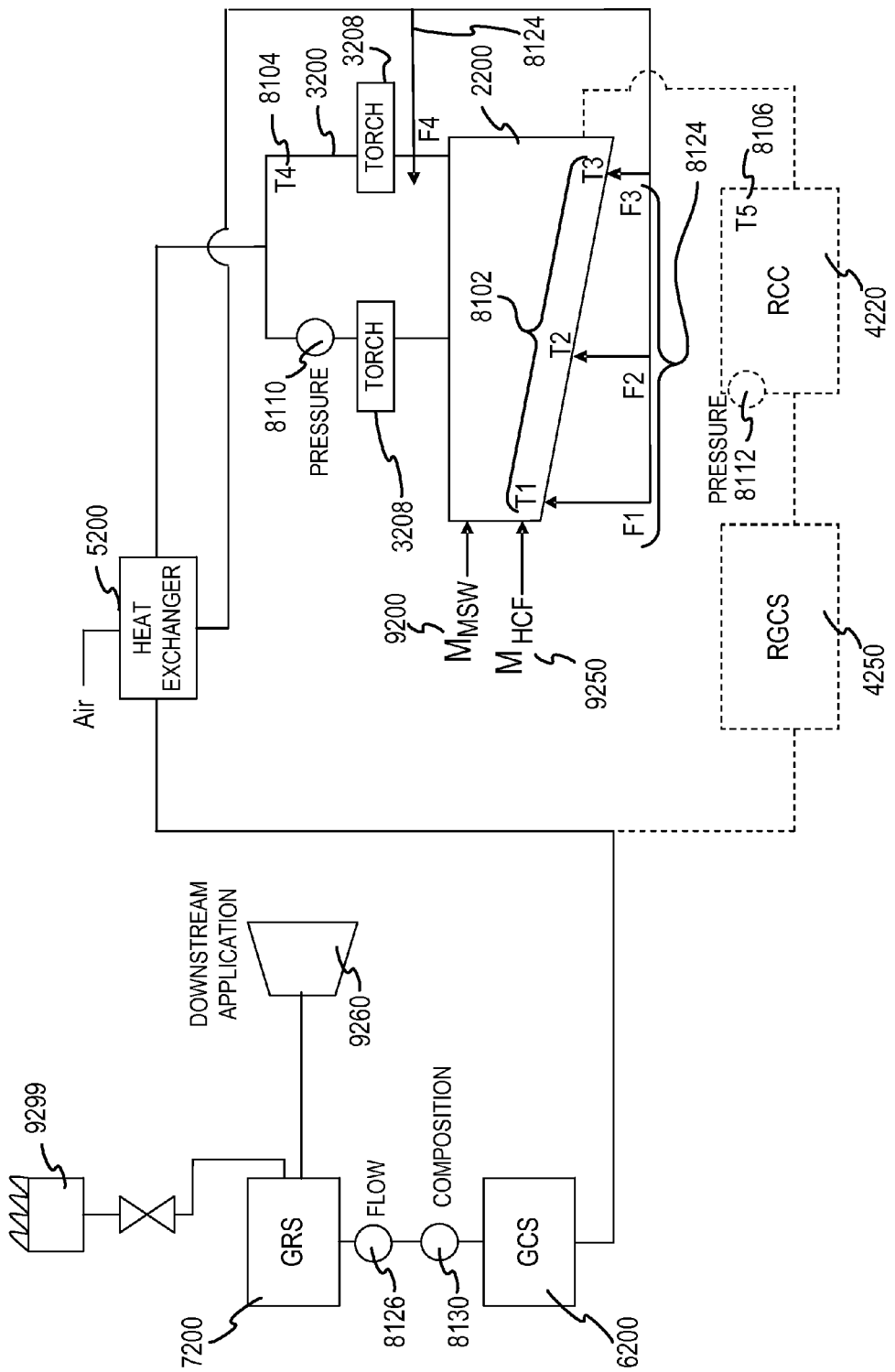
FIG. 70 is an alternative diagrammatic representation of the gasification and control systems of FIG. 69.

A high-level process control schematic is provided for this example in FIG. 69, wherein the process to be controlled is provided by the gasification system 120 described above. FIG. 70 provides an alternative depiction of the system 120 and control system of FIG. 69 to identify exemplary characteristics and sensing elements associated therewith. As described above, the system 120 comprises a converter 1200, comprising a gasifier 2200 and GRS 3200 in accordance with the present example, for converting the one or more feedstocks (e.g. MSW and plastics) into a syngas and a residue product. The system 120 further comprises a residue conditioning system (RCS) 4200 and a heat exchanger 5200 conducive to recuperating heat form the syngas and, in this example, using this recuperated heat for heating the air input additive used in the converter 1200. A gas conditioning system (GCS) 6200 for conditioning (e.g. cooling, purifying and/or cleaning) the syngas is also provided, and a regulation system 7200 used for at least partially homogenising the syngas for downstream use. As depicted herein, residue may be provided to the RCS 4200 from both the converter 1200 and the GCS 6200, the combination of which being conditioned to yield a solid product (e.g. vitrified slag 4203) and a syngas to be conditioned and combined with the converter syngas for further conditioning, homogenisation and downstream use.

In FIGS. 69 and 70, various sensing and response elements are depicted and configured to provide various levels of control for the system 120. As discussed hereinabove, certain control elements may be used for local and/or regional system controls, for example in order to affect a portion of the process and/or subsystem thereof, and therefore, may have little or no effect on the overall performance of the system. For example, while the GCS 6200 may provide for the conditioning and preparation of the syngas for downstream use, its implementation, and variations absorbed thereby, may have little effect on the general performance and output productivity of the system 120. On the other hand, certain control elements may be used for regional and/or global system controls, for example in order to substantially affect the process and/or system 120 as a whole. For example, variation of the feedstock input via the MSW handling system 9200 and/or plastics handling means 9250 may have a significant downstream effect on the product gas, namely affecting a change in composition and/or flow, as well as affect local processes within the converter 1200. Similarly, variation of the additive input rate, whether overall or discretely for different sections of the converter 1200, may also have a significant downstream effect on the product gas, namely to the gas composition and flow. Other controlled operations, such as reactant transfer sequences within the converter 1200, airflow distribution adjustments, plasma heat source power variations and other such elements may also effect characteristics of the product gas and may thus be used as a control to such characteristics, or again be accounted for by other means to reduce their impact on downstream application.

In FIGS. 69 and 70, various sensing elements are depicted and used in the present example to control various local, regional and global characteristics of the gasification process. For instance, the system 120 comprises various temperature sensing elements for sensing a process temperature at various locations throughout the process. In FIG. 69, one or more temperature sensing elements are provided for respectively detecting temperature variations within the converter 1200, in relation to the plasma heat source 3208, and in relation to the residue conditioning process in RCS 4200. For example, independent sensing elements (commonly identified by temperature transmitter and indicator control 8102 of FIG. 69) may be provided for sensing temperatures T1, T2 and T3 associated with the processes taking place within Stages 1, 2 and 3 of the gasifier 2200 (e.g. see FIG. 70). An additional temperature sensing element 8104 may be used to sense temperature T4 (e.g. see FIG. 70) associated with the reformulating process of the GRS 3200 and particularly associated with the output power of the plasma heat source 3208. In this example, a temperature sensing element 8106 is also provided for sensing a temperature within the RCC 4220 (e.g. temperature T5 of FIG. 70), wherein this temperature is at least partially associated with the output power of the residue conditioner plasma heat source 4230. It will be appreciated that other temperature sensing elements may also be used at various points downstream of the converter 1200 for participating in different local, regional and/or global processes. For example, temperature sensing elements can be used in conjunction with the heat exchanger 5200 to ensure adequate heat transfer and provide a sufficiently heated air additive input to the converter 1200. Temperature monitors may also be associated with the GCS 6200 to ensure gases conditioned thereby are not too hot for a given sub-process, for example. Other such examples should be apparent to the person skilled in the art.

The system 120 further comprises various pressure sensing elements operatively disposed throughout the system 120. For instance, a pressure sensing element (depicted as pressure transmitter and indicator control 8110 in FIG. 69) is provided for sensing a pressure within the converter 1200 (depicted in the example of FIG. 70 as particularly associated with GRS 3200), and operatively associated with blower 6500 via speed indicator control, variable frequency drive and motor assembly 8113 for maintaining an overall pressure within the converter 1200 below atmospheric pressure; in this particular example, the pressure within the converter 1200, in one embodiment, is continuously monitored at a frequency of about 20 Hz and regulated accordingly. In another embodiment, the blower is maintained at a frequency of about 20 Hz or above in accordance with operational requirements; when blower rates are required below 20 Hz an override valve may be used temporarily. A pressure sensing element 8112 is also provided in operative association with the RCC 4220 and operatively linked to a control valve leading residue conditioner gas from the RCC 4220 to the GCS 6200. Pressure sensing element 8116, is also provided for monitoring input air pressure to the heat exchanger 5200 and is operatively linked to blower 5210 for regulating same via speed indicator control, variable frequency drive and motor assembly 8120. A pressure control valve 8115 is optionally provided as a secondary control to override and adjust pressure within the system when the syngas blower speed 6250 falls below the blower's minimum operating frequency Another pressure sensing element 8114 is further provided with the syngas regulation system (SRS) 7200 and operatively linked to control valve 7500 for controlled and/or emergency release of syngas via flare stack 9299 due to excess pressure, for example during start-up and/or emergency operations. This pressure sensing element 8114 is further operatively linked to control valve 8122 via flow transmitter and control indicator 8124 to increase a process additive input flow to the converter 1200 in the event that insufficient syngas is being provided to the SRS 7200 to maintain continuous operation of the gas engines 9260, for example. This is particularly relevant when the control system is operated in accordance with a back-to-front control scheme, as will be described in greater detail below. Note that in FIG. 70, the air flow sensing element 8124 and control valve 8122 are used to regulate the additive air flows to Stages 1, 2 and 3 of the gasifier 2200, as depicted by respective flows F1, F2 and F3, and additive air flow to the GRS 3200, as depicted by flow F4, wherein relative flows are set in accordance with a pre-set ratio defined to substantially maintain pre-set temperature ranges at each of the process stages. For example, a ratio F1:F2:F3:F4 of about 36:18:6:40 can be used to maintain relative temperatures T1, T2 and T3 within ranges of about 300-600° C., 500-900° C. and 600-1000° C. respectively, or optionally within ranges of about 500-600° C., 700-800° C. and 800-900° C., respectively, particularly upon input of additional feedstock to compensate for increased combustion due to increased volume, as described below.

The system 120 also comprises various flow sensing elements operatively disposed throughout the system 120. For instance, as introduced above, a flow sensing element 8124 is associated with the air additive input to the converter 1200 and operatively linked to the control valve 8122 for adjusting this flow, for example in response to a detected pressure drop within the SRS 7200 via sensing element 8114. A flow sensing element 8126 is also provided to detect a syngas flow to the SRS 7200, values derived from which being used to regulate both an air additive input rate as a fast response to a decrease in flow, and adjust a feedstock input rate, for example in accordance with the currently defined fuel to air ratio (e.g. the (MSW+plastics):(Total additive air input) ratio currently in use), via MSW and/or plastics feeding mechanisms 9200 and 9250 respectively, for longer term stabilisation; this again is particularly useful when the system is operated in accordance with a back-to-front control scheme, as described below. In this example the air to fuel ratio is generally maintained between about 0 to 4 kg/kg, and during normal operation is generally at about 1.5 kg/kg. A flow sensing element 8128 may also be provided to monitor flow of excess gas to the flare stack 9299, for example during start-up, emergency and/or front-to-back control operation, as described below.

FIGS. 69 and 70 also depict a gas analyser 8130 for analysing a composition of the syngas as it reaches the SRS 7200, the control system being configured to use this gas composition analysis to determine a syngas fuel value and carbon content and adjust the fuel to air ratio and MSW to plastics ratio respectively and thereby contribute to regulate respective input rates of MSW and plastics. Once again, this feature is particularly useful in the back-to-front control scheme implementation of the control system, described in greater detail below.

Not depicted in FIGS. 69 and 70, but described above with reference to an exemplary embodiment of the gasifier 2200, is the inclusion of various sensing elements configured for detecting a height of reactant within the gasifier 2200 at various locations, namely at steps 1, 2 and 3 2212, 2214 & 2216. These sensing elements may be used to control the motion of the lateral transfer means, such as carrier rams 2228, 2230 & 2232 to enhance effective processing within the gasifier 2200. In such an example, a carrier ram sequence controller would both affect computation of an actual feedstock input rate, as would variation in the desired feedstock input rate need to be communicated to the carrier ram sequence controller. Namely, the carrier ram sequence controller can be used to adjust a feedstock input rate, and the control system, in communication with the carrier ram sequence controller, may be used to compensate for variations induced by changes in the carrier ram sequence (e.g. to address issues raised due to various detected reactant distributions) in downstream processes.

Figure 71:
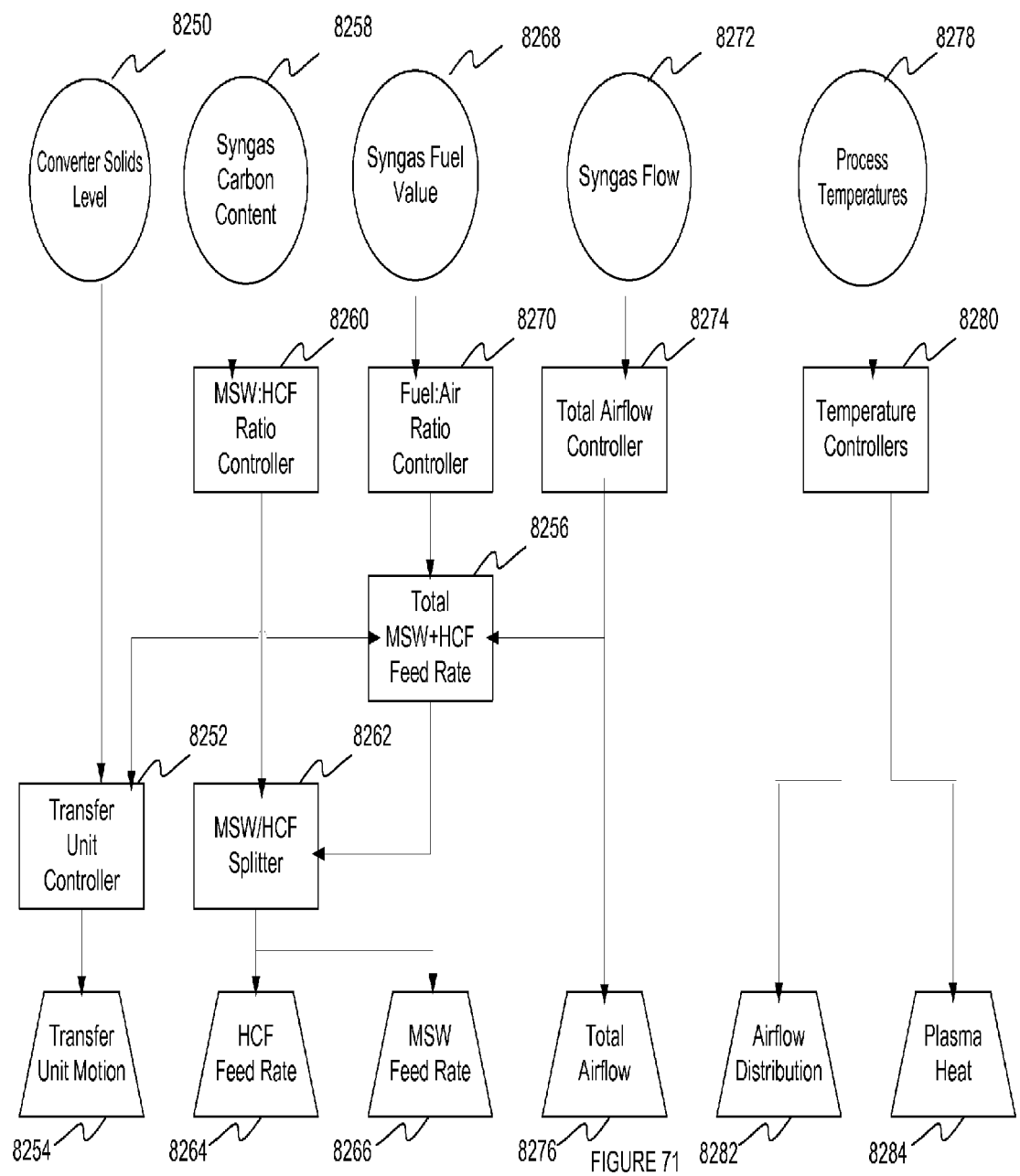
FIG. 71 is a flow diagram of a control scheme for controlling the gasification system of FIGS. 69 and 70.

FIG. 71 provides a control flow diagram depicting the various sensed characteristic values, controllers (e.g. response elements) and operating parameters used by the control system of the present example, and interactions there between conducive to promoting proper and efficient processing of the feedstock. In this figure:

- a converter solids levels detection module 8250 is configured to cooperatively control a transfer unit controller 8252 configured to control motion of the transfer unit(s) 8254 and cooperatively control a total MSW+HCF feed rate 8256;
- a syngas (product gas) carbon content detection module 8258 (e.g. derived from gas analyser 8130) is operatively coupled to a MSW:HCF ratio controller 8260 configured to cooperatively control an MSW/HCF splitter 8262 for controlling respective MSW and HCF feed rates 8264 and 8266 respectively;
- a syngas (product gas) fuel value determination module 8268 (e.g. LHV=c1*[$H_2$]+c2*[CO], where c1 and c2 are constants and where [$H_2$] and [CO] are obtained from the syngas analyser 8130) is operatively coupled to a Fuel:Air ratio controller 8270 for cooperatively controlling the total MSW+HCF feed rate 8256 directed to the MSW/HCF splitter 8262 and the transfer unit controller 8252;
- a syngas flow detection module 8272 is operatively coupled to a total airflow controller 8274 for controlling a total airflow 8276 and cooperatively control the total MSW+HCF feed rate 8256; and
- a process temperature detection module 8278 is operatively coupled to a temperature controller(s) 8280 for controlling an airflow distribution 8282 (e.g. Ft, F2, F3 and F4 of FIG. 28) and plasma heat 8284 (e.g. via PHS 1002).

In this configuration, in order to determine the amount of air additive to input into the system 120 to obtain a syngas composition within an appropriate range for the downstream application, or again within a range conducive to increasing the energetic efficiency and/or consumption of product gas, the control system may be configured to compute a control parameter based on an acquired characteristic value for the LHV (e.g. from analysis of [$H_2$] and [CO] of syngas). For instance, by setting the temperature and pressure constant, or at a desired set point, a global system parameter may be defined empirically such that the air input parameter may be estimated with sufficient accuracy using a linear computation of the following format:

$$[LHV] = a[Air]$$

wherein a is an empirical constant for a particular system design and desired output characteristics. Using this method, it has been demonstrated that the system 120 of the present example may be operated efficiently and continuously to meet regulatory standards while optimising for process efficiency and consistency.

Figure 72:
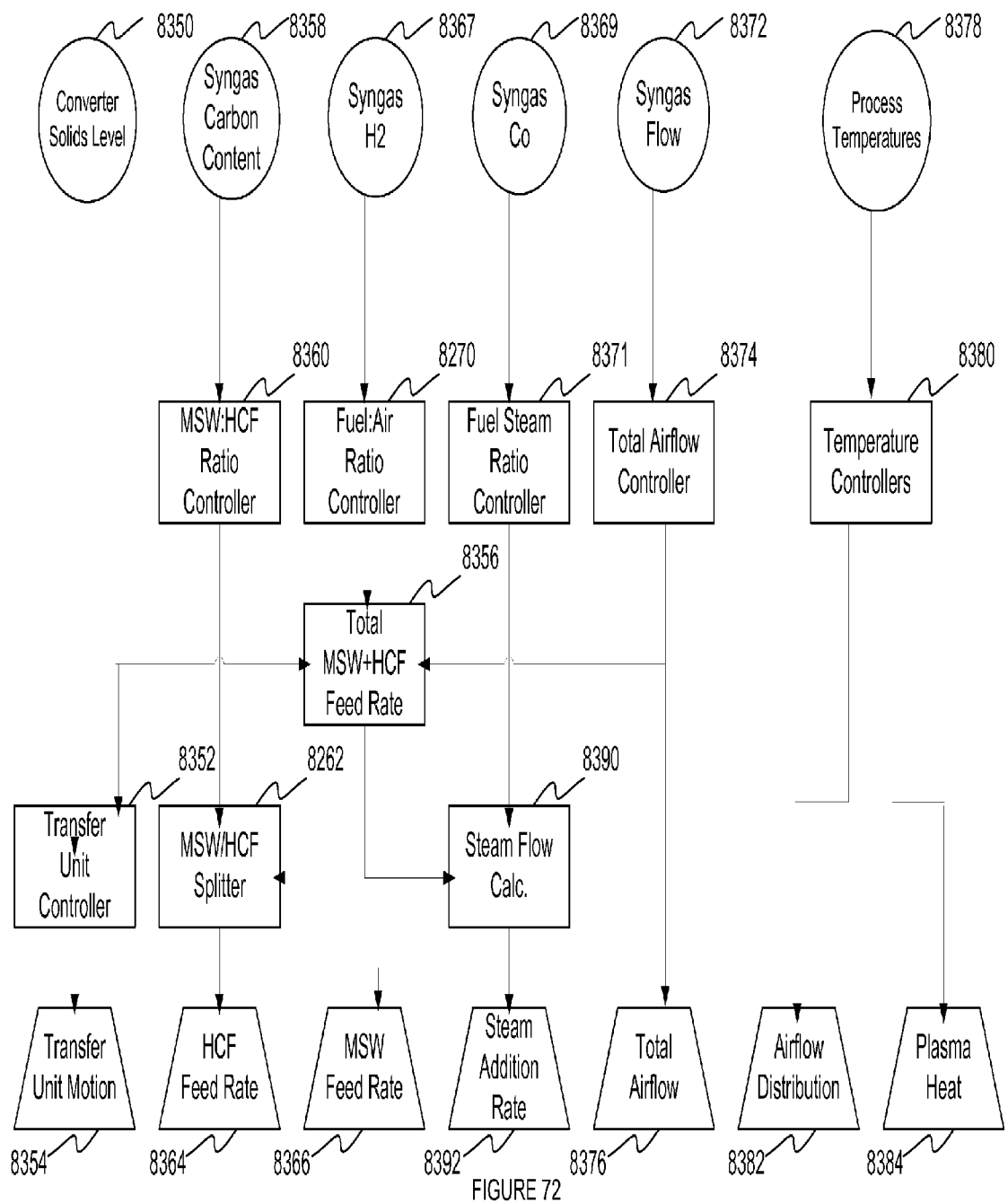
FIG. 72 is a flow diagram of an alternative control scheme for controlling the gasification system of FIGS. 69 and 70, wherein this system is further adapted for using process additive steam in a gasification process thereof.
Figure 73:
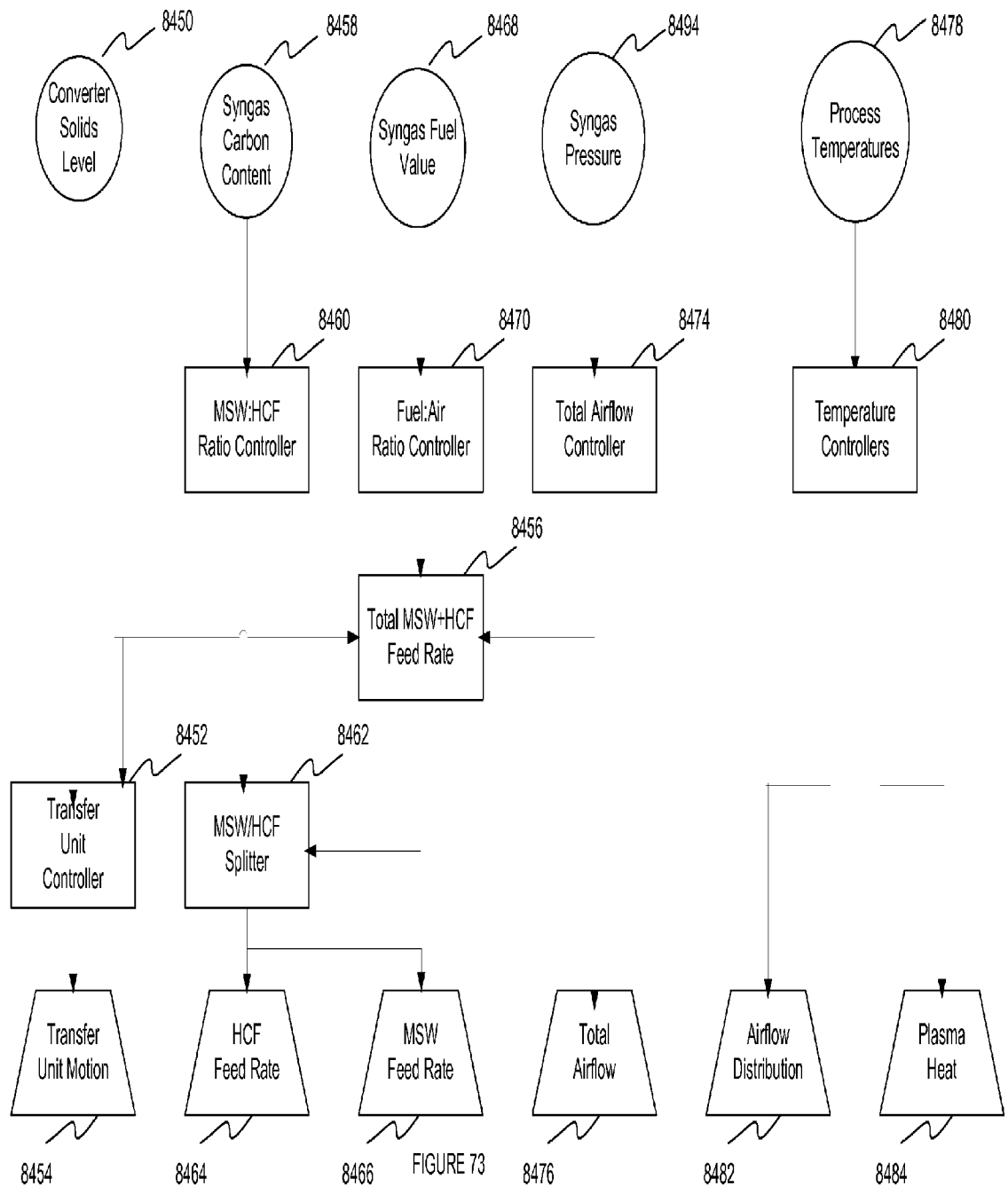
FIG. 73 is a flow diagram of an alternative control scheme for controlling a gasification process, in accordance with a further exemplary embodiment of the present invention.

FIG. 72 provides an alternative control flow diagram depicting the various sensed characteristic values, controllers (e.g. response elements) and operating parameters that can be used by a slightly modified configuration of the control system 8000, and interactions therebetween conducive to promoting proper and efficient processing of the feedstock. In this figure:

- a converter solids levels detection module 8350 is configured to cooperatively control a transfer unit controller 8352 configured to control motion of the transfer unit(s) 8354 and cooperatively control a total MSW+HCF feed rate 8356;

a syngas (product gas) carbon content detection module 8358 (e.g. derived from gas analyser 8130) is operatively coupled to a MSW:HCF ratio controller 8360 configured to cooperatively control an MSW/HCF splitter 8362 for controlling respective MSW and HCF feed rates 8364 and 8366 respectively;

a syngas (product gas) [H$_2$] content detection module 8367 (e.g. obtained from the syngas analyser 8130) is operatively coupled to a Fuel:Air ratio controller 8370 for cooperatively controlling the total MSW+HCF feed rate 8356 for cooperatively controlling the transfer unit controller 8352, the MSW/HCF splitter 8362, the steam flow calculation 8390 and the total airflow 8376;

a syngas (product gas) [CO] content detection module 8369 (e.g. obtained from the syngas analyser 8130) is operatively coupled to a Fuel:Steam ratio controller 8371 for cooperatively controlling the steam flow calculation 8390 for controlling the steam addition rate 8392 (note: steam additive input mechanism may be operatively coupled to the converter 1000 (not shown in FIGS. 69 and 70) and provided to compliment air additive and participate in refining the chemical composition of the syngas);

a syngas flow detection module 8372 is operatively coupled to a total airflow controller 8374 for cooperatively controlling a total airflow 8376 and cooperatively controlling the total MSW+HCF feed rate 8356; and a process temperature detection module 8378 is operatively coupled to a temperature controller 8380 for controlling an airflow distribution 8382 and plasma heat 8384.

In this configuration, in order to determine the amount of air additive and steam additive to input into the system 120 to obtain a syngas composition within an appropriate range for the downstream application, or again within a range conducive to increasing the energetic efficiency and/or consumption of product gas, the control system may be configured to compute control parameters based on acquired characteristic values for [H$_2$] and [CO]. For instance, by setting the temperature and pressure constant, or at a desired set point, global system parameters may be defined empirically such that the air and steam input parameters may be estimated with sufficient accuracy using a linear computation of the following format:

$$\begin{bmatrix} H_2 \\ CO \end{bmatrix} = \begin{bmatrix} a & b \\ c & d \end{bmatrix} \begin{bmatrix} Air \\ Steam \end{bmatrix}$$

wherein a, b, c and d are empirical constants for a particular system design and desired output characteristics. The person of skill in the art will appreciate that although simplified to a linear system, the above example may be extended to include additional characteristic values, and thereby provide for the linear computation of additional control parameters. Higher order computations may also be considered to refine computation of control parameters as needed to further restrict process fluctuations for more stringent downstream applications. Using the above, however, it has been demonstrated that the system 120 of the present example may be operated efficiently and continuously to meet regulatory standards while optimising for process efficiency and consistency.

It will be appreciated that the various controllers of the control system generally operate in parallel to adjust their respective values, which can include both absolute (e.g. total air flow) and relative values (e.g. feed to air ratio), although it is also possible for some or all of the controllers to operate sequentially.

As discussed above, a front-to-back (or supply-driven) control strategy is used in the present example during start-up operation of the system 120 where the converter 1200 is run at a fixed feed rate of MSW. Using this control scheme, the gasification system 120 allows for process variations to be absorbed by the downstream equipment such as gas engines 9260 and flare stack 9299. A small buffer of excess syngas is produced, and a small continuous flare is hence used. Any extra syngas production beyond this normal amount can be sent to the flare, increasing the amount flared. Any deficiency in syngas production first eats into the buffer, and may eventually require generator power output to be reduced (generators can be operated from 50-100% power output via an adjustable power set point) or further system adjustments to be implemented by the control system, as described below. This control scheme is particularly amenable to start-up and commissioning phases.

The main process control goals of this front-to-back control scheme comprise stabilizing the pressure in the HC 7230, stabilizing the composition of the syngas being generated, controlling pile height of material in the gasification chamber 2202, stabilizing temperatures in the gasification chamber 2202, controlling temperatures in the reformulating chamber 3202, and controlling converter process pressure.

When using GE/Jenbacher gas engines 9260, the minimum pressure of product gas is about 150 mbar (2.18 psig), the maximum pressure is about 200 mbar (2.90 psig), the allowed fluctuation of fuel gas pressure is about +/−10% (+/−17.5 mbar, +/−0.25 psi) while the maximum rate of product gas pressure fluctuation is about 10 mbar/s (0.145 psi/s). The gas engines 9260 have an inlet regulator that can handle small disturbances in supply pressure, and the holdup in the piping and HC act somewhat to deaden these changes. The control system however still uses a fast acting control loop to act to maintain suitable pressure levels. As mentioned above, the converter 1200 in this control scheme is run at sufficient MSW feed rate to generate a small buffer of excess syngas production, which is flared continuously. Therefore the HC 7230 pressure control becomes a simple pressure control loop where the pressure control valves in the line from HC 7230 to the flare stack 9299 are modulated as required to keep the HC pressure within a suitable range.

The control system generally acts to stabilize the composition of the syngas being generated. The gas engines 9260 can operate over a wide range of fuel values, provided that the rate of change is not excessive. The allowable rate of change for Lower Heating Value (LHV) relevant in this example is less than 1% fluctuation in syngas LHV per 30 second. For hydrogen based fuels, the fuel gas is adequate with as little as 15% hydrogen by itself, and the LHV can be as low as 50 btu/scf (1.86 MJ/Nm3). The system volume and HC 7230 aid in stabilizing the rate of change of LHV by providing about 2 minutes of syngas production.

In this control scheme, the product gas composition can be measured by the gas analyzer 8130 installed at the inlet of the HC 7230, or proximal thereto. Based on this measurement, the control system can adjust the fuel-to-air ratio (i.e. slightly increase/decrease MSW feed rate relative to air additive input air) in order to stabilize the gas fuel value. Increasing either the MSW or plastics feed relative to the air addition increases the fuel value of the gas. It will be appreciated, however, that this control action may have a relatively long response time depending on the overall implementation of the system 120, and as such, may be tuned to prevent long-term drift rather than respond to short-term variation.

While the plastics feed is by itself a much richer fuel source (e.g. LHV of about twice that of MSW), it is typically added in a ratio of about 1:20 (0 to 14%) with the MSW, and therefore, in accordance with this example, it is not the dominant player in terms of fuel being added to the system. Since it can be uneconomical to add too much plastics to the system 120, the plastics feed may be used as a trim rather than as a primary control. In general, the PLASTICS FEED is ratioed to the total feed with the ratio optionally adjusted to stabilise the total carbon exiting the system 120 in the syngas, as measured by the gas analyzer 8130. This may thus have for affect to dampen fluctuations in MSW fuel value.

In addition, a reactant pile level control system may be used to aid in maintaining a stable pile height inside the converter 1200. Stable level control may prevent fluidisation of the material from process air injection which could occur at low level and to prevent poor temperature distribution through the pile owing to restricted airflow that would occur at high level. Maintaining a stable level may also help maintain consistent converter residence time. A series of level switches in the gasification chamber 2202 may be used, for example, to measure pile depth. The level switches in this example could include, but are not limited to, microwave devices with an emitter on one side of the converter and a receiver on the other side, which detects either presence or absence of material at that point inside the converter 1200. The inventory in the gasifier 2200 is generally a function of feed rate and carrier ram motion (e.g. carrier ram motion), and to a lesser degree, the conversion efficiency.

In this example, the Stage 3 carrier ram(s) sets the converter throughput by moving at a fixed stroke length and frequency to discharge residue from the gasifier 2200. The Stage 2 carrier ram(s) follows and moves as far as necessary to push material onto Stage 3 and change the Stage 3 start-of-stage level switch state to "full". The Stage 1 carrier ram(s) follows and moves as far as necessary to push material onto Stage 2 and change the Stage 2 start-of-stage level switch state to "full". All carrier rams are then withdrawn simultaneously, and a scheduled delay is executed before the entire sequence is repeated. Additional configuration may be used to limit the change in consecutive stroke lengths to less than that called for by the level switches to avoid excess carrier ram-induced disturbances. The carrier rams may be moved fairly frequently in order to prevent over-temperature conditions at the bottom of the converter. In addition, full extension carrier ram strokes to the end of each stage may be programmed to occur occasionally to prevent stagnant material from building up and agglomerating near the end of the stage. It will be apparent to the person skilled in the art that other carrier ram sequences may be considered herein without departing from the general scope and nature of the present disclosure.

In order to optimize conversion efficiency, in accordance with one embodiment of the present invention, the material is maintained at as high a temperature as possible, for as long as possible. Upper temperature limits are set to avoid the material beginning to melt and agglomerate (e.g. form clinkers), which reduces the available surface area and hence the conversion efficiency, causes the airflow in the pile to divert around the chunks of agglomeration, aggravating the temperature issues and accelerating the formation of agglomeration, interferes with the normal operation of the carrier rams, and potentially causes a system shut down due to jamming of the residue removal screw 2209. The temperature distribution through the pile may also be controlled to prevent a second kind of agglomeration from forming; in this case, plastic melts and acts as a binder for the rest of the material.

In one embodiment, temperature control within the pile is achieved by changing the flow of process air into a given stage (i.e. more or less combustion). For instance, the process air flow provided to each stage in the bottom chamber may be adjusted by the control system to stabilize temperatures in each stage. Temperature control utilizing extra carrier ram strokes may also be used to break up hot spots. In one embodiment, the air flow at each stage is pre-set to maintain substantially constant temperatures and temperature ratios between stages. For example, about 36% of the total air flow may be directed to stage 1, about 18% to Stage 2, and about 6% to Stage 3, the remainder being directed to the GRS (e.g. 40% of total air flow). Alternatively, air input ratios may be varied dynamically to adjust temperatures and processes occurring within each stage of the gasifier 2200 and/or GRS 3200.

Plasma heat source power (e.g. plasma torch power) may also be adjusted to stabilize exit temperatures of the GRS 3200 (e.g. reformulating chamber output) at the design set point of about 1000 degrees C. This may be used to ensure that the tars and soot formed in the gasification chamber 2202 are fully decomposed. Addition of process air into the reformulating chamber 3202 may also bear a part of the heat load by releasing heat energy with combustion of the syngas. Accordingly, the control system may be configured to adjust the flow rate of process air to keep torch power in a good operating range.

Furthermore, converter pressure may be stabilized by adjusting the syngas blower's 6250 speed, in the embodiment of FIG. 69, depicted proximal to the homogenisation subsystem input. At speeds below the blower's minimum operating frequency, a secondary control may override and adjust a recirculation valve instead. Once the recirculation valve returns to fully closed, the primary control re-engages. In general, a pressure sensor 8110 is operatively coupled to the blower 6250 via the control system, which is configured to monitor pressure within the system, for example at a frequency of about 20 Hz, and adjust the blower speed via an appropriate response element 8113 operatively coupled thereto to maintain the system pressure within a desired range of values.

A residue melting operation is also performed in a continuous operation in a separate vessel (e.g. RCC 4220) which is directly connected to the outlet of the converter 1200. The residue is removed from the gasification chamber 2202 by a toothed screw conveyor (residue extraction screw) or the like mounted at the end of the gasifier 2200 and fed into the top of the RCS 4200 via a series of screw conveyors, for example. A small stream of particulate from the bag house filters 6230 may also join the main stream of residue via screw conveyors, for example, for further processing.

The RCS 4200 is a small, refractory-lined residue conditioning chamber (RCC) 4220 with a 300 kW plasma torch 4230 mounted into the top, a process gas outlet 4228 connecting a gas treatment skid, and a molten slag outlet 4226. The gas exiting the gas treatment skid may be directed to join the main stream of syngas from the converter 1200 at the inlet to the main baghouse 6230, or directed alternatively for further processing. In this example, the residue drops directly into the top of the RCC 4220 where it is melted by close contact with the plasma torch plume 4230. The molten slag is held-up, for example, by a vee-notch weir 4224 inside the RCC 4220. As additional residue particles flow into the RCC 4220 and are melted, a corresponding amount of molten material overflows the weir 4224 and drops into a water-filled quench tank 4240 integral with a screw conveyor where it solidifies, shatters into small pieces of glass-like slag, and is conveyed to a storage container.

In controlling the residue processing, the power of the plasma torch 4230 may be adjusted as needed to maintain temperatures adequate for the melting operation. The RCC 4220 temperature instrumentation (e.g. temperature sensing element 8106) may include, for example, two optical thermometers (OT's) which measure the surface temperature of the surface upon which they are aimed, 3 vapour space thermocouples mounted in ceramic thermo wells above the melt pool, and 5 external skin mounted thermocouples mounted on the outer metal shell. The RCC 4220 may also include a pressure transmitter for measuring process pressure (e.g. pressure sensing element 8112) inside the RCC 4220.

One melt temperature control strategy contemplated herein is to measure the delta temperature being observed by the two optical thermometers. One OT is aimed at the melt pool below the torch 4230, the other at the melt pool near the weir 4224. If the temperature near the weir 4224 is cooling off compared to the temperature below the torch 4230, then more torch power is applied. An alternative is to use the OT temperatures directly. A set point in the range of 1400-1800° C., known to be above the melting temperature of most MSW components is entered into the controller. Torch power is then adjusted as required to meet this set point.

In general, the level is not measured directly, but is inferred by both OT temperature and vapour space thermocouples. If the temperature falls below the temperature set point, this is an indication of un-melted material and interlocks will be used to momentarily slow the feed rate of residue, or to shut down the RCS 4200 as a last resort. The rate of material flow may be controlled by adjusting the RCC feed screw conveyor speed via drive motor variable frequency drives (VFD's), for example. The feed rate may be adjusted as required to ensure acceptable temperature control, within capability of melting rate of plasma torches 4230, and to prevent high levels in the RCC 4220 due to un-melted material. In general, there may be some hold-up capacity for residue beyond Stage 3 in the gasification chamber 2202, but sustained operation will depend on the RCC 4220 having adequate melting capacity matching the steady-state production of residue.

The pressure in the RCC 4220 may be monitored by a pressure transmitter tapped into the vapour space of the vessel (e.g. element 8112). In general, the operating pressure of the RCC 4220 is somewhat matched to that of the converter gasification chamber 2202 such that there is minimal driving force for flow of gas through the screw conveyors in either direction (flow of solid residue particles only). A control valve 8134 is provided in the gas outlet line which can restrict the flow of gas that is being removed by the downstream vacuum producer (syngas blower). A DCS PID controller calculates the valve position needed to achieve the desired operating pressure.

Beyond the start-up phase, a back-to-front control, or demand-driven control can be used where the gas engines 9260 at the back-end of the system 120 drive the process. The gas engines 9260 consume a certain volume/hr of fuel depending on the energy content of the fuel gas (i.e. product gas) and the electrical power being generated. Therefore the high level goal of this control system is to ensure that adequate MSW/plastics feed enters the system 120 and is converted to syngas of adequate energy content to run the generators at full power at all times, while adequately matching syngas production to syngas consumption such that flaring of syngas is reduced, or even eliminated, and the electrical power produced per ton of MSW consumed is enhanced, and preferably optimized.

In general, the front-to-back control scheme described above comprises a sub-set of the back-to-front control scheme. For instance, most if not all process control goals listed in the above scheme are substantially maintained, however the control system is further refined to reduce flaring of syngas while increasing the amount of electrical power produced per ton of MSW, or other such feedstock, consumed. In order to provide enhanced control of the process and achieve increased process efficiency and utility for a downstream application, the flow of syngas being produced is substantially matched to the fuel being consumed by the gas engines 9260; this thus reduces reduce flaring or otherwise disposition of excess product gas from the system 120, and reduces the likelihood of insufficient gas production to maintain operation of the downstream application. Conceptually, the control system therefore becomes a back-to-front control (or demand-driven control) implemented such that the downstream application (e.g. gas engines/generators) drive the process.

In general, in order to stabilize syngas flow out of the converter 1200 in the short term, the air additive input flow into the converter 1200 may be adjusted, providing a rapid response to fluctuations in gas flow, which are generally attributed to variations in feedstock quality variations (e.g. variation in feedstock humidity and/or heating value). In general, effects induced by an adjustment of airflow will generally propagate within the system at the speed of sound. Contrarily, though adjustment of the MSW and/or plastics feed rate may also significantly affect system output (e.g. syngas flow), the feedstock having a relatively long residence time within the converter 1200 (e.g. up to 45 minutes or more for this particular example), system response times associated with such adjustment will generally range at about 10 to 15 minutes, which on the short term, may not be sufficient to effect the product gas in a timely manner to avoid unwanted operating conditions (e.g. flared excess gas, insufficient gas supply for optimal operation, insufficient gas supply for continuous operation, etc.). While still having a slower response than an increase in airflow, an increase in MSW feed rate may result in a faster response than an increase in PLASTICS FEED because the moisture content of MSW may produce steam in about 2 to 3 minutes.

Accordingly, adjusting total airflow generally provides the fastest possible acting loop to control pressure and thereby satisfy input flow requirements for the downstream application. In addition, due to the large inventory of material in the converter 1200, adding more air, or other such additive, to the bottom chamber does not necessarily dilute the gas proportionately. The additional air penetrates further into the pile, and reacts with material higher up. Conversely, adding less air will immediately enrich the gas, but eventually causes temperatures to drop and reaction rates/syngas flow to decrease.

Therefore, total airflow is generally ratioed to material feed rate (MSW+plastics) as presented in FIG. 71, whereby an increase in additive input will engender an increase in feedstock input rate. Accordingly, the control system is tuned such that the effect of increased air is seen immediately, whereas the effect of the additional feed is eventually observed to provide a longer term solution to stabilizing syngas flow. Temporarily reducing generator power output may also be considered depending on system dynamics to bridge the dead time between increasing the MSW/plastics feed rate and seeing increased syngas flow, however, this may not be necessary or expected unless faced with unusual feedstock conditions.

While adjustments to airflow (the fastest acting control loop) and adjustments to the fuel to air ratio and the total fuel rate (both longer term responses) are preferred in this example to maintain suitable gas characteristics for the downstream application, the MSW to plastics feed ratio control is not necessary, but may act as an additional control used to help smooth out long term variability.

In this example, MSW moisture content generally varies between 0 and 80%, and heating values vary between about 3000 and 33000 kJ/kg, and the HC has a 2 minute residency time and generally a pressure of about 210 mbar. A variation of about +/−60 mbar is possible without exceeding the minimum supply pressure for the engine of about 150 mbar. Without the control system, the pressure can vary by up to about 1000 mbar, hence the long term flow fluctuations are actively reduced by the control system by up to 4 times (or 75%) in order to run the gas engine 9260 at constant load as desired. Furthermore, pressure fluctuations of the converter gas can reach about 25 mbar/s without the control system, which is about 2.5 times the maximum of about 10 mbar/s for the engine of this example (or about 60%). Hence, the control system of the present invention may reduce short time process variability by at least 2.5 times (60%) and long term process variability by about 4 times (75%). Use of the HC 7230 in this example can help reduce the short term variations.

Accordingly, in view of the foregoing results, it will be appreciated that the control system of the present invention can be used to effectively convert a feedstock of substantially inhomogeneous characteristics and/or composition to produce a gas having substantially stable characteristics conducive for downstream application. Therefore, depending on a particular configuration of a gasification system controlled by the present control system, fluctuations in feedstock characteristics may be attenuated via continuous and/or real-time control of this system for example reducing long term process variability by at least 4 times. In an alternative embodiment, fluctuations in feedstock characteristics may be attenuated via continuous and/or real-time control of this system to reduce long term process variability by about 3 times. In an alternative embodiment, fluctuations in feedstock characteristics may be attenuated via continuous and/or real-time control of this system to reduce long term process variability by about 2 times.

Example 2

In this example an alternative control scheme is presented for a gasification system such as the one presented in Example 1. This alternative control scheme is presented in FIG. 73 and is a variant of the control scheme presented in FIG. 71, wherein a syngas pressure detection module is used instead of a syngas flow detection module.

Example 3

Figure 74:
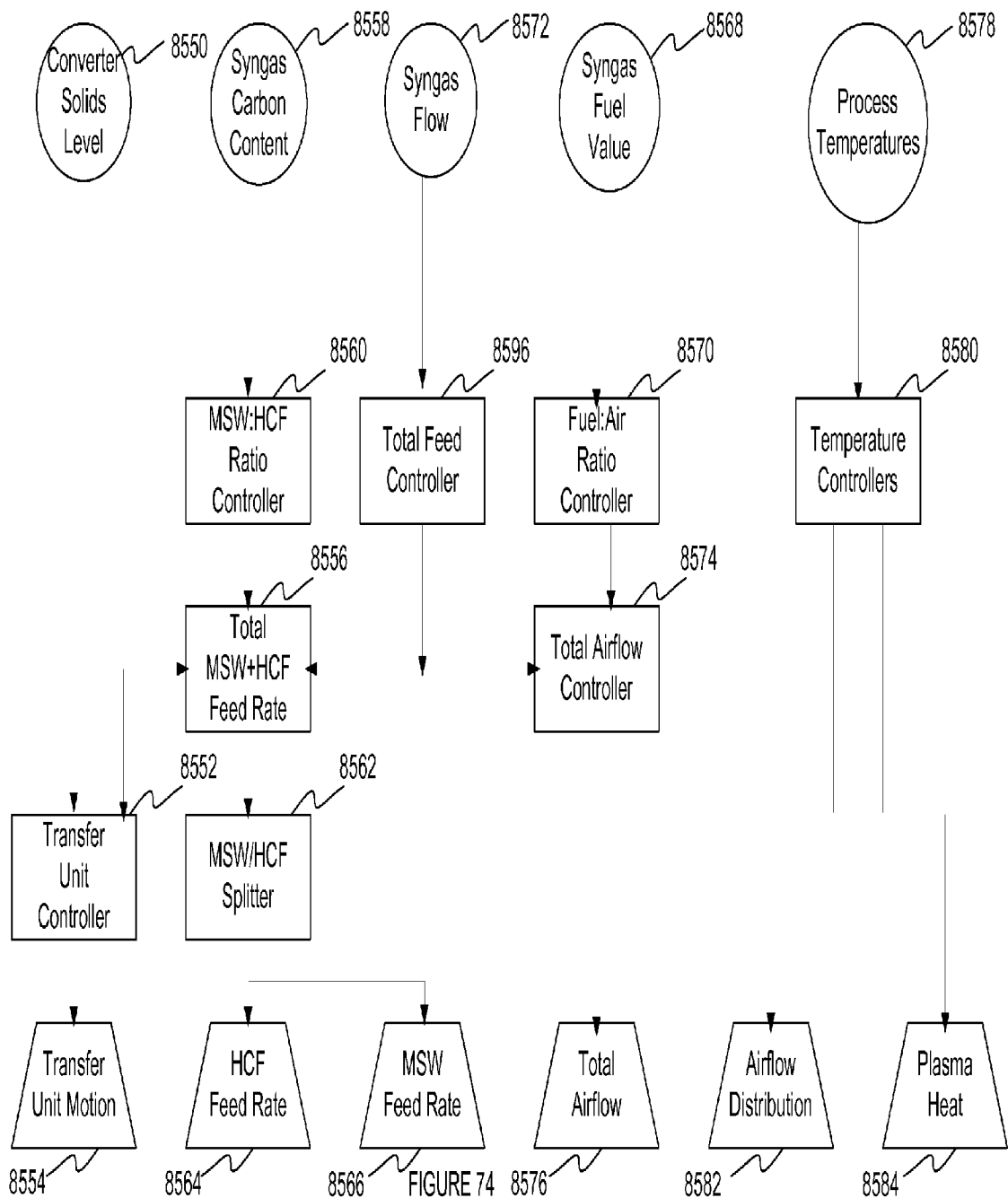
FIG. 74 is a flow diagram of an alternative control scheme for controlling a gasification process, in accordance with a further exemplary embodiment of the present invention.

In this example an alternative control scheme is presented for a gasification system such as the one presented in Example 1. FIG. 74 provides an alternative control flow diagram depicting the various sensed characteristic values, controllers (e.g. response elements) and operating parameters used by the control system 8000 of the present example, and interactions therebetween conducive to promoting proper and efficient processing of the feedstock. In this example:

- a converter solids levels detection module 8550 is configured to cooperatively control a transfer unit controller 8552 configured to control motion of the transfer unit(s) 8554 and cooperatively control a total MSW+HCF feed rate 8556;
- a syngas (product gas) carbon content detection module 8558 (e.g. derived from a gas analyser) is operatively coupled to a MSW:HCF ratio controller 8560 configured to cooperatively control the total MSW+HCF feed rate 8556 for controlling an MSW/HCF splitter 8562 (for controlling respective MSW and HCF feed rates 8564 and 8566 respectively) and cooperatively controlling both a transfer unit controller 8552 and a total airflow controller 8574;
- a syngas (product gas) flow value detection module 8572 is operatively coupled to the total feed controller 8596 for cooperatively controlling both the total airflow controller 8574 and the total MSW+HCF feed rate 8556;
- a syngas (product gas) fuel value determination module 8568 (e.g. $LHV = c1*[H_2] + c2*[CO]$, where c1 and c2 are constants and where $[H_2]$ and $[CO]$ are obtained from a syngas analyser) is operatively coupled to a Fuel:Air ratio controller 8570 for cooperatively controlling the total airflow controller 8574 for controlling a total airflow 8566 and a total MSW+HCF feed rate 8556; and
- a process temperature detection module 8578 is operatively coupled to temperature controllers 8580 for controlling an airflow distribution 8582 and plasma heat 8584.

Example 4

Figure 75:
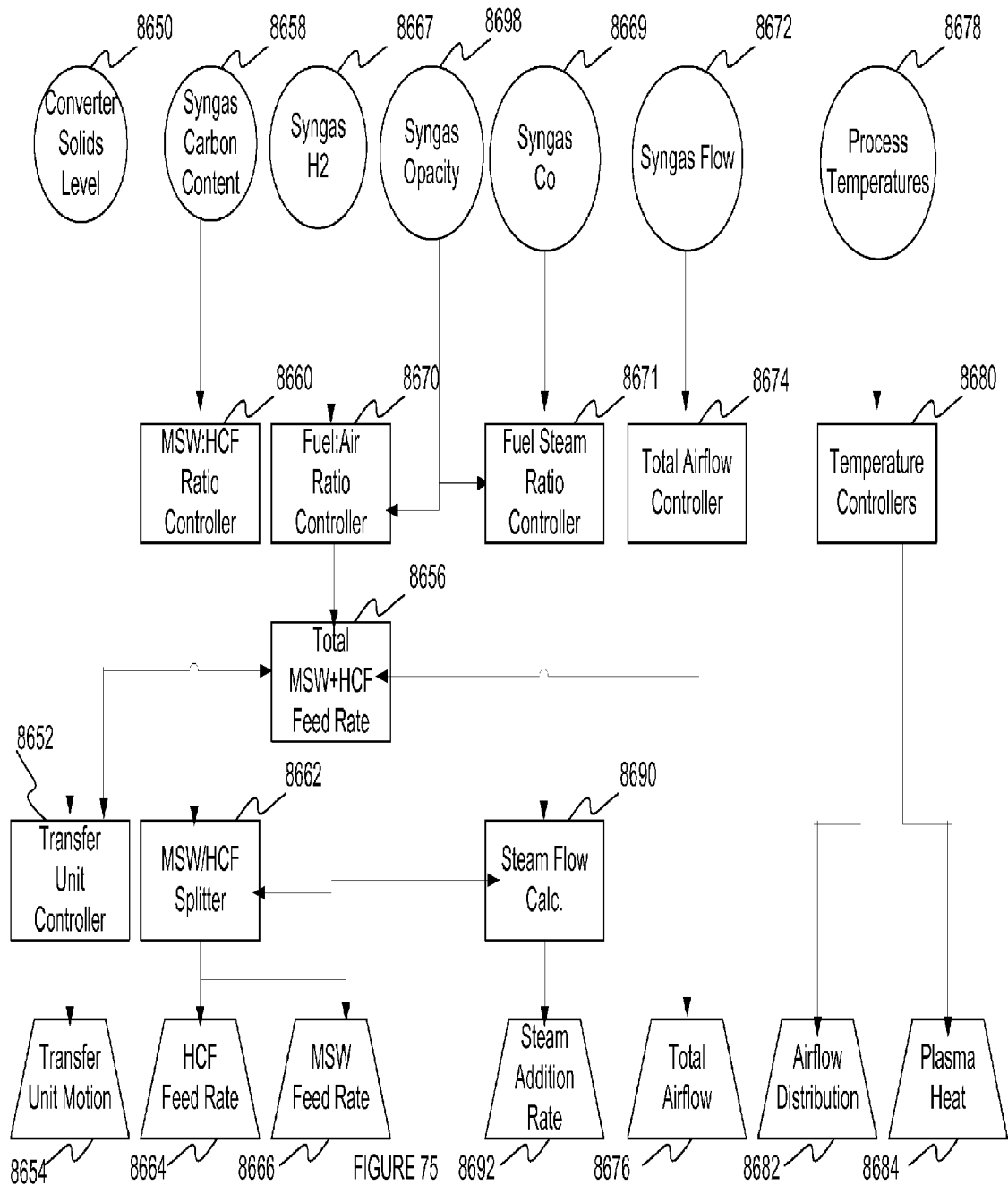
FIG. 75 is a flow diagram of an alternative control scheme for controlling a gasification process, in accordance with a further exemplary embodiment of the present invention.

In this example an alternative control scheme is presented for a gasification system such as the one presented in Example 1. FIG. 75 provides another alternative control flow diagram depicting the various sensed characteristic values, controllers (e.g. response elements) and operating parameters that can be used by a slightly modified configuration of the control system 8000, and interactions therebetween conducive to promoting proper and efficient processing of the feedstock. In this figure:

- a converter solids levels detection module 8650 is configured to cooperatively control a transfer unit controller 8652 configured to control motion of the transfer unit(s) 8654 and cooperatively control a total MSW+HCF feed rate 8656;
- a syngas (product gas) carbon content detection module 8658 (e.g. derived from a gas analyser) is operatively coupled to a MSW:HCF ratio controller 8660 configured to cooperatively control an MSW/HCF splitter 8662 for controlling respective MSW and HCF feed rates 8664 and 8666 respectively;
- a syngas (product gas) $[H_2]$ content detection module 8667 (e.g. obtained from a syngas analyser) is configured to cooperatively control a Fuel:Air ratio controller 8670 for cooperatively controlling the total MSW+HCF feed rate 8656;
- a syngas (product gas) opacity detection module 8698 for cooperatively controlling both the Fuel:Air ratio controller 8670 and the Fuel:Steam ratio controller 8671;
- a syngas (product gas) [CO] content detection module 8669 (e.g. obtained from a syngas analyser) is configured to cooperatively control a Fuel:Steam ratio controller 8671 for cooperatively controlling a steam flow calculation 8690 for controlling a steam addition rate 8692;
- a syngas flow detection module 8672 is operatively coupled to a total airflow controller 8674 for cooperatively controlling a total airflow 8676 and cooperatively controlling the total MSW+HCF feed rate 8656; and a process temperature detection module 8678 is operatively coupled to a temperature controller(s) 8680 for controlling an airflow distribution 8682 and plasma heat 8684.

Example 5

Figure 17:
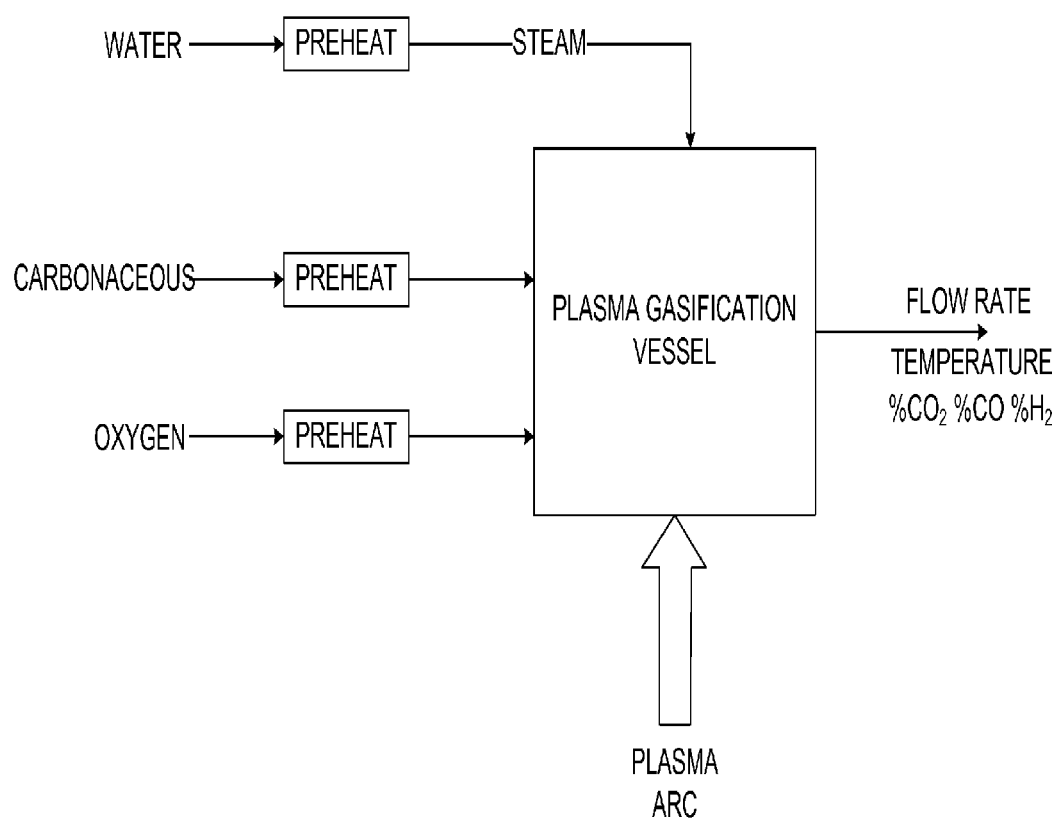
FIG. 17 is a schematic diagram depicting a control system for controlling inputs to a converter of a system for the conversion of carbonaceous feedstock into a gas, in accordance with one embodiment of the present invention.
Figure 18:
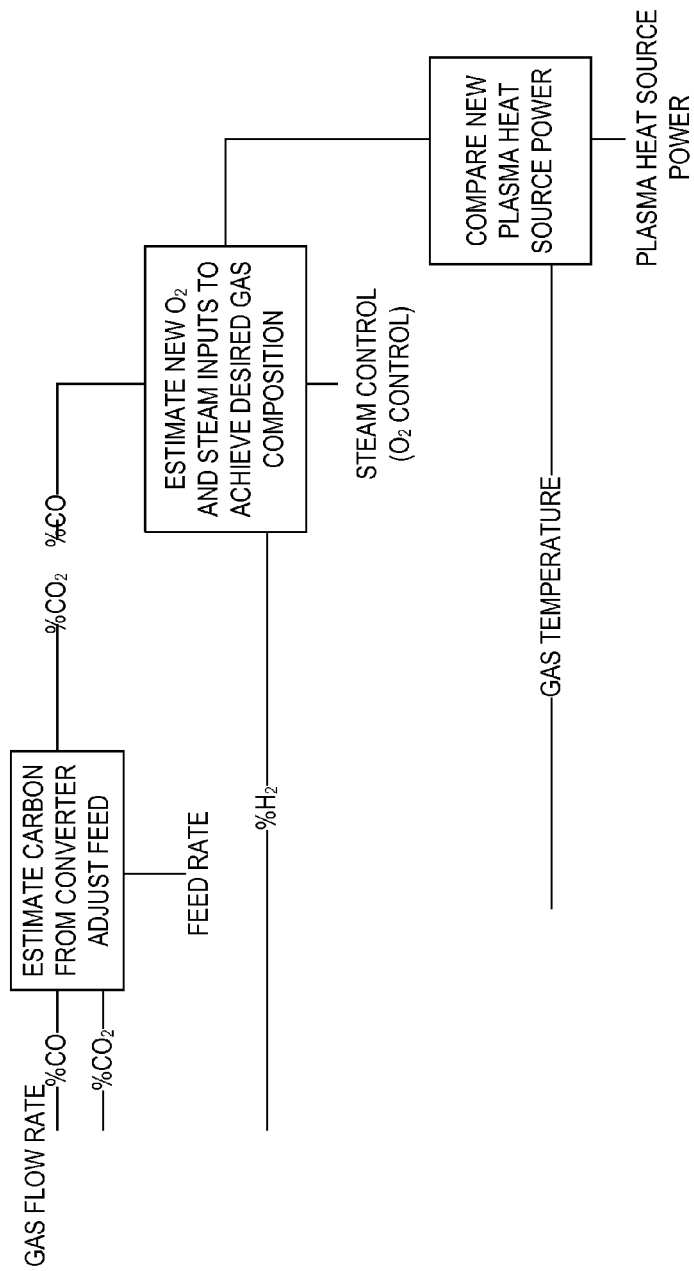
FIG. 18 is a schematic diagram depicting an exemplary control sequence implemented by the control system of FIG. 14.
Figure 19:
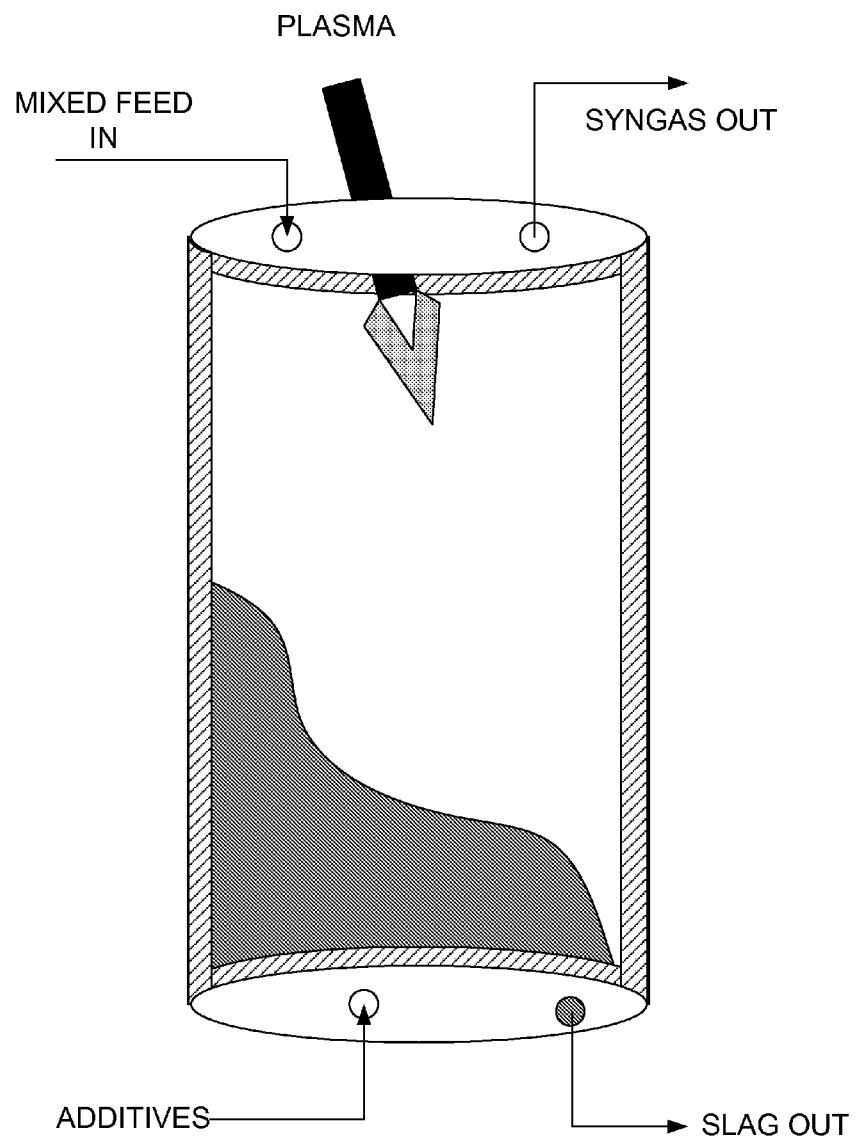
FIG. 19 is a schematic diagram of a converter for converting a carbonaceous feedstock into a gas, in accordance with one embodiment of the present invention.
Figure 20:
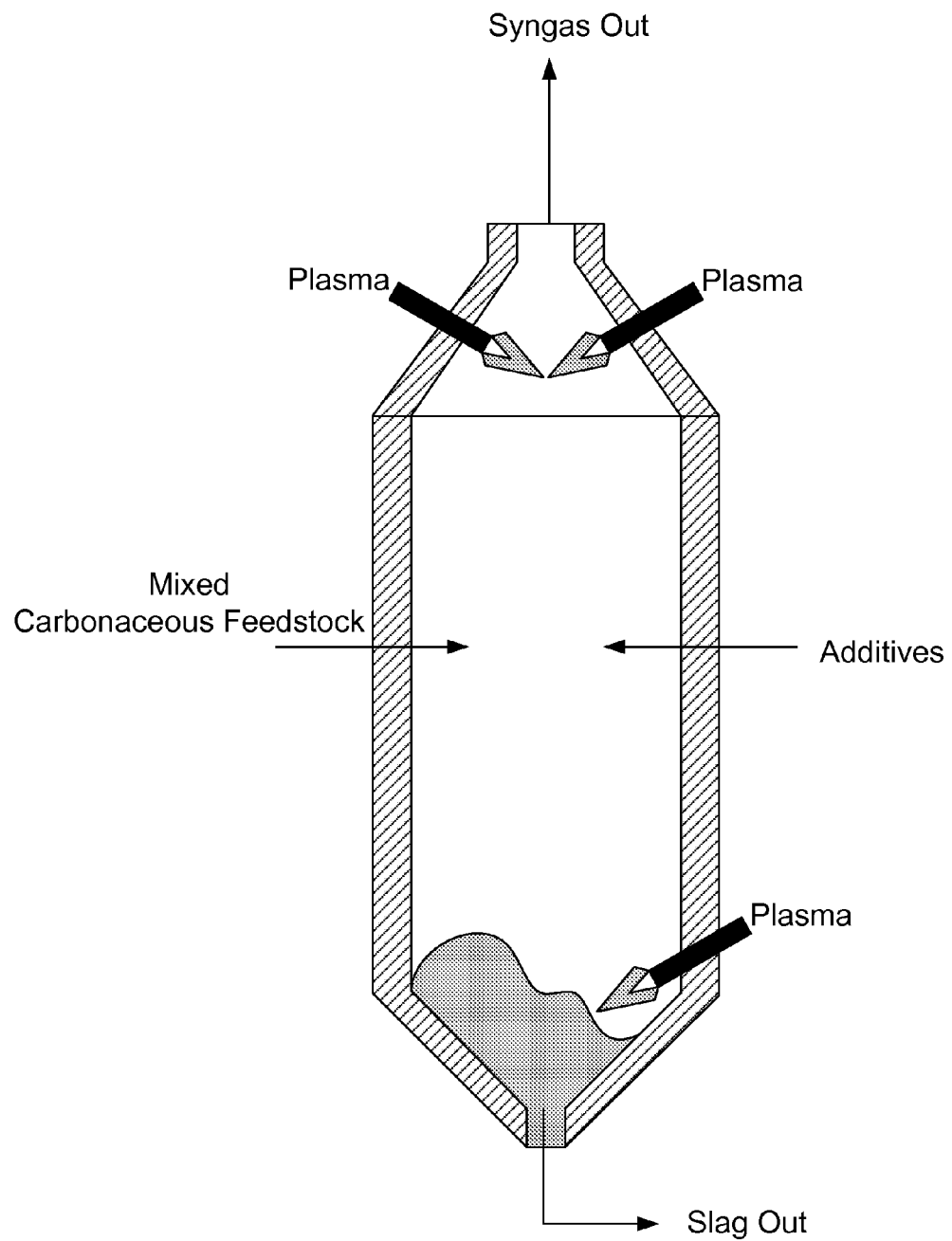
FIG. 20 is a schematic diagram of a converter for converting a carbonaceous feedstock into a gas, in accordance with one embodiment of the present invention.
Figure 21:
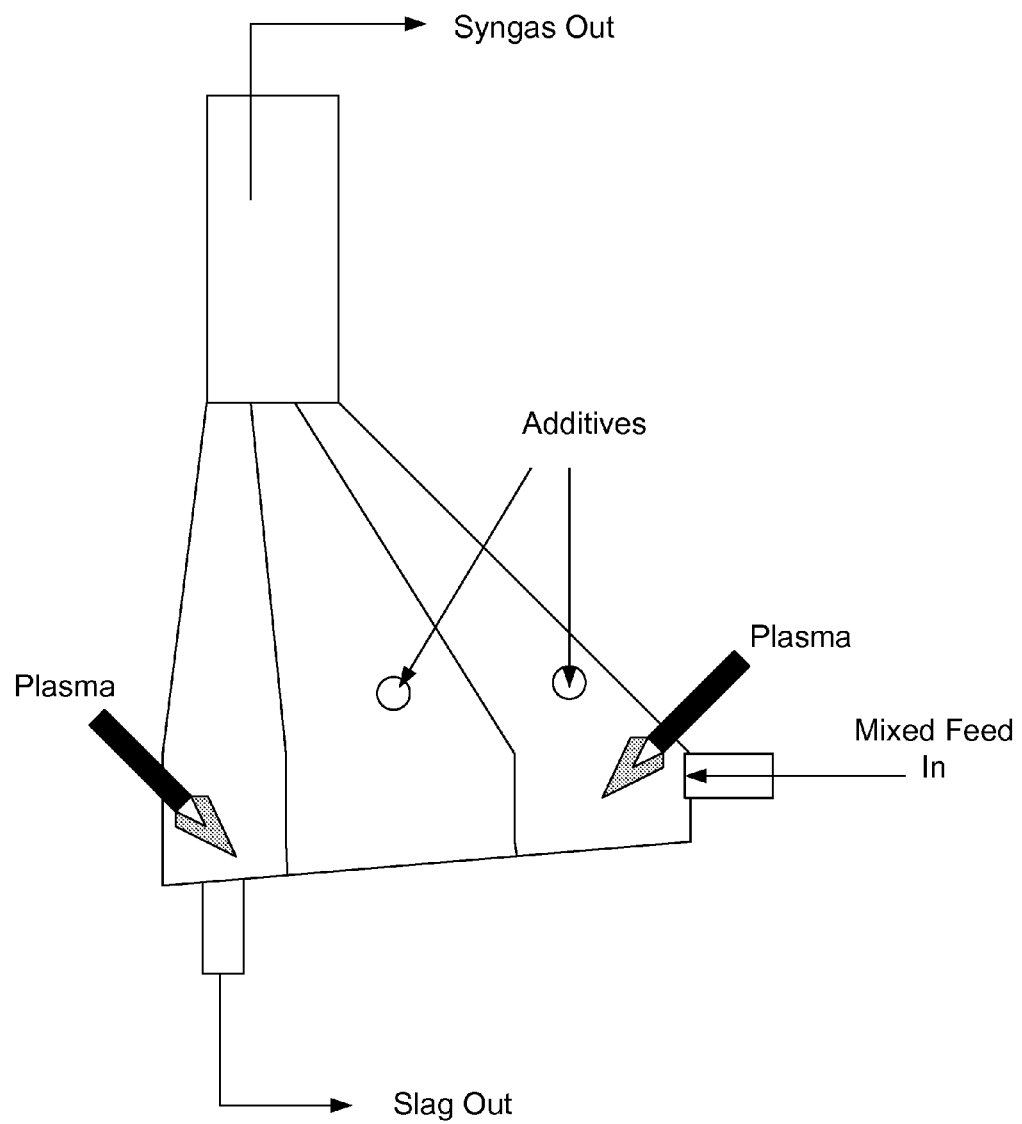
FIG. 21 is a schematic diagram of a converter for converting a carbonaceous feedstock into a gas, in accordance with one embodiment of the present invention.
Figure 22:
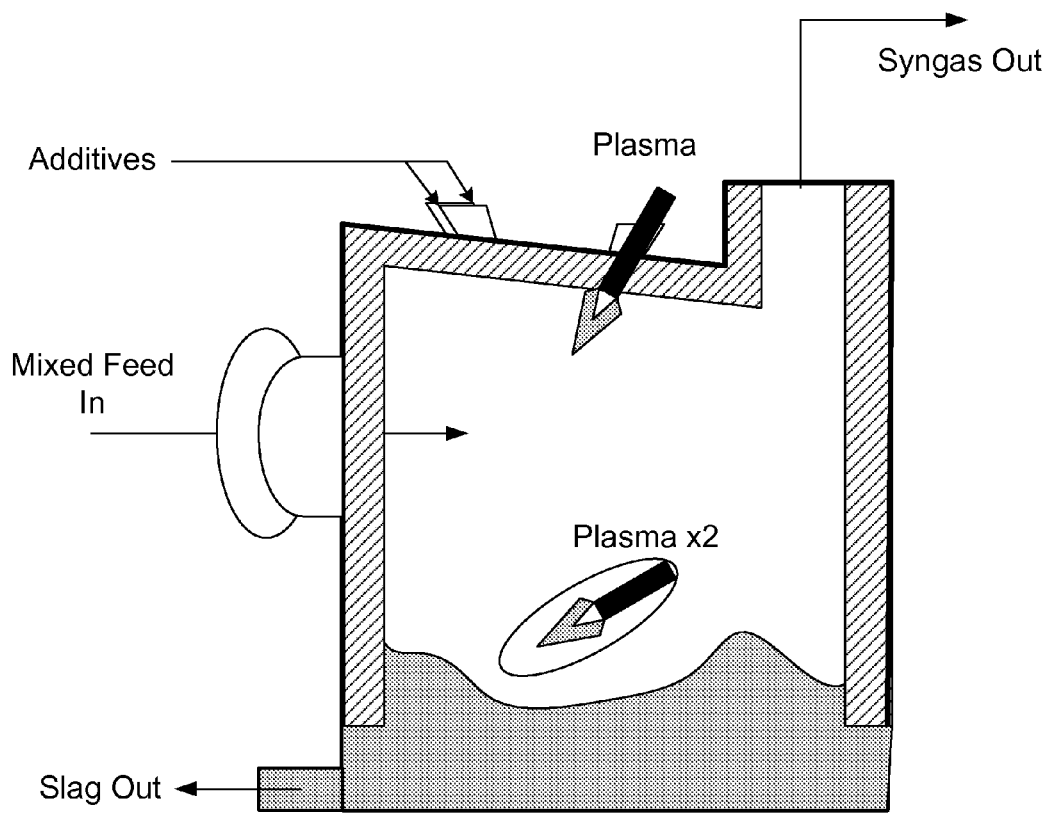
FIG. 22 is a schematic diagram of a converter for converting a carbonaceous feedstock into a gas, in accordance with one embodiment of the present invention.

FIGS. 17 and 18 provide a further example of how the control system can be used to control conversion of a carbonaceous feedstock into a gas. In this example, water is preheated into steam as an additive input, oxygen preheated as an air additive input, and carbonaceous feedstock preheated for feeding into a converter for conversion. On the output of the converter, the flow rate, temperature and composition of the product gas is monitored using one or more sensing elements.

As shown in FIG. 18, the sensed gas flow rate, % CO and % CO2 is used to estimate a carbon content of the product gas and thereby adjust a feedstock feed rate. The sensed % CO and % $CO_2$ are further used, as well as the sensed % $H_2$, to estimate a new $O_2$ and steam input rate to achieve a desired gas composition. Finally, the sensed gas temperature is used to adjust a plasma heat source power, if needed.

The embodiments of the invention in which an exclusive property or privilege is claimed are defined as follows:

1. A method for controlling processing of a feedstock of highly variable carbon content into a gas having substantially consistent characteristics, the method comprising the steps of:
providing a facility configured to process the feedstock of highly variable carbon content into the gas having substantially consistent characteristics in accordance with a global process, said facility comprising one or more feedstock inputs, one or more additive inputs, one or more plasma heat sources and one or more outputs, said global process comprising a plurality of local processes, regional processes, or both;
sensing a plurality of operational characteristics, each operational characteristic indicative of one or more of the global, local and regional processes;
generating, using one or more computing platforms, one or more control parameters based on information indicative of said plurality of operational characteristics, the one or more control parameters conducive to obtain, adjust towards or maintain a plurality of target conditions of the global, local and regional processes, wherein the one or more control parameters are configured for cooperatively controlling two or more of the global, local and regional processes;
controlling, using a plurality of response elements communicatively linked to the one or more computing platforms, the global, local and regional processes based-at least in part on the one or more control parameters; and
representing one or more of the plurality of operational characteristics by a numeric characteristic value;
wherein said generating one or more control parameters includes computing one or more of the control parameters based in part on a comparison of:
one or more of the characteristic values wherein each of the characteristic values is provided directly or indirectly by one or more sensing element or is derived from signals provided directly or indirectly by the one or more sensing elements, with one or more numeric target values or ranges thereof wherein each of the one or more target values is associated with one or more of the target conditions;
wherein the one or more operational characteristics include a $H_2$ content of the gas and a CO content of the gas, wherein the $H_2$ content of the gas is represented by a characteristic value $[H_2]$ and the CO content of the gas is represented by a characteristic value $[CO]$, wherein said one or more control parameters include a parameter for controlling input of air [Air] into a gasifier of the facility and a parameter for controlling input of steam [Steam] into the gasifier, wherein the parameters [Air] and [Steam] are determined at least in part using a relationship according to:

$$\begin{bmatrix} H_2 \\ CO \end{bmatrix} = \begin{bmatrix} a & b \\ c & d \end{bmatrix} \begin{bmatrix} Air \\ Steam \end{bmatrix}$$

and wherein a b c and d are empirical values that depend on facility design and one or more desired output characteristics of the facility.

2. The method according to claim 1, wherein the plurality of operational characteristics includes a carbon content of the gas, wherein the facility comprises one or more lateral transfer units configured to facilitate lateral movement of converter solids derived from the feedstock within the facility, and wherein the one or more control parameters includes a parameter for control of motion of the one or more lateral transfer units, the parameter for control of motion of the one or more lateral transfer units based at least in part on the carbon content of the gas.

3. The method according to claim 1, wherein the plurality of operational characteristics includes a carbon content of the gas, wherein the feedstock comprises a Carbonaceous Feedstock and a High Carbon Feedstock, and wherein the one or more control parameters includes a parameter for control of a feed rate of the Carbonaceous Feedstock into the facility and a parameter for control of a feed rate of the High Carbon Feedstock into the facility, the parameter for control of the feed rate of the Carbonaceous Feedstock and the parameter for control of the feed rate of the High Carbon Feedstock based at least in part on the carbon content of the gas.

4. The method according to claim 1, wherein the plurality of operational characteristics includes a carbon content of the gas, wherein the facility comprises one or more lateral transfer units configured to facilitate lateral movement of converter solids derived from the feedstock within the facility, wherein the feedstock comprises a Carbonaceous Feedstock and a High Carbon Feedstock, and wherein the one or more control parameters includes a parameter for control of a feed rate of the Carbonaceous Feedstock into the facility, a feed rate of the High Carbon Feedstock into the facility, a parameter for control of motion of the one or more lateral transfer units, and a parameter for control of total airflow through at least a predetermined portion of the facility, the parameter for control of motion of the one or more lateral transfer units, the parameter for control of the feed rate of the Carbonaceous Feedstock, the parameter for control of the feed rate of the High Carbon Feedstock, and the parameter for control of total airflow based at least in part on the carbon content of the gas.

5. The method according to claim 1, wherein the plurality of operational characteristics includes a carbon content of the gas, wherein the feedstock comprises a Carbonaceous Feedstock and a High Carbon Feedstock, and wherein the one or more control parameters includes a parameter for control of a feed rate of the Carbonaceous Feedstock into the facility, a parameter for control of a feed rate of the High Carbon Feedstock into the facility and a parameter for control of an addition rate of steam into a predetermined portion of the facility, the parameter for control of the feed rate of the Carbonaceous Feedstock, the parameter for control of the feed rate of the High Carbon Feedstock, and the parameter for control of the addition rate of steam based at least in part on the carbon content of the gas.

6. The method according to claim 1, wherein the plurality of operational characteristics includes a fuel value of the gas, wherein the feedstock comprises a Carbonaceous Feedstock and a High Carbon Feedstock, and wherein the one or more control parameters includes a parameter for control of a feed rate of the Carbonaceous Feedstock into the facility and a parameter for control of a feed rate of the High Carbon Feedstock into the facility, the parameter for control of the feed rate of the Carbonaceous Feedstock and the parameter for control of the feed rate of the High Carbon Feedstock based at least in part on the fuel value of the gas.

7. The method according to claim 1, wherein the plurality of operational characteristics includes a fuel value of the gas, wherein the facility comprises one or more lateral transfer units configured to facilitate lateral movement of converter solids derived from the feedstock within the facility, wherein the feedstock comprises a Carbonaceous Feedstock and a High Carbon Feedstock, and wherein the one or more control parameters includes a parameter for control of a feed rate of the Carbonaceous Feedstock into the facility, a feed rate of the High Carbon Feedstock into the facility, a parameter for control of motion of the one or more lateral transfer units, and a parameter for control of total airflow through at least a predetermined portion of the facility, the parameter for control of motion of the one or more lateral transfer units, the parameter for control of the feed rate of the Carbonaceous Feedstock, the parameter for control of the feed rate of the High Carbon Feedstock, and the parameter for control of total airflow based at least in part on the fuel value of the gas.

8. The method according to claim 1, wherein the facility comprises one or more lateral transfer units configured to facilitate lateral movement of converter solids derived from the feedstock within the facility, wherein the feedstock comprises a Carbonaceous Feedstock and a High Carbon Feedstock, and wherein the one or more control parameters includes one or more of: a parameter for control of a feed rate of the Carbonaceous Feedstock into the facility, a parameter for control of a feed rate of the High Carbon Feedstock into the facility, a parameter for control of motion of the one or more lateral transfer units, and a parameter for control of an addition rate of steam into at least a predetermined portion of the facility, the parameter for control of motion of the one or more lateral transfer units, the parameter for control of the feed rate of the Carbonaceous Feedstock, the parameter for control of the feed rate of the High Carbon Feedstock, and the parameter for control of the addition rate of steam based at least in part on the $H_2$ content of the gas.

9. The method according to claim 1, wherein the facility comprises one or more lateral transfer units configured to facilitate lateral movement of converter solids derived from the feedstock within the facility, wherein the feedstock comprises a Carbonaceous Feedstock and a High Carbon Feedstock, and wherein the one or more control parameters includes one or more of: a parameter for control of a feed rate of the Carbonaceous Feedstock into the facility, a parameter for control of a feed rate of the High Carbon Feedstock into the facility, a parameter for control of motion of the one or more lateral transfer units, and a parameter for control of an addition rate of steam into at least a predetermined portion of the facility, the parameter for control of motion of the one or more lateral transfer units, the parameter for control of the feed rate of the Carbonaceous Feedstock, the parameter for control of the feed rate of the High Carbon Feedstock, and the parameter for control of the addition rate of steam based at least in part on the CO content of the gas.

10. The method according to claim 1, wherein the plurality of operational characteristics includes one or both of a gas pressure of the gas and a gas composition of the gas and wherein the one or more control parameters includes one or more of a parameter adjustment of an additive input rate and a parameter for adjustment of a feedstock input rate, the parameter for adjustment of the additive input rate and the parameter for adjustment of the feedstock input rate based at least in part on one or both of the gas pressure and the gas composition.

11. The method according to claim 1, wherein the plurality of operational characteristics includes a gas composition of the gas and wherein the one or more control parameters includes a parameter for control of an additive input rate, the parameter for control of the additive input rate based at least in part on the gas composition.

12. The method according to claim 11, wherein said gas composition is used to determine a heating value of the gas, and wherein said additive input rate comprises an air additive input rate which is adjusted as a function of said heating value.

13. The method according to claim 12, wherein said air additive input rate is adjusted as a linear function of said heating value.

14. The method according to claim 1, wherein the one or more control parameters includes a parameter for control of an additive input rate, the parameter for control of the additive input rate based at least in part on one or both of the CO content and the $H_2$ content.

15. The method according to claim 1, wherein said feedstock of highly variable carbon content is defined by a feedstock heating value range, said heating value range being from about 3000 KJ/Kg to about 33000 KJ/Kg.

16. The method according to claim 1, wherein:
said generating one or more control parameters includes:
determining one or more select control parameters of the one or more control parameters, the one or more select control parameters for control of at least one select response element of the plurality of response elements; and
said controlling includes generating, at least in part using the one or more computing platforms, one or more control signals based at least in part on the one or more select control parameters, and providing the one or more control signals to the at least one select response element for control thereof.

17. The method according to claim 1, wherein one or more of the characteristic values are indicative of a composition of the gas and wherein one or more of the control parameters are configured for adjusting an input rate of an additive to one or more of the global, local and regional processes, wherein said input rate is adjusted at least in part as a function of the gas composition.

18. The method according to claim 1, wherein one or more of the characteristic values are indicative of a composition of the gas and said one or more characteristic values are used at least in part to derive a measurement of a heating value of the gas, wherein one or more of the control parameters are configured for adjusting an input rate of an air additive to one or more of the global, local and regional processes, and wherein said input rate is adjusted at least in part as a function of the heating value.

19. The method according to claim 18, wherein the input rate is adjusted as a linear function of the heating value.

20. The method according to claim 1, wherein one or more of the characteristic values are indicative of a composition of the gas, the composition including a sensed CO content of the gas and a sensed $H_2$ content of the gas, wherein one or more of the control parameters are configured for adjusting an input rate of an additive to one or more of the global, local and regional processes, wherein said input rate is adjusted at least in part as a function of the sensed CO content of the gas and the sensed $H_2$ content of the gas.

21. The method according to claim 1, wherein the parameter [Air] for controlling the amount of Air fed into a gasifier of the facility as a process additive is generated as a function of the Heating Value [HV] of the gas, in accordance with:
[HV]=[a] [Air];
wherein [a] is an empirical value that depends on design of the facility and one or more desired output characteristics of the facility.

22. The method according to claim 21, wherein the heating value is a Low Heating Value (LHV) of the gas.

23. The method according to claim 21, wherein the heating value is a High Heating Value (HHV) of the gas.

24. The method according to claim 1, wherein the facility comprises one or more lateral transfer units configured to facilitate lateral movement of converter solids derived from the feedstock within the facility, wherein the feedstock comprises a Carbonaceous Feedstock and a High Carbon Feedstock, the method further comprising receiving an output from a converter solids level detection module operatively associated with the facility, wherein at least a portion of the output from the converter solids level detection module is cooperatively used for generation of one or more of the control parameters, said one or more of the control parameters for control of: motion of the one or more lateral transfer units, a feed rate of the Carbonaceous Feedstock (CF) and a feed rate of the High Carbon Feedstock (HCF).

25. The method according to 24, wherein are generated based on a linear relationship defined between the rate of motion of the one or more lateral transfer units, the feed rate of the Carbonaceous Feedstock, the feed rate of the High Carbon Feedstock, and a height of solids in a gasifier of the facility.

26. The method according to claim 1, wherein the feedstock comprises a Carbonaceous Feedstock and a High Carbon Feedstock, wherein the facility comprises a splitter configured to facilitate feeding of the Carbonaceous Feedstock and the High Carbon Feedstock into the facility, wherein the plurality of operational characteristics includes a carbon content of the gas and a Carbonaceous Feedstock (CF):High Carbon Feedstock (HCF) ratio, wherein the one or more control parameters includes a parameter for control of the splitter, a parameter for control of a feed rate of the Carbonaceous Feedstock, and a parameter for control of a feed rate of the High Carbon Feedstock, and wherein the parameter for control of the splitter, the parameter for control of the feed rate of the Carbonaceous Feedstock, and the parameter for control of the feed rate of the High Carbon Feedstock are based at least in part on the carbon content of the gas.

27. The method according to claim 1, wherein the feedstock comprises a Carbonaceous Feedstock and a High Carbon Feedstock, wherein the facility comprises one or more lateral transfer units configured to facilitate lateral movement of converter solids derived from the feedstock within the facility and a splitter configured to facilitate feeding of the Carbonaceous Feedstock and the High Carbon Feedstock into the facility, wherein the plurality of operational characteristics includes a fuel value of the gas, and wherein the one or more control parameters includes one or more parameters for control of a Fuel:Air ratio controller, and one or more parameters for controlling a feed rate of total Carbonaceous Feedstock (CF) and High Carbon Feedstock (HCF) directed to the splitter, the Fuel:Air ratio controller providing one or more control parameters to a transfer unit controller for control of motion of one or more of the lateral transfer units.

28. The method according to claim 1, wherein the feedstock comprises a Carbonaceous Feedstock and a High Carbon Feedstock, wherein the one or more control parameters include a parameters for control of a feed rate of the Carbonaceous Feedstock and a parameter for control of a feed rate of the High Carbon Feedstock, the parameter for control of the feed rate of the Carbonaceous Feedstock and the parameter for control of the feed rate of the High Carbon Feedstock based at least in part on the $H_2$ content of the gas and the CO content of the gas.

29. The method according to claim 1, wherein said controlling comprises real-time control.

30. The method according to claim 1, wherein said controlling comprises continuous control.

31. The method according to claim 1, wherein the plurality of operational characteristics includes one or more of, a flow rate of the gas, a pressure of the gas, and a composition of the gas, and wherein said one or more control parameters comprise one or more of: a parameter for control of an additive input rate, a parameter for control of a feedstock input rate, a parameter for control of an air to fuel input ratio, a parameter for control of a MSW to HCF input ratio and a parameter for control of a steam to fuel input ratio.

* * * * *